(12) United States Patent
Kimura et al.

(10) Patent No.: US 7,440,381 B2
(45) Date of Patent: Oct. 21, 2008

(54) OPTICAL PICK-UP APPARATUS

(75) Inventors: Tohru Kimura, Hachioji (JP); Kohei Ota, Hachioji (JP)

(73) Assignee: Konica Corporation, Tokyo (JP)

( * ) Notice: Subject to any disclaimer, the term of this patent is extended or adjusted under 35 U.S.C. 154(b) by 164 days.

(21) Appl. No.: 11/120,374

(22) Filed: May 2, 2005

(65) Prior Publication Data

US 2005/0281169 A1 Dec. 22, 2005

Related U.S. Application Data

(63) Continuation of application No. 09/846,238, filed on May 2, 2001, now Pat. No. 6,898,168.

(30) Foreign Application Priority Data

| | | | |
|---|---|---|---|
| May 12, 2000 | (JP) | ............... | 2000-139836 |
| Jun. 23, 2000 | (JP) | ............... | 2000-189466 |
| Aug. 31, 2000 | (JP) | ............... | 2000-262372 |
| Oct. 30, 2000 | (JP) | ............... | 2000-330009 |
| Dec. 25, 2000 | (JP) | ............... | 2000-392333 |

(51) Int. Cl.
*G11B 7/00* (2006.01)
(52) U.S. Cl. .............................. 369/112.01
(58) Field of Classification Search ............ 369/112.01, 369/112.1, 112.2, 112.24, 44.23, 44.24
See application file for complete search history.

(56) References Cited

U.S. PATENT DOCUMENTS 6,192,022 B1 * 2/2001 Hendriks et al. ....... 369/112.24

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An optical pickup apparatus for conducting recording and/or reproducing information of an optical information recording medium, comprises a light source; a converging optical system having an objective lens; and a photo-detector. The converging optical system comprises a plastic lens and a spherical aberration deviation correcting element to correct deviation of a spherical aberration of the converging optical system. A numerical aperature of the objective lens at an image-side is 0.65 or more.

45 Claims, 48 Drawing Sheets

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

FIG. 39 (a)
FIG. 39 (b)
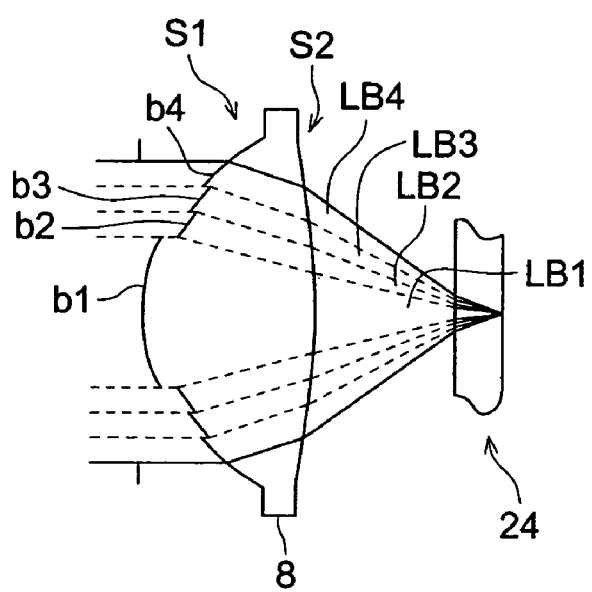
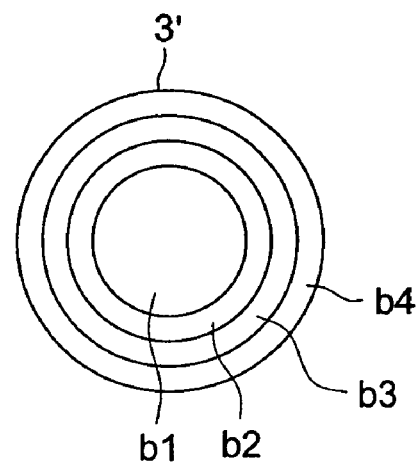

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

OPTICAL PICK-UP APPARATUS

This application is a continuation application of U.S. application Ser. No. 09/846,238, filed May 2, 2001 now U.S. Pat. No. 6,898,168, which claims the foreign priority benefit of Japanese Application Nos. 2000-139,836, filed May 12, 2000, 2000-189,466, filed Jun. 23, 2000, 2000-262,372, filed Aug. 31, 2000, 2000-330,009, filed Oct. 30, 2000, and 2000-392,333, filed Dec. 25, 2000.

BACKGROUND OF THE INVENTION

The present invention relates to an optical pick-up apparatus, an apparatus for recording/reproducing information of an optical information recording medium, and beam expander, and particularly to an optical pick-up apparatus, objective lens and beam expander, by which variations of the spherical aberration can be effectively corrected in a high density optical information recording medium.

Recently, according to the practical use of a short wavelength red semiconductor laser, the development of a DVD (digital versatile disk) which is a high density optical disk whose size is the almost same as a conventional optical disk, that is, a CD (compact disk) which is an optical information recording medium, and whose capacity is greatly increased, is advanced, and in near future, it is presupposed that a higher density next generation optical disk also appears in the market. In the optical system of the optical information recording and reproducing apparatus using such the optical disk as a medium, in order to attain the high densification of the recording signal, or to reproduce the high density recording signal, it is required that a spot diameter to converge the light onto the recording medium through the objective lens, is reduced. In order to attain this requirement, there is the actual situation that the reduction of the wavelength of the laser as the light source or the increase of the NA of the objective lens are considered.

In this connection, when the reduction of the wavelength of the laser or the increase of the NA of the objective lens thus comes to be realized, even an almost negligible problem in the optical pick-up apparatus structured by the combination of the comparatively long wavelength laser and the objective lens of low NA by which the recording or reproducing of the information is conducted on the conventional optical disk such as the CD or DVD, it is more actualized.

A problem actualized in the combination of the shortening of the wavelength of the laser and the increase of the NA of the objective lens, is a variation of the spherical aberration of the optical system due to the temperature and humidity change. That is, in comparison with a glass lens, a generally used plastic lens in the optical pick-up apparatus is easily deformable due to the temperature or humidity change, and thereby, the refractive index changes. Even in a variation of the spherical aberration by the change of the refractive index which is not a problem in the optical system used in the conventional pick-up apparatus, its amount is not negligible in the combination the reduction of the wavelength of the laser and the increase of the NA of the objective lens, and a problem in which the spot diameter is increased, is generated. Accordingly, in the optical system employing a plastic lens, a spherical aberration becomes an important problem.

Further, another problem in the combination of the shortening of the wavelength of the laser and the increase of the NA of the objective lens, is deviation of a spherical aberration taking place on the objective lens due to the slight deviation of wavelength of the light source. In the semiconductor laser used as a light source in the optical pickup apparatus, there is a deviation of ±10 nm among actual products of the semiconductor laser. Therefore, if a semiconductor laser having an wavelength deviating from a reference wavelength is used as the light source, the spherical aberration taking place on the objective lens becomes larger as the numerical aperture becomes lager. Owing to this, if it is determined that the semiconductor laser having an wavelength deviating from a reference wavelength is used as the light source, the selection for the semiconductor laser to be used as the light source will be required. As a result, the cost of the semiconductor laser will be raised.

Further, another problem in the combination of the shortening of the wavelength of the laser and the increase of the NA of the objective lens, is deviation of a spherical aberration of the optical system due to errors in the thickness of a protective layer (or a transparent substrate) of the optical disk. Since the spherical aberration caused by the errors in the thickness of the protective layer occurs in proportion to fourth power of numerical aperture of the objective lens, the influence of the errors in the thickness of the protective layer becomes larger as the numerical aperture of the objective lens becomes larger, there my be a fear that recording or reproducing information can not be conducted stably.

In this connection, for the recording or reproducing of the information, between the optical disk of the next generation requiring the combination of the reduction of the wavelength of the laser and the increase of the NA of the objective lens, and the conventional optical disk, the wavelength of the light source and the NA of the objective lens are greatly different from each other as described above. Further, in order to suppress the coma greatly generated due to the tilt of the disk surface from the surface perpendicular to the optical axis which is presupposed in the optical disk of the next generation, it is effective to reduce the transparent substrate thickness, however, according to that, the transparent substrate thickness is greatly different from the conventional optical disk such as a CD. For example, an optical disk proposed for use in a next future generation comprises a transparent substrate having a thickness of 0.1 mm which is greatly different from the thickness of a transparent substrate of CD or DVD. Therefore, if the information of CD or DVD is reproduced by the objective lens for use in the next future generation, a large spherical aberration may be occurred. Accordingly, at least by using the common objective lens, without greatly increasing the cost, and by a compact optical pick-up apparatus, how to record or reproduce the information by suppressing the spherical aberration for the different optical information recording medium including the next generation optical disk, is a problem.

Further, the other problems is a problem of the axial chromatic aberration caused in the objective lens due to minute variations of the wavelength of the laser light source. The change of the reflective index due to the minute variation of the wavelength of the general optical lens material is larger as the short wavelength is used. Therefore, the defocus amount of the focal point caused due to the minute variation of the wavelength becomes large. However, as it can be seen from a fact that the depth of focus of the objective lens is expressed by $k \cdot \lambda / NA^2$ (k is a proportional constant, $\lambda$ is the wavelength, and NA is a numerical aperture of an image side of the objective lens), the shorter the wavelength of the used light source is, the smaller the depth of the focus is, and even a few defocus amount is not allowed. Accordingly, in an optical system using a short wavelength light source such as the blue purple semiconductor laser (about 400 nm wavelength) and an objective lens having a high image side numerical aperture, in order to prevent a wavelength variation due to the mode hop phenomenon of the semiconductor laser, or the deterioration of the wave front aberration due to the high frequency superimposition, a correction of the axial chromatic aberration becomes important.

SUMMARY OF THE INVENTION

The present invention has been made in view of the above problems in prior and an object of the present invention is to provide an converging optical system and an optical pickup apparatus capable of correcting efficiently with a simple structure deviation in a spherical aberration occurring in each optical surface in an optical pickup apparatus due to variations in wavelength of a laser light source, changes in temperature and humidity, and errors in the thickness of a transparent base plate (substrate) on an optical information recording medium and in particular, capable of using a plastic lens for the converging optical system.

Further, another object of the present invention is to provide an optical pick-up apparatus by which the axial chromatic aberration due to the mode hopping and HFCS (high frequency superimposition) of the semiconduction laser can be effectively corrected, and its objective lens and the beam expander.

Further, sill another object of the present invention is to provide an optical pick-up apparatus which is provided with the short wavelength laser and the high NA objective lens, and which can record or reproduce the information for the different optical information recording medium. Hereinafter, examples of means of the present invention to solve the above problems will be exemplified.

(A) An optical pickup apparatus for conducting recording and/or reproducing information of an optical information recording medium, comprises:

a light source;

a converging optical system to converge light flux emitted from the light source on an information recording plane of the optical information recording medium so as to conduct reproducing and/or recording information of the optical information recording medium, the converging optical system having an objective lens; and a photo-detector to receive reflected light flux from the information recording plane;

wherein the converging optical system comprises at least a plastic lens and a spherical aberration deviation correcting element to correct deviation of a spherical aberration of the converging optical system and a numerical aperture of the objective lens at an image-side is 0.65 or more.

(B) An optical information recording medium recording and/or reproducing apparatus for conducting recording and/or reproducing information of an optical information recording medium, comprises:

an optical pickup apparatus comprising:

a light source;

an converging optical system to converge light flux emitted from the light source on an information recording plane of the optical information recording medium so as to conduct reproducing and/or recording information of the optical information recording medium, the converging optical system having an objective lens; and a photo-detector to receive reflected light flux from the information recording plane;

wherein the converging optical system comprises at least a plastic lens and a spherical aberration deviation correcting element to correct deviation of a spherical aberration of the converging optical system and a numerical aperture of the objective lens at an image-side is 0.65 or more.

(C) A spherical aberration deviation correcting element for use in an optical information recording medium recording and/or reproducing apparatus, comprises:

a positive lens group having at least one positive lens; and a negative lens group having at least one negative lens, wherein a numerical aperture of the objective lens at an image-side is 0.65 or more, at least one of the positive lens group and the negative lens group is movable in a direction of an optical axis and deviation of a spherical aberration of the optical pickup apparatus is corrected by moving the at least one of the positive lens group and the negative lens group in the direction of an optical axis, and wherein the spherical aberration deviation correcting element comprises at least one plastic lens.

(D) A spherical aberration deviation correcting element for use in an optical pickup apparatus for recording and/or reproducing information of the optical information recording medium, comprises:

a positive lens group having at least a positive lens; and a negative lens group having at least a negative lens, wherein at least one of the positive lens group and the negative lens group is a movable element movable in a direction of an optical axis and the movable element can change the slope angle of the marginal ray of an exit light flux by moving in a direction of the optical axis, and wherein each positive lens of the spherical aberration deviation correcting element has Abbe's numbers of 70 or less or each negative lens of the spherical aberration deviation correcting element has Abbe's numbers of 40 or more and the spherical aberration deviation correcting element comprise at least a diffractive surface having a ring-shaped diffractive structure.

(E) A spherical aberration deviation correcting element unit for use in an optical information recording medium recording and/or reproducing apparatus, comprising:

a spherical aberration deviation correcting element comprising, a positive lens group having at least one positive lens; and a negative lens group having at least one negative lens, wherein at least one of the positive lens group and the negative lens group is movable in a direction of an optical axis and deviation of a spherical aberration of the optical pickup apparatus is corrected by moving the at least one of the positive lens group and the negative lens group in the direction of an optical axis, and wherein each positive lens has Abbe's numbers of 70 or less and each negative lens has Abbe's numbers of 40 or more and the spherical aberration deviation correcting element comprise at least a diffractive surface having a ring-shaped diffractive structure; and a moving device to at least one of the positive lens and the negative lens in a direction of an optical axis.

Further, another preferable means to attain the above object are exemplified.

(1) An optical pick-up apparatus comprises a converging optical system including a light source, and an objective lens to converge the light flux emitted from the light source onto the information recording plane (surface) through a transparent substrate of an optical information recording medium, and a light detector to light-receive the reflected light from the optical information recording medium, wherein the objective lens includes a lens composed of at least one plastic lens, and because a means for correcting a variation of the spherical aberration caused by a change of at least one of the shape and the refractive index of the objective lens, and by the variation of the (oscillation) wavelength of the light source, for the environmental change between the temperature of −30 C to +85 C, and the humidity of 5% to 90%, is provided between the light source and the objective lens, even when a change of the refractive index is generated in the objective lens, or even when the change of the wavelength of the light source is generated, corresponding to the temperature or humidity change of the environment in which the optical pick-up apparatus is used, the variation of the spherical aberration of the objective lens caused due to them can be effectively suppressed.

In this connection, the objective lens is defined to be included 'between the light source and the objective lens', and accordingly, even the diffractive surface provided on the surface of the objective lens can become a means for correcting the variation of the spherical aberration in the present invention.

(2) An optical pickup apparatus comprises the light source of the wavelength λ, a converging optical system including the objective lens to converge the light flux emitted from the light source onto the information recording plane through the transparent substrate of the optical information recording medium, and a light detector for receiving the reflected light from the optical information recording medium, wherein a means for correcting the variation of the spherical aberration is provided between the light source and the objective lens, and because the means for correcting the variation of the spherical aberration can correct the spherical aberration up to 0.2 λrms to less than 0.07 λrms, for example, the variation of the spherical aberration of the objective lens caused due to the temperature or humidity change of the environment in which the optical pick-up apparatus is used, and/or the minute variation of the wavelength of the light source, can be effectively suppressed.

(3) The optical pick-up apparatus described in (2) is preferable when the means for correcting the variation of the spherical aberration can correct the spherical aberration up to the 0.5 λrms to not more than 0.07 λrms.

(4) An optical pick-up apparatus comprises the light source, a converging optical system including the objective lens to converge the light flux emitted from the light source onto the information recording plane through the transparent substrate of the optical information recording medium, and a light detector for light-receiving the reflected light from the optical information recording medium, wherein, because a means for correcting the variation of the spherical aberration generated in the objective lens is provided between the light source and the objective lens, for example, the variation of the spherical aberration of the objective lens caused due to the temperature or humidity change of the environment in which the optical pick-up apparatus is used, and/or the minute variation of the wavelength of the light source, can be effectively suppressed.

(5) Because there is a deviation of about ±10 nm among the individual bodies in the wavelength of the semiconductor laser, in the optical system using the objective lens having the light source of the short wavelength and the high image side numerical aperture, when the semiconductor laser deviated from the wavelength as the reference is used, it becomes a factor of the performance deterioration of the apparatus, and it may be necessary to select the semiconductor laser. An optical pick-up apparatus described in (5) is an optical pick-up apparatus comprising a light source, a converging optical system including the objective lens to converge the light flux emitted from the light source onto the information recording plane through the transparent substrate of the optical information recording medium, and a light detector for light-receiving the reflected light from the optical information recording medium, wherein, because a means for correcting the variation of the spherical aberration generated in the objective lens due to the minute variation of the wavelength of the light source, is provided between the light source and the objective lens, the variation of the spherical aberration of the objective lens caused when the semiconductor laser deviated from the wavelength as the reference is used, can be effectively suppressed, thereby, the selection of the semiconductor laser is not necessary.

(6) An optical pick-up apparatus comprises a light source, a converging optical system including the objective lens to converge the light flux emitted from the light source onto the information recording plane through the transparent substrate of the optical information recording medium, and a light detector for light-receiving the reflected light from the optical information recording medium, wherein, because a means for correcting the variation of the spherical aberration generated in the conversing optical system due to the temperature or humidity change is provided between the light source and the objective lens, thereby, for example, the variation of the spherical aberration of the objective lens caused due to the temperature or humidity change of the environment in which the optical pick-up apparatus is used, can be effectively suppressed.

(7) An optical pick-up apparatus comprises a light source, a converging optical system including the objective lens to converge the light flux emitted from the light source onto the information recording plane through the transparent substrate of the optical information recording medium, and a light detector for light-receiving the reflected light from the optical information recording medium, wherein, because a means for correcting the variation of the spherical aberration generated in the light conversing optical system due to the minute variation of the oscillation wavelength of the light source and the temperature or humidity change is provided between the light source and the objective lens, thereby, for example, the variation of the spherical aberration of the objective lens caused due to the temperature or humidity change of the environment in which the optical pick-up apparatus is used, and caused when the semiconductor laser deviated from the reference wavelength as the light source is used, can be effectively suppressed.

(8) The optical pick-up apparatus described in (1) to (7) is characterized in that a means for correcting the variation of the spherical aberration includes at least one positive lens and at least one negative lens, and at least one of them is a movable element which can move in the optical axis direction.

(9) Further, the optical pick-up apparatus described in (1) to (7) is characterized in that a means for correcting the variation of the spherical aberration has a positive lens group having the positive refractive power including at least one positive lens, and a negative lens group having the negative refractive power including at least one negative lens, and at least one lens group of them is a movable element which can move in the optical axis direction.

In the optical pick-up apparatus used the light source of the short wavelength, as described above, the variation of the spherical aberration due to the wavelength variation of the light source or the variation of the spherical aberration due to the temperature and humidity change is large. Particularly, when the objective lens of the high image side numerical aperture (high NA) or the objective lens composed of plastic material is used, the variation is increased. Accordingly, in the optical pick-up apparatus using the light source of the short wavelength, it is particularly necessary to provide a means for correcting the variation of these spherical aberration. When the spherical aberration of the objective lens is varied due to the minute change of the wavelength or the temperature or humidity change, by moving the movable element of a means for correcting the variation of the spherical aberration by an appropriate amount, and by changing the slope angle of the marginal ray of the light flux incident to the objective lens so that the spherical aberration of the wave front formed on the information recording plane is minimum, the variation of the spherical aberration can be corrected.

(10), (11) The optical pick-up apparatus described respectively in (8) and (9) is characterized in that a means for correcting the variation of the spherical aberration satisfies the following expression.

$$vdP > vdN \quad (1)$$

where, vdP: an average of Abbe's numbers of d lines of the all positive lenses including the positive lens, and vdN: an average of Abbe's numbers of d lines of the all negative lenses including the negative lens.

The above expression (1) relates to the correction of the axial chromatic aberration. Due to the minute variation of the wavelength of the light source, or the temperature or humidity change, in the case where the spherical aberration of the objective lens is varied, when a means for correcting it is, for example, comprised of an optical element movable in the optical axis direction by moving, the optical element by an appropriate amount, the slope angle of the marginal ray of the light flux incident to the objective lens can be changed so that the spherical aberration of the objective lens is minimum. For the axial chromatic aberration of the objective lens which becomes a problem when the short wavelength light source is used, it can be corrected when the means for correcting the variation of the spherical aberration is constituted by the following structure.

When the material of the positive lens and the negative lens in the means for correcting the variation of the spherical aberration is selected so that the above expression (1) is satisfied, the axial chromatic aberration which has the inverse sign to the axial chromatic aberration generated in the objective lens, can be generated. Accordingly, because the axial chromatic aberration is cancelled with each other, the wave front when it is focused on the optical information recording medium, transmitting through the means for correcting the variation of the spherical aberration and the objective lens, is in the condition that the axial chromatic aberration is suppressed to small. When the diffractive surface is provided to the objective lens and/or to the means for correcting the variation of the spherical aberration, because the back focus length of the diffractive surface decreases as the wavelength increases, the aberration can be more excellently corrected. In this case, because the role of the correction of the axial chromatic aberration can be allotted to the means for correcting the variation of the spherical aberration and the diffractive surface, when the means for correcting the variation of the spherical aberration comprises, for example, the optical element movable in the optical axis direction, the stroke of such the optical element can be small.

Further, when the role of the correction the correction the axial chromatic aberration correction is allotted to the means for correcting the variation of the spherical aberration and the diffractive surface, the power of the diffractive surface can be reduced to small, thereby, the interval of annular bands of the diffractive surface is increased, so that the diffraction efficiency of the diffractive surface can be increased. Accordingly, without separately providing the means for correcting the variation of the spherical aberration and the means for correcting the axial chromatic aberration, even when the variation of the wavelength or the temperature or humidity change is generated, a compact optical pick-up apparatus in which the spherical aberration of the whole optical system and the axial chromatic aberration is excellently corrected, can be obtained.

(12), (13) The optical pick-up apparatus described respectively in (10) and (11) is characterized in that the vdP and the vdN satisfy the following expressions.

$$vdP > 55 \quad (2)$$

$$vdN < 35 \quad (3)$$

When the difference of Abbe's number between the positive lens and the negative lens is increased, because the axial chromatic aberration of the inverse sign to that of the objective lens can be generated largely by the spherical aberration deriation (variation) correcting element, the axial chromatic aberration of the optical pick-up optical system can be more excellently corrected.

(14) The optical pick-up apparatus described in (8), (10), or (12) is characterized in that, when the means for correcting the variation of the spherical aberration is structured by a positive lens group including the positive lens and a negative lens group including the negative lens group, the following expression is realized, and the optical pick-up apparatus described in the fifteenth aspect is characterized in that, for the means for correcting the variation of the spherical aberration, the following expression is realized.

$$\Delta d \cdot |fP/fN|/\Delta vd \leq 0.05 \quad (4)$$

Where, $\Delta d$: the movement amount (mm) of the movable element when the information is recorded onto or reproduced from one information recording plane of an arbitrary one optical information recording medium onto or from which the information can be recorded or reproduced;

fP: the focal length (mm) of the positive lens group (where, when the diffractive surface is provided on the positive lens group, the total focal length in which the refractive power and diffractive power are combined);

fN: the focal length (mm) of the negative lens group (where, when the diffractive surface is provided on the positive lens group, the total focal length in which the refractive power and diffractive power are combined);

$\Delta vd$: in the positive lens group and the negative lens group, the difference between the maximum value of Abbe's number of the positive lens and the minimum value of Abbe's number of the negative lens.

The above expression (4) relates to the paraxial power of the means for correcting the variation of the spherical aberration and a balance of the movement amount of the movable element of the means for correcting the variation of the spherical aberration. Herein, even though $\Delta vd$ is small, when the value of $|fP/fN|$ is made large, the axial chromatic aberration of the objective lens can be finely corrected, and when the means for correcting the variation of the spherical aberration of the objective lens due to the variation of the wavelength or the temperature or humidity change is structured by using the optical element displaceable in the optical axis direction, the stroke of such the optical element can be suppressed to small, however, there is a possibility that the effective diameter of the positive lens group is too large, or the effective diameter of the negative lens group is too small. Reversely, when the value of the $\Delta vd$ is large, even when the value of $|fP/fN|$ is small, although the axial chromatic aberration of the objective lens can be finely corrected, the movement amount of the movable element of the means for correcting the variation of the spherical aberration necessary for correction of the spherical aberration becomes large, therefore, there is a possibility that the size of the optical system becomes large. Accordingly, when the value of Δd·|fP/fN|/Δvd is made to satisfy the above expression (4), the balance of them can be attained. hat is, an axial chromatic aberration can be corrected well and further a compact optical system can be obtained.

(16), (17) The optical pick-up apparatus described respectively in ((8), (10) or (12)) and ((9), (11) or (13)) can conduct the recording and/or reproducing of the information for at least 2 kinds of optical information recording media, and because the means for correcting the variation of the spherical aberration changes the slope angle of marginal ray of the light flux incident to the objective lens for at least 2 kinds of optical information recording media whose transparent substrate thickness are different from each other, corresponding to each transparent substrate thickness, the difference of the spherical aberration due to the difference of the transparent substrate thickness is corrected, and because the variation of the spherical aberration generated when the recording or the reproducing is conducted on each optical information recording medium, can be finely corrected, the fine wave front can always be formed on the information recording plane.

(18),(19) The optical pick-up apparatus described respectively in ((8), (10) or (10)) and ((9), (11) or (13) to (15)) can conduct the recording and/or reproducing of the information on the optical information recording medium in which a plurality of the transparent substrates and the information recording planes are laminated in order from the front surface side of the optical information recording medium, and when the means for correcting the variation of the spherical aberration respectively conducts the light converging on each information recording plane, because it changes the slope angle of the marginal ray of the incident light flux of the objective lens corresponding to the information recording plane, the difference of the spherical aberration due to the difference in the thickness is corrected, and because the variation of the spherical aberration generated when the recording or reproducing is conducted on the respective information recording plane, is finely corrected, the fine wave front can be respectively formed on the information recording plane for each information recording plane. As described above, the recording or reproducing of the information can be finely conducted also on the optical information recording medium having 2 layer- or the more layer-information recording planes. For example, when the objective lens is moved in the optical axis direction, the focusing can be conducted on desired one information recording plane, and in this case, because the spherical aberration varied due to the difference of the thickness up to the information recording plane is mainly 3 order spherical aberration, when the movable element of the means for correcting the variation of the spherical aberration is moved along the optical axis direction, the variation of the spherical aberration can be finely corrected. Accordingly, the recording or reproducing of the information of 2 times or the more, can be conducted on the surface of the single side of the optical information recording medium.

(20), (21) The optical pick-up apparatus described respectively in (16) and (17) is characterized in that, in the case where two kinds of transparent substrate thickness of the optical information recording medium are respectively a and b (a<b), when the information is recorded or reproduced on the optical information recording medium of the transparent substrate thickness a, the interval between the negative lens and the positive lens is increased more than the case where the information is recorded or reproduced on the optical information recording medium of the transparent substrate thickness b.

(22) The optical pick-up apparatus described in (16), (18), or (20) is characterized in that, when the means for correcting the variation of the spherical aberration is structured by the positive lens group including the positive lens and the negative lens group including the negative lens, the following expression is satisfied.

(23) The optical pick-up apparatus described in (17), (19) or (21) is characterized in that the following expression is satisfied.

$$|fP/fN| \geq 1.3 \tag{5}$$

Where, fP: the focal length (mm) of the positive lens group (where, when the diffractive surface is provided on the positive lens group, the whole focal length in which the refractive (refracting) power and diffractive (diffracting) power are totaled); and fN: the focal length (mm) of the negative lens group (where, when the diffractive surface is provided on the negative lens group, the whole focal length in which the refracting power and diffracting power are totaled).

The above expression (5) relates to the relationship of the paraxial power of the means for correcting the variation of the spherical aberration. In the case where the objective lens is corrected so that the aberration is minimum under the combination of the transparent substrate having the specific thickness, when the thickness of the transparent substrate is changed, by moving the movable element in the means for correcting the variation of the spherical aberration, it is necessary that the slope angle of the marginal ray of the incident light flux is changed so that the spherical aberration of the objective lens is minimum to the thickness. Accordingly, when the paraxial power of the means for correcting the variation of the spherical aberration is selected so that the above expression (5) is satisfied, the stroke of the movable element is decreased, thereby the totally compact optical system can be obtained.

(24) The optical pick-up apparatus described in one of (8) to (23) is characterized in that the means for correcting the variation of the spherical aberration has a transfer apparatus to transfer the movable element along the optical axis corresponding to the variation of the spherical aberration.

(25) The optical pick-up apparatus described in one of (8) to (24) is characterized in that the movable element is formed of the material of specific gravity not larger than 2.0. Thereby, the burden of the movable device can be lightened.

(26) The optical pick-up apparatus described in one of (8) to (25) is characterized in that at least one of the positive lens and the negative lens is formed of the plastic material. Particularly, when the movable element of the spherical aberration correction means is made of the plastic material, the burden onto the transfer apparatus can be lightened, and high speed tracking becomes possible. Further, when the components on which the diffractive surface or aspherical surface is provided, are formed of the plastic material, diffractive surface or aspherical surface can be easily added.

(27) The optical pick-up apparatus described in one (8) to (25) is characterized in that the movable element is formed of the plastic material. Thereby, the weight reduction of the optical system can be attained, thereby, the burden of the movable device can be lightened. Further, the diffractive structure can be easily added.

(28) The optical pick-up apparatus described in one of (8) to (27) is characterized in that at least one of the positive lens and the negative lens has the aspherical surface on at least one surface, and an optical pick-up apparatus described in the 29th aspect is characterized in that it has the aspherical surface on at least one surface of the movable element. By providing the aspherical surface, the means for correcting the variation of the spherical aberration can obtain the good performance optical system by the aberration correction action of the aspherical surface. Particularly, when the aspherical surface is provided on the movable element, the deterioration of the wave front aberration at the time of the decenter of movable element can be prevented.

(30) The optical pick-up apparatus described in one of (8) to (29) is characterized in that the means for correcting the variation of the spherical aberration is formed of the material whose saturate water absorption is not larger than 0.5%.

(31) The optical pick-up apparatus described in one of (8) to (30) is characterized in that the means for correcting the variation of the spherical aberration is formed of the material whose internal transmittance at the thickness of 3 mm, is not smaller than 85% to the light of the oscillation wavelength of the light source.

(32) The optical pick-up apparatus described in one (8) to (31) is characterized in that the means for correcting the variation of the spherical aberration is structured by one positive lens and one negative lens.

(33) In the optical pick-up apparatus described in one of (8) to (32), because the means for correcting the variation of the spherical aberration includes the optical element provided with the diffractive surface having the ring shaped diffractive structure, the axial chromatic aberration can be effectively corrected by using such the diffractive surface, therefore, it is not necessary that the optical element for the axial chromatic diffraction correction is newly provided, thereby, the low cost and space saving can be attained. In this connection, the optical element provided with the diffractive surface includes one lens of the lens group, and accordingly, it includes one side of the positive lens group or the negative lens group. Further, it also includes the optical element separately provided other than those lenses.

(34) The optical pick-up apparatus described in one of (1) to (7) is characterized in that the means for correcting the variation of the spherical aberration has the element whose refractive index distribution can be changed. As such the element, there is an element such as the element SE using the liquid crystal which will be described later referring to FIG. 24 and FIG. 24, however, the element is not limited to this.

(35) An optical pick-up element comprises the light source; the converging optical system including the objective lens to light converge the light flux emitted from the light source onto the information recording plane through the transparent substrate of the optical information recording medium; and the light detector to light receive the reflected light from the optical information recording medium. Wherein, because a means for correcting the variation of the spherical aberration generated in the objective lens, and the axial chromatic aberration generated in the objective lens is provided between the light source and the objective lens, the variation of the spherical aberration of the objective lens generated when the wavelength of the semiconductor laser as the light source is minutely varied, can be effectively suppressed. Further, even when the refractive index change is generated in the objective lens corresponding to the environmental temperature or humidity change, the variation of the spherical aberration of the objective lens due to that, can be effectively suppressed. Further, because the axial chromatic aberration generated in the objective lens can be effectively corrected, even when the instantaneous mode hopping of the oscillation wavelength to which the spherical aberration correction means or focusing of the objective lens can not follow is generated, a fine wave front can be always formed on the information recording plane.

(36) the optical pick-up apparatus described in (35) is characterized in that the means for correcting the variation of the spherical aberration and the axial chromatic aberration includes at least one positive lens and at least one negative lens, and at least one of them is a movable element which can be transferred in the optical axis direction.

(37) Further, the optical pick-up apparatus described in (35) is characterized in that the means for correcting the variation of the spherical aberration and the axial chromatic aberration includes the positive lens group having the positive diffracting power including one positive lens and the negative lens group having the negative diffracting power including one negative lens, and at least one lens group of them is a movable element which can be transferred in the optical axis direction.

In the optical pick-up apparatus used for the light source of the short wavelength, as described above, the variation of the wavelength of the light source or the variation of the spherical aberration due to the temperature or humidity change is large. Particularly, when the objective lens of the high image side numerical aperture (high NA) or the objective lens formed of the plastic material is used, the variation is increased. Accordingly, in the optical pick-up apparatus using the light source of the short wavelength, it is particularly necessary that the means for correcting the variation of these spherical aberration is provided. When the spherical aberration of the objective lens is varied due to the minute variation of the wavelength of the light source or the temperature or humidity change, by moving the movable element of the correction means for the variation of the spherical aberration and the axial chromatic aberration by an appropriate amount, when the divergent angle of the light flux (slope angle of the marginal ray of the incident light flux) incident to the objective lens is changed so that the wave front aberration of the wave front formed on the information recording medium is minimum, the variation of the spherical aberration can be corrected.

(38), (39) The optical pick-up apparatus described respectively in (36) and (37) is characterized in that the means for correcting the variation of the spherical aberration and the axial chromatic aberration satisfies the above expression (1).

The above expression (1) relates to the correction of the axial chromatic aberration. In the case where the spherical aberration of the objective lens is varied due to the minute variation or the temperature or humidity change, when the means for correcting this is structured by using the optical element transferable, for example, in the optical axis direction, the optical element is moved by an appropriate amount, and slope angle of marginal ray of the light flux incident to the objective lens can be changed so that the spherical aberration of the objective lens is minimum. The axial chromatic aberration of the objective lens which is a problem when the light source of the short wavelength is used, can be corrected when a means for correcting the variation of the spherical aberration and the axial chromatic aberration has the following structure.

When the material of the positive lens and the negative lens in the means for correcting the variation of the spherical aberration and the axial chromatic aberration is selected so as to satisfy the expression (1), the axial chromatic aberration of inversal sign to the axial chromatic aberration generated in the objective lens can be generated. Accordingly, because the chromatic aberrations are cancelled with each other, the wave front when it is focused onto the optical information recording medium through the means for correcting the variation of the spherical aberration and the axial chromatic aberration and the objective lens, is in the condition that the axial chromatic aberration is suppressed to small. When the diffractive surface is provided to the objective lens and/or the means for correcting the variation of spherical aberration and the axial chromatic aberration, because the back focus length of the diffractive surface decrease as the wavelength increases, the aberration can be more finely corrected. In this case, because the role of the axial chromatic correction can be allotted to the means for correcting the variation of the spherical aberration and the axial chromatic aberration and to the diffractive surface, when, for example, the means for correcting the variation of the spherical aberration and the axial chromatic aberration is structured by using the optical element transferable in the optical axis direction, the stroke of such the optical element is enough to be short.

Further, when the role of the correction the axial chromatic correction can be allotted to the means for correcting the variation of the spherical aberration and the axial chromatic aberration and to the diffractive surface, the power of the diffractive surface can be reduced, thereby, the interval of annular bands of the diffractive surface is increased, so that the diffraction efficiency of the diffractive surface can be increased. Accordingly, it is not necessary that the means for correcting the variation of the spherical aberration and the means for correcting the axial chromatic aberration are separately provided, and even when the wavelength variation or the temperature or humidity change is generated, the compact optical pick-up apparatus by which the spherical aberration of the whole optical system and the axial chromatic aberration are finely corrected, can be obtained.

(40), (41) The optical pick-up apparatus described respectively in (38) and (39) is characterized in that the vdP and the vdN satisfy the above expressions (2) and (3).

When the difference between Abbe's numbers of the positive lens and the negative lens is increased, because the axial chromatic aberration of the inverse sign to that of the objective lens can be generated largely by the spherical aberration deriation correcting element the axial chromatic aberration of the optical pick-up optical system can be more finely corrected.

(42) The optical pick-up apparatus described in (36), (38) or (40) is characterized in that, when the means for correcting the variation of the spherical aberration and the axial chromatic aberration is structured by the positive lens group including the positive lens and the negative lens group including the negative lens, the above expression (4) is realized.

(43) The optical pick-up apparatus described in (37), (39) or (41) is characterized in that the means for correcting the variation of the spherical aberration and the axial chromatic aberration satisfies the above expression (4).

The above expression (4) relates to the correction amount of the axial chromatic aberration of the objective lens, the paraxial power of the means for correcting the variation of the spherical aberration and the axial chromatic aberration, and a balance of the movement amount of the movable element of the means for correcting the variation of the spherical aberration and the axial chromatic aberration. Herein, even when the value of $\Delta vd$ is small, when the value of $|fP/fN|$ is increased, the axial chromatic aberration of the objective lens can be finely corrected, and when the means for correcting the variation of the spherical aberration and the axial chromatic aberration by which the variation of the spherical aberration of the objective lens due to the wavelength variation or the temperature or humidity change can be corrected, is structured by the optical element movable in the optical axis direction, the stroke of such the optical element can be suppressed to small, however, there is a possibility that the effective diameter of the positive lens group becomes too large, or the effective diameter of the negative lens group becomes too small. Reversely, when the value of $\Delta vd$ is increased, even when the value of $|fP/fN|$ is small, the axial chromatic aberration of the objective lens can be finely corrected, however, the movement amount of the movable element of the means for correcting the variation of the spherical aberration and the axial chromatic aberration is increased, therefore, there is a possibility that the size of the optical system becomes large. Accordingly, when the value of $\Delta d \cdot |fP/fN|/\Delta vd$ is made to satisfy the above expression (5), the balance of them can be attained. That is, an axial chromatic aberration can be corrected well and further a compact optical system can be obtained.

(44) The optical pick-up apparatus described in (36), (38) or (40) is characterized in that, when the means for correcting the variation of the spherical aberration and the axial chromatic aberration is structured by the positive lens group including the positive lens and the negative lens group including the negative lens, the next expression is realized.

(45) The optical pick-up apparatus described in (37), (39), or (41) to (43) is characterized in that the means for correcting the variation of the spherical aberration and the axial chromatic aberration satisfies the next expression.

$$\Delta d \cdot |fP/fN| \leq 0.50 \qquad (6)$$

Where, $\Delta d$: the movement amount (mm) of the movable element when the information is recorded onto or reproduced from one information recording plane of an arbitrary one optical information recording medium onto or from which the information can be recorded or reproduced; fP: the focal length (mm) of the positive lens group (where, when the diffractive surface is provided on the positive lens group, the whole focal length in which the refracting power and diffracting power are totaled); fN: the focal length (mm) of the negative lens group (where, when the diffractive surface is provided on the positive lens group, the whole focal length in which the refracting power and diffracting power are totaled); and $\Delta vd$: in the positive lens group and the negative lens group, the difference between the maximum value of Abbe's number of the positive lens and the minimum value of Abbe's number of the negative lens.

Incidentally, it may be preferable that $\Delta d$ is defied as followed: $\Delta d$ is a shifting distance necessary to correct the spherical aberration deviation lower than $\lambda$rms where the spherical aberration deviation occurs when the temperature raises +30° C. above the reference temperature (preferably, 15 to 35° C.).

The above expression (6) relates to the correction amount of the axial chromatic aberration of the objective lens, the paraxial power of the means for correcting the variation of the spherical aberration and the axial chromatic aberration, and a balance of the movement amount of the movable element of the means for correcting the variation of the spherical aberration and the axial chromatic aberration. When the refracting power as the refractive lens of the means for correcting the variation of the spherical aberration and the axial chromatic aberration, and the diffracting power of the diffractive surface added to the means for correcting the variation of the spherical aberration and the axial chromatic aberration, are appropriately combined, the axial chromatic aberration of the objective lens can be corrected. At this time, in the case where the means for correcting the variation of the spherical aberration and the axial chromatic aberration, by which the variation of the oscillation wavelength of the light source and the variation of the spherical aberration of the objective lens due to the temperature or humidity change are corrected, is structured by using the optical element transferable in the optical axis direction, when the stroke of such the optical element is too large, the problem that the spherical aberration can not be finely corrected, is generated. Accordingly, in the above expression (6), when the value of $\Delta d \cdot |fP/fN|$ is made not larger than 0.50, the balance of the correction of the axial chromatic aberration and the correction of the spherical aberration of the objective lens can be finely maintained.

(46), (47) In the optical pick-up apparatus described respectively in ((36), (38) or (40)) and ((37), (39), or (41) to (45)), the recording and/or reproducing of the information can be conducted on two kinds of optical information recording media, and because the means for correcting the variation of the spherical aberration and the axial chromatic aberration changes the slope angle of the marginal ray of the light flux incident to the objective lens to at least 2 kinds of optical information recording medium whose transparent substrate thickness are different from each other, corresponding to the respective transparent substrate thickness, the difference of the spherical aberrations due to the difference of the transparent substrate thickness is corrected, and further, because the variation of the spherical aberration generated when the recording or reproducing is conducted on the respective optical information recording medium, is finely corrected, the fine wave front can be always formed on the information recording plane.

(48), (49) In the optical pick-up apparatus described respectively in ((36), (38) or (40)) and ((37), (39), or (41) to (45)), the recording and/or reproducing of the information can be conducted on the optical information recording medium in which a plurality of transparent substrates and the information recording layers are laminated in the order from the front surface side of the optical information recording medium, and when the means for correcting the variation of the spherical aberration and the axial chromatic aberration respectively converges the light onto respective information recording planes, corresponding to the information recording layer, because the slope angle of the marginal ray of the light flux incident to the objective lens is changed, the difference of the spherical aberrations due to the difference of the thickness up to the information recording plane is corrected, and further, because the variation of the spherical aberration generated when the recording or reproducing is conducted on the respective optical information recording medium, is finely corrected, the fine wave front can be always formed respectively on the information recording plane for each of respective information recording plane. As described above, even for the optical information recording medium on whose single side surface the 2 layers or the more information recording planes are provided, the recording or reproducing of the information can be finely conducted. For example, when the objective lens is moved in the optical axis direction, the focusing can be obtained on one information recording plane, and in this case, because the spherical aberration varied by the difference of the thickness up to the information recording plane is mainly the tertiary order spherical aberration, when the movable element of the means for correcting the variation of the spherical aberration and the axial chromatic aberration is transferred along the optical axis direction, the variation of the spherical aberration can be finely corrected. Accordingly, the recording or reproducing of the 2 times or more information can be conducted on the single side surface of the information recording medium.

(50), (51) The optical pick-up apparatus described respectively in (46) and (47) is characterized in that, when the transparent substrate thickness of the 2 kinds of optical information recording media are respectively a and b (a<b), in the case where the recording or reproducing the information is conducted on the information recording plane of the optical information recording medium of the transparent substrate thickness a, the interval between the negative lens and the positive lens is more increased than the case where the recording or reproducing of the information is conducted on the information recording plane of the optical information recording medium of the transparent substrate thickness b.

(52) The optical pick-up apparatus described in (46), (48) or (50) is characterized in that, when the means for correcting the variation of the spherical aberration and the axial chromatic aberration is structured by the positive lens group including the positive lens and the negative lens group including the negative lens, the above expression (5) is satisfied.

(53) The optical pick-up apparatus described in (47), (49) or (51) is characterized in that the above expression (5) is satisfied.

The above expression (5) relates to the relationship of the paraxial power of the means for correcting the variation of the spherical aberration and the axial chromatic aberration. In the case where the objective lens is corrected so that the aberration is minimum under the combination of the transparent substrate having the specific thickness, when the thickness of the transparent substrate is changed, by moving the movable element in the means for correcting the variation of the spherical aberration and the axial chromatic aberration, it is necessary that slope angle of the marginal ray of the incident light flux is changed so that the spherical aberration of the objective lens is minimum to the thickness. Accordingly, when the paraxial power of the means for correcting the variation of the spherical aberration and the axial chromatic aberration is selected so that the above expression (5) is satisfied, the stroke of the movable element is decreased, thereby the totally compact optical system can be obtained.

(54) The optical pick-up apparatus described in one of (36) to (53) is characterized in that the means for correcting the variation of the spherical aberration and the axial chromatic aberration has the transfer apparatus to transfer the movable element along the optical axis corresponding to the variation of the spherical aberration.

(55) The optical pick-up apparatus described in one of (36) to (54) is characterized in that the movable element is formed of the material whose density is not larger than 2.0. Thereby, the burden of the movable element onto the transfer apparatus can be lightened.

(56) The optical pick-up apparatus described in one of (36) to (55) is characterized in that at least one of the positive lens and the negative lens is formed of the plastic material. Particularly, when the movable element of the means for correcting the variation of the spherical aberration and the axial chromatic aberration is made of the plastic material, the burden onto the transfer apparatus can be lightened, and high speed tracking becomes possible. Further, when the components on which the diffractive surface or aspherical surface is provided, are formed of the plastic material, diffractive surface on aspherical surface can be easily added.

(57) The optical pick-up apparatus described in one of (36) to (55) is characterized in that the movable element is formed of the plastic material. Thereby, the weight reduction of the optical system can be attained, thereby, the burden of the movable device can be lightened. Further, the diffractive structure can be easily added.

(58) The optical pick-up apparatus described in one of (36) to (57) is characterized in that at least one of the positive lens and the negative lens has the aspherical surface on at least one surface, and an optical pick-up apparatus described in the 59th aspect is characterized in that it has the aspherical surface on at least one surface of the movable element. By providing the aspherical surface, the means for correcting the variation of the spherical aberration and the axial chromatic aberration can obtain the good performance optical system by the aberration correction action of the aspherical surface. Particularly, when the aspherical surface is provided on the movable element, the deterioration of the wave front aberration at the time of the decenter of movable element can be prevented.

(60) The optical pick-up apparatus described in one of (36) to (59) is characterized in that the means for correcting the variation of the spherical aberration and the axial chromatic aberration is formed of the material whose saturate water absorption is not larger than 0.5%.

(61) The optical pick-up apparatus described in one of (36) to (60) is characterized in that the means for correcting the variation of the spherical aberration and the axial chromatic aberration is formed of the material whose internal transmittance at the thickness of 3 mm, is not smaller than 85% to the light of the oscillation wavelength of the light source.

(62) The optical pick-up apparatus described in one of (36) to (61) is characterized in that the means for correcting the variation of the spherical aberration and the axial chromatic aberration is structured by one positive lens and one negative lens.

(63) In the optical pick-up apparatus described in one of (36) to (62), because, when the means for correcting the variation of the spherical aberration and the axial chromatic aberration includes the optical element provided with the diffractive surface having the ring shaped diffractive structure, the axial chromatic aberration can be effectively corrected by using such the diffractive surface, therefore, it is not necessary that the optical element for the axial chromatic diffraction correction is newly provided, thereby, the low cost and space saving can be attained. In this connection, the optical element provided with the diffractive surface includes one lens of the lens group, and accordingly, it includes one side of the positive lens group or the negative lens group. Further, it also includes the optical element separately provided other than those lenses.

(64) The optical pick-up apparatus described in (35) is characterized in that the means for correcting the variation of the spherical aberration and the axial chromatic aberration has the element whose refractive index distribution can be changed.

(65) The optical pick-up apparatus described in (64) is characterized in that the means for correcting the variation of the spherical aberration and the axial chromatic aberration has a coupling lens provided with the function for correcting the axial chromatic aberration of the objective lens.

(66) The optical pick-up apparatus described in one of (1) to (65) is characterized in that it has the optical element provided with the diffractive surface having the ring shaped diffractive structure.

(67) The optical pick-up apparatus described (66) is characterized in that the objective lens is the optical element (optical element provided with the diffractive surface having the ring band shaped diffractive structure).

(68) The optical pick-up apparatus described in (67) is characterized in that at least one surface of the objective lens is an aspherical single objective lens, and satisfies the following expression.

$$5.0 \leq fD/f \leq 40.0 \quad (7)$$

Where, fD: when the diffractive structure of the objective lens is expressed by the optical path difference function defined by $\Phi b = b_2 h^2 + b_4 h^4 + b_6 h^6 + \ldots$ (herein, h is the height (mm) from the optical axis, and $b_2$, $b_4$, $b_6$, ... are the optical path difference function coefficients of the second order, fourth order, sixth order, ... ), the focal length, which is defined by $fD=1/(-2 \cdot b_2)$, at the wavelength of the light source by only the diffractive structure of the objective lens, and f: the focal length at the oscillation wavelength of the light source of the whole objective lens in which the refractive power of the objective lens and the diffractive power are combined with together.

(68) An optical pick-up apparatus relates to the correction of the axial chromatic aberration of the objective lens used for the optical pick-up apparatus by which the variation of the spherical aberration can be finely corrected. When the short wavelength laser light source of the wavelength of about 400 nm and the objective lens having the high image side numerical aperture of about NA 0.85 are used, from the above reason, the correction of the axial chromatic aberration generated in the objective lens can become a important problem. This problem is solved by providing the diffractive structure having the focal length satisfying the above expression (7) on the objective lens. Because this diffractive structure has the wavelength characteristic which changes in the direction in which the back focus becomes short, when the refracting power as the refractive lens and the diffracting power as the diffractive lens are appropriately selected so as to satisfy the above expression (7), the axial chromatic aberration generated in the objective lens can be corrected. It can be conducted that the value of the fD/f is not smaller than the lower limit of the above expression (7) and the axial chromatic aberration of the objective lens is not too excessively corrected, and the value of the fD/f is not larger than the upper limit of the above expression (7) and the axial chromatic aberration of the objective lens is not too insufficiently corrected. Further, when the axial chromatic aberration of the objective lens is in the excessively corrected condition, the axial chromatic aberration generated in each optical element included in the converging optical system can be just cancelled by the objective lens, which is preferable.

(69) The optical pick-up apparatus described in one of (33), (63), one of (66) to (68) is characterized in that the diffractive structure is structured so that the n-order diffraction light (herein, n is an integer other than −1, 0 and +1) whose diffraction light amount is larger than that of any other order diffraction light, in the diffraction light generated by the diffractive structure, is generated, and for the recording and/or reproducing of the information to the optical information recording medium, the n-order diffraction light can be light converged onto the information recording plane of the information recording medium.

The optical pick-up apparatus described in (69) particularly relates to the optical system used in the optical pick-up apparatus in which the recording or reproducing of the information by using the higher order diffraction light than 2-order generated in the diffractive structure is conduced on the optical information recording medium. When the n-order diffraction light is used, as compared to the case where +1 order or −1 order diffraction light is used, because the ring band interval (ring band pitch) of the diffractive structure can be increased to about n times and the ring band number can be made to about 1/n, the lens molding die for adding the diffractive structure can be easily produced, and the processing time of the molding die can be reduced, and the lowering of the diffraction efficiency due to the processing·production error can be prevented.

(70) The optical pick-up apparatus described in one of (8) to (33) is characterized in that, in the means having the optical element provided with the diffractive surface having the ring band shaped diffractive structure and for correcting the variation of the spherical aberration, respective Abbe's numbers of all positive lenses including the positive lens are not larger than 70.0, or respective Abbe's numbers of all negative lenses including the negative lens are not smaller than 40.0.

(71) The optical pick-up apparatus described in one of (36) to (63) is characterized in that, in the means having the optical element provided with the diffractive surface having the ring band shaped diffractive structure and for correcting the variation of the spherical aberration and the axial chromatic aberration, respective Abbe's numbers of all positive lenses including the positive lens are not larger than 70.0, or respective Abbe's numbers of all negative lenses including the negative lens are not smaller than 40.0.

The optical pick-up apparatus described in (70) relates to a preferable structure of the means for correcting the variation of the spherical aberration by which the axial chromatic aberration generated in the objective lens can be corrected, and the optical pick-up apparatus described in (71) relates to a preferable structure of the means for correcting the variation of the spherical aberration and the axial chromatic aberration by which the axial chromatic aberration generated in the objective lens can be corrected. When Abbe's number of the positive lens structuring the means for correcting the variation of the spherical aberration or the means for correcting the variation of the spherical aberration and the axial chromatic aberration is not larger than 70.0 or Abbe's number of the negative lens structuring the means is not smaller than 40.0, the axial chromatic aberration generated in the objective lens is apt to be insufficient correction. In this case, when the diffractive surface having the diffractive structure having the wavelength characteristic so that the back focus of the objective lens becomes short when the oscillation wavelength of the light source is minutely varied to the long wavelength side is provided on at least one surface of the component of the means for correcting the variation of the spherical aberration or the means for correcting the variation of the spherical aberration and the axial chromatic aberration, the axial chromatic aberration of the objective lens can be finely corrected. Further, when, on this diffractive surface, the spherical aberration characteristic in which the spherical aberration of the objective lens becomes insufficient correction when the oscillation wavelength of the light source is minutely varied to the long wavelength side, is provided, the spherical aberration generated when the oscillation wavelength of the light source is minutely varied to the long wavelength side, can also be corrected. Further, when Abbe's number of the positive lens is not larger than 70.0, the strength is excellent, the production is easy, and also for the anti-environment, it is good. On the one hand, when Abbe's number of the negative lens is not smaller than 40.0, the penetrability for the light of short wavelength is excellent. For both the positive lens and the negative lens, it is preferable that Abbe's numbers are not smaller than 40.0 and not larger than 70.0.

(72) The optical pick-up apparatus described in (70) is characterized in that the means for correcting the variation of the spherical aberration, and further, (73) the optical pick-up apparatus described in (71) is characterized in that the means for correcting the variation of the spherical aberration and the axial chromatic aberration is, respectively, when the paraxial power in the oscillation wavelength of the light source is P1, the paraxial power in the wavelength which is 10 nm shorter than the oscillation wavelength is P2, and the paraxial power in the wavelength which is 10 nm longer than the oscillation wavelength is P3, the following expression is satisfied.

$$P2<P1<P3 \qquad (8)$$

According to this, the role for correcting the axial chromatic aberration generated in the optical element such as the objective lens or the coupling lens can be allotted to a means for correcting the variation of the spherical aberration, or the means for correcting the variation of the spherical aberration and the axial chromatic aberration. That is, in the means itself for correcting the variation of the spherical aberration by the diffractive structure, or in the means itself for correcting the variation of the spherical aberration and the axial chromatic aberration, the axial chromatic aberration is excessively corrected and by generating the axial chromatic aberration whose polarity is reverse to the axial chromatic aberration generated in the optical element such as the objective lens or coupling lens, the axial chromatic aberration generated in the optical element such as the objective lens or coupling lens can be corrected.

(74) The optical pick-up apparatus described in (33), (63), or one of (66) to (73) is characterized in that the diffractive surface has the function to suppress the axial chromatic aberration generated in the objective lens with respect to the minute variation of the oscillation wavelength of the light source.

(75) The optical pick-up apparatus described in (33), (63), or one of (66) to (74) is characterized in that, when the oscillation wavelength of the light source is minutely varied to the long wavelength side, the diffractive surface has the wavelength characteristic so that the back focus of the objective lens becomes short. According to this, the axial chromatic aberration can be finely corrected. Particularly, when the axial chromatic aberration generated in the objective lens is corrected by providing the diffractive surface on the coupling lens and/or the objective lens, even when the instantaneous wavelength change, such as the mode hop, on which the spherical aberration deviation means or the focusing of objective lens can not follow, is generated, the spot diameter is not increased, and the stable recording or reproducing of the information can be conducted.

(76) The optical pick-up apparatus described in (33), (63), or one of (66) to (75) is characterized in that, when the oscillation wavelength of the light source is minutely varied to the long wavelength side, the diffractive surface has the spherical aberration characteristic in which the spherical aberration of the objective lens is changed to the direction of the insufficient correction. Thereby, the spherical aberration generated when the oscillation wavelength of the light source is minutely varied to the long wavelength side, can be finely corrected.

(77) The optical pick-up apparatus described in one of (1) to (65) is characterized in that the light source has at least 2 light sources of the light source of the oscillation wavelength $\lambda 1$ and the light source of the oscillation wavelength $\lambda 2$ ($\lambda 1<\lambda 2$), and the converging optical system can converge the first light flux from the light source of the oscillation wavelength $\lambda 1$ onto the information recording plane of the first optical information recording medium of the transparent substrate thickness t1 in the condition not larger than the wave front aberration 0.07 $\lambda 1$ rpm within a predetermined numerical aperture on the image side of the objective lens necessary for the recording or reproducing of the information, and can converge the second light flux emitted from the light source of the oscillation wavelength $\lambda 2$ onto the information recording plane of the second optical information recording medium of the transparent substrate thickness t2 (t1≦t2) in the condition not larger than the wave front aberration 0.07 λ2 rpm within a predetermined numerical aperture on the image side of the objective lens necessary for the recording or reproducing of the information.

For example, in the case where recording or reproducing the information is conducted onto the optical information recording media of the different transparent substrate thickness, by using the short wavelength light source such as the blue purple semiconductor laser, when the design work is conducted so that the spherical aberration correction of the objective lens becomes optimum on the one side optical information recording medium, the spherical aberration is largely generated at the time of recording or reproducing of the information on the other optical information recording medium. More specifically, in the case where the combination of the objective lens and the optical information recording medium of the transparent substrate thickness t1 is corrected so that the spherical aberration is minimum for the incidence of the infinite parallel light flux, when the optical information recording medium having the transparent substrate thickness of t2 (>t1) is recorded or reproduced, the excessively corrected spherical aberration is generated in the objective lens. Reversely, when the optical information recording medium having the transparent substrate thickness of t2' (<t1) is recorded or reproduced, the insufficiently corrected spherical aberration is generated in the objective lens.

In contrast to that, for example, when the diffractive surface is added to the objective lens, and the diffractive lens having the wavelength dependency in which the light flux of the different wavelength respectively forms the fine wave front onto the optical information recording medium whose transparent substrate thickness is different, is formed, the spherical aberration when the transparent substrate thickness is different cam be finely corrected. As described in the optical pick-up apparatus of the 77th aspect, it is fine when the diffraction light of the short wavelength forms the fine wave front onto the optical information recording medium having the small transparent substrate thickness, and the diffraction light of the long wavelength forms the fine wave front onto the optical information recording medium having the large transparent substrate thickness.

More specifically, it is preferable that, when the wavelength of the light source is minutely varied to the long wavelength side, the diffractive surface has the spherical aberration characteristic in which the spherical aberration of the objective lens is insufficiently corrected. Further, a divergent angle changing means for changing the divergent angle of the light flux is provided and when the divergent angle of the light flux incident to the objective lens is changed to the divergent angle corresponding to the object distance at which the spherical aberration becomes minimum, the spherical aberration of the objective lens can be more finely corrected. Particularly, when the light flux when the spherical aberration is minimum to the optical information recording medium having the transparent substrate thickness of t2, is the divergent light, the working distance can be easily secured. Because the role of the correction of the spherical aberration deterioration when the transparent substrate thickness is different can be allotted to the divergent angle change means and the diffractive surface, the movement amount of the movable portion of the divergent angle change means can be small. Further, when the role of the correction of the spherical aberration can be allotted to the divergent angle change means and the diffractive surface, the power of the diffractive surface can be reduced, and the interval of the diffraction ring band is increased, and the diffractive lens having the high diffraction efficiency can be easily produced. In this connection, in the above description, in the combination to the transparent substrate thickness t1, the objective lens is corrected so that the spherical aberration becomes minimum to the infinite light flux, however, either objective lens may also be allowable in which, to the divergent light flux from the finite distance or the converging light flux toward the image side object, the spherical aberration is corrected so as to be minimum, and it is of course that, by the same manner as the above description, the spherical aberration when the transparent substrate thickness is different can be corrected.

(78) The optical pick-up apparatus described in (77) is characterized in that it has the optical element provided with the diffractive surface having the ring bans shaped diffractive structure.

(79) The optical pick-up apparatus described in (78) is characterized in that it has the wavelength characteristic in which the diffractive surface of the optical element can converge the first light flux emitted from the light source of the oscillation wavelength λ1 onto the information recording plane of the first optical information recording medium of the transparent substrate thickness ti in the condition not larger than the wave front aberration 0.07 λ1 rpm within a predetermined numerical aperture on the image side of the objective lens necessary for the recording or reproducing of the information, and can converge the second light flux emitted from the light source of the oscillation wavelength λ2 (λ1<λ2) onto the information recording plane of the second optical information recording medium of the transparent substrate thickness t2 (t1≦t2) in the condition not larger than the wave front aberration 0.07 λ2 rpm within a predetermined numerical aperture on the image side of the objective lens necessary for the recording or reproducing of the information. Specifically, the spherical aberration generated by the difference in the transparent substrate thickness is corrected by using the difference of the oscillation wavelengths of two light sources used for recording and/or reproducing the information for respective optical information recording media and the action of the diffractive structure provided on the diffractive surface.

(80) The optical apparatus described in (79) is characterized in that, when, to the information recording plane of the first optical information recording medium, a predetermined numerical aperture on the image side of the objective lens necessary for the recording or reproducing of the information by the first light flux emitted from the light source of the oscillation wavelength λ1 is NA1, and to the information recording plane of the second optical information recording medium, a predetermined numerical aperture on the image side of the objective lens necessary for the recording or reproducing of the information by the second light flux emitted from the light source of the oscillation wavelength λ2 is NA2 (NA1>NA2), the diffractive surface of the optical element light-converges the second light flux emitted from the light source of the oscillation wavelength λ2 onto the information recording plane of the second optical information recording medium within the NA1, in the condition not smaller than the wave front aberration 0.07 λ2 rms.

Particularly, as described in (80), it is preferable that the spherical aberration is in the finely corrected condition, to the combination of the oscillation wavelength λ1, transparent substrate thickness t1 and the image side numerical aperture NA1, and the spherical aberration up to the range of the image side numerical aperture NA2 necessary for the combination of the oscillation wavelength λ2, transparent substrate thickness t2 and the image side numerical aperture NA2, is corrected by the action of the diffractive structure, and the spherical aberration of the range from the image side numerical aperture NA2 to NA1 is increased (it is largely generated as the flare component). Thereby, when the second light flux of the oscillation wavelength λ2 is incident to so that it passes through the whole inside the diaphragm decided by the oscillation wavelength λ1 and the image side numerical aperture NA1 of the objective lens, the light flux more than the image side numerical aperture NA2 does not contribute to the image focusing of the spot, and because the spot diameter is not too small on the information recording plane to the first optical information recording medium of the transparent substrate thickness t1, the generation of the false signal or the detection of the unnecessary signal in the light receiving means of the optical pick-up apparatus can be prevented, and further, because it is not necessary that, corresponding to the combination of the oscillation wavelengths of the respective light sources and the corresponding image side numerical apertures, a means for switching the diaphragm is provided, a simple optical pick-up apparatus can be obtained. Particularly, it is more preferable that the second light flux emitted from the light source of the oscillation wavelength λ2 is converged onto the information recording plane of the second optical information recording medium, in the condition not smaller than the spherical aberration 0.2 λ2 rms within the NA1.

(81) The optical pick-up apparatus described in one of (78) to (80) is characterized in that the objective lens is the optical element (the optical element provided with the diffractive surface having the ring band shaped diffractive structure). An optical pick-up apparatus described in the 82th aspect is characterized in that at least one surface of the objective lens is an aspherical single lens objective lens, and satisfies the following expression.

$$5.0 \leq (f1/vd) \cdot fD1 \leq 10.0 \tag{9}$$

Where, f1: the focal length (mm) at the oscillation wavelength λ1 of the whole objective lens in which the refracting power of the objective lens and the diffracting power by the diffractive structure of the objective lens are combined with together; vd: Abbe's number of d line of the objective lens; and fD1: when the diffractive structure of the objective lens is expressed by the optical path difference function defined by $\Phi b = b_2 h^2 + b_4 h^4 + b_6 h^6 + \ldots$ (herein, h is the height (mm) from the optical axis, and $b_2, b_4, b_6, \ldots$ are the optical path difference function coefficients of the second order, fourth order, sixth order, . . . ), the focal length (mm), which is defined by $fD=1/(-2 \cdot b_2)$, at the oscillation wavelength λ1 by only the diffractive structure of the objective lens.

(83) The optical pick-up apparatus described in (81) is characterized in that at least one surface of the objective lens is an aspherical single objective lens, and satisfies the following expression.

$$-25.0 \leq (b_2/\lambda 1) \leq 0.0 \tag{10}$$

Where, $b_2$: the optical path difference function coefficient of the second order, when the diffractive structure of the objective lens is expressed by the optical path difference function defined by $\Phi b = b_2 h^2 + b_4 h^4 + b_6 h^6 + \ldots$ (herein, h is the height (mm) from the optical axis, and $b_2, b_4, b_6, \ldots$ are the optical path difference function coefficients of the second order, fourth order, sixth order, . . . ); and λ1: the oscillation wavelength λ1 (mm). (82), (83) An optical pick-up apparatus relates to the optical pick-up apparatus by which the axial chromatic aberration generated in the objective lens and variation of the spherical aberration generated on each optical surface of the converging optical system can be finely corrected, to a plurality of optical information recording media whose transparent substrate thickness are different, and particularly to a case in which, in the optical pick-up apparatus using the same order diffraction light to the light fluxes of a plurality of light sources whose wavelengths are different from each other, the diffractive structure is provided on the objective lens, and by the action of the diffractive structure, the axial chromatic aberrations of the same order diffraction light are respectively corrected.

When the short wavelength light source (not larger than the oscillation wavelength about 500 nm) and the objective lens having the image side numerical aperture higher than the conventional image side numerical aperture (for example, about NA0.45 for the CD, and about NA 0.6 for the DVD) are used, in order to suppress the generation of the coma small, it is particularly effective that the transparent substrate thickness of the optical information recording medium is decreased to not larger than 0.2 mm, however, by satisfying the above expression (9), the axial chromatic aberration to both light fluxes of the short wavelength light source and the conventional long wavelength light source is not excessively corrected, or insufficiently corrected, and can be corrected with well balance, and when the diffractive structure having the wavelength characteristic by which respectively fine spots are formed on the respective information recording planes to a plurality of optical information media whose transparent substrate thickness is different, is provided on the objective lens, also for the conventional optical information recording medium whose transparent substrate thickness (for example, 1.2 mm for the CD, and 0.6 mm for the DVD) is large, by a single optical pick-up apparatus (at least, the optical pick-up apparatus which commonly uses the objective lens and its drive mechanism), the recording or reproducing of the information can be conducted. In the above expression (9), on more than the lower limit of the left side, the axial chromatic aberration is not excessively corrected for the light flux of the long wavelength light source of 600 nm to 800 nm, and on lower than the upper limit of the right side, the axial chromatic aberration is not insufficiently corrected for the light flux of the short wavelength light source not larger than 500 nm, and it is preferable.

Further, by satisfying the above expression (10), the burden of the aberration correction by the diffractive structure provided on the objective lens can be lightened, that is, by satisfying the above expression (10), because it is possible that the role of the correction of the axial chromatic aberration generated in the converging optical system is not almost allotted to the diffractive structure provided on the objective lens, the ring band interval of the diffractive structure can be large, the number of ring bands can be small, and the objective lens with the high diffraction efficiency can be obtained. Herein, when $b_2 = 0$, it corresponds to a case where the axial chromatic aberration is not corrected by the diffractive structure provided on the objective lens, and when $-25.0 \leq (b_2/\lambda 1) < 0.0$, it corresponds to a case where the axial chromatic aberration is corrected for the light flux of the short wavelength light source (not larger than about 500 nm), to the degree in which the axial chromatic aberration is not excessively corrected for the light flux of the long wavelength light source (about 600 nm to 800 nm). In this manner, the axial chromatic aberration of insufficient correction can be corrected when the means for correcting the variation of the spherical aberration arranged between the objective lens an the light source is structured by the structure described in the 10th, 11th, 33th, 38th, 39th, 63th, and 65th aspects. Further, in the case where the axial chromatic aberration generated in the objective lens is corrected by the action of the diffractive structure, when Abbe's number of the material of the objective lens is νd, it is preferable that νd>55.0 is satisfied, thereby, the second order spectrum can be suppressed to small.

(84) The optical pick-up apparatus described in one of (78) to (83) is characterized in that the diffractive surface has a function to correct the axial chromatic aberration generated in the objective lens, for the minute variation of the oscillation wavelength of the light source.

(85) In the optical pick-up apparatus described in one (78) to (84), because the diffractive surface has the wavelength characteristic in which the back focus of the objective lens becomes short when the oscillation wavelength of the light source is minutely varied to the long wavelength side, the axial chromatic aberration which is a problem when the short wavelength light source is used, can be finely corrected.

(86) In the optical pick-up apparatus described in one (78) to (85) is characterized in that, when the oscillation wavelength of the light source is minutely varied to the long wavelength side, the diffractive surface has the spherical aberration characteristic in which the spherical aberration of the objective lens is varied to the direction of insufficient correction. Thereby, because the role of the spherical aberration correction can be allotted to the means for correcting the variation of the spherical aberration or the means for correcting the variation of the spherical aberration and the axial chromatic aberration, and the diffractive surface, when the means for correcting the variation of the spherical aberration or the means for correcting the variation of the spherical aberration and the axial chromatic aberration, is structured by using the optical element movable in the optical axis direction, the stroke amount of the optical element is enough to be small. Further, as described above, when the role of the spherical aberration correction is allotted to the means for correcting the variation of the spherical aberration or the means for correcting the variation of the spherical aberration and the axial chromatic aberration, and the diffractive surface, the power of the diffractive surface can be suppressed, and the because the interval of the diffraction ring band can be large, the optical element with the high diffraction efficiency can be easily produced.

(87), (88) The optical pick-up apparatus described respectively in one of (1) to (65) and (77) is characterized in that the objective lens has at least the first part, the second part and the third part, on at least one surface, by which the light flux emitted from the light source is divided into a plurality of light fluxes in the order from the optical axis side to its outer periphery by the refractive action, wherein the first part and the third part can converge the light flux from the light source so that the recording or the reproducing of the information can be conducted for the information recording plane of the first optical information recording medium of the transparent substrate thickness t1, and the first part and the second part can converge the light flux from the light source so that the recording or the reproducing of the information can be conducted for the information recording plane of the second optical information recording medium of the transparent substrate thickness t2 (t1<t2).

(89) The optical pick-up apparatus described in (77) is characterized in that, on at least one surface of the objective lens, a ring band shaped step portion to divide the incident light flux into k (k≧4) ring band shaped light fluxes (herein, in the order from the optical axis side to the outside, the first, the second, . . . , and the k-th light flux, are defined), is formed, and when the recording and/or reproducing of the information is conducted on the first optical information recording medium, the spherical aberration components of the wave front aberrations of the first and the k-th light flux in the best image surface position formed by the first and the k-th light flux are not larger than 0.05 λ1 rms (light source wavelength of λ1), and in the second to the (k−1)-th light flux, at least 2 light fluxes respectively form apparent best image surface positions at different positions from the best image surface positions formed by the first and the k-th light flux, and at the best image surface positions formed by the first and the k-th light flux, the wave front aberrations of the light rays in respective light flux of the first to the k-th light flux passing through the necessary numerical aperture to the first optical information recording medium are almost miλ1 (mi is an integer, i=1, 2, . . . , k).

According to the optical pick-up apparatus described in (89), because the residual error is decreased in the difference of the substrate thickness between the transparent substrate thickness of the first optical information recording medium (the first optical disk) and the transparent substrate thickness of the second optical information recording medium (the second optical disk), the recording and/or reproducing of the information can be appropriately conducted on a plurality of kinds of optical disks. For such the objective lens, referring to FIG. 26, description will be made later.

(90) The optical pick-up apparatus described in one of (77) to (86), (88) or (89) is characterized in that the transparent substrate thickness t1 of the first optical information recording medium is not larger than 0.6 mm, the transparent substrate thickness t2 of the second optical information recording medium is not smaller than 0.6 mm, and the oscillation wavelength λ2 is within the range of not smaller than 600 nm and not larger than 800 nm.

(91) The optical pick-up apparatus described in one of (1) to (90) is characterized in that, in the spherical aberration of the objective lens, when the tertiary spherical aberration component is SA1, and the sum of the fifth, seventh, and ninth spherical aberration components is SA2, the following expression is satisfied.

$$|SA1/SA2|>1.0 \qquad (11)$$

Where, SA1: the tertiary spherical aberration component when the aberration function is developed into Zernike's polynomial; and SA2: root of the sum of squares of the fifth spherical aberration component, the seventh spherical aberration component, and the ninth spherical aberration component when the aberration function is developed into Zernike's polynomial.

The optical pick-up apparatus described in (91) relates to a balance in the practical order spherical aberration component of the spherical aberration generated in the objective lens. Particularly, in the single lens objective lens having the high image side aperture, because there is a tendency in which an amount of the spherical aberration is increased by a slight difference of the central thickness (axial thickness), the allowable range of the central thickness required for the objective lens becomes very narrow, further, when the lens is produced by the molding, it is also difficult to obtain a plurality of lenses in the deviation of the central thickness not larger than several μm, however, by satisfying the above expression (11), because the tertiary spherical aberration component can be comparatively easily corrected by the means for correcting the variation of the spherical aberration or the means for correcting the variation of the spherical aberration and the axial chromatic aberration, the allowable range of the central thickness (particularly, the error from the designed value) can be expanded.

(92) The optical pick-up apparatus described in one of (1) to (91) is characterized in that a diaphragm to determine the numerical aperture of the objective lens is positioned on the side at which the optical information recording medium is arranged, from the surface top of the surface on the most light source side of the objective lens. Thereby, when the divergent light is incident to the objective lens, because the pass height of the ray of light on the surface on the most light source side can be suppressed to small, it is preferable for the size reduction of the objective lens or the aberration correction of the objective lens.

(93) In the optical pick-up apparatus described in one of (1) to (92), because the objective lens is the single lens objective lens having the aspherical surface on at least one surface, the spherical aberration or the coma can be effectively corrected, and the small sized and light weight compact optical pick-up apparatus can be provided. Particularly, when both surfaces are asperical, because the spherical aberration and the coma can be effectively corrected, it is more preferable.

(94) In the optical pick-up apparatus described in one of (1) to (93), because the light source has the oscillation wavelength of at least not larger than 500 nm, the recording of the high density information or reproducing of the high density recording signal becomes possible. Further, the axial chromatic aberration which is a problem when the short wavelength light source with the oscillation wavelength not larger than 500 nm is used, can be corrected particularly by the structure described in 10th, 11th, 33th, 38th, 39th, 63th or 65th aspect.

(95) The optical pick-up apparatus described in one of (1) to (94) is characterized in that the image side numerical aperture NA of the objective lens is at least not smaller than 0.65. When the image side numerical aperture of the objective lens is not smaller than 0.65 (more preferably, not smaller than 0.75), which is larger than the conventional one, the greater increase of density and capacity of the optical information recording medium can be attained. Giving specific numerical values, the present invention will be described below. Because the spot diameter converged onto the optical information recording medium can be expressed by $k\lambda/NA$ (k: proportional constant, $\lambda$: the oscillation wavelength of the light source, NA: the image side numerical aperture of the objective lens), in the high density optical pick-up optical system using the blur purple semiconductor laser of the oscillation wavelength 400 nm, and the objective lens of the image side numerical aperture 0.85, as compared to the low density optical pick-up optical system using the red semiconductor laser of the oscillation wavelength 650 nm, and the objective lens of the image side numerical aperture 0.65, the spot diameter is about ½. Herein, because the recording density onto the optical information recording medium is proportional to the square of the inverse number of the ratio of the spot diameter, the recording density of the high density optical pick-up optical system is about 4 times of that of the low density optical pick-up optical system.

(96) The optical pick-up apparatus described in one of (1) to (95) is characterized in that the objective lens satisfies the following expression.

$$1.1 \leq d1/f \leq 3.0 \tag{12}$$

Where, d1: axial lens thickness (mm) and f: focal length (mm) at the oscillation wavelength of the light source, (in this connection, when the light source has a plurality of light sources with different oscillation wavelength, the focal length at the oscillation wavelength whose wavelength is shortest, and when the diffractive surface is provided on the objective lens, the focal length of the whole in which the refracting power and the diffracting power are combined).

The above expression (12) relates to a condition to obtain the good image height characteristic. In the case where the large image side numerical aperture larger than 0.65 is desired, when the value d1/f is not lower than the lower limit, the good image height characteristic can be secured, and the shift sensitivity can be decreased. Further, because an angle formed between the contact surface of the aspherical surface at the maximum position of the effective diameter of the objective lens and the surface perpendicular to the optical axis can be decreased, the processing of the molding die when the lens is molded becomes easy. On the one hand, when the value d1/f is not smaller than the upper limit, because the central thickness (axial thickness) is not too large, the working distance can be secured large. Further, because the generation of the astigmatism can be suppressed to small, the good image height characteristic can be secured. According to the above, it is more preferable that the value d1/f satisfied the following expression.

$$1.2 \leq d1/f < 2.3 \tag{12'}$$

Further, it is particularly preferable to satisfy the following expression.

$$1.4 \leq d1/f \leq 1.8 \tag{12''}$$

(97) The optical pick-up apparatus described in one of (1) to (96) is characterized in that the objective lens is formed of the plastic material. When the objective lens is formed of the plastic, the weight reduction can be attained, and the burden onto the focusing mechanism can be decreased. Further, the objective lens can be produced with a stable accuracy and a large amount at a low cost. Further, when the aspherical surface or the diffractive surface is provided on the objective lens, these surfaces can be easily formed. Particularly, it is preferable to produce them by the injection molding (injection compression molding is included).

(98) The optical pick-up apparatus described in one of (1) to (97) is characterized in that the objective lens is formed of the material whose saturation water absorption is not larger than 0.5%. Thereby, because the refractive index change of the objective lens by the humidity absorption becomes small, it is preferable.

(99) The optical pick-up apparatus described in one of (1) to (98) is characterized in that the objective lens is formed of the material whose internal permeability is not smaller than 85% at the thickness 3 mm for the light of the oscillation wavelength of the light source. Thereby, because the light source having the high light intensity is not necessary, the energy saving can be attained.

(100) The optical pick-up apparatus described in one of (1) to (99) is characterized in that it can be applied to the optical pick-up apparatus described in any one of the first to 99th aspects.

(101) The optical pick-up apparatus described in one of (1) to (99) is characterized in that it is the objective lens used for the optical pick-up apparatus described in any one of the first to 99th aspects.

(102) An objective lens is characterized in that, in the objective lens for use in the optical pick-up apparatus by which recording and/or reproducing of the information can be conducted for at least 2 kinds of optical information recording media, and which has the light source of the oscillation wavelength $\lambda 1$, the light source of the oscillation wavelength $\lambda 2$ which is different from the oscillation wavelength $\lambda 1$ ($\lambda 1 < \lambda 2$), the converging optical system including the objective lens for light-converging the first light flux emitted from the light source of the oscillation wavelength $\lambda 1$ onto the information recording plane of the first optical information recording medium through the transparent substrate of the transparent substrate thickness t1, and for light-converging the second light flux emitted from the light source of the oscillation wavelength $\lambda 2$ onto the information recording plane of the first optical information recording medium through the transparent substrate of the transparent substrate thickness t2 (t1≦t2), and the light detector for light-receiving the reflected light from the first and second optical information recording medium, the following expression is satisfied.

$$1.1 \leq d1/f < 3.0 \quad (13)$$

Where, d1: axial lens thickness (mm) and f: focal length (mm) at the oscillation wavelength $\lambda 1$, (in this connection, when the diffractive surface is provided on the objective lens, the focal length of the whole in which the refracting power and the diffracting power are combined).

(103) The objective lens described in (102) is characterized in that the image side numerical aperture NA is not smaller than 0.75.

(104) The objective lens described in (102) or (103) is characterized in that it is provided with the diffractive surface having the ring band shaped diffractive structure.

(105) The objective lens described in (104) is characterized in that the diffractive surface has the wavelength characteristic which can converge the first light flux emitted from the light source of the oscillation wavelength $\lambda 1$ onto the information recording plane of the first optical information recording medium in the condition not larger than the wave front aberration 0.07 $\lambda 1$ rpm within a predetermined numerical aperture on the image side of the objective lens necessary for the recording or reproducing of the information, and can converge the second light flux emitted from the light source of the oscillation wavelength $\lambda 2$ onto the information recording plane of the second optical information recording medium in the condition not larger than the wave front aberration 0.07 $\lambda 2$ rpm within a predetermined numerical aperture on the image side of the objective lens necessary for the recording or reproducing of the information.

(106) The objective lens described in (104) or (105) is characterized in that when, to the information recording plane of the first optical information recording medium, a predetermined numerical aperture on the image side of the objective lens necessary for the recording or reproducing of the information by the first light flux emitted from the light source of the oscillation wavelength $\lambda 1$ is NA1, and to the information recording plane of the second optical information recording medium, a predetermined numerical aperture on the image side of the objective lens necessary for the recording or reproducing of the information by the second light flux emitted from the light source of the oscillation wavelength $\lambda 2$ is NA2 (NA1>NA2), the diffractive surface light-converges the second light flux emitted from the light source of the oscillation wavelength $\lambda 2$ onto the information recording plane of the second optical information recording medium within the NA1, in the condition not smaller than the wave front aberration 0.07 $\lambda 2$ rms.

(107) The objective lens described in one of (104) to (106) is characterized in that the diffractive surface has a function to suppress the axial chromatic aberration to the minute variation of the oscillation wavelength of the light source.

(108) The objective lens described in one of (104) to (107) is characterized in that the diffractive surface has the wavelength characteristic to shorten the back focus of the objective lens when the oscillation wavelength of the light source is minutely varied onto the long wavelength side.

(109) The objective lens described in one of (104) to (108) is characterized in that the diffractive surface has the spherical aberration characteristic which varies to the direction in which the spherical aberration of the objective lens becomes an insufficient correction condition when the oscillation wavelength of the light source is minutely varied onto the long wavelength side.

(110) The objective lens described in one of (102) to (109) is characterized in that it is an single lens whose at least one surface is an aspherical surface, and satisfies the following expression.

$$0.5 \leq (f1/vd) \cdot fD1 \leq 10.0 \quad (14)$$

Where, f1: the focal length (mm) of the objective lens in which the refracting power of the objective lens and the diffracting power by the diffractive structure of the objective lens are combined with together, at the oscillation wavelength $\lambda 1$; vd: Abbe's number of d line of the lens material; and fD1: when the diffractive structure is expressed by the optical path difference function defined by $\Phi b = b_2 h^2 + b_4 h^4 + b_6 h^6 + \ldots$ (herein, h is the height (mm) from the optical axis, and $b_2$; $b_4$, $b_6$, ... are the optical path difference function coefficients of the second order, fourth order, sixth order, . . . ), the focal length (mm) at the oscillation wavelength $\lambda 1$ by only the diffractive structure, which is defined by fD=1/(−2·$b_2$).

By satisfying the above expression (14), the axial chromatic aberration to both light fluxes of the short wavelength light source and the conventional long wavelength light source is not excessively corrected, or insufficiently corrected, and can be corrected with well balance. In the above expression (14), in more than the lower limit of the left side, the axial chromatic aberration is not excessively corrected for the light flux of the long wavelength light source of 600 nm to 800 nm, and in lower than the upper limit of the right side, the axial chromatic aberration is not insufficiently corrected for the light flux of the short wavelength light source not larger than 500 nm, and it is preferable. When the diffractive structure having the wavelength characteristic by which respectively fine spots are formed on the respective information recording planes to a plurality of optical information recording media whose transparent substrate thickness is different, is provided on the objective lens, also for the conventional optical information recording medium whose transparent substrate thickness (for example, 1.2 mm for the CD, and 0.6 mm for the DVD) is large, and also for the optical information recording medium whose transparent substrate thickness is small (for example, the transparent substrate thickness is not larger than 0.2 mm), for which the short wavelength light source and the high image side numerical aperture are necessary, an objective lens which can be commonly used for the recording or reproducing of the information, can be obtained.

(111) The objective lens described in one of. (102) to (109) is characterized in that it is an single lens whose at least one surface is an aspherical surface, and satisfies the following expression.

$$-25.0 \leq (b_2/\lambda 1) \leq 0.0 \quad (15)$$

Where, $b_2$: the optical path difference function coefficient of the second order, when the diffractive structure is expressed by the optical path difference function defined by $\Phi b = b_2 h^2 + b_4 h^4 + b_6 h^6 + \ldots$ (herein, h is the height (mm) from the optical axis, and $b_2$, $b_4$, $b_6$, . . . are the optical path difference function coefficients of the second order, fourth order, sixth order, . . . ); and λ1: the oscillation wavelength λ1 (mm).

Further, by satisfying the above expression (15), the burden of the aberration correction by the diffractive structure provided on the objective lens can be lightened, that is, by satisfying the above expression (15), because it is possible that the role of the correction of the axial chromatic aberration generated in the converging optical system is not almost allotted to the diffractive structure provided on the objective lens, the ring band interval of the diffractive structure can be large, the number of ring bands can be small, and the objective lens with the high diffraction efficiency can be obtained. Herein, when $b_2=0$, it corresponds to a case where the axial chromatic aberration is not corrected by the diffractive structure provided on the objective lens, and when $-25.0 \leq (b_2/\lambda 1) < 0.0$, it corresponds to a case where the axial chromatic aberration is corrected for the light flux of the short wavelength light source (not larger than about 500 nm), to the degree in which the axial chromatic aberration is not excessively corrected for the light flux of the long wavelength light source (about 600 nm to 800 nm). In this manner, the axial chromatic aberration of insufficient correction can be corrected when the means for correcting the variation of the spherical aberration arranged between the objective lens an the light source is structured by the structure described in (10), (11), (33), (38), (39), (63), (65). Further, in the case where the axial chromatic aberration generated in the objective lens is corrected by the action of the diffractive structure, when Abbe's number of the material of the objective lens is νd, it is preferable that νd>55.0 is satisfied, thereby, the second order spectrum can be suppressed to small.

(112) The objective lens described in one of (102) to (111) is characterized in that, in the spherical aberration, when the tertiary spherical aberration component is SA1, and the sum of the fifth, seventh, and ninth spherical aberration components is SA2, the following expression is satisfied.

$$|SA1/SA2|>1.0 \qquad (16)$$

Where, SA1: the tertiary spherical aberration component when the aberration function is developed into Zernike's polynomial; and SA2: root of the sum of squares of the fifth spherical aberration component, the seventh spherical aberration component, and the ninth spherical aberration component when the aberration function is developed into Zernike's polynomial.

This relates to a balance in the practical order spherical aberration component of the spherical aberration generated in the objective lens. Particularly, in the single lens objective lens having the high image side aperture, because there is a tendency in which an amount of the spherical aberration is increased by a slight difference of the central thickness (axial thickness), the allowable range of the central thickness required for the objective lens becomes very narrow, further, when the lens is produced by the molding, it is also difficult to obtain a plurality of lenses in the deviation of the central thickness not larger than several μm, however, by satisfying the above expression (11), the balance in the spherical aberration components of the practical order generated in the objective lens can be made fine, and the allowable range of the central thickness (particularly, the error from the designed value) required for the objective lens can be expanded.

(113) The objective lens described in (102) or (103) is characterized in that it has at least the first part, the second part and the third part, on at least one surface, by which the light flux emitted from the light source is divided into a plurality of light fluxes in the order from the optical axis side to its outer periphery by the refractive action, wherein the first part and the third part can converge the light flux from the light source of the oscillation wavelength λ1 so that the recording or the reproducing of the information can be conducted for the information recording plane of the first optical information recording medium, and the first part and the second part can converge the light flux from the light source of the oscillation wavelength λ2 so that the recording or the reproducing of the information can be conducted for the information recording plane of the second optical information recording medium.

(114) The objective lens described in (102) or (103) is characterized in that, on at least one surface of the objective lens, a ring band shaped step portion to divide the incident light flux into k (k≧4) ring band shaped light fluxes (herein, in the order from the optical axis side to the outside, the first, the second, and the k-th light flux, are defined), is formed, and when the recording and/or reproducing of the information is conducted on the first optical information recording medium, the spherical aberration components of the wave front aberrations of the first and the k-th light flux in the best image surface position formed by the first and the k-th light flux are not larger than 0.05 ||1 rms (light source wavelength of λ1), and in the second to the (k−1)-th light flux, at least 2 light fluxes respectively form apparent best image surface positions at different positions from the best image surface positions formed by the first and the k-th light flux, and at the best image surface positions formed by the first and the k-th light flux, the wave front aberrations of the light rays in respective light flux of the first to the k-th light flux passing through the necessary numerical aperture to the first optical information recording medium are almost miλ1 (mi is an integer, i=1, 2, . . . , k).

(115) The objective lens described in one of (102) to (114) is characterized in that it is formed of the plastic material.

(116) The objective lens described in one of (102) to (115) is characterized in that it is formed of the material whose saturation water absorption is not larger than 0.5%.

(117) The objective lens described in one of (102) to (116) is characterized in that it is formed of the material whose internal permeability is not smaller than 85% at the thickness 3 mm, to the oscillation wavelength of the light source.

(118) The objective lens described in one of (102) to (117) is characterized in that it is a single lens at least one surface of which is aspherical surface.

(119) The objective lens described in one of (102) to (118) is characterized in that it can be applied for the optical pick-up apparatus described in any one of (1) to (99). (120) A beam expander is characterized in that it includes at least one positive lens and at least one negative lens, and at least one of them is a movable element which can transfer along the optical axis direction, and respective Abbe's numbers of all positive lenses including the positive lens are not larger than 70.0 or respective Abbe's numbers of all negative lenses including the negative lens are not smaller than 40.0, and it has the diffractive surface having the ring band shaped diffractive structure on at least one surface.

When Abbe's number of the positive lens constituting the beam expander is not smaller than 70.0 or Abbe's number of the negative lens is not smaller than 40.0, the axial chromatic aberration generated in the other optical element (particularly, preferably, the objective lens when being applied for the optical pick-up apparatus) is apt to be in insufficient correction condition, however, when the diffractive surface is provided, the axial chromatic aberration can be finely corrected. Particularly, when the diffractive surface having the wavelength characteristic in which the back focus becomes short when the oscillation wavelength of the incident light source is minutely varied to the long wavelength side, is provided on at least one surface, the axial chromatic aberration of the objective lens can be finely corrected. Further, when Abbe's number of the positive lens is not larger than 70.0, the strength is excellent, the production is easy, and also for the anti-environment, it is good. On the one hand, when Abbe's number of the negative lens is not smaller than 40.0, the penetrability for the light of short wavelength is excellent. For both the positive lens and the negative lens, it is preferable that Abbe's numbers are not smaller than 40.0 and not larger than 70.0.

(121) The beam expander described in (120) is characterized in that, when the paraxial power in the oscillation wavelength of the light source which outputs the light flux to be incident, is P1, the paraxial power in the wavelength which is 10 nm shorter than the oscillation wavelength is P2, and the paraxial power in the wavelength which is 10 nm longer than the oscillation wavelength is P3, the following expression is satisfied.

$$P2 < P1 < P3 \quad (17)$$

According to this, the role for correcting the axial chromatic aberration generated in the optical element such as the objective lens or the coupling lens can be allotted to the beam expander. That is, in the beam expander itself, the axial chromatic aberration is excessively corrected by the diffractive structure, and by generating the axial chromatic aberration whose polarity is reverse to the axial chromatic aberration generated in the optical element such as the objective lens or coupling lens, the axial chromatic aberration generated in the optical element such as the objective lens or coupling lens can be corrected.

(122) The beam expander described in (120) or (121) is characterized in that the diffractive surface has the function to suppress the axial chromatic aberration generated in the condenser lens arranged on the light emission side with respect to the minute variation of the oscillation wavelength of the light source which outputs the light flux to be incident.

(123) The beam expander described in one of (120) to (122) is characterized in that, when the oscillation wavelength of the light source which outputs the light flux to be incident, is minutely varied to the long wavelength side, the diffractive surface has the wavelength characteristic so that the back focus of the condenser lens arranged on the light emission side becomes short. According to this, the axial chromatic aberration of the optical element such as the objective lens can be finely corrected.

(124) The beam expander described in one of (120) to (123) is characterized in that, when the oscillation wavelength of the light source which outputs the light flux to be incident, is minutely varied to the long wavelength side, the diffractive surface has the spherical aberration characteristic in which the spherical aberration of the condenser lens arranged on the light emission side is changed to the direction of the insufficient correction. Thereby, the spherical aberration generated when the oscillation wavelength of the light source which outputs the light flux to be incident, is minutely varied to the long wavelength side, can be finely corrected.

(125) The beam expander described in one of (120) to (124) is characterized in that the movable element is formed of the material whose specific density is not larger than 2.0. According to this, the burden of the movable element onto the transfer apparatus can be lightened.

(126) The beam expander described in one of (120) to (125) is characterized in that the movable element is formed of the plastic material. According to this, the burden onto the transfer apparatus can be lightened, and the high speed transfer of the movable element in the optical axis direction becomes possible. Further, when the structural element on which the diffractive surface or aspherical surface is provided, is formed of the plastic material, these can be easily added.

(127) The beam expander described in one of (120) to (126) is characterized in that it has the aspherical surface on at least one surface of the movable element.

(128) The beam expander described in one of (120) to (127) is characterized in that the movable element is formed of the material whose saturation water absorption is not larger than 0.5%.

(129) The beam expander described in one of (120) to (128) is characterized in that the movable element is formed of the material whose internal permeability is not smaller than 85% at the thickness 3 mm, to the light of the oscillation wavelength of the light source to be incident.

(130) The beam expander described in one of (120) to (124) is characterized in that it is formed of the plastic material.

(131) The beam expander described in one of (120) to (124) or (130) is characterized in that it has an aspherical surface on at least one surface.

(132) The beam expander described in one of (120) to (124), (130) or (131) is characterized in that it is formed of the material whose saturation water absorption is not larger than 0.5%.

(133) The beam expander described in one of (120) to (124) and (130) to (132) is characterized in that it is formed of the material whose internal permeability is not smaller than 85% at the thickness 3 mm, to the light of the oscillation wavelength of the light source to be incident.

(134) The beam expander described in one of (120) to (133) is characterized in that it can be applied for the optical pick-up apparatus described in any one of (8) to (33) and (36) to (63).

(135) A converging optical system is one on an optical pick-up apparatus for recording and/or reproduction for an optical information recording medium, the converging optical system including a coupling lens which changes a divergence angle of divergent light emitted from a light source and including an objective lens that converges a light flux that has passed the coupling lens on the image recording surface through a transparent substrate of an optical information recording medium, and a ring-shaped band diffractive structure is formed on at least one optical surface of an optical element constituting the converging optical system, the coupling lens is of a 2-group structure, and deviation of spherical aberration caused on each optical surface of the converging optical system is corrected by moving at least one lens group constituting the coupling lens in the optical axis direction, which is a special feature.

The converging optical system of (135) relates to the preferable structure of a converging optical system used for an optical pick-up apparatus for conducting recording and/or reproduction for an advanced optical information recording medium that is higher in terms of density and larger in terms of capacity than DVD. BY providing, on at least one optical surface of an optical element constituting the converging optical system, the diffractive structure having the wavelength characteristic wherein a back focus of an objective lens is shortened when a wavelength of a light source fluctuates slightly toward the long wavelength side, it is possible to correct effectively axial chromatic aberration that is caused on an objective lens and is problematic when a short wavelength light source such as a violet semiconductor laser is used. Though the diffractive structure stated above may also be provided on an optical element other than a coupling lens that is arranged separately to be closer to a light source than an objective lens, it is preferable to provide it on an objective lens and/or coupling lens because the number of structural elements of a converging optical system is less and an optical pick-up apparatus can be made small in size accordingly. When providing the diffractive structure on an optical surface of a coupling lens, the minimum ring-shaped band distance of the diffractive structure to be provided on one optical surface can be made large, because it is possible to make two or more optical surfaces to share in power of diffraction, and thus, diffraction efficiency can be enhanced.

Further, when at least one of two lens groups constituting a coupling lens is made to be capable of moving in the direction of an optical axis, it is possible to correct deviation of spherical aberration caused on each optical surface in the converging optical system, especially on an optical surface of an objective lens. Since it is possible to correct, on a real time basis, the spherical aberration caused greatly on an objective lens by minute deviation of emission wavelength of a light source, changes in temperature and humidity and/or errors of a thickness of a transparent substrate of an optical information recording medium which cause a problem when an objective lens having a high numerical aperture that is necessary for recording information at higher density than a conventional optical information recording medium and/or for reproducing information recorded at high density is used, an appropriate spot can always be formed on an information recording plane of an optical information recording medium.

By moving the movable lens group of the coupling lens in the direction of an optical axis, it is possible to correct spherical aberration caused by an error of forming an optical element that constitutes a converging optical system. When manufacturing an optical element through a forming method employing a metal mold in general, there are generated errors for machining a metal mold and for forming an optical element. Examples of the error include an error in a thickness of the central portion and an error in a form of an optical surface. If a component of aberration caused by these errors is third order spherical aberration, it is possible to correct it by moving the movable lens group of the coupling lens in the direction of an optical axis in the converging optical system of the invention. Therefore, a tolerance in manufacture of an optical element that forms a converging optical system can be made large, and thereby, productivity can be enhanced.

(136) In the converging optical system described in (135), the light source stated above emits light having a wavelength of not more than 600 nm, and axial chromatic aberration generated by a refraction action of each refracting interface in the converging optical system and axial chromatic aberration generated by the diffractive structure offset each other.

Though recording at density higher than that in a conventional optical information recording medium and/or reproduction of information recorded at higher density is possible for an optical information recording medium, by employing a light source generating light having an oscillation wavelength of not more than 600 nm, as shown in (136), the axial chromatic aberration caused on the converging optical system, especially on an objective lens as stated above is a problem. When axial chromatic aberration whose polarity is opposite to that of axial chromatic aberration generated on each refracting interface of the converging optical system is generated on the diffractive structure mentioned above, the wavefront in the case of forming a spot on an information recording plane of an optical information recording medium through a converging optical system is in the state wherein axial chromatic aberrations are canceled, and thereby, it is possible to create a system wherein axial chromatic aberration is corrected satisfactorily within a range of wavelength deviation of a light source as an overall converging optical system.

Incidentally, it is preferable that a converging optical system of the invention is made of optical materials whose inner transmission factor in thickness of 3 mm is 85% or more for light having an oscillation wavelength of a light source. When using a light source with a short wavelength having an oscillation wavelength of not more than 600 nm, especially of about 400 nm, a fall of a transmission factor caused by absorption of light by optical materials is a problem. However, by making the converging optical system with materials having the aforesaid inner transmission factor, it is possible to form a spot having high quantity of light without increasing output of a light source in the course of recording, and to improve an S/N ratio of a reading signal in reproduction.

It is further preferable that a converging optical system of the invention is made of optical materials whose saturated coefficient of water absorption is not more than 0.5%. If this condition is observed, a refractive index distribution caused by a difference in coefficient of water absorption is hardly generated in an optical element in the course for each optical element constituting a converging optical system to absorb moisture in the air, and thereby, aberration generated and a fall of diffraction efficiency caused by phase change can be repressed. When the numerical aperture of an objective lens is great, in particular, generation of aberration and a fall of diffraction efficiency tend to take place more. However, they can be suppressed to a lower level sufficiently by doing in the aforesaid manner.

(137) In the converging optical system described in (136), axial chromatic aberration of a composition system composed of the coupling lens, an optical element having thereon the diffractive structure and the objective lens satisfies the following expression;

$$|\Delta fB \cdot NA^2| \leq 0.25 \text{ μm} \tag{17}$$

wherein, NA represents the numerical aperture of the prescribed objective lens on the subject side necessary for recording and/or reproducing for an optical information recording medium, and ΔfB represents a change (μm) of a focus position of the composition system corresponding to the change of +1 nm in wavelength of the light source.

When axial chromatic aberration generated on each refracting interface of a converging optical system is corrected by utilizing an action of the diffractive structure, it is preferable that axial chromatic aberration of the converging optical system, namely, axial chromatic aberration of a composition system composed of a coupling lens, an optical element having thereon a diffractive structure and an objective lens satisfies the conditional expression (17) of (137).

(138) In the converging optical system described in one of (135) to (137), the numerical aperture of the prescribed objective lens on the subject side necessary for recording and/or reproducing for an optical information recording medium is 0.65 or more, and a thickness of a transparent substrate of the optical information recording medium is not more than 0.6 mm.

Since it is possible to reduce a size of a spot converged on an information recording plane by enhancing the numerical aperture of the prescribed objective lens on the subject side necessary for recording and/or reproduction for an optical information recording medium to 0.65 or more (0.45 for a conventional optical information recording medium, such as CD, for example, and 0.60 for DVD), as shown in (138), recording at density higher than that in a conventional optical information recording medium and/or reproduction of information recorded at higher density is possible for an optical information recording medium. However, the enhancement of the numerical aperture of an objective lens causes a problem that occurrence of coma caused by an inclination of an optical information recording medium from the surface perpendicular to the optical axis or by a warp thereof is more remarkable. By making a thickness of a transparent substrate of an optical information recording medium to be smaller, occurrence of coma can be repressed. When the numerical aperture of the objective lens is enhanced to 0.65 or more, it is preferable to make a thickness (t) of a transparent substrate of an optical information recording medium to be 0.6 or less ((1.2 mm for a conventional optical information recording medium, for example, CD, and 0.6 mm for DVD). To be concrete, in the case of $0.65 \leq NA \leq 0.70$, $0.3 \leq t \leq 0.6$ is preferable, while, in the case of $0.70 \leq NA \leq 0.85$, $0.0 \leq t \leq 0.3$ is preferable.

(139) In the converging optical system described in one of (135) to (138), a lens group capable of moving in the direction of an optical axis among those constituting the coupling lens has positive refracting power, and satisfies the following expression;

$$4 \leq f_{CP}/f_{OBJ} < 17 \quad (18)$$

wherein $f_{CP}$ represents focal length (mm) of a lens group that can move in the direction of an optical axis and has positive refracting power, and $f_{OBJ}$ represents a focal length of the objective lens.

When a lens group having positive refracting power among those constituting a coupling lens is made to be capable of moving in the direction of an optical axis as shown in (139), it is preferable that expression (18) is satisfied. When the upper limit in expression (18) is not exceeded, an amount of movement for correcting deviation of spherical aberration caused on a converging optical system can be small, which makes the total converging optical system to be compact. When the lower limit in expression (2) is not exceeded, it is possible to repress refracting power of the movable lens group to be small, and thereby to repress occurrence of aberration on the movable lens group. When two lens groups constituting a coupling lens are made to have positive refracting power, well-balanced distribution of refracting power to two lens groups can be carried out by satisfying expression (18), and each lens group can be made to have a form which is easy for manufacture.

(140) In the converging optical system described in one of (135) to (138), a lens group capable of moving in the direction of an optical axis among those constituting the coupling lens has negative refracting power, and satisfies the following expression;

$$-20 \leq f_{CN}/f_{OBJ} \leq -3 \quad (19)$$

wherein $f_{CN}$ represents focal length (mm) of a lens group that can move in the direction of an optical axis and has negative refracting power, and $f_{OBJ}$ represents a focal length of the objective lens.

When a lens group having negative refracting power among those constituting a coupling lens is made to be capable of moving in the direction of an optical axis as shown in (140), it is preferable that expression (19) is satisfied. When the lower limit in expression (19) is not exceeded, an amount of movement for correcting deviation of spherical aberration caused on a converging optical system can be small, which makes the total converging optical system to be compact. When the upper limit in expression (19) is not exceeded, it is possible to repress refracting power of the movable lens group to be small, and thereby to repress occurrence of aberration on the movable lens group. It is further possible to repress refracting power of the lens group having positive refracting power among two lens groups constituting a coupling lens to be small, and thereby, it is possible to repress occurrence of aberration on the lens group having positive refracting power, which makes manufacture to be easy.

(141) In the converging optical system described in one of (135) to (140), the objective lens is of a construction of 1-group and 1-element, and at least one surface is aspherical.

By making an objective lens to be of a construction of 1-group and 1-element in which at least one surface is aspherical as shown in (141), it is possible to obtain an objective lens suitable for optical pick-up wherein spherical aberration and coma are corrected satisfactorily in the simple construction of 1-group and 1-element, and recording at density higher than that in a conventional optical information recording medium and/or reproduction of information recorded at higher density is possible for an optical information recording medium. Further, it is more preferable that both surfaces are aspherical, and thereby, aberration can be corrected more accurately. Further, by making an objective lens to be of a construction of 1-group and 1-element, it is possible to secure a working distance to be long even when the numerical aperture is great, and thereby to prevent the contact between an objective lens and an optical information recording medium caused by a warp or inclination of the optical information recording medium.

(142) In the converging optical system described in one of (135) to (140), the objective lens is of a construction of 2-group and 2-element, and at least two surfaces among the first surface up to the third surface are aspherical.

By making an objective lens to be of a construction of 2-group and 2-element as shown in (142), it is possible to distribute refracting power for a ray of light to four surfaces, thus, refracting power per one surface can be small even when the numerical aperture is made to be great. As a result, a tolerance for eccentricity between lens surfaces can be large in making a metal mold and in forming a lens, resulting in a lens that is easy to be manufactured. By distributing refracting power for a ray of light to four surfaces, there is produced a room in correcting operations for aspherical surfaces provided on at least two surfaces among the first surface up to the third surface, which makes it possible to correct spherical aberration and coma accurately. In this case, it is preferable that at least two surfaces including the first surface and the third surface are made to be aspherical. It is further preferable that the second surface is also made to be aspherical, because aberration caused by deviation of an optical axis between the first lens and the second lens can be controlled to be small.

(143) In the converging optical system described in one of (135) to (142), an optical element having thereon a diffractive structure is made of plastic material, and therefore, the diffractive structure can easily be provided, which makes it possible to manufacture at low cost on a mass production basis through an injection molding method employing a metal mold.

(144) In the converging optical system described in one of (135) to (143), it is preferable that a lens group movable in the direction of an optical axis among lens groups constituting the coupling lens is made of material having specific gravity of 2.0 or less, because inertia force in the course of movement can be kept small and quick movement is possible accordingly. Further, electric power for driving an actuator representing a driving device for moving the movable lens group can be small, and a small-sized actuator can be used.

(145) In the converging optical system described in one of (134) to (144), it is preferable that a quantity of light of n-th order diffraction light (n represents integers other than 0 and ±1) is greater than that of diffraction light in any other order, and the converging optical system stated above can converge, on an information recording plane of the optical information recording medium, n-th order diffraction light generated on the diffractive structure in the course of information recording and/or reproduction for the optical information recording medium, because a ring-shaped band distance can be made large when the diffractive structure is formed by a plurality of zones, which makes manufacture to be easy.

(146) In the converging optical system described in one of (135) to (145), it is possible to form an excellent spot on an information recording plane of an optical information recording medium and thereby no selection of a light source is needed, which is preferable, if deviation of spherical aberration caused on each optical surface of a converging optical system by deviation of oscillation wavelength of the light source is corrected by moving at least one lens group constituting the coupling lens in the direction of an optical axis.

(147) In the converging optical system described in one of (135) to (146), even a plastic lens that is subject to a fall of image forming efficiency caused by temperature change and humidity change can be used as an objective lens with a high numerical aperture and extensive cost reduction can be attained for an optical pick-up apparatus, if the objective lens includes a lens formed with at least one plastic material sheet, and deviation of spherical aberration caused on each optical surface of a converging optical system by changes of temperature and humidity is corrected by moving at least one lens group constituting the coupling lens in the direction of an optical axis.

(148) In the converging optical system described in one of (135) to (146), it is possible to make a tolerance for manufacture for an optical information recording medium to be great, and thereby to enhance productivity, if deviation of spherical aberration caused by variation of a thickness of a transparent substrate of the information recording medium is corrected by moving at least one lens group constituting the coupling lens in the direction of an optical axis.

(149) In the converging optical system described in one of (135) to (146), deviation of spherical aberration caused on each optical surface of a converging optical system by combination of at least two of deviation of oscillation wavelength of the light source, changes of temperature and humidity, and variation of a thickness of a transparent substrate of the information recording medium, is corrected by moving at least one lens group constituting the coupling lens in the direction of an optical axis.

In the converging optical system of the invention, as indicated in (147), deviation of spherical aberration caused by a combination of changes of temperature and humidity, or an error of a thickness of a transparent substrate of an optical information recording medium, or dispersion of oscillation wavelength of a light source from the standard wavelength, can be corrected, and therefore, it is possible to obtain a converging optical system whose light-converging characteristics are constantly excellent.

(150) In the converging optical system described in one of (135) to (149), the optical information recording medium has structure wherein a plurality of transparent substrates and a plurality of information recording layers are laminated alternately in this order from the surface of the optical information recording medium, the objective lens is moved in the direction of an optical axis for focusing for information recording and/or reproduction for each information recording plane, and deviation of spherical aberration caused by a difference of a thickness of the transparent substrate on each information recording layer is corrected by moving at least one lens group constituting the coupling lens in the direction of an optical axis.

The converging optical system of (150) relates to one for an optical pick-up apparatus capable of recording and/or reproducing information for an optical information recording medium having structure wherein a plurality of transparent substrates and a plurality of information recording layers are laminated alternately in this order from the surface of the optical information recording medium. In this converging optical system, it is possible to correct spherical aberration caused by a difference in thickness for transparent substrates existing in the surface up to the information recording layer by moving the movable optical element of the coupling lens in the direction of an optical axis, and it is possible to focus on the aimed information recording layer by moving the objective lens in the direction of an optical axis, thus, it is possible to form an excellent wavefront on each information recording plane. Accordingly, information in doubled volume or more can be recorded on the surface on one side of the optical information recording medium and/or reproduced.

(151) An optical pick-up apparatus is one having therein a converging optical system having a light source, a coupling lens of a 2-group structure changing a divergence angle of divergent light emitted from the light source and an objective lens that converges a light flux passing through the coupling lens on an information recording plane through a transparent substrate of an optical information recording medium, a detector that detects light reflected on the information recording plane, the first driving device that moves the objective lens in the direction of an optical axis and in the direction perpendicular to an optical axis for converging a light flux on the information recording plane, and the second driving device that moves at least one optical element of the coupling lens in the direction of an optical axis, and conducts information recording and/or reproduction for an information recording plane of the optical information recording medium, wherein a ring-shaped band refractive structure is formed on at least one optical surface of an optical element constituting the converging optical system, and the second driving device moves at least one lens group constituting the coupling lens in the direction of an optical axis to correct deviation of spherical aberration caused on each optical surface of the converging optical system.

The optical pick-up apparatus of (151) relates to one for conducting recording and/or reproduction for an advanced optical information recording medium that is higher in terms of density and larger in terms of capacity than DVD. BY providing, on at least one optical surface of an optical element constituting the converging optical system of the optical pick-up apparatus, the diffractive structure having the wavelength characteristic wherein a back focus of an objective lens is shortened when a wavelength of a light source fluctuates slightly toward the long wavelength side, it is possible to correct effectively axial chromatic aberration that is caused on an objective lens and is problematic when a short wavelength light source such as a violet semiconductor laser is used. It is further possible to correct satisfactorily deviation of spherical aberration caused on each optical surface of the converging optical system by making at least one of two lens groups constituting the coupling lens to be capable of moving in the direction of an optical axis. The second driving device moves at least one of two lens groups constituting the coupling lens in the direction of an optical axis, and in this case, the optical element is moved so that spherical aberration caused on the converging optical system may be corrected appropriately, while monitoring signals from the sensor that detects the state of light-converging of a light flux converged on the information recording plane. It is possible to use an actuator of a voice coil type and a piezo-actuator as the second driving device. Further, the same effects as those in (135) are exhibited.

(152) In the optical pick-up apparatus described in (151), the light source emits light having a wavelength of 600 nm or less, and axial chromatic aberration caused by refracting action of each refracting interface in the converging optical system and axial chromatic aberration caused by the diffractive structure offset each other, thus, the same effects as those in the invention described in Structure 2 are exhibited.

(153) In the optical pick-up apparatus described in (152), axial chromatic aberration caused by the coupling lens, the optical element on which the diffractive structure is provided, and by the objective lens satisfies the following expression, and thereby, the same effects as those in the invention described in Structure 3 are exhibited;

$$|\Delta fB \cdot NA^2| \leq 0.25 \, \mu m \tag{20}$$

wherein, NA represents the numerical aperture of the prescribed objective lens on the subject side necessary for recording and/or reproducing for an optical information recording medium, and $\Delta fB$ represents a change ($\mu m$) of a focus position of the composition system corresponding to the change of +1 nm in wavelength of the light source.

(154) In the optical pick-up apparatus described in one of (151) to (153), the numerical aperture of the objective lens on the image side that is necessary for conducting recording and/or reproduction for the optical information recording medium is 0.65 or more, and a thickness of the transparent substrate of the optical information recording medium is 0.6 mm or less, thus, the same effects as those in the invention described in (138) are exhibited.

(155) In the optical pick-up apparatus described in one of (151) to (154), a lens group capable of moving in the direction of an optical axis among lens groups constituting the coupling lens has positive refracting power and satisfies the following expression, thus, the same effects as those in the invention described in Structure 5 are exhibited;

$$4 \leq f_{CP}/f_{OBJ} \leq 17 \tag{21}$$

wherein $f_{CP}$ represents focal length (mm) of a lens group that can move in the direction of an optical axis and has positive refracting power, and $f_{OBJ}$ represents a focal length of the objective lens.

(156) In the optical pick-up apparatus described in one of (151) to (154), a lens group capable of moving in the direction of an optical axis among lens groups constituting the coupling lens has negative refracting power and satisfies the following expression, thus, the same effects as those in the invention described in Structure 6 are exhibited;

$$-20 \leq f_{CN}/f_{OBJ} \leq -3 \tag{22}$$

wherein $f_{CN}$ represents focal length (mm) of a lens group that can move in the direction of an optical axis and has negative refracting power, and $f_{OBJ}$ represents a focal length of the objective lens.

(157) In the optical pick-up apparatus described in one of (151) to (156), the objective lens is of a construction of 1-group and 1-element, and at least one surface thereof is aspherical, thus, the same effects as those in the invention described in (141) are exhibited.

(158) In the optical pick-up apparatus described in one of (151) to (156), the objective lens is of a construction of 2-group and 2-element, and at least two surfaces among the first–third surfaces are aspherical, thus, the same effects as those in the invention of (142) are exhibited.

(159) In an optical pick-up apparatus, an optical element on which the diffractive structure is provided is made of plastic materials, and therefore, the same effects as those in the invention of (143) are exhibited.

(160) In the optical pick-up apparatus described in one of (151) to (159), a lens group capable of moving in the direction of an optical axis among lens groups constituting the coupling lens is made of materials whose specific gravity is not more than 2, and therefore, the same effects as those in the invention described in Structure 10 are exhibited.

(161) In the optical pick-up apparatus described in one of (151) to (160), a quantity of light of n-th order diffraction light (n represents integers other than 0 and ±1) is greater than that of diffraction light in any other order, and the converging optical system stated above can converge, on an information recording plane of the optical information recording medium, n-th order diffraction light generated on the diffractive structure in the course of information recording and/or reproduction for the optical information recording medium, and therefore, the same effects as those in the invention described in Structure 11 are exhibited.

(162) In the optical pick-up apparatus described in one of (151) to (161), deviation of spherical aberration caused on each optical surface of the converging optical system by deviation of oscillation wavelength of the light source is corrected by moving at least one lens group constituting the coupling lens in the direction of an optical axis, and therefore, the same effects as those in the invention described in Structure 12 are exhibited.

(163) In the optical pick-up apparatus described in one of (151) to (161), the objective lens includes a lens formed with at least one plastic material sheet, and deviation of spherical aberration caused on each optical surface of a converging optical system by changes of temperature and humidity is corrected by moving at least one lens group constituting the coupling lens in the direction of an optical axis, thus, the same effects as those in the invention of (147) are exhibited.

(164) In the optical pick-up apparatus described in one of (151) to (161), deviation of spherical aberration caused by variation of a thickness of a transparent substrate of the information recording medium is corrected by moving at least one lens group constituting the coupling lens, and thus, the same effects as those in the invention of. (148) are exhibited.

(165) In the optical pick-up apparatus described in one of (151) to (161), deviation of spherical aberration caused on each optical surface of a converging optical system by combination of at least two of deviation of oscillation wavelength of the light source, changes of temperature and humidity, and variation of a thickness of a transparent substrate of the information recording medium, is corrected by moving at least one lens group constituting the coupling lens in the direction of an optical axis, and thereby, the same effects as those in the invention represented by (149) and described in Structure 15 are exhibited.

(166) In the optical pick-up apparatus described in one of (151) to (165), the optical information recording medium has structure wherein a plurality of transparent substrates and a plurality of information recording layers are laminated alternately in this order from the surface of the optical information recording medium, the objective lens is moved in the direction of an optical axis for focusing for information recording and/or reproduction for each information recording plane, and deviation of spherical aberration caused by a difference of a thickness of the transparent substrate on each information recording layer is corrected by moving at least one lens group constituting the coupling lens in the direction of an optical axis, and thereby, the same effects as those in the invention of (150) are exhibited.

(167) A reproduction apparatus is equipped with an optical pick-up apparatus described in either one of (151)–(166) and is for recording voice and/or image, and/or for reproducing voice and/or image.

The reproduction apparatus of (167) makes it possible to conduct satisfactorily recording or reproduction of voice and image for an advanced optical information recording medium that is higher in terms of density and larger in terms of capacity than DVD, because a recording apparatus and a reproduction apparatus both for voice and image are equipped with the aforesaid optical pick-up apparatus.

(168) An optical pick-up apparatus has therein a light source, a coupling lens that changes a divergence angle of a divergent light emitted from the light source, and an objective lens that converges a light flux coming through the coupling lens on an information recording plane of an optical information recording medium, and conducting recording and/or reproduction of information for the optical information recording medium by detecting light coming from the optical information recording medium, wherein the coupling lens has a function to correct chromatic aberration of the objective lens, while the objective lens has an aspheric surface on at least one surface thereof and satisfies the following expression to obtain excellent image height characteristics;

$$1.1 \leq d1/f \leq 3$$

wherein, d1 represents an axial lens thickness and f represents a focal length.

(169) In the objective lens described in (168), the following expression is satisfied;

$$f/vd < 0.060$$

wherein, vd represents Abbe number.

(170) In the objective lens described in (168) or (169), the following expression is satisfied;

$$1.40 \leq n$$

wherein, n represents the index of refraction at the wavelength used.

(171) In the objective lens described in (170), the following expression is satisfied.

$$1.40 \leq n \leq 1.85$$

(172) In the objective lens described in one of (168) or (171), the following expression is satisfied;

$$0.40 \leq r1/(n+f) \leq 0.70$$

wherein, r1 represents the paraxial radius of curvature on the light source side.

(173) In the objective lens described in (168), it is preferable that the following expression is satisfied with respect to magnification m of a composite optical system;

$$0.05 \leq |m| \leq 0.5 \ (m<0)$$

more preferably, $0.1 \leq |m| \leq 0.5 \ (m<0)$ wherein, m represents a magnification of a composite optical system of an objective lens and a coupling lens.

When the magnification is not less than the lower limit of the conditional expression above, the composite optical system can be compact in size, and when it is not more than the upper limit, aberration of the coupling lens turns out to be better.

(174) In the objective lens described in one of (168) to (173), it is preferable that deviation of spherical aberration caused on each optical surface of an optical system is corrected by moving the coupling lens in the direction of an optical axis. With regard to correction of the spherical aberration caused on a converging optical system of an optical pick-up apparatus, a divergence angle of a light flux entering the objective lens is changed by moving the coupling lens in the direction of an optical axis by an appropriate amount, when the spherical aberration of the optical system fluctuates to the "over" side or the "under" side. By virtue of this, the deviation of spherical aberration caused on the optical system can be canceled.

(175) In the objective lens described in (174), it is preferable that deviation of spherical aberration caused on each optical surface of an optical system by slight variation of an oscillation wavelength of the light source is corrected by moving the coupling lens in the direction of an optical axis. With regard to correction of spherical aberration that is caused on a converging optical system of an optical pick-up apparatus when an oscillation wavelength of a semiconductor laser of the light source is fluctuated, "over" or "under" spherical aberration is caused on the optical system when the oscillation wavelength is shifted from the standard wavelength. A divergence angle of a light flux entering the objective lens is changed by moving the coupling lens in the direction of an optical axis by an appropriate amount. By virtue of this, the deviation of spherical aberration caused on the optical system can be canceled.

(176) In the objective lens described in (174), it is preferable that deviation of spherical aberration caused on each optical surface of an optical system by changes of temperature and humidity is corrected by moving the coupling lens in the direction of an optical axis. With regard to correction of the spherical aberration that is caused on a converging optical system of an optical pick-up apparatus when temperature or humidity is changed, a divergence angle of a light flux entering the objective lens is changed by moving the coupling lens in the direction of an optical axis by an appropriate amount, when "over" or "under" spherical aberration is caused on an optical system by changes of temperature or humidity. By virtue of this, the deviation of spherical aberration caused on the optical system can be canceled.

(177) In the objective lens described in (174), it is preferable that deviation of spherical aberration caused on each optical surface of an optical system by slight variation of a thickness of a protective layer of the optical information recording medium is corrected by moving the coupling lens in the direction of an optical axis. With regard to correction of the spherical aberration that is caused on an optical system by an error of a thickness of the protective layer of the optical information recording medium, when there is an error that the protective layer turns out to be thicker, "under" spherical aberration is caused when there is an error that the "over" spherical aberration turns out to be thinner in the optical system. In this case, a divergence angle of a light flux entering the objective lens is changed by moving the coupling lens in the direction of an optical axis by an appropriate amount. By virtue of this, deviation of spherical aberration caused on the optical system can be canceled.

(178) In the objective lens described in (174), it is preferable that deviation of spherical aberration caused on each optical surface of an optical system by a combination of at least two or more of slight deviation of an oscillation wavelength of the light source, changes of temperature and humidity, and slight deviation of a thickness of the protective layer of the optical information recording medium, is corrected by moving the coupling lens in the direction of an optical axis. With regard to correction of spherical aberration generated on the optical system by a combination of at least two or more of slight deviation of an oscillation wavelength of the laser, changes of temperature and humidity, and slight deviation of a thickness of the protective layer of the optical information recording medium, a divergence angle of a light flux entering the objective lens is changed by moving the coupling lens in the direction of an optical axis by an appropriate amount, even in this case. By virtue of this, deviation of spherical aberration caused on the optical system can be canceled.

Further, it is preferable that deviation of spherical aberration caused on each optical surface of an optical system is corrected by moving the coupling lens in the direction of an optical axis so that a distance between the coupling lens and the objective lens may be increased when spherical aberration of the optical system fluctuates to the "over" side, and by moving the coupling lens in the direction of an optical axis so that a distance between the coupling lens and the objective lens may be decreased when spherical aberration of the optical system fluctuates to the "under" side. If the coupling lens is moved in the direction of an optical axis so that the distance between the objective lens and the coupling lens may be increased, divergent light enters the objective lens more, compared with an occasion before movement of the coupling lens, which makes it possible to generate under spherical aberration on the objective lens. Therefore, when over spherical aberration is caused on the optical system for the reason stated above, if the coupling lens is moved by an appropriate amount to increase the distance between the objective lens and the coupling lens, it is possible to just cancel the generated over spherical aberration. On the contrary, if the coupling lens is moved in the direction of an optical axis so that a distance between the coupling lens and the objective lens may be decreased, converged light enters the objective lens more, compared with an occasion before movement of the coupling lens, which makes it possible to generate over spherical aberration on the objective lens. Therefore, when under spherical aberration is generated for the aforesaid reason, if the coupling lens is moved by an appropriate amount to decrease the distance between the objective lens and the coupling lens, it is possible to just cancel the generated under spherical aberration.

It is further preferable to include a moving device that moves the coupling lens in the direction of an optical axis. On the actual optical pick-up apparatus, a coupling lens is moved so that spherical aberration caused on an optical system may be corrected appropriately, while an RF signal of reproduction signal is being monitored. As a moving device for the coupling lens, it is possible to use an actuator of a voice coil type and a piezo-actuator.

The diffractive surface used in the present specification means a configuration (or the surface) in which a relief is provided on the surface of the optical element, for example, the surface of the lens, and an action to change an angle of the light rays by the diffraction is given to it, and when there is an area in which the diffraction is generated or an area in which the diffraction is not generated, in one optical surface, it means the area in which the diffraction is generated. As the shape of the relief, a shape in which it is formed, for example, on the surface of the optical element, as the almost concentric ring band around the optical axis, and when its cross section is viewed on the plane including the optical axis, it is known that each ring band is formed as the saw-toothed shape, and such the shape is included. Particularly, such the saw-tooth shaped ring band structure is preferable.

In the present specifications, let it be assumed that an objective lens means, in a narrow sense, a lens that is arranged to be closest to an optical information recording medium to face it and has a light-converging function in an optical pick-up apparatus loaded with the optical information recording medium, and means, in a broad sense, a lens group that is capable of being driven by an actuator at least in the direction of its optical axis together with the aforesaid lens. The lens group in this case means at least one or more of lenses. Therefore, in the present specifications, numerical aperture NA of an objective lens on the optical information recording medium side (image side) is numerical aperture NA of a light flux which has emerged from the lens surface positioned to be closest to the optical information recording medium on the objective lens to the optical information recording medium side. Further, the prescribed numerical aperture necessary for recording and/or reproduction of information for an optical information recording medium in the present specifications is a numerical aperture stipulated by the standard of each optical information recording medium, or a numerical aperture of an objective lens having the diffraction limit function capable of obtaining a spot diameter necessary for recording or reproducing information in accordance with a wavelength of the light source to be used for each optical information recording medium.

In the present specification, it is defined that the converging optical system means a coupling lens which includes at least an objective lens, and is arranged between the light source and the objective lens, and which forms the incident light flux into almost parallel light flux, (including a collimator which forms the incident divergent light into the parallel light flux). However, an aggregate which is an aggregate of at least integrally functioned optical elements such as the beam expander, which will be described later, and an aggregate in which a part of optical elements constituting the aggregate can transfer along the optical axis direction, and a part of optical elements of the aggregate are not included in the converging optical system herein. In this connection, the coupling lens may be composed of a plurality of lenses, and the structure in which those lenses are separated and the other optical elements are inserted between them, may also be allowable.

In the present specification, it is defined that the beam expander means an aggregate of the optical elements such as lenses (a group of optical elements such as lens group) which can transfer at least the optical element such as one lens along the optical axis direction, and thereby, can change the divergent angle (including the divergent action, convergent action) of the emitted light flux, and by which, when almost parallel light flux is incident, almost parallel light flux can be emitted. It is preferable that a plurality of optical elements such as those lenses are integrated, and when it is structured so that the optical element such as at least one lens can transfer along the optical axis, a drive means such as a transfer apparatus to practically conduct the transfer may not be included in the beam expander.

In the beams expander of the present specification, supposing that the diameter of almost parallel incoming light flux is "a" and the diameter of almost parallel outgoing light flux is "b", both cases that a<b (beam expanding system) and a>b (beans compressing system) are included. Of course, the case that a=b is included.

In the present specification, the means for correcting the variation of the spherical aberration and the axial chromatic aberration, means a structure in which a means for correcting the variation of the spherical aberration, and a means for correcting the axial chromatic aberration, have both of 2 correction functions by a single means, for example, one optical element or its aggregate (for example, beam expander), and for example, the beam expander structured by the specific Abbe's number positive lens and negative lens, or the beam expander provided with the surface having the diffractive structure, is listed. Further, in the present specification, in the invention relating to the optical pick-up apparatus, so far as specifically not being regulated, it is defined that the focal length indicates a focal length to the oscillation wavelength of the light source which emits the light of the shortest oscillation wavelength in the used light source.

In the present specification, it is defined that the minute variation of the oscillation wavelength of the light source indicates the wavelength variation within the range of ±10 nm to the oscillation wavelength of the light source. Further, in the present specification, for (finely)correcting each kind of aberrations, it is preferable that, when the spherical aberration is obtained, it is not larger than 0.07 λrms, which is so-called the diffraction limit performance, (herein, λ is the oscillation wavelength of the used light source), and further, considering the accuracy of the machine, it is more preferable to be not larger than 0.05 λrms. According to them, respectively appropriate spot sizes to various optical information recording media, can be obtained.

In the present specification, as the optical information recording medium (optical disk), the disk-shaped present optical information recording media and the next generation optical information recording media such as, for example, each kind of CDs such as CD-R, CD-RW, CD-Video, and CD-ROM, each kind of DVDs such as DVD-ROM, DVD-RAM, DVD-R, DVD-RW, and DVD-Video, or M, are also included. In this connection, the transparent substrate used in the present specification also includes a case where the thickness is 0, that is, the transparent substrate does not exist.

In the present specification, the recording and the reproducing of the information mean to record the information onto the information recording plane of the optical information recording media as described above, and to reproduce the information recorded onto the information recording plane. The optical pick-up apparatus of the present invention may be the apparatus used for conducting only the recording or only the reproducing, or may be the apparatus used for conducting both of the recording and the reproducing. Further, it may be the apparatus used for conducting the recording for some optical information recording medium, and for conducting the reproducing for the other optical information recording medium, and may be the apparatus used for conducting the recording or reproducing for some optical information recording medium, and for the other optical information recording medium, for conducting the recording and the reproducing. In this connection, the reproducing used herein, includes also only the reading of the information.

The optical pick-up apparatus of the present invention can be mounted in the recording and/or reproducing apparatus of the audio and/or image, such as each kind of players or drives, or AV devices in which these are assembled, personal computers, or the other information terminal equipments.

BRIEF DESCRIPTION OF THE DRAWINGS

FIG. 39($a$) is a sectional view typically showing the objective lens 3' which can be used for the optical pick-up apparatus of the present embodiment, and FIG. 39($b$) is a front view viewed from the light source side.

DETAILED DESCRIPTION OF THE PREFERRED EMBODIMENT

Figure 1:
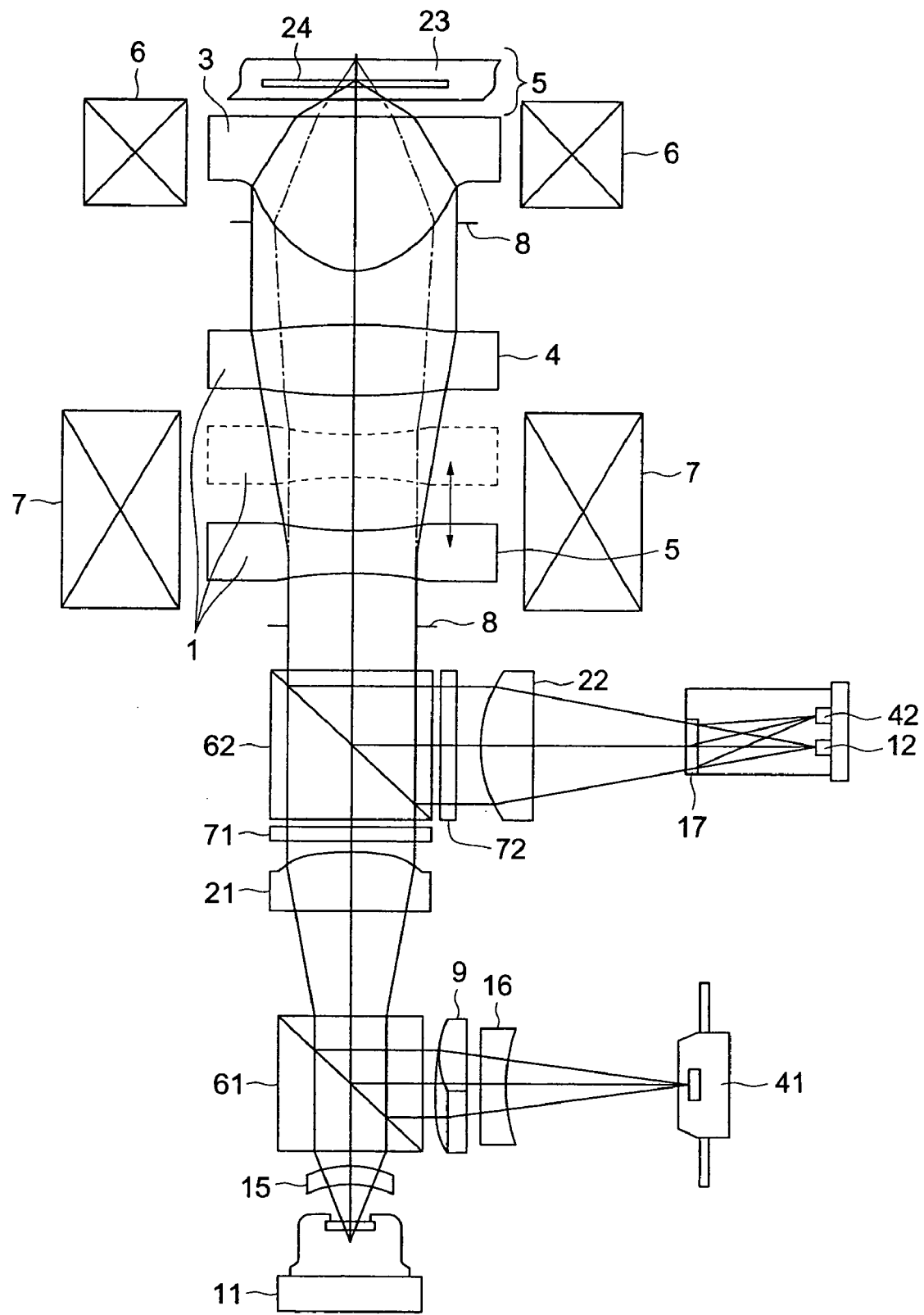
FIG. 1 is an outline structural view of an optical pick-up apparatus according to the present embodiment.

The optical pick-up apparatus to conduct the recording and/or reproducing of the information of the optical information recording medium of the present invention has a light source, a converging optical system having the objective lens for converging the light flux emitted from the light source onto the information recording plane of the optical information recording medium so that the reproducing and/or recording of the information of the optical information recording medium can be conducted, and a photo detector for receiving the reflected light flux from the information recording plane. The converging optical system has at least one plastic lens, and a spherical aberration deviation (variation) correcting element (means) for correcting the deviation (variation) of the spherical aberration of the converging optical system. The numerical aperture at the image side of the objective lens is not smaller than 0.65 (preferably, not smaller than 0.75).

It is preferable that the light source is a semiconductor laser diode whose wavelength is not larger than 500 nm so as to be applied for the high density optical information recording medium. When the wavelength is such the short wavelength, it is preferable because the effect of the present invention becomes conspicuous.

It is preferable that the converging optical system has a coupling lens such as a collimator lens. The coupling lens may be composed of one lens, or one lens group, or comprises plurality of lenses or plurality of lens groups. Further, it is preferable that the converging optical system can converge the light flux of the wavelength $\lambda$ emitted from the light source onto the information recording plane of the optical information recording medium within a predetermined numerical aperture of the optical information recording medium in the condition of the wavefront aberration not larger than 0.07 $\lambda$ rms. More preferably, the converging optical system can converge the light flux in the condition of not larger than 0.05 $\lambda$rms.

The objective lens may be composed of one lens, or one lens group, or comprises plurality of lenses or plurality of lens groups. From the viewpoint of cost and the mounting accuracy, it is preferable that the objective lens is composed of a single lens. Further, it is preferable that the objective lens has at least one aspheric surface.

The optical pick-up apparatus of the present invention can be applied for a pickup apparatus to detect the reflected light from the information recording plane and reproduces and/or records the information.

The photo detector is a detector to detect the reflected light, and an element to convert optical signals into electronic signals such as PDIC is preferably used.

The plastic lens provided in the converging optical system may be an objective lens, or a coupling lens such as a collimator lens, or a lens constituting the spherical aberration deviation correcting element, or a lens constituting the axial chromatic aberration correcting element, or other lenses of course, all of the lenses in the converging optical system may be made of plastic.

The spherical aberration deviation (variation) correcting element may be composed of one optical element, or may have more than two optical elements.

Further, as examples of the deviation (variation) of the spherical aberration of the converging optical system to be corrected by the spherical aberration deviation (variation) correcting element, the following examples are listed.

The first example is the deviation (variation) of the spherical aberration accompanied by the change of the temperature and/or the humidity. For example, it is the variation of the spherical aberration generated accompanied by the change of at least one of the shape of the optical element (specifically, the optical element formed of plastic) and refractive index due to the environmental change between the temperature −30 to +85° C., humidity 5% to 90%. The second example is the deviation (variation) of the spherical aberration accompanied by the wavelength deviation (variation) of the light source and/or the manufacturing error of the wavelength of the light source. In this connection, the [wavelength deviation (variation)] used herein means that the wavelength of the light source of the optical pick-up apparatus is minutely varied by about −10 nm to +10 nm accompanied by the change of the temperature, humidity or time, and the [manufacturing error of the wavelength] means the error of the wavelength due to the deviation for each of light sources at the time of the production of the light source. The third example is the deviation (variation) of the spherical aberration accompanied by the deviation (variation) of the thickness of the transparent substrate of the optical information recording medium. The deviation (variation) of a thickness of the transparent substrate includes a slight change in a thickness of the transparent substrate (less than 100 µm preferably) of one optical information recording medium, and it also includes a difference of a thickness of a transparent substrate between at least two kinds of optical information recording medium, and the former is preferably meant. The fourth example is the deviation (variation) of the spherical aberration caused by the manufacturing errors of optical element of the converging optical system such as a lens (for example, errors of a form of the surface or errors of thickness on an optical axis) aberration caused by, if a spherical aberration deviation correcting element can correct the spherical aberration deviation of fourth example manufacturing precision does not need to be too severe, and lens productivity can be enhanced.

Incidentally, when temperature rises, spherical aberration is generated on an information recording plane in the case of a refractive lens, in general, while, when temperature falls, undercorrected spherical aberration is generated. (However, when a objective lens having two lenses is used, undercorrected spherical aberration is sometimes generated when temperature rises.) When humidity rises, undercorrected spherical aberration is generated on an information recording plane in the case of a refractive lens, in general, while, when humidity falls, overcorrected spherical aberration is generated. When a wavelength of a light source turns out to be long, overcorrected spherical aberration is generated on an information recording plane in the case of a refractive lens, in general, while, when a wavelength of a light source turns out to be short, undercorrected spherical aberration is generated. Further, when a thickness of a transparent substrate of an optical information recording medium is increased, overcorrected spherical aberration is generated on an information recording plane in the case of a refractive lens, in general, while, when a thickness of a transparent substrate is decreased, undercorrected spherical aberration is generated.

Further, it is preferable that spherical aberration deviation correcting element can correct the spherical aberration from 0.07 λrms up to 0.2 λrms to not larger than 0.07 λrms. Further preferably, the spherical aberration from 0.07 λrms up to 0.5 λrms can be corrected to not larger than 0.07 λrms.

The spherical aberration deviation (variation) correcting element may have a movable element movable in the optical axis direction, or may be composed of only a fixed element. Further, the spherical aberration deviation correcting element may be a combination of the movable element and the fixed element.

A mode in which the spherical aberration deviation (variation) correcting element has the movable element will be described below. In the case where it has the movable element, when the movable element moves in the optical axis direction, the movable element can change the slope angle of the marginal ray of an exit light flux by moving in an optical axis direction, and the deviation (variation) of the spherical aberration is corrected. In this connection, the movable element is preferably a lens or a lens group. More preferably, the movable element has a plastic lens. When the spherical averration deviation correcting element has the fixed element together with the movable element, the fixed element may also have a plastic lens. Further, preferably, the movable element has an aspheric lens having an aspheric surface on at least one surface. It may be a lens which has two aspheric surfaces. When it has the fixed element together with the movable element, the fixed element may also have an aspheric lens. Further, the optical pick-up apparatus preferably has a moving device to move the movable element in the direction of an optical axis. For example, the voice coil actuator or the piezoelectric actuator can be used as the moving device.

The first example having the movable element is an example in which the converging optical system has coupling lens, and at least one lens group in the lens group constructing the coupling lens is a movable element of the spherical aberration deviation (variation) correcting element. The coupling lens is composed of one or plural lens groups, and one lens group is composed of one or plural lenses. Incidentally, with regard to a "lens group" in the invention, one lens or a set of plural lenses each having the same movement is regarded as one lens group, in the case of lenses moving in the direction of an optical axis, and one lens or a set of plural lenses which are in contact with adjacent lenses is regarded as one lens group, in the case of lenses which do not move in the direction of an optical axis. Therefore, when two lenses which do not move in the direction of an optical axis are present to be away from each other, these lenses are regarded as different lens groups.

The one example of the first example will be shown. The converging optical system has the coupling lens having at least 2 lens groups, and at least one lens group among at least 2 lens groups constituting the coupling lens is a movable element of a spherical aberration deviation correcting element. Incidentally, all lens groups constituting the coupling lens may move in the direction of an optical axis, or, one or plural lens groups which do not move in the direction of an optical axis may be used as a fixed element. The example is shown in FIG. 40.

Figure 40:
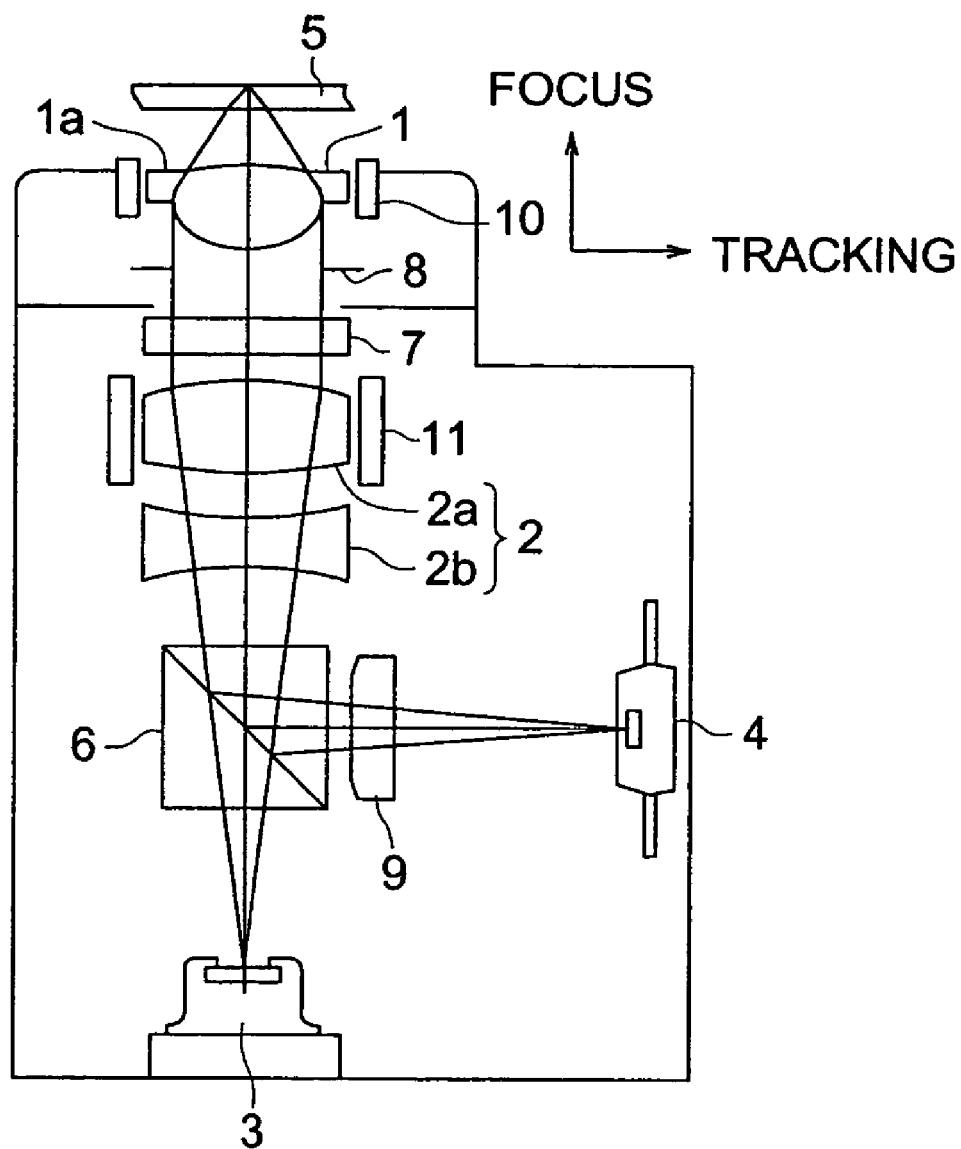
FIG. 40 is an outlined structural view of an optical pickup apparatus according to the example 15.

In this connection, in the lenses shown in FIG. 40, the coupling lens is composed of 2 elements (lenses) in 2 groups. The positive lens is the movable element of the spherical aberration deviation correcting element of course, in the example 1-1, the one lens group of coupling lens may be composed of one lens, or a plurality of lenses. Further, in one lens group, a plurality of lenses may be cemented or not cemented. Further, in the example 1-1, the coupling lens composed of 2 lens groups may be composed of the positive lens group and the negative lens group, or may be composed of the positive lens group and the positive lens group. In the case of the coupling lens composed of the positive lens group and negative lens group, the positive lens group may be the movable element, or the negative lens group may be the movable element. In this connection, it is preferable that the coupling lens has a plastic lens. Particularly, the movable element preferably has a plastic lens. Further, the coupling lens has preferably the aspheric lens. Particularly, the movable element preferably has the aspheric lens.

In the example 1-1, when the coupling lens is composed of two lens groups, it is preferable to move a movable element so that a distance between two groups of the coupling lens may be reduced, when spherical aberration varies in the overcorrected deviation on the information recording plane, and it is preferable to move a movable element so that a distance between two groups of the coupling lens may be extended when spherical aberration varies in the undercorrected deviation on the information recording plane.

Next, the another example of the first example (example 1-2) will be shown. Also in this mode, the coupling lens is the movable element of the spherical aberration deviation correcting element. The coupling lens in the converging optical system is composed of only one lens group, and the one lens group of coupling lens is the movable element of the spherical aberration deviation correcting element. That example is shown in FIG. 62.

Figure 62:
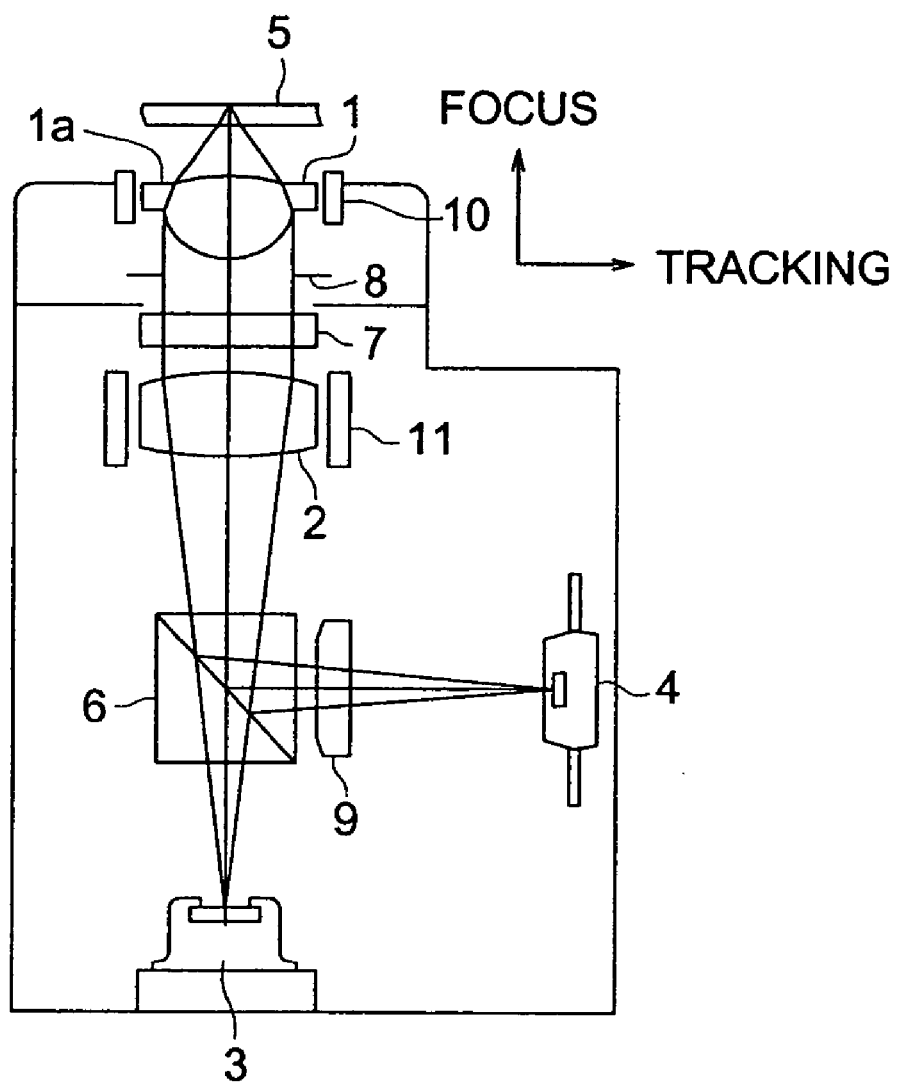
FIG. 62 is a view showing another embodiment of an optical pickup apparatus employing the objective lens of the present invention.

In this connection, in the coupling lens shown in FIG. 62, the coupling lens is composed of one element in one group, and the element is a positive lens, and the positive lens is the movable element of the spherical aberration deviation correcting element. Of course, in the example 1-2, one lens group of the coupling lens may be composed of one lens, or may be composed of a plurality of lenses. Further, in the one lens group, a plurality of lenses may be cemented, or not cemented. In this connection, it is preferable that the coupling lens has a plastic lens. Further, it is preferable that the coupling lens has an aspheric lens.

In the example 1-2, it is preferable that the following conditional expression is satisfied.

$$0.05 \leq |m| \leq 0.5 \ (m<0)$$

m: the magnification of the combined system of the objective lens and the coupling lens.

It is more preferable that the following conditional expression is satisfied.

$$0.1 \leq |m| \leq 0.5 \ (m<0)$$

In the example 1-2, when spherical aberration varies in the overcorrected direction on the information recording plane, it is preferable that the coupling lens is moved so that a distance between the coupling lens and the objective lens may be extended, while when spherical aberration varies in the under corrected direction on the information recording plane, it is preferable that the coupling lens is moved so that a distance between the coupling lens and the objective lens may be reduced.

An example of an embodiment which is more preferable in the first example having therein a movable element will be shown below. A wavelength of a light source is not more than 500 nm, at least one lens in the coupling lens has a diffractive surface having a ring-shaped diffractive structure, the lens having a diffractive surface is a plastic lens, and the movable element is a plastic lens and an objective lens is a plastic lens.

Next, the second example having the movable element will be shown. The second example is an example in which the converging optical system has a coupling lens, and has the positive lens group having at least one positive lens and the negative lens group having at least one negative lens, between the coupling lens and the objective lens, and at least one of the positive lens group and the negative lens group is the movable element of the spherical aberration deviation correcting element. Further, its one example is shown in FIG. 1.

In the second example, the positive lens group and the negative lens group may be composed of respectively one lens, or may be composed of a plurality of lenses. Further, in respective lens groups, a plurality of lenses may be cemented or not cemented. In this connection, it is preferable that the positive lens group, or the negative lens group has the plastic lens. More preferably, the movable lens groups have the plastic lens. Further, it is preferable that the positive lens group or the negative lens group has the aspheric lens. More preferably, the movable lens groups have the aspheric lens.

Further, in the second example, the converging optical system may have a beam expander, and the beam expander may also have the positive lens group and the negative lens group. Of course, in this case also, at least one of the positive lens group and the negative lens group is the movable element of the spherical aberration deviation correcting element. It is preferable that the beam expander has a moving device to move the movable element. For example, the voice coil actuator or the piezoelectric actuator can be used as the moving device.

In this connection, in the optical system shown in FIG. 1, the coupling lens having positive refractive power is composed of one element in one group, and the one element is a positive lens and the beam expander is provided between the coupling lens and the objective lens, and the beam expander is composed of one negative lens and one positive lens, and the negative lens is the movable element of the spherical aberration deviation correcting element.

In the second example, it is preferable that the following conditional expression is satisfied.

$$|fP/fN| \geq 1.1$$

fP: the focal distance of the positive lens group (when the positive lens group has the diffractive surface, fP is the total focal distance in which the refractive power and the diffractive power are combined together)

fN: the focal distance of the negative lens group (when the negative lens group has the diffractive surface, fN is the total focal distance in which the refractive power and the diffractive power are combined together).

More preferably, $|fP/fN|>1.2$.

Further preferably, $2.0 \geq |fP/fN| \geq 1.2$.

Further more preferably, $2.0 \geq |fP/fN| \geq 1.3$.

In the example 2, in which a beam expander is composed of two lens groups including a positive lens group and a negative lens group, when spherical aberration varies in the overcorrected deviation on the information recording plane, it is preferable that the movable element is moved so that a distance between the two lens groups of the beam expander is reduced, while, when spherical aberration varies in the undercorrected deviation on the information recording plane, it is preferable that the movable element is moved so that a distance between the two lens groups of the beam expander may be extended.

Incidentally, a preferable embodiment in the second example having therein a movable element will be shown below. A wavelength of a light source is not more than 500 nm, at least one lens among positive lens group or a negative lens group has a diffractive surface having a ring-shaped diffractive structure, a lens having a diffractive surface is a plastic lens, and the movable element is a plastic lens and an objective lens is a plastic lens.

Next, there will be described an occasion wherein a spherical aberration deviation correcting element has no movable element but has only a fixed element which does not move in the direction of an optical axis. It is preferable that the fixed element is represented by an element whose refractive index distribution in the direction perpendicular to an optical axis is variable. For example, there is given a liquid crystal element. An example of a preferable fixed element whose refractive index distribution is variable will be shown below.

Figure 63:
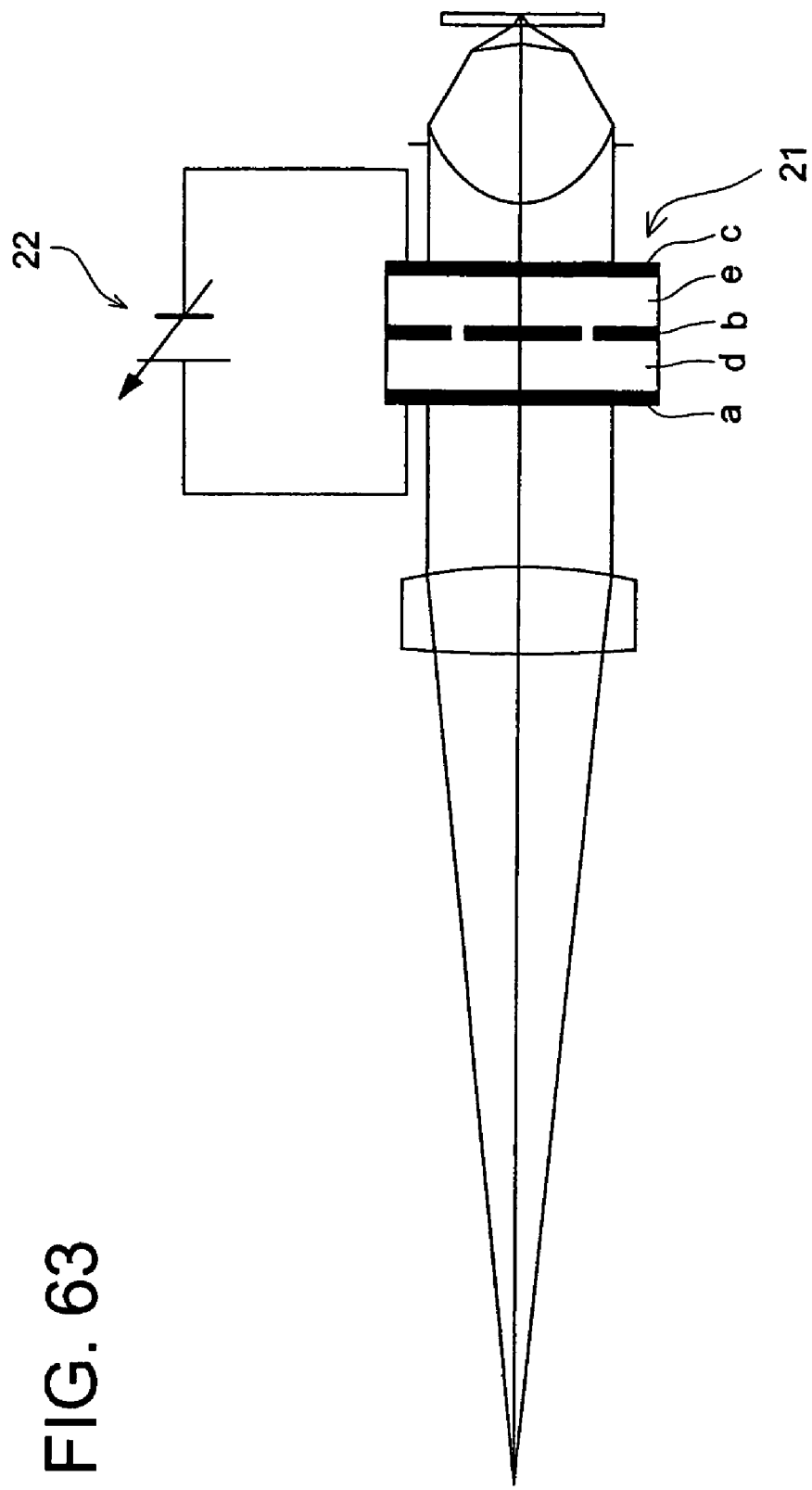
FIG. 63 is a sectional view showing an embodiment employing a refracting index distribution changing element according to the present invention.

FIG. 63 shows the example 1. Between the objective lens and the collimator lens, there is arranged refractive index distribution variable element 21 whose refractive index distribution is variable, as shown in FIG. 63.

As refractive index distribution variable element 21, it is possible to use an element wherein electrode layers a, b and c which are electrically connected each other and are transparent optically, for example, and refractive index distribution variable layers d and e which are insulated electrically from the electrode layers a, b and c and change in terms of refractive index distribution in accordance with impressed voltage are laminated alternatively, and optically transparent electrode layers a, b and c are divided into plural areas.

In FIG. 63, when deviation of spherical aberration is detected, voltage is impressed on electrode layers a, b and c by driving means 22 for refractive index distribution variable element 21 so that refractive index of refractive index distribution variable layers d and e may be changed depending on locations, and a phase of light emerging from refractive index distribution variable element 21 is controlled so that deviation of spherical aberration may be zero.

Figure 64:
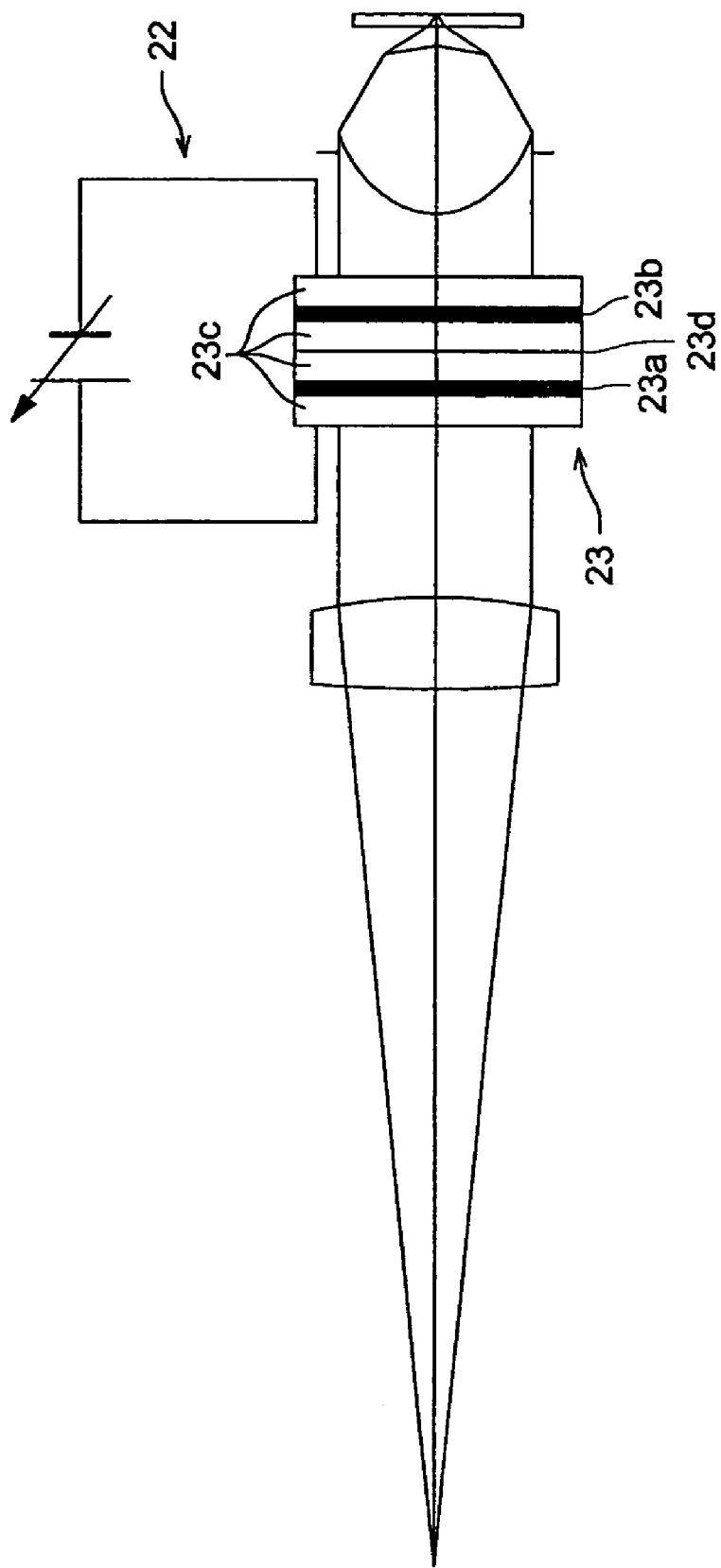
FIG. 64 is a sectional view showing another embodiment employing a refracting index distribution changing element according to the present invention.

FIG. 64 shows an example of another refractive index distribution variable element. Refractive index distribution variable element 23 in FIG. 64 is equipped with liquid crystal element 23a on which liquid crystal molecules are arranged in order in the arbitrary X direction on a plane perpendicular to an optical axis and with liquid crystal element 23b on which liquid crystal molecules are arranged in order in the Y direction perpendicular to the X direction on a plane perpendicular to an optical axis. Liquid crystal element 23a and liquid crystal element 23b are laminated alternatively with an inbetween of glass base board 23c, and ½ wavelength plate 23d is arranged between inner glass substrate 23c.

In FIG. 64, when deviation of spherical aberration is detected, deviation of spherical aberration is corrected by impressing voltage on each of liquid crystal element 23a and liquid crystal element 23b both of refractive index distribution variable element 23 with driving means 22, and thereby, by controlling component in X direction and component in Y direction of light emerging from refractive index distribution variable element 23 independently.

Refractive index distribution variable element 21 and refractive index distribution variable element 23 shown respectively in FIG. 63 and FIG. 64 make it possible to constitute a converging optical system which has no movable element and has structure that is mechanically simple.

Further, it is preferable that the converging optical system has the axial chromatic aberration correcting element to correct the axial chromatic aberration of the converging optical system. Particularly, in the case where the converging optical system has the plastic lens, particularly the objective lens is the plastic lens, a problem of the axial chromatic aberration becomes conspicuous, and it is preferable that converging optical system has the axial chromatic aberration correcting element. Further, in the case that the wavelength of the light source is 500 nm or less, it is preferable to comprise the axial chromatic aberration correcting element, since the axial chromatic aberration becomes larger. In this connection, the axial chromatic aberration correcting element and the spherical aberration deviation correcting element may be composed of the same optical elements or members, or may be composed of different optical elements or members. One of the axial chromatic aberration correcting element and the spherical aberration deviation correcting element may be incorporated in the other one. Further, a part of the spherical aberration deviation correcting element and a part of the axial chromatic aberration correcting element may be the same optical element. Further, the axial chromatic aberration correcting element may be composed of one optical element, or may have more than 2 optical elements.

It is preferable that in case that the axial chromatic aberration correcting element comprises at least one positive lens group (including only one lens or plural lenses) having one positive lens and at least one negative lens group (including only one lens or plural lenses) having one negative lens, and the following condition is satisfied.

$$\nu dP > \nu dN$$

νdP: an average of Abbe's numbers of d lines of all the positive lenses of the conversing optical system
νdN: an average of Abbe's numbers of d lines of all the negative lenses of the conversing optical system
Further preferably, the following condition is satisfied.

$$\nu dP > 55$$

$$\nu dN < 35$$

Further, in the case of the above second example in which the spherical aberration deviation correcting element has the movable element, as the axial chromatic aberration correcting element, it is preferable that the following conditional expression is satisfied.

$$\Delta d \cdot fP/fN/\Delta \nu d \leq 0.05$$

Δd: the movement amount (mm) of the movable element when the information is recorded or reproduced for one information recording plane of one arbitrary optical information recording medium for which the information can be recorded or reproduced,
fP: the focal length (mm) of the positive lens group (in this connection, when the diffractive surface is provided on the positive lens group, the total focal length in which the refractive power and the diffractive power are combined),
fN: the focal length (mm) of the negative lens group (in this connection, when the diffractive surface is provided on the negative lens group, the total focal length in which the refractive power and the diffractive power are combined),
Δνd: the difference between the maximum value of Abbe's number of the positive lens and the minimum value of Abbe's number of the negative lens, in the positive lens group and the negative lens group.

Incidentally, it is preferable that Δd is defined as follows.

Δd: The movement amount (mm) of a movable element necessary for correcting deviation of spherical aberration caused by temperature rise of 30° C. from standard temperature (preferably, temperature within a range of 15–35° C.) to 0.05 λrms or less.

Further, in the case of the above second example in which the spherical aberration deviation correcting element has the movable element, as the axial chromatic aberration correcting element, it is preferable that the following conditional expression is satisfied.

$$\Delta d \cdot |fP/fN| \leq 0.5$$

Further, it is preferable that the axial chromatic aberration correcting element has the diffractive surface having the ring-shaped diffractive structure. It is preferable because the correction can be more intensely conducted, as compared to a case in which the axial chromatic aberration is corrected by the regulation of Abbe's number. The diffractive surface may be provided on the objective lens, or coupling lens, or on the other lens, or on the optical element other than lenses. Of course, diffractive surface may also be provided on the optical element comprised in the spherical aberration deviation correcting element. Further, a diffractive surface may be provided on one side or both sides of the lens. The optical element provided with the diffractive surface becomes the axial chromatic aberration correcting element.

Further, when axial chromatic aberration correcting element has a positive lens group having at least one positive lens (having only one lens or plural lenses), a negative lens group having at least one negative lens (having only one lens or plural lenses) and further, at least one diffractive surface, it is preferable that Abbe's number of d line for each of all positive lenses of the converging optical system is not more than 70, and Abbe's number of d line for each of all negative lenses of the converging optical system is not less than 40.

When providing a axial chromatic aberration correcting element having a diffractive surface, it is preferable that the following conditional expression is satisfied, when "a" represents the axial chromatic aberration caused by reflective index dispersion of a converging optical system (including objective lens and other optical elements) when a wavelength of a light source varies (preferably, varies by −10 nm to +10 nm), and "b" represents the sum total of the axial chromatic aberrations caused by both refractive index dispersion of the converging optical system and a diffractive surface.

$$|a| > |b|$$

Further, it is preferable that the diffractive surface suppresses axial chromatic aberration caused by an objective lens when a wavelength of a light source varies. In particular, it is preferable that axial chromatic aberration is suppressed when a wavelength slightly varies by −10 nm to +10 nm. Further, when a wavelength of a light source varies, it is preferable that axial chromatic aberration caused by the diffractive surface and axial chromatic aberration caused by refractive index dispersion of a converging optical system offset each other for the most part (preferably, perfectly). Further, when the wavelength of a light source increases, it is preferable that the diffractive surface has wavelength characteristics which make the back focus to be short. Further, it is preferable that the diffractive surface corrects spherical aberration so that spherical aberration caused by refractive index dispersion of a converging optical system when a wavelength of a light source varies may be made to approach the spherical aberration of the converging optical system in the case of the standard wavelength. To be more concrete, it is preferable that undercorrected spherical aberration caused by the diffractive surface when a wavelength of a light source increases, corrects overcorrected spherical aberration caused by refractive index dispersion of the converging optical system. It is further preferable that spherical aberration caused by the diffractive surface when a wavelength of a light source varies and spherical aberration caused by the refractive index dispersion of a converging optical system offset each other for the most part (preferably, perfectly). When the wavelength of a light source increases, it is preferable that the diffractive surface has spherical aberration characteristics which make spherical aberration to be undercorrected. Further, it is preferable that the diffractive surface generates an amount of nth-ordered diffracted ray (n represents integers other than 0, ±1) to be greater than that of any other ordered diffracted ray.

Further, it is preferable that the axial chromatic aberration correcting element satisfies the following conditional expression.

$$P2 < P1 < P3$$

P1: the paraxial power of the axial chromatic aberration correcting element at the wavelength of light source, P2: the paraxial power of the axial chromatic aberration correcting element at the wavelength which is 10 nm shorter than the wavelength of the light source, P3: the paraxial power of the axial chromatic aberration correcting element at the wavelength which is 10 nm longer than the wavelength of the light source.

When the axial chromatic aberration correcting element has a diffractive surface, each of the paraxial powers P1, P2, P3 stated above are the total paraxial powers wherein paraxial refractive power and paraxial diffractive power are combined.

When the objective lens is composed of one lens, it is preferable that the following conditional expression is satisfied.

$$1.1 \leq d1/f \leq 3$$

d1: the axial lens thickness of the objective lens, f: the focal distance of the objective lens More preferably, $1.2 \leq d1/f \leq 2.3$, and further preferably, $1.4 \leq d1/f \leq 1.8$.

The condition mentioned above is especially appropriate in the objective lens of an optical pickup apparatus used for reproducing or recording of information for only optical information recording medium or media whose necessary numerical aperture is 0.65 or more.

Further, it is preferable that the objective lens is the plastic lens.

As the material of the optical element in the present invention, the following is listed as the preferable materials. Further, it is more preferable that the optical element, particularly the movable element comprised of the spherical aberration deviation correcting element, or the objective lens is made of the following materials. The material whose specific gravity is not larger than 2.0. The material whose saturated water absorption is not larger than 0.5%. The material, for the light of the wavelength of the light source, whose internal transmittance at the 3 mm thickness is not smaller than 85%. Plastics satisfying one or more of the above conditions.

Further, the optical pick-up apparatus of the present invention may be made so that it conducts the recording and/or reproducing of the information of only one kind of optical information recording medium, or it can also conduct the recording and/or reproducing of the information of more than 2 kinds of different optical information recording media.

For example, when the optical pick-up apparatus can conduct the recording and/or reproducing of the information of 2 kinds of optical information recording media, it is preferable that the optical pick-up apparatus has the first light source to emit the first light flux of the wavelength of λ1 to conduct the reproducing and/or recording of the first optical information recording medium, and the second light source to emit the second light flux of the wavelength of λ2 (λ1≠λ2) to conduct the reproducing and/or recording of the second optical information recording medium. The converging optical system converges at least a portion of the first light flux onto the information recording plane of the first optical information recording medium so that the information of the first optical information recording medium can be recorded and/or reproduced, and converges at least a portion of the second light flux onto the information recording plane of the second optical information recording medium so that the information of the second optical information recording medium can be recorded and/or reproduced.

In this connection, the different kind of optical information recording medium includes cases in which the recording density of the information is different, the necessary numerical aperture for recording and/or reproducing is different, the wavelength used for recording and/or reproducing of the information is different, the thickness of the transparent substrate is different, or the combination of these cases. As a preferable example, the combination in which λ1<λ2, and the recording density of information of the first optical information recording medium is higher than the density of the second information recording medium, and the transparent substrate thickness of the first optical information recording medium is thinner than the transparent substrate thickness of the second optical information recording medium, and the necessary numerical aperture for recording and/or reproducing information of the first optical information recording medium is larger than the necessary numerical aperture for recording and/or reproducing information of the second optical information recording medium, is listed.

Especially, when a thickness of the first transparent substrate of the first optical information recording medium is different from a thickness of second transparent substrate of the second optical information recording medium, the spherical aberration deviation correcting element may correct variation of spherical aberration caused by a difference between a thickness of the first transparent substrate and that of the second transparent substrate.

As the structure to record and/or reproduce 2 kinds of different optical information recording media by one optical pick-up apparatus, various modes can be applied.

As the first example, a mode in which the spherical aberration deviation correcting element having the movable element of the spherical aberration deviation correcting element is used, is listed. When the movable element of the spherical aberration deviation correcting element is moved in the optical axis direction, the slop angle of the marginal ray of the incident light flux into the objective lens is changed, and the deviation of the spherical aberration generated by the difference of the transparent substrate thickness of 2 kinds of optical information recording media is corrected, and the light flux is converged onto respective information recording planes so that the information can be recorded and/or reproduced.

The second example is a mode in which the diffractive surface is used. The diffractive surface is provided on the optical element in the converging optical system, and by using the difference of the position of the focus point of the diffracted light by difference of the wavelengths of 2 light sources, the spherical aberration caused by the difference of the transparent substrate thickness of 2 kinds of the optical information recording media is corrected, and the light fluxes are converged onto respective information recording planes so that the information can be recorded and/or reproduced. The diffractive surface may be provided on the coupling lens, or the objective lens, or may be provided also on the other optical elements.

The third example is a mode in which the optical element such as an objective lens having at least 3 divided surfaces formed concentric circularly around the optical axis is used. When the divided surface closest to the optical axis is the first divided surface, its outside divided surface is the second divided surface, and its outside surface is the third divided surface, the light flux passed through the first divided surface and the third divided surface is converged onto the information recording plane of the first optical information recording medium so that the information can be recorded and/or reproduced. On the one hand, the light flux passed through the first divided surface and the second divided surface is converged onto the information recording plane of the second optical information recording medium whose necessary predetermined numerical aperture is smaller than the first optical information recording medium, so that the information can be recorded and/or reproduced.

Incidentally, on the outside of the third divided surface, one or plural divided surfaces may be further provided.

The fourth example is an embodiment wherein an objective lens has, on its at least one surface, ring-shape stepped sections which divide an incident light flux through refraction effect into a ring-shaped light flux (in this case, $1^{st}$, $2^{nd}$, ... k-th light fluxes in the order from the optical axis side to its outside) in quantity of k (k≧3), spherical aberration component of wavefront aberration of the $1^{st}$ and k-th light fluxes in the position of the best image plane made by the $1^{st}$ and k-th light fluxes is 0.07 λ1 rms or less, at least two light fluxes among the $2^{nd}$ to (k−1)-th fluxes form a position of an apparent best image plane at the location different from the position of the best image plane made by the $1^{st}$ and k-th light fluxes, and at the position of the best image plane made by the $1^{st}$ and k-th light fluxes, wavefront aberration of light in each of $1^{st}$ to k-th light fluxes passing through the prescribed numerical aperture on the image side of the objective lens needed for recording and/or reproducing of information of the first optical information recording medium is almost miλ1 (mi is an integer and i=1, 2, ..., k).

Further, two or more of above four examples may be combined. In all of the above 4 examples, when the light flux of the first light source of the wavelength λ1 is converged onto the information recording plane of the first optical information recording medium, it is preferable that, within the predetermined numerical aperture for recording and/or reproducing information of the first optical information recording medium, the wave front aberration on the information recording plane is not larger than 0.07 λ1 rms, and more preferably, not larger than 0.05 λ1 rms. Further, when the light flux of the second light source of the wavelength λ2 is converged onto the information recording plane of the second optical information recording medium, it is preferable that, within the predetermined numerical aperture for recording and/or reproducing information of the second optical information recording medium, the wave front aberration on the information recording plane is not larger than 0.07 λ2 rms, and more preferably, not larger than 0.05 λ2 rms.

When predetermined numerical aperture NA1 for recording and/or reproducing information of the first optical information recording medium is greater than predetermined numerical aperture NA2 for recording and/or reproducing information of the second optical information recording medium, and when a light flux of the second light source having wavelength of λ2 is converged on an image recording plane of the second optical information recording medium, it is preferable that light fluxes within NA2 are converged so that wavefront aberration on the information recording plane is 0.07 λ2 rms or less, and light fluxes within NA1 are converged so that wavefront aberration on the information recording plane may be greater than 0.07 λ2 rms. It is more preferable to be not more than 0.05 λ2 rms within NA2 and to be not less than 0.2 λ2 rms within NA1.

Incidentally, when two kinds or more kinds of different optical information recording media are subjected to recording and/or reproducing by one optical pickup apparatus, and these optical information recording media include one whose necessary numerical aperture for recording and/or reproducing information is less than 0.65, and when an objective lens is composed of one lens, it is preferable that the following conditional expression is satisfied;

$$0.7 \leq d1/f \leq 2.4$$

wherein, d1 represents an axial lens thickness of the objective lens, and f represents a focal length of the objective lens at λ1.

It is preferable that the objective lens satisfying the conditional expression stated above has at least one aspheric surface.

Further, the optical information recording medium may have a plurality of information recording planes on the one side of optical information recording medium. For example, there may be listed the structure that a transparent substrate and a information recording layer are alternately piled in a plurality of stacked layers in the order from the same light flux incident side surface. In this case, the converging optical system can converge the light flux emitted from the light source onto respective information recording planes of the optical information recording medium so that the information of the optical information recording medium can be recorded and/or reproduced.

For the structure to record and/or reproduce information of the optical information recording medium having a plurality of information recording planes, various modes can be applied. For example, a mode in which the spherical aberration deviation correcting element having the movable element is used, is listed. When the movable element of the spherical aberration deviation correcting element is moved in the optical axis direction, the slope angle of the marginal ray of the incident light flux into the objective lens is changed, and the deviation of the spherical aberration generated by the position of each information recording plane is corrected, and the light flux is converged onto respective information recording plane so that the information can be recorded and/or reproduced.

Further, in the above description, when the light flux of the wavelength λ is converged onto each information recording plane of the optical information recording medium, it is preferable that, within a predetermined numerical aperture for recording and/or reproducing information of the optical information recording medium, the wave front aberration on the information recording plane is not larger than 0.07 λrms, and more preferably, not larger than 0.05 λrms.

Further, it is preferable that the optical pickup apparatus of the invention has a spherical aberration deviation detection means that detects deviation of spherical aberration caused in a converging optical system. Based on the results of the detection by this detection means, the deviation of spherical aberration can also be corrected by moving a movable element when the spherical aberration deviation detection means has the movable element, or by changing refractive index when the spherical aberration deviation correcting element has a means whose refractive index distribution in the direction perpendicular to an optical axis is variable.

Further, the optical information recording medium recording and/or reproducing apparatus of the present invention in order to record and/or reproduce the information of the optical information recording medium, has the optical pick-up apparatus, as described above, of the present invention. Preferably, it has a spindle motor or a power source.

The aspherical surface used in the present embodiment, is expressed by the following [Equation 1]. Where, X is the axis in the optical axis direction, h is the axis in the perpendicular direction to the optical axis, and the advancing direction of the light is positive, r is the paraxial radius of curvature, κ is a conical coefficient, and $A_{2i}$ is the aspherical surface coefficient.

$$X = \frac{h^2/r}{1+\sqrt{1-(1+\kappa)h^2/r^2}} + \sum_{i=2}^{\infty} A_{2i}h^{2i} \qquad [\text{Equation 1}]$$

The spherical surface used in the present embodiment is expressed by [Equation 2] as the optical path difference function.

$$\phi_b = \sum_{i=1}^{\infty} b_{2i}h^{2i} \qquad [\text{Equation 2}]$$

Referring to the drawings, the preferable embodiments of the present invention will be described below. FIG. 1 is an outline structural view of the optical pick-up apparatus according to the present embodiment. In FIG. 1, the first light source 11 to conduct the recording and/or reproducing for the first optical information recording medium 24, and the second light source whose wavelength is different from the first light source 11 to conduct the recording and/or reproducing for the second optical information recording medium 23 are provided, and coupling lenses 21 and 22 to convert the divergent angles of the divergent light fluxes emitted from respective light sources, a beam splitter 62 which is an optical path composition means for making the light fluxes emitted from respective light sources advance in almost the same direction, an objective lens 3 to light-converge the light flux from the beam splitter 62 onto the information recording plane 5 of the optical information recording medium, and light detectors 41 and 42 to light-receive the reflected light from the optical information recording medium, are provided. In the drawing, numeral 8 is a diaphragm, numeral 9 is a cylindrical lens, numerals 71 and 72 are ¼ wavelength plates, numeral 15 is a coupling lens to reduce the divergent angle of the divergent light flux from the light source 11, numeral 16 is a concave lens, and numeral 17 is a hologram to separate the reflected light flux.

Further, in the present embodiment, as a means for correcting the variation of the spherical aberration of the objective lens 3 and a divergent angle changing means, a negative lens 5 and a positive lens 4 which are arranged in order from the light source side and an actuator 7 are provided, (hereinafter, these are also called a spherical aberration correction means, and a divergent angle changing means). The actuator 7 functions as a transfer apparatus to change the slope angle of the marginal ray of the light flux by moving the negative lens 5 as an optical element in the optical axis direction. Further, relating to the present embodiment, in examples 1 to 14 showing a specific portion of the optical system, an example of so-called beam expander structured by the transferable negative lens 5 and the positive lens 4, is sometimes expressed as the spherical aberration correction means. In this connection, numeral 6 is an actuator to dive the objective lens 3 in the optical axis direction for focusing. It is defined that the first light source 11 can emit the laser light of wavelength $\lambda 1$=405 nm, and the second light source 12 can emit the laser light of wavelength $\lambda 2$=655 nm.

In the examples being described below, in examples 1, 2, 11, 12, the diffractive surface is provided on the objective lens 3 and the axial chromatic aberration is corrected, and in examples 3 to 5, a specific material is used for the negative lens 5 and the positive lens 4 and the axial chromatic aberration is corrected, and in examples 6 to 8, 13 and 14, the diffractive surface is provided on at least one of the negative lens 5 and the positive lens 4, and the axial chromatic aberration of the objective lens 3 is corrected, and in examples 9 and 10, the axial chromatic aberration of the objective lens 3 is corrected by the synergetic effect of the specific material of the negative lens 5 and the positive lens 4 and the diffractive surface provided on the positive lens 4. Further, examples 4, 5 and 12 are examples to conduct the recording or reproducing of the information by using the same optical system for the different optical information recording media. In this connection, in the following examples of the objective lens 3, it is formed by using the plastic material whose saturated water absorption is not larger than 0.01%, and whose internal transmittance by the light flux of the light source wavelength 400 nm is 90.5%, and whose permeability by the light flux of the light source wavelength 700 nm is 92%. Further, in the following example, in the example in which only the first light source 11 in the present embodiment shown in FIG. 1 is used, although a drawing of the specific embodiment is neglected, generally, in the pick-up apparatus of FIG. 1, for example, a mode in which the second light source 12, coupling lens 22, beam splitter 62, light detector 42, ¼ wavelength plate 72 and hologram 17 are removed, can be applied. Each of examples will be described below.

EXAMPLE 1

The data for the optical system composed of the negative lens 5, positive lens 4, and objective lens 3 in the example 1 is shown in Table 1. In this connection, in the data shown hereinafter, the powers of 10 (for example, $2.5 \times 10^{-3}$) is expressed by using E (for example, 2.5×E-3). Further, the first order light by the diffraction of the diffractive surface expressed by the rotation symmetry polynomial means the light in which an angle of the ray of light changes in the converging direction after the diffraction.

TABLE 1

Example 1
$\lambda 1$ 405 nm
NA 0.85

| | | r(mm) | d(mm) | $N_{\lambda 1}$ | vd |
|---|---|---|---|---|---|
| 1 | Spherical | −604.711 | 0.800 | 1.91409 | 23.8 |
| 2 | aberration | 7.532 | 1.000 | | |
| 3 | correction | 8.122 | 1.200 | 1.50717 | 81.6 |
| 4 | means | −11.199 | 1.000 | | |
| 5 (Diaphragm) | | ∞ | 0.000 | | |
| 6 (Aspheric surface 1, diffractive | Objective lens | 1.233 | 2.688 | 1.52524 | 56.5 |

TABLE 1-continued

Example 1
$\lambda 1$ 405 nm
NA 0.85

| | | | | | |
|---|---|---|---|---|---|
| surface 1) 7 (Aspheric surface 2) | | −0.931 | 0.334 | | |
| 8 | Transparent | ∞ | 0.100 | 1.51949 | 30.0 |
| 9 | substrate | ∞ | 0.000 | | |

Aspheric surface 1

| | |
|---|---|
| K | −6.8440E−01 |
| $A_4$ | 1.7085E−02 |
| $A_6$ | 2.4417E−03 |
| $A_8$ | 1.4011E−03 |
| $A_{10}$ | 3.9966E−04 |
| $A_{12}$ | −2.0375E−04 |
| $A_{14}$ | 1.8903E−05 |
| $A_{16}$ | 2.6231E−05 |
| $A_{18}$ | 2.3047E−05 |
| $A_{20}$ | −1.4976E−05 |

Aspheric surface 2

| | |
|---|---|
| K | −22.173426 |
| $A_4$ | 0.345477 |
| $A_6$ | −0.821245 |
| $A_8$ | 0.890651 |
| $A_{10}$ | −0.391613 |
| $A_{12}$ | −0.252257E−03 |
| $A_{14}$ | −0.109061E−09 |
| $A_{16}$ | −0.166822E−10 |
| $A_{18}$ | −0.250470E−11 |
| $A_{20}$ | −0.370377E−12 |

Diffractive surface 1

| | |
|---|---|
| $B_2$ | −7.0001E−03 |

Figure 2:
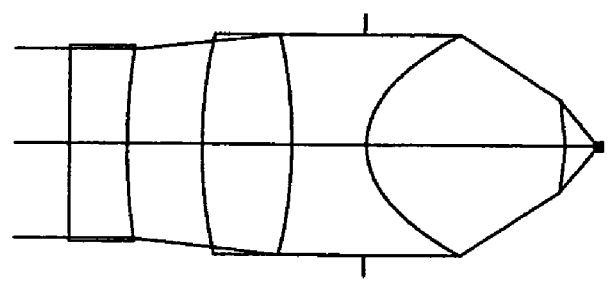
FIG. 2 is an optical system structural view of a negative lens 5, positive lens 4 and objective lens 3 according to the example 1.
Figure 3:
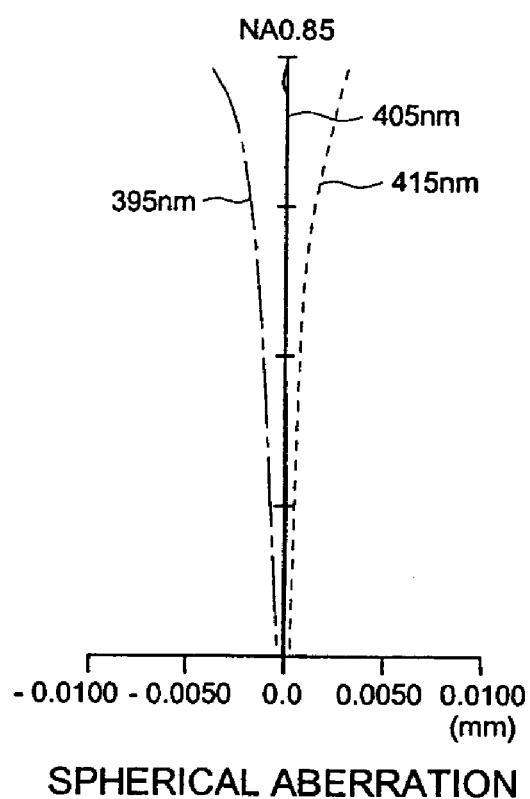
FIG. 3 is a spherical aberration view of the objective lens 3 according to the optical system of the example 1.

FIG. 2 is an optical system structural view of the negative lens 5, positive lens 4, and objective lens 3 according to the example 1. FIG. 3 is a spherical aberration view according to the objective lens 3. In the example 1, the information is recorded or reproduced by the combination of the first light source 11 of the wavelength 405 nm and the image side numerical aperture NA 0.85 of the objective lens 3. In the present example, as the material of the negative lens 5 and the positive lens 4 of the means for correcting the variation of the spherical aberration, the materials of vdN=23.8, vdP=81.6 are respectively selected, and further, by providing the diffractive surface on the surface of the light source side of the objective lens 3, the axial chromatic aberration generated in the objective lens 3 is corrected. Further, in the present example, fN=−8.13 (mm), fP=9.48 (mm), and f=1.765 (mm) and fD=71.483 (mm).

In the present example, the correction of the variation of the spherical aberration at the time of the minute variation of the oscillation wavelength of the light source (hereinafter, simply called also as the wavelength variation) or the temperature change, can be conducted as follows. In the case of the present example, when the wavelength becomes large, or the temperature rises, in the objective lens 3, the overcorrected spherical aberration is generated. In such the case, when the negative lens 5 is moved along the optical axis by the actuator 7, and the interval between the negative lens 5 and the positive lens 4 is reduced, the undercorrected spherical aberration can be generated. When the negative lens 5 is moved by an appropriate amount, the overcorrected spherical aberration can be cancelled, and as can clearly be seen from Table 2 showing the result of the spherical aberration, the spherical aberration of the whole optical system becomes fine.

TABLE 2

| | | Example 1 | |
|---|---|---|---|
| Image height characteristic WFE rms | | Y = 0 μm | 0.004λ (1.00 mm) |
| | | Y = 10 μm | 0.011λ |
| Wavelength characteristic WFE rms | +10 nm | Y = 0 μm | 0.005λ (0.75 mm) |
| | | Δf$_B$ (μm) | +0.47 |
| | −10 nm | Y = 0 μm | 0.011λ (1.27 mm) |
| | | Δf$_B$ (μm) | −0.64 |
| Temperature characteristic WFE rms | +30° C. | Y = 0 μm | 0.008λ (0.80 mm) |
| | −30° C. | | 0.024λ (1.22 mm) |

Note)
The figure in the parentheses in the Table expresses the interval between the negative lens and the positive lens of the spherical aberration correction means, and the divergent angle changing means.

EXAMPLE 2

The data relating to the optical system composed of the negative lens 5, positive lens 4 and objective lens 3 in the example 2 is shown in Table 3.

TABLE 3

| | | Example 2 λ1 405 nm NA 0.85 | | | |
|---|---|---|---|---|---|
| | | r(mm) | d(mm) | N$_{λ1}$ | νd |
| 1 | Spherical | −6.551 | 0.800 | 1.61949 | 30.0 |
| 2 | aberration | 5.582 | 1.000 | | |
| 3 | correction | 8.542 | 1.200 | 1.52524 | 56.5 |
| 4 | means | −5.364 | 1.000 | | |
| 5 (Diaphragm) | | ∞ | 0.000 | | |
| 6 (Aspheric surface 1, diffractive surface 1) | Objective lens | 1.233 | 2.688 | 1.52524 | 56.5 |
| 7 (Aspheric surface 2) | | −0.931 | 0.334 | | |
| 8 | Transparent | ∞ | 0.100 | 1.61949 | 30.0 |
| 9 | substrate | ∞ | 0.000 | | |

| Aspheric surface 1 | |
|---|---|
| K | −6.8440E−01 |
| A$_4$ | 1.7085E−02 |
| A$_6$ | 2.4417E−03 |
| A$_8$ | 1.4011E−03 |
| A$_{10}$ | 3.9966E−04 |
| A$_{12}$ | −2.0375E−04 |
| A$_{14}$ | 1.8903E−05 |
| A$_{16}$ | 2.6231E−05 |
| A$_{18}$ | 2.3047E−05 |
| A$_{20}$ | −1.4976E−05 |
| Aspheric surface 2 | |
| K | −22.173426 |
| A$_4$ | 0.345477 |
| A$_6$ | −0.821245 |
| A$_8$ | 0.890651 |
| A$_{10}$ | −0.391613 |
| A$_{12}$ | −0.252257E−03 |
| A$_{14}$ | −0.109061E−09 |
| A$_{16}$ | −0.166822E−10 |
| A$_{18}$ | −0.250470E−11 |
| A$_{20}$ | −0.370377E−12 |
| Diffractive surface 1 | |
| B2 | −7.0001E−03 |

Figure 4:
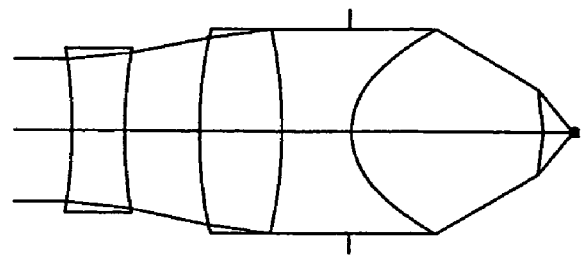
FIG. 4 is an optical system structural view of the negative lens 5, positive lens 4 and objective lens 3 according to the example 2.
Figure 5:
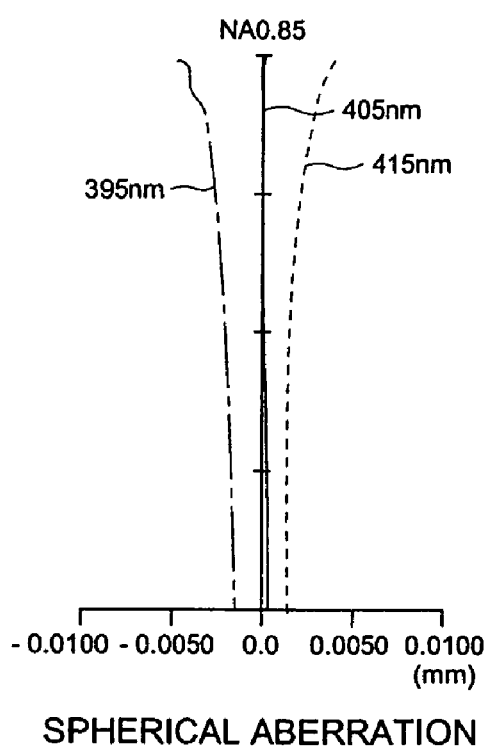
FIG. 5 is a spherical aberration view of the objective lens 3 according to the optical system of the example 2.

FIG. 4 is an optical system structural view of the negative lens 5, positive lens 4, and objective lens 3 according to the example 2. FIG. 5 is a spherical aberration view according to the objective lens 3. In the example 2, the information is recorded or reproduced by the combination of the first light source 11 of the wavelength 405 nm and the image side numerical aperture NA 0.85 of the objective lens 3. In the example 2, as the material of the negative lens 5 and the positive lens 4 of the means for correcting the variation of the spherical aberration, the materials of vdN=30.0, vdP=56.5 are respectively selected, and further, by providing the diffractive surface on the surface of the light source side of the objective lens 3, the axial chromatic aberration generated in the objective lens 3 is corrected. Further, in the present example, fN=−4.75 (mm), fP=6.47 (mm), and f=1.765 (mm) and fD=71.483 (mm).

Because the correction of the variation of the spherical aberration at the time of the wavelength variation or temperature change in the present example is the same as in the example 1, the explanation is neglected. As can clearly be seen from Table 4 showing the correction result of the spherical aberration, the spherical aberration at the time of the wavelength variation or temperature change becomes fine. Further, as the objective lens 3 and the means for correcting the variation of the spherical aberration, when the plastic material is used for the negative lens 5 and the positive lens 4, the weight reduction of the optical system and the reduction of the burden onto the movable mechanism are attained.

TABLE 4

| | | Example 2 | |
|---|---|---|---|
| Image height characteristic WFE rms | | Y = 0 μm | 0.005λ (1.00 mm) |
| | | Y = 10 μm | 0.009λ |
| Wavelength characteristic WFE rms | +10 nm | Y = 0 μm | 0.005λ (0.91 mm) |
| | | Δf$_B$ (μm) | +1.30 |
| | −10 nm | Y = 0 μm | 0.009λ (1.10 mm) |
| | | Δf$_B$ (μm) | −1.60 |
| Temperature characteristic WFE rms | +30° C. | Y = 0 μm | 0.007λ (0.88 mm) |
| | −30° C. | | 0.017λ (1.13 mm) |

Note)
The figure in the parentheses in the Table expresses the interval between the negative lens and the positive lens of the spherical aberration correction means, and the divergent angle changing means.

EXAMPLE 3

The data relating to the optical system composed of the negative lens 5, positive lens 4 and objective lens 3 in the example 3 is shown in Table 5.

TABLE 5

| | | Example 3 λ1 405 nm NA 0.85 | | | |
|---|---|---|---|---|---|
| | | r(mm) | d(mm) | N$_{λ1}$ | νd |
| 1 | Spherical | −20.486 | 0.800 | 1.91409 | 23.8 |
| 2 | aberration | 14.729 | 1.000 | | |
| 3 | correction | 26.278 | 1.200 | 1.50717 | 81.6 |
| 4 | means | −7.040 | 1.000 | | |
| 5 (Diaphragm) | | ∞ | 0.000 | | |
| 6 (Aspheric surface 1) | Objective lens | 1.225 | 2.845 | 1.52524 | 56.5 |
| 7 (Aspheric surface 2) | | −0.763 | 0.292 | | |
| 8 | Transparent | ∞ | 0.100 | 1.61949 | 30.0 |
| 9 | substrate | ∞ | 0.000 | | |

TABLE 5-continued

Example 3
λ1 405 nm
NA 0.85

Aspheric surface 1

| | |
|---|---|
| K | −0.699712 |
| $A_4$ | 0.166009E−01 |
| $A_6$ | 0.209051E−02 |
| $A_8$ | 0.157932E−02 |
| $A_{10}$ | 0.212509E−03 |
| $A_{12}$ | −0.344184E−03 |
| $A_{14}$ | 0.119417E−04 |
| $A_{16}$ | 0.577745E−04 |
| $A_{18}$ | 0.409189E−04 |
| $A_{20}$ | −0.257292E−04 |

Aspheric surface 2

| | |
|---|---|
| K | −20.033672 |
| $A_4$ | 0.331327 |
| $A_6$ | −0.881378 |
| $A_8$ | 0.965015 |
| $A_{10}$ | −0.412771 |
| $A_{12}$ | −0.252257E−03 |
| $A_{14}$ | −0.110756E−09 |
| $A_{16}$ | −0.168921E−10 |
| $A_{18}$ | −0.253030E−11 |
| $A_{20}$ | −0.370376E−12 |

Figure 6:
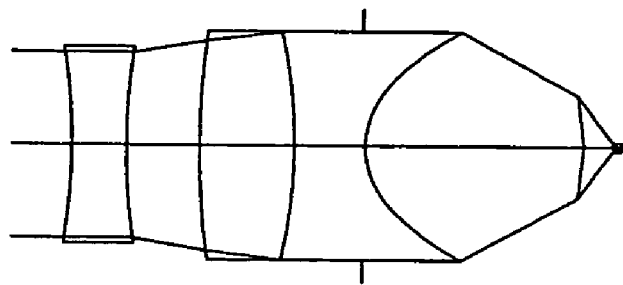
FIG. 6 is an optical system structural view of the negative lens 5, positive lens 4 and objective lens 3 according to the example 3.
Figure 7:
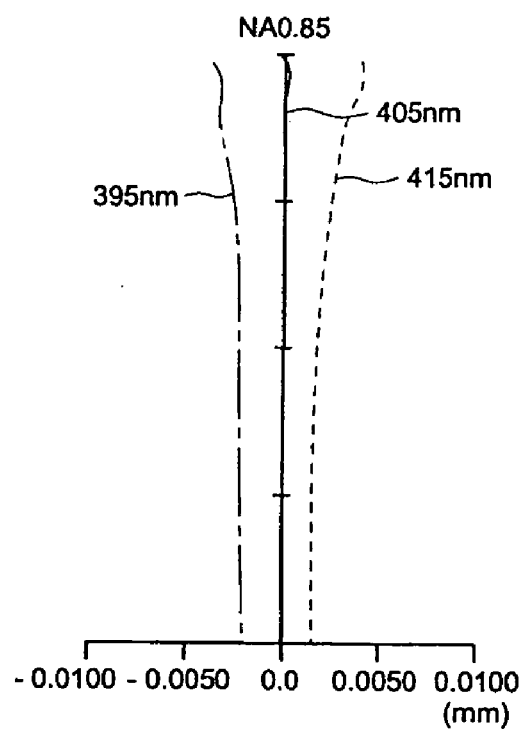
FIG. 7 is a spherical aberration view of the objective lens 3 according to the optical system of the example 3.

FIG. 6 is an optical system structural view of the negative lens 5, positive lens 4, and objective lens 3 according to the example 3. FIG. 7 is a spherical aberration view according to the objective lens 3. In the example 3, the information is recorded or reproduced by the combination of the first light source 11 of the wavelength 405 nm and the image side numerical aperture NA 0.85 of the objective lens 3. In the example 3, as the material of the negative lens 5 and the positive lens 4, by respectively selecting the materials of vdN=23.8 and vdP=81.6, the axial chromatic aberration is corrected. Further, in the present example, fN=−9.27 (mm), fP=11.08 (mm), and f=1.765 (mm).

Because the correction of the variation of the spherical aberration at the time of the wavelength variation or temperature change in the present example is the same as in the example 1, the explanation is neglected. As can clearly be seen from Table 6 showing the correction result of the spherical aberration, the spherical aberration at the time of the wavelength variation or temperature change becomes fine. Further, when the plastic material is used for the objective lens 3, the weight reduction of the optical system and the reduction of the burden onto the movable mechanism are attained.

TABLE 6

Example 3

| | | | |
|---|---|---|---|
| Image height characteristic WFE rms | | Y = 0 μm | 0.010λ (1.00 mm) |
| | | Y = 10 μm | 0.011λ |
| Wavelength characteristic WFE rms | +10 nm | Y = 0 μm | 0.025λ (0.87 mm) |
| | | $Δf_B$ (μm) | +1.81 |
| | −10 nm | Y = 0 μm | 0.021λ (1.21 mm) |
| | | $Δf_B$ (μm) | −2.03 |
| Temperature characteristic WFE rms | +30° C. | Y = 0 μm | 0.028λ (0.70 mm) |
| | −30° C. | | 0.024λ (1.28 mm) |

Note)
The figure in the parentheses in the Table expresses the interval between the negative lens and the positive lens of the spherical aberration correction means, and the divergent angle changing means.

EXAMPLE 4

The data relating to the optical system composed of the negative lens 5, positive lens 4 and objective lens 3 in the example 4 is shown in Table 7.

TABLE 7

Example 4
λ1 405 nm
λ2 655 nm
NA1 0.85
NA2 0.65

| | | r(mm) | d(mm) | $N_{λ1}$ | vd |
|---|---|---|---|---|---|
| 1 (Aspheric surface 1) | Divergent angle | −4.511 | 0.800 | 1.5949 | 30.0 |
| 2 (Aspheric surface 2) | changing means | 5.332 | (Variable interval 1) | | |
| 3 (Aspheric surface 3) | | 8.748 | 1.200 | 1.52524 | 56.5 |
| 4 (Aspheric surface 4) | | −5.817 | 1.700 | | |
| 5 (Diaphragm) | | ∞ | 0.700 | | |
| 7 (Aspheric surface 5, diffractive surface 1) | Objective lens | 1.180 | 2.518 | 1.52524 | 56.5 |
| 8 (Aspheric surface 5) | | −1.146 | (Variable interval 2) | | |
| 9 | Transparent substrate | ∞ | (Variable interval 3) | 1.61949 | 30.0 |
| 10 | | ∞ | | | |

| | λ1 | λ2 |
|---|---|---|
| Variable interval 1 | 2.271 | 0.602 |
| Variable interval 2 | 0.405 | 0.261 |
| Variable interval 3 | 0.100 | 0.600 |

Aspheric surface 1

| | |
|---|---|
| K | −1.82245E+00 |
| $A_4$ | 1.91843E−03 |
| $A_6$ | 1.53453E−03 |
| $A_8$ | −3.74714E−03 |
| $A_{10}$ | −3.98906E−05 |
| $A_{12}$ | −4.92552E−13 |

Aspheric surface 2

| | |
|---|---|
| K | −3.59130E−01 |
| $A_4$ | −3.68216E−04 |
| $A_6$ | 3.35772E−04 |
| $A_8$ | −1.59195E−03 |
| $A_{10}$ | −7.62648E−04 |
| $A_{12}$ | −4.15896E−10 |

Aspheric surface 3

| | |
|---|---|
| K | −4.37805E+00 |
| $A_4$ | −7.92779E−04 |
| $A_6$ | 1.00408E−03 |
| $A_8$ | 2.25086E−04 |
| $A_{10}$ | −1.35761E−04 |
| $A_{12}$ | −5.87062E−08 |
| $A_{14}$ | −4.46993E−05 |
| $A_{16}$ | −1.66320E−06 |
| $A_{18}$ | −9.66153E−07 |
| $A_{20}$ | 1.05818E−06 |

Aspheric surface 4

| | |
|---|---|
| K | −1.59857E−01 |
| $A_4$ | 7.04289E−05 |
| $A_6$ | 2.47603E−04 |
| $A_8$ | 3.22371E−04 |
| $A_{10}$ | 6.12332E−05 |
| $A_{12}$ | −5.31635E−05 |

TABLE 7-continued

Example 4
λ1 405 nm
λ2 655 nm
NA1 0.85
NA2 0.65

| | |
|---|---|
| $A_{14}$ | −3.38725E−05 |
| $A_{16}$ | 1.91316E−06 |
| $A_{18}$ | −2.94735E−08 |
| $A_{20}$ | 6.23600E−07 |
| Aspheric surface 5 | |
| K | −7.83080E−01 |
| $A_4$ | 2.01730E−02 |
| $A_6$ | −1.84080E−03 |
| $A_8$ | 7.06210E−03 |
| $A_{10}$ | −6.87170E−04 |
| $A_{12}$ | −9.64340E−04 |
| $A_{14}$ | 6.64990E−05 |
| $A_{16}$ | 2.60470E−04 |
| $A_{18}$ | 4.70690E−05 |
| $A_{20}$ | −4.45290E−05 |
| Aspheric surface 6 | |
| K | −2.03154E+01 |
| $A_4$ | 2.67833E−01 |
| $A_6$ | −4.80343E−01 |
| $A_8$ | 3.68667E−01 |
| $A_{10}$ | −1.19103E−01 |
| $A_{12}$ | 4.67297E−03 |
| $A_{14}$ | 9.98218E−10 |
| $A_{16}$ | 1.22952E−10 |
| $A_{18}$ | 1.57221E−11 |
| $A_{20}$ | 1.92406E−12 |
| Diffractive surface 1 | |
| $b_2$ | −1.00000E−06 |
| $b_4$ | −2.33560E−03 |
| $b_6$ | −7.29050E−04 |
| $b_8$ | 9.81200E−04 |
| $b_{10}$ | 5.06860E−05 |
| $b_{12}$ | 1.88310E−04 |
| $b_{14}$ | −1.02330E−04 |
| $b_{16}$ | 5.97500E−05 |
| $b_{18}$ | 2.65550E−05 |
| $b_{20}$ | −1.09350E−05 |

Figure 8:
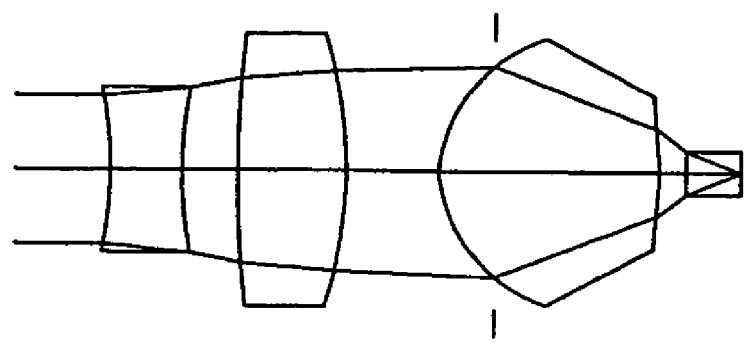
FIG. 8 is an optical system structural view of the negative lens 5, positive lens 4 and objective lens 3 according to the example 4.
Figure 9:
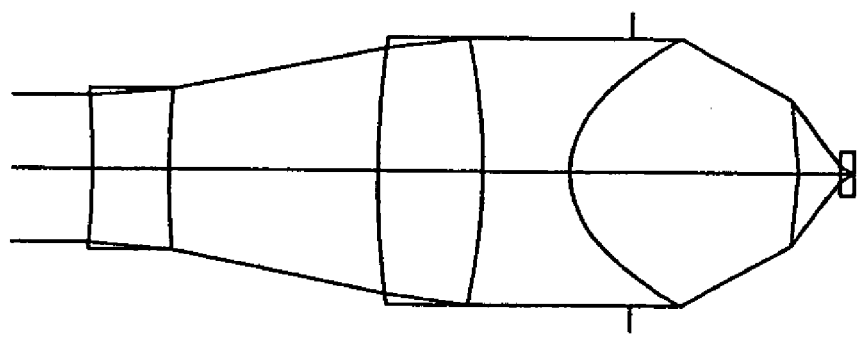
FIG. 9 is an optical system structural view of the negative lens 5, positive lens 4 and objective lens 3 according to the example 4.
Figure 10:
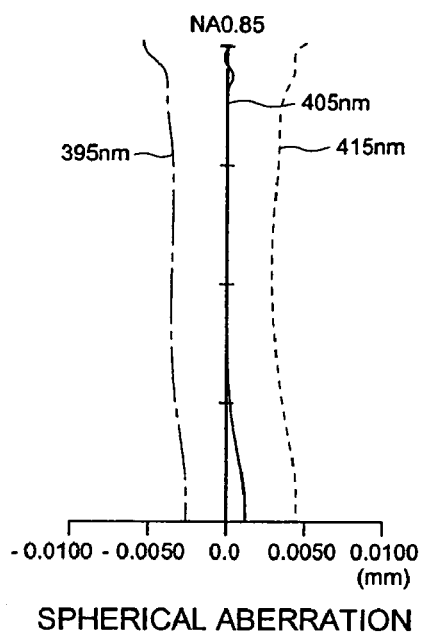
FIG. 10 a spherical aberration view of the objective lens 3 according to the optical system of the example 4.
Figure 11:
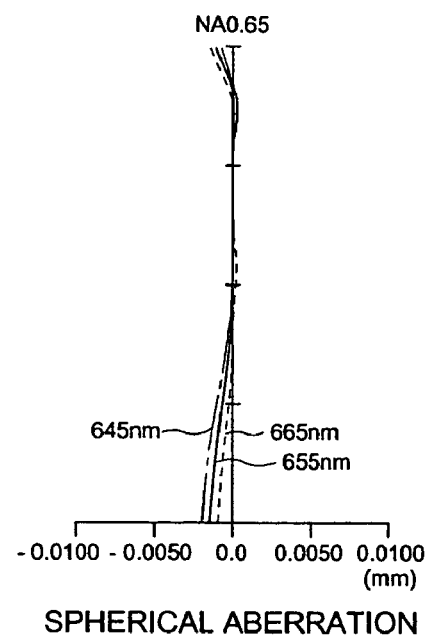
FIG. 11 is a spherical aberration view of the objective lens 3 according to the optical system of the example 4.

FIGS. 8 and 9 are optical system structural views of the negative lens 5, positive lens 4, and objective lens 3 according to the example 4. FIGS. 10 and 11 are spherical aberration views according to the objective lens 3 when the information is recorded or reproduced respectively for the different optical information recording media. The example 4 is an example of the optical pick-up apparatus by which the information is recorded or reproduced by the combination of the first light source 11 of the wavelength 405 nm and the optical information recording medium whose transparent substrate thickness is 0.6 mm, or by the combination of the second light source 11 of the wavelength 655 nm and the optical information recording medium whose transparent substrate thickness is 0.6 mm, by using the same optical system. In the example 4, as the material of the negative lens 5 and the positive lens 4, by respectively selecting the materials of vdN=30.0 and vdP=56.5, the axial chromatic aberration is corrected. Further, in the present example, fN=−3.82 (mm), fP=6.85 (mm), and f1=1.765 (mm) and fD1=5000000.02 (mm). In this connection, the focal length of the objective lens at the oscillation wavelength λ2=655 nm is f2=1.804.

In the example 4, the variation of the spherical aberration generated due to the difference of the transparent substrate thickness in more than two kinds of optical information recording media, is corrected by changing the interval of the divergent angle changing means (corresponds to a means for correcting the variation of the spherical aberration of the present invention, or a means for correcting the variation of the spherical aberration and the axial chromatic aberration) composed of one negative lens 5 and one positive lens 4 in the order from the light source side. Further, by providing the diffractive surface on the surface on the light source side of the objective lens 3, the spherical aberration is more finely corrected. Further, the spherical aberration deviation of converging optical system at the time of the wavelength variation of the light source or the temperature change is also finely corrected by changing the interval of the divergent angle changing means. That is, as can clearly be seen from Table 8, by changing the interval between the negative lens 5 and the positive lens 4 to an appropriate interval, the spherical aberration deterioration of the objective lens 3 at the time of the substrate thickness change, or at the time of the wavelength variation and temperature change, is finely corrected. Further, when the plastic material is used for the objective lens 3, negative lens 5 and positive lens 4, the weight reduction of the optical system and the reduction of the burden onto the movable mechanism are attained.

TABLE 8

Example 4

| | | | 405 nm<br>NA 0.85 | 655 nm<br>NA 0.65 |
|---|---|---|---|---|
| Image height | | Y = 0 μm | 0.008λ (2.27 mm) | 0.008λ (0.60 mm) |
| characteristic WFE rms | | Y = 10 μm | 0.025λ | 0.030λ |
| Wavelength | +10 nm | Y = 0 μm | 0.019λ (2.24 mm) | 0.005λ (0.62 mm) |
| characteristic WFE rms | | $\Delta f_B$ (μm) | +3.57 | +0.47 |
| | −10 nm | Y = 0 μm | 0.021λ (2.31 mm) | 0.01λ (0.59 mm) |
| | | $\Delta f_B$ (μm) | +3.57 | +0.47 |
| Temperature | +30° C. | Y = 0 μm | 0.028λ (2.15 mm) | 0.018λ (0.63 mm) |
| Characteristic WFE rms | −30° C. | | 0.028λ (2.44 mm) | 0.006λ (0.58 mm) |

Note)
The figure in the parentheses in the Table expresses the interval between the negative lens and the positive lens of the spherical aberration correction means, and the divergent angle changing means.

EXAMPLE 5

The data relating to the optical system composed of the negative lens 5, positive lens 4 and objective lens 3 in the example 5 is shown in Table 9.

TABLE 9

Example 5
λ1 405 nm
λ2 655 nm
NA1 0.85
NA2 0.65

|   |   | r(mm) | d(mm) | $N_{\lambda 1}$ | vd |
|---|---|---|---|---|---|
| 1 (Aspheric surface 1) | Divergent angle changing means | −8.096 | 1.000 | 1.61949 | 30.0 |
| 2 (Aspheric surface 2) | | 8.634 | (Variable interval 1) | | |
| 3 (Aspheric surface 3) | | 11.647 | 1.500 | 1.52524 | 56.5 |
| 4 (Aspheric surface 4) | | −8.791 | 1.800 | | |
| 5 (Diaphragm) | | ∞ | −0.800 | | |
| 7 (Aspheric surface 5, diffractive surface 1) | Objective lens | 1.979 | 4.322 | 1.52524 | 56.5 |
| 8 (Aspheric surface 5) | | −1.853 | (Variable interval 2) | | |
| 9 | Transparent substrate | ∞ | (Variable interval 3) | 1.61949 | 30.0 |
| 10 | | ∞ | | | |

|   | λ1 | λ2 |
|---|---|---|
| Variable interval 1 | 2.367 | 1.520 |
| Variable interval 2 | 0.684 | 0.503 |
| Variable interval 3 | 0.100 | 0.600 |

Aspheric surface 1

| K | −8.49544E−01 |
|---|---|
| $A_4$ | 2.60023E−04 |
| $A_6$ | −1.81862E−05 |
| $A_8$ | −5.43678E−05 |
| $A_{10}$ | −4.51719E−06 |
| $A_{12}$ | −4.84352E−07 |

Aspheric surface 2

| K | −1.51200E+00 |
|---|---|
| $A_4$ | −2.95477E−04 |
| $A_6$ | −6.00121E−05 |
| $A_8$ | −9.38876E−07 |
| $A_{10}$ | −9.20091E−06 |
| $A_{12}$ | −4.37732E−07 |

Aspheric surface 3

| K | −1.41587E+00 |
|---|---|
| $A_4$ | −1.44673E−04 |
| $A_6$ | −9.36888E−06 |
| $A_8$ | 6.82686E−07 |
| $A_{10}$ | 1.03613E−07 |
| $A_{12}$ | 1.93933E−09 |
| $A_{14}$ | −5.32563E−09 |

Aspheric surface 4

| K | −6.16512E−01 |
|---|---|
| $A_4$ | 1.03046E−04 |
| $A_6$ | 2.00275E−06 |
| $A_8$ | −8.66334E−07 |
| $A_{10}$ | 1.56881E−07 |

TABLE 9-continued

Example 5
λ1 405 nm
λ2 655 nm
NA1 0.85
NA2 0.65

| $A_{12}$ | −1.06594E−08 |
|---|---|
| $A_{14}$ | 1.06582E−09 |

Aspheric surface 5

| K | −7.77500E−01 |
|---|---|
| $A_4$ | 4.52960E−03 |
| $A_6$ | −1.03310E−04 |
| $A_8$ | 1.54300E−04 |
| $A_{10}$ | −7.93870E−06 |
| $A_{12}$ | −2.71240E−06 |
| $A_{14}$ | −3.51620E−09 |
| $A_{16}$ | 9.02610E−08 |
| $A_{18}$ | 6.04590E−09 |
| $A_{20}$ | −1.79290E−09 |

Aspheric surface 6

| K | −2.31402E+01 |
|---|---|
| $A_4$ | 5.47424E−02 |
| $A_6$ | −3.25565E−02 |
| $A_8$ | 8.11386E−03 |
| $A_{10}$ | −8.45883E−04 |
| $A_{12}$ | 6.59378E−05 |
| $A_{14}$ | −1.21099E−06 |
| $A_{16}$ | −2.46113E−06 |
| $A_{18}$ | −1.12315E−06 |
| $A_{20}$ | 9.53156E−11 |

Diffractive surface 1

| $b_2$ | −5.88260E−07 |
|---|---|
| $b_4$ | −2.47940E−04 |
| $b_6$ | −8.68800E−05 |
| $b_8$ | 1.67950E−05 |
| $b_{10}$ | −4.00170E−07 |
| $b_{12}$ | −5.69670E−07 |
| $b_{14}$ | −9.95240E−08 |
| $b_{16}$ | 2.40370E−08 |
| $b_{18}$ | 3.46480E−09 |
| $b_{20}$ | −5.18490E−10 |

Figure 12:
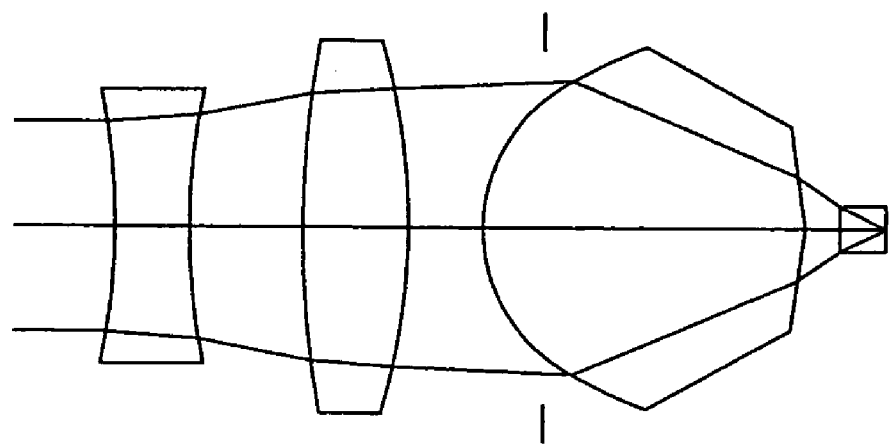
FIG. 12 is an optical system structural view of the negative lens 5, positive lens 4 and objective lens 3 according to the example 5.
Figure 13:
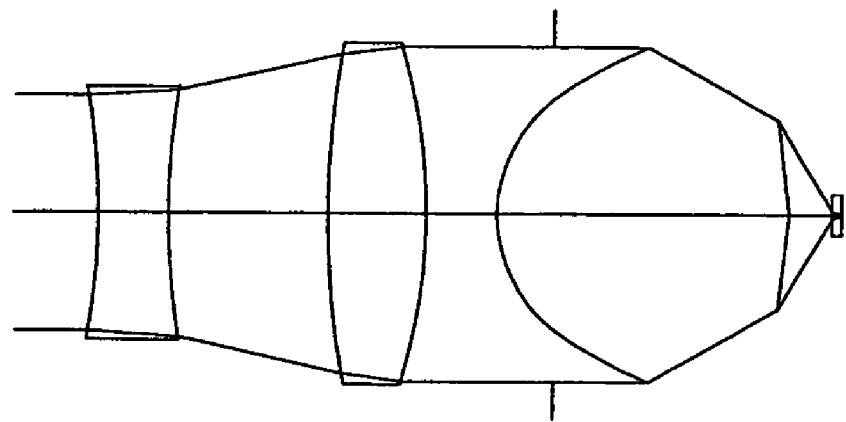
FIG. 13 is an optical system structural view of the negative lens 5, positive lens 4 and objective lens 3 according to the example 5.
Figure 14:
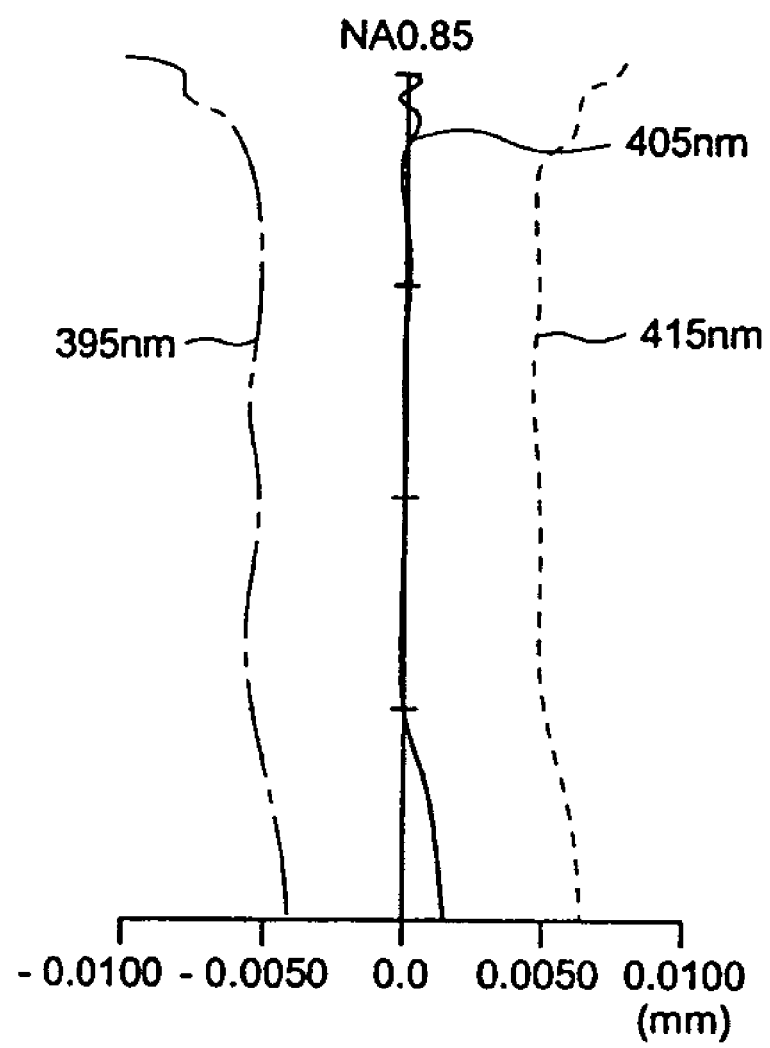
FIG. 14 is a spherical aberration view of the objective lens 3 according to the optical system of the example 5.
Figure 15:
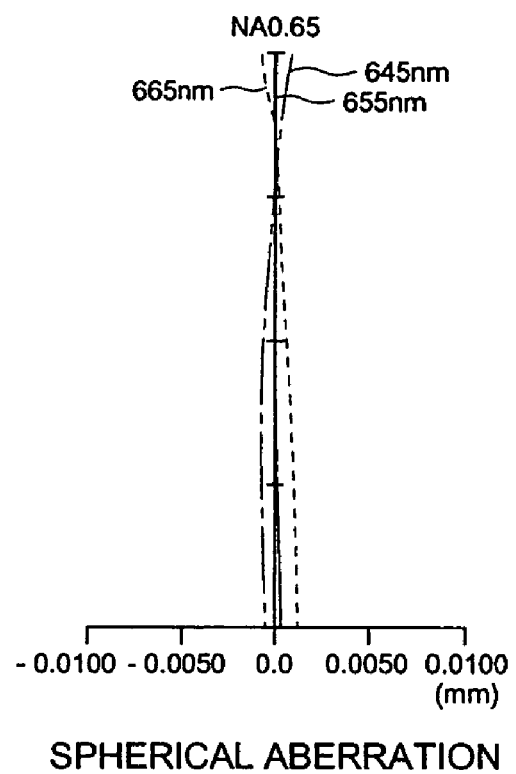
FIG. 15 is a spherical aberration view of the objective lens 3 according to the optical system of the example 5.

FIGS. 12 and 13 are optical system structural views of the negative lens 5, positive lens 4, and objective lens 3 according to the example 5. FIGS. 14 and 15 are spherical aberration views according to the objective lens 3 when the information is recorded or reproduced respectively for the different optical information recording media. The example 5 is an example of the optical pick-up apparatus by which the information is recorded or reproduced by the combination of the first light source 11 of the wavelength 405 nm and the optical information recording medium whose transparent substrate thickness is 0.6 mm, or by the combination of the second light source 11 of the wavelength 655 nm and the optical information recording medium whose transparent substrate thickness is 0.6 mm, by using the same optical system. In the example 5, as the material of the negative lens 5 and the positive lens 4, by respectively selecting the materials of vdN=30.0 and vdP=56.5, the axial chromatic aberration is corrected. Further, in the present example, fN=−6.59 (mm), fP=9.85 (mm), and f1=3.011 (mm) and fD1=849964.33 (mm). In this connection, the focal length of the objective lens at the oscillation wavelength λ2=655 nm is f2=3.076.

In the same manner as in the example 4, as can clearly be seen from Table 10, by changing the interval between the negative lens 5 and the positive lens 4 to an appropriate interval, the spherical aberration deviation of converging optical system at the time of the substrate thickness change, or at the time of the wavelength variation and temperature change, is finely corrected. Further, when the plastic material is used for the objective lens 3, negative lens 5 and positive lens 4, the weight reduction of the optical system and the reduction of the burden onto the movable mechanism are attained.

TABLE 10

Example 5

|  |  | 405 nm<br>NA 0.85 | 655 nm<br>NA 0.65 |
|---|---|---|---|
| Image height characteristic WFE rms |  | Y = 0 μm<br>Y = 10 μm | 0.008λ (2.36 mm)<br>0.021λ | 0.001λ (1.52 mm)<br>0.019λ |
| Wavelength characteristic WFE rms | +10 nm | Y = 0 μm<br>$\Delta f_B$ (μm) | 0.044λ (2.35 mm)<br>+4.90 | 0.002λ (1.57 mm)<br>+0.82 |
|  | −10 nm | Y = 0 μm<br>$\Delta f_B$ (μm) | 0.045λ (2.39 mm)<br>−5.47 | 0.002λ (1.47 mm)<br>−0.86 |
| Temperature characteristic WFE rms | +30° C.<br>−30° C. | Y = 0 μm | 0.061λ (2.22 mm)<br>0.081λ (2.55 mm) | 0.006λ (1.57 mm)<br>0.004λ (1.45 mm) |

Note)
The figure in the parentheses in the Table expresses the interval between the negative lens and the positive lens of the spherical aberration correction means, and the divergent angle changing means.

In this connection, even when the light flux incident to the negative lens 5 of the means for correcting the variation of the spherical aberration is not only the parallel light, but also the divergent light or convergent light, the optical system of the present invention can also be applied in the same manner. Further, although not shown in the drawing in the present example, a coupling lens to change the divergent angle of the light flux from the light source can be provided between the light source and the spherical aberration correction means. When the diffractive surface is added to such the coupling lens and the diffractive structure has characteristic in which the back focus becomes short on the long wavelength side, the axial chromatic aberration generated in the objective lens can be corrected.

The coupling lens used for the optical system according to the present invention is not limited to the above modes, but when it is a coupling lens as described in Japanese No. 2000-060843 by the present applicant, the axial chromatic aberration generated in the objective lens 3 can be more finely corrected.

Further, when a beam shaping element by which the astigmatic difference of the light flux from the light source is relieved, and the almost circular light flux can be incident to the spherical aberration correction means, is provided between the coupling lens and the means for correcting the variation of the spherical aberration (negative lens 5, positive lens 4), the divergent angle of the light flux from the coupling lens is changed by the focal point movement due to the temperature or humidity change, and the astigmatism is generated by the beam shaping element. In order to suppress this, when the coupling lens as disclosed in Japanese No. 2000-053858 is used, the generation of the astigmatism by the beam shaping element can be suppressed.

In this connection, in the examples 4 and 5, the spherical aberration views for the optical information recording medium in the light source wavelength 655 nm, and the transparent substrate thickness 0.6 mm, are shown up to NA 0.65. However, in this case, the light flux passing though all of the diaphragms determined by the light source wavelength 405 nm, NA 0.85 is incident to the objective lens 3. The light flux more than NA 0.65 which does not contribute to the image formation, is made a flare component by using the effect of the diffractive surface provided on the objective lens 3, thereby, the spot diameter is not excessively squeezed on the optical information recording plane, and the detection of the unnecessary signal on the light receiving element of the optical pick-up apparatus can be prevented.

EXAMPLE 6

The data relating to the optical system composed of the negative lens 5, positive lens 4 and objective lens 3 in the example 6 is shown in Table 11.

TABLE 11

Example 6
λ1 405 nm
NA 0.85

|  |  | r(mm) | d(mm) | $N_{\lambda 1}$ | vd |
|---|---|---|---|---|---|
| 1 (Aspheric surface 1) | Spherical aberration | −5.556 | 0.800 | 1.52524 | 56.5 |
| 2 (Aspheric surface 2) | correction means | 5.279 | 1.000 |  |  |
| 3 (Aspheric surface 3) |  | 12.098 | 1.200 | 1.52524 | 56.5 |
| 4 (Aspheric surface 4, diffractive surface 1) |  | −6.085 | 1.000 |  |  |
| 5 (Diaphragm) |  | ∞ | −0.000 |  |  |
| 6 (Aspheric surface 5) | Objective lens | 1.225 | 2.845 | 1.52524 | 56.5 |
| 7 (Aspheric surface 6) |  | −0.763 | 0.292 |  |  |
| 8 | Transparent | ∞ | 0.100 | 1.61949 | 30.0 |
| 9 | substrate | ∞ | 0.000 |  |  |

| Aspheric surface 1 |  |
|---|---|
| K | −5.72580E−02 |
| $A_4$ | −1.45908E−03 |
| $A_6$ | 6.52770E−03 |
| $A_8$ | −2.53887E−03 |
| $A_{10}$ | −3.22205E−03 |
| Aspheric surface 2 |  |
| K | 4.07593E+00 |
| $A_4$ | 3.63395E−03 |
| $A_6$ | −2.26920E−03 |
| $A_8$ | −2.83908E−03 |
| $A_{10}$ | −3.04265E−04 |
| Aspheric surface 3 |  |
| K | 5.32508E+00 |
| $A_4$ | 1.06266E−04 |

TABLE 11-continued

Example 6
λ1 405 nm
NA 0.85

| | |
|---|---|
| $A_6$ | −5.48799E−05 |
| $A_8$ | 1.47470E−04 |
| $A_{10}$ | 4.06608E−04 |
| $A_{12}$ | −1.27769E−04 |
| Aspheric surface 4 | |
| K | 1.13730E+00 |
| $A_4$ | −1.46440E−03 |
| $A_6$ | 4.40310E−04 |
| $A_8$ | 2.47800E−04 |
| $A_{10}$ | 4.40280E−05 |
| $A_{12}$ | −1.33270E−05 |
| Aspheric surface 5 | |
| K | −6.99712E−01 |
| $A_4$ | 1.66009E−02 |
| $A_6$ | 2.09051E−03 |
| $A_8$ | 1.57932E−03 |
| $A_{10}$ | 2.12509E−04 |
| $A_{12}$ | −3.44184E−04 |
| $A_{14}$ | 1.19417E−05 |
| $A_{16}$ | 5.77745E−05 |
| $A_{18}$ | 4.09189E−05 |
| $A_{20}$ | −2.57292E−05 |
| Aspheric surface 6 | |
| K | −2.00337E+01 |
| $A_4$ | 3.31327E−01 |
| $A_6$ | −8.81378E−01 |
| $A_8$ | 9.65015E−01 |
| $A_{10}$ | −4.12771E−01 |
| $A_{12}$ | −2.52257E−04 |
| $A_{14}$ | −1.10756E−10 |
| $A_{16}$ | −1.68921E−11 |
| $A_{18}$ | −2.53030E−12 |
| $A_{20}$ | −3.70376E−13 |
| Diffractive surface 1 | |
| $b_2$ | −1.00000E−02 |
| $b_4$ | 4.93850E−04 |
| $b_6$ | 2.43430E−04 |
| $b_8$ | 1.12150E−04 |
| $b_{10}$ | −2.73490E−05 |

Figure 16:
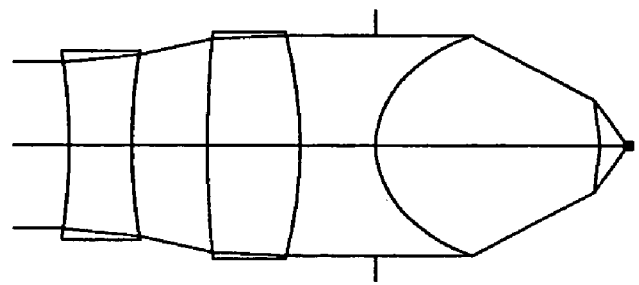
FIG. 16 is an optical system structural view of the negative lens 5, positive lens 4 and objective lens 3 according to the example 6.
Figure 17:
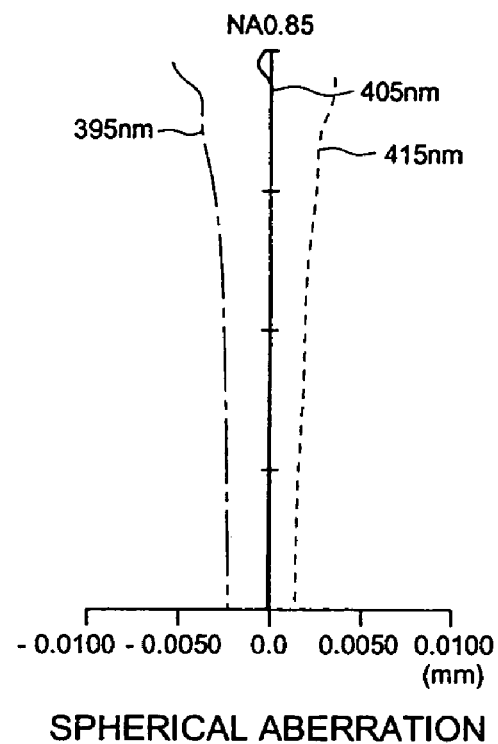
FIG. 17 is a spherical aberration view of the objective lens 3 according to the optical system of the example 6.

FIG. 16 is an optical system structural view of the negative lens 5, positive lens 4, and objective lens 3 according to the example 6. FIG. 17 is a spherical aberration view according to the objective lens 3. In the example 6, the information is recorded or reproduced by the combination of the first light source 11 of the wavelength 405 nm and the image side numerical aperture NA 0.85 of the objective lens 3. In the example 6, when the diffractive surface is added to the surface of the optical information recording medium side of the objective lens 4, and the diffractive structure has characteristics in which the back focus becomes short on the long wavelength side, the axial chromatic aberration generated in the objective lens 3 is corrected. Further, in the present example, fN=−0.503 (mm), fP=6.81 (mm), and f1=1.765 (mm).

Because the correction of the variation of the spherical aberration at the time of the wavelength variation of the light source or temperature change in the present example is the same as in the example 1, the explanation is neglected. As can clearly be seen from Table 12, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are attained.

TABLE 12

Example 6

| | | | |
|---|---|---|---|
| Image height characteristic WFE rms | | Y = 0 μm | 0.008λ (1.00 mm) |
| | | Y = 10 μm | 0.017λ |
| Wavelength characteristic WFE rms | +10 nm | Y = 0 μm | 0.009λ (0.94 mm) |
| | | $\Delta f_B$ (μm) | +3.01 |
| | −10 nm | Y = 0 μm | 0.009λ (1.06 mm) |
| | | $\Delta f_B$ (μm) | −3.71 |
| Temperature characteristic WFE rms | +30° C. | Y = 0 μm | 0.005λ (0.93 mm) |
| | −30° C. | | 0.016λ (1.07 mm) |

Note)
The figure in the parentheses in the Table expresses the interval between the negative lens and the positive lens of the spherical aberration correction means, and the divergent angle changing means

EXAMPLE 7

The data relating to the optical system composed of the negative lens 5, positive lens 4 and objective lens 3 in the example 7 is shown in Table 13.

TABLE 13

Example 7
λ1 405 nm
NA 0.85

| | | r(mm) | d(mm) | $N_{\lambda 1}$ | νd |
|---|---|---|---|---|---|
| 1 (Aspheric surface 1) | Spherical aberration correction means | −6.790 | 0.800 | 1.52524 | 56.5 |
| 2 (Aspheric surface 2) | | 4.293 | 1.000 | | |
| 3 (Aspheric surface 3, diffractive surface 1) | | 6.555 | 1.200 | 1.52524 | 56.5 |
| 4 (Aspheric surface 4, diffractive surface 2) | | −10.777 | 1.000 | | |
| 5 (Diaphragm) | | ∞ | 0.000 | | |
| 6 (Aspheric surface 5) | Objective lens | 1.225 | 2.845 | 1.52524 | 56.5 |
| 7 (Aspheric surface 6) | | −0.763 | 0.292 | | |
| 8 | Transparent substrate | ∞ | 0.100 | 1.61949 | 30.0 |
| 9 | | ∞ | 0.000 | | |

| Aspheric surface 1 | |
|---|---|
| K | 6.34005E−01 |
| $A_4$ | −8.04474E−04 |
| $A_6$ | 3.26482E−03 |
| $A_8$ | −1.10780E−03 |
| $A_{10}$ | −2.17617E−03 |
| Aspheric surface 2 | |
| K | 5.90931E−01 |
| $A_4$ | 1.44067E−03 |
| $A_6$ | −3.12725E−03 |
| $A_8$ | −2.20735E−03 |
| $A_{10}$ | −3.12725E−05 |
| Aspheric surface 3 | |
| K | 9.31840E−01 |
| $A_4$ | 1.47940E−04 |
| $A_6$ | −2.30680E−05 |
| $A_8$ | 3.05100E−04 |
| $A_{10}$ | −4.13730E−05 |

TABLE 13-continued

Example 7
λ1 405 nm
NA 0.85

Aspheric surface 4

| | |
|---|---|
| K | 0.00000E+00 |
| $A_4$ | −1.11870E−03 |
| $A_6$ | 6.80430E−04 |
| $A_8$ | 3.66720E−04 |
| $A_{10}$ | −2.55160E−05 |

Aspheric surface 5

| | |
|---|---|
| K | −6.99712E−01 |
| $A_4$ | 1.66009E−02 |
| $A_6$ | 2.09051E−03 |
| $A_8$ | 1.57932E−03 |
| $A_{10}$ | 2.12509E−04 |
| $A_{12}$ | −3.44184E−04 |
| $A_{14}$ | 1.19417E−05 |
| $A_{16}$ | 5.77745E−05 |
| $A_{18}$ | 4.09189E−05 |
| $A_{20}$ | −2.57292E−05 |

Aspheric surface 6

| | |
|---|---|
| K | −2.00337E+01 |
| $A_4$ | 3.31327E−01 |
| $A_6$ | −8.81378E−01 |
| $A_8$ | 9.65015E−01 |
| $A_{10}$ | −4.12771E−01 |
| $A_{12}$ | −2.52257E−04 |
| $A_{14}$ | −1.10756E−10 |
| $A_{16}$ | −1.68921E−11 |
| $A_{18}$ | −2.53030E−12 |
| $A_{20}$ | −3.70376E−13 |

Diffractive surface 1

| | |
|---|---|
| $b_2$ | −8.00000E−03 |
| $b_4$ | 2.66130E−04 |
| $b_6$ | 7.45750E−05 |
| $b_8$ | −1.58010E−04 |
| $b_{10}$ | 4.67190E−05 |

Diffractive surface 2

| | |
|---|---|
| $b_2$ | −8.00000E−03 |
| $b_4$ | −2.59880E−04 |
| $b_6$ | 3.77670E−04 |
| $b_8$ | 5.66990E−05 |
| $b_{10}$ | −4.26270E−05 |

Figure 18:
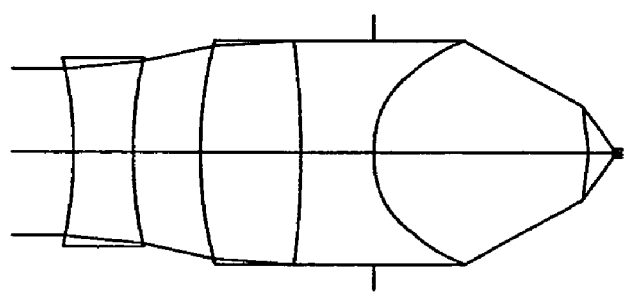
FIG. 18 is an optical system structural view of the negative lens 5, positive lens 4 and objective lens 3 according to the example 7.
Figure 19:
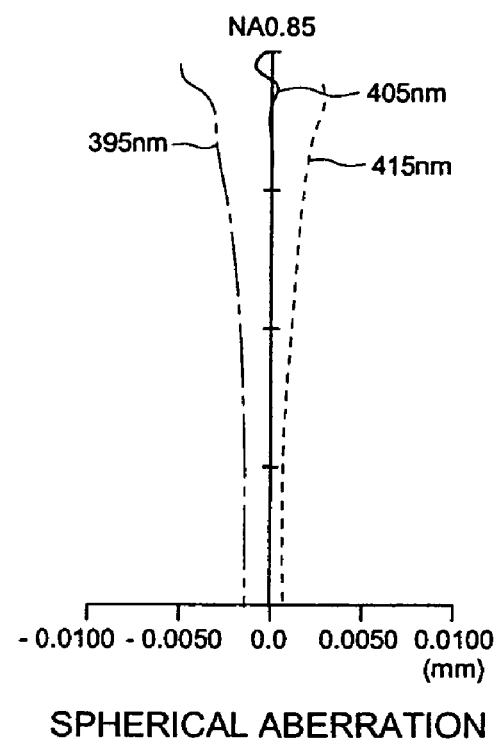
FIG. 19 is a spherical aberration view of the objective lens 3 according to the optical system of the example 7.

FIG. 18 is an optical system structural view of the negative lens 5, positive lens 4, and objective lens 3 according to the example 7. FIG. 19 is a spherical aberration view according to the objective lens 3. In the example 7, the information is recorded or reproduced by the combination of the first light source 11 of the wavelength 405 nm and the image side numerical aperture NA 0.85 of the objective lens 3. In the example 7, when the diffractive surfaces are added to the both surfaces of the negative lens 5 and the positive lens 4, and the diffractive structure have characteristics in which the back focus becomes short on the long wavelength side, the axial chromatic aberration generated in the objective lens 3 is corrected. Further, in the present example, fN=−4.89 (mm), fP=5.83 (mm), and f1=1.765 (mm).

Because the correction of the variation of the spherical aberration at the time of the wavelength variation of the light source or temperature change in the present example is the same as in the example 1, the explanation is neglected. As can clearly be seen from Table 14, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are intended.

TABLE 14

Example 7

| | | | |
|---|---|---|---|
| Image height characteristic WFE rms | | Y = 0 μm | 0.008λ (1.00 mm) |
| | | Y = 10 μm | 0.017λ |
| Wavelength characteristic WFE rms | +10 nm | Y = 0 μm | 0.007λ (0.95 mm) |
| | | $\Delta f_B$ (μm) | +0.83 |
| | −10 nm | Y = 0 μm | 0.010λ (1.05 mm) |
| | | $\Delta f_B$ (μm) | −1.21 |
| Temperature characteristic WFE rms | +30° C. | Y = 0 μm | 0.008λ (0.96 mm) |
| | −30° C. | | 0.019λ (1.05 mm) |

Note)
The figure in the parentheses in the Table expresses the interval between the negative lens and the positive lens of the spherical aberration correction means, and the divergent angle changing means.

EXAMPLE 8

The data relating to the optical system composed of the negative lens 5, positive lens 4 and objective lens 3 in the example 8 is shown in Table 15.

TABLE 15

Example 8
λ1 405 nm
NA 0.85

| | | r(mm) | d(mm) | $N_{\lambda 1}$ | νd |
|---|---|---|---|---|---|
| 1 (Aspheric surface 1, diffractive surface 1) | Spherical aberration correction means | −4.781 | 0.800 | 1.52524 | 56.5 |
| 2 (Aspheric surface 2, diffractive surface 2) | | 6.136 | 1.000 | | |
| 3 (Aspheric surface 3, diffractive surface 3) | | 23.371 | 1.200 | 1.52524 | 56.5 |
| 4 (Aspheric surface 4, diffractive surface 4) | | −5.587 | 1.000 | | |
| 5 (Diaphragm) | | ∞ | 0.000 | | |
| 6 (Aspheric surface 5) | Objective lens | 1.225 | 2.845 | 1.52524 | 56.5 |
| 7 (Aspheric surface 6) | | −0.763 | 0.292 | | |
| 8 | Transparent substrate | ∞ | 0.100 | 1.61949 | 30.0 |
| 9 | | ∞ | 0.000 | | |

Aspheric surface 1

| | |
|---|---|
| K | −5.09350E−02 |
| $A_4$ | −2.56160E−04 |
| $A_6$ | 2.73940E−03 |
| $A_8$ | −6.04320E−04 |
| $A_{10}$ | −1.04120E−03 |
| $A_{12}$ | −8.54300E−04 |

Aspheric surface 2

| | |
|---|---|
| K | 2.61840E+00 |
| $A_4$ | 1.40260E−03 |
| $A_6$ | −9.46360E−04 |
| $A_8$ | −1.03170E−03 |
| $A_{10}$ | −7.00650E−04 |
| $A_{12}$ | 1.59290E−04 |

TABLE 15-continued

Example 8
λ1 405 nm
NA 0.85

Aspheric surface 3

| | |
|---|---|
| K | 1.48200E+01 |
| $A_4$ | 1.08520E-04 |
| $A_6$ | -2.99390E-05 |
| $A_8$ | -5.09390E-05 |
| $A_{10}$ | -9.76740E-05 |
| $A_{12}$ | -5.01720E-01 |

Aspheric surface 4

| | |
|---|---|
| K | 7.68210E-01 |
| $A_4$ | -7.75160E-04 |
| $A_6$ | 2.57520E-04 |
| $A_8$ | 2.11770E-04 |
| $A_{10}$ | 2.31350E-05 |
| $A_{12}$ | -1.82460E-05 |

Aspheric surface 5

| | |
|---|---|
| K | -6.99712E-01 |
| $A_4$ | 1.66009E-02 |
| $A_6$ | 2.09051E-03 |
| $A_8$ | 1.57932E-03 |
| $A_{10}$ | 2.12509E-04 |
| $A_{12}$ | -3.44184E-04 |
| $A_{14}$ | 1.19417E-05 |
| $A_{16}$ | 5.77745E-05 |
| $A_{18}$ | 4.09189E-05 |
| $A_{20}$ | -2.57292E-05 |

Aspheric surface 6

| | |
|---|---|
| K | -2.00337E+01 |
| $A_4$ | 3.31327E-01 |
| $A_6$ | -8.81378E-01 |
| $A_8$ | 9.65015E-01 |
| $A_{10}$ | -4.12771E-01 |
| $A_{12}$ | -2.52257E-04 |
| $A_{14}$ | -1.10756E-10 |
| $A_{16}$ | -1.68921E-11 |
| $A_{18}$ | -2.53030E-12 |
| $A_{20}$ | -3.70376E-13 |

Diffractive surface 1

| | |
|---|---|
| $b_2$ | -5.00000E-03 |
| $b_4$ | 3.72180E-04 |
| $b_6$ | -1.28520E-03 |
| $b_8$ | 2.68410E-04 |
| $b_{10}$ | 1.32790E-05 |

Diffractive surface 2

| | |
|---|---|
| $b_2$ | -5.00000E-03 |
| $b_4$ | 1.24620E-03 |
| $b_6$ | 1.57800E-04 |
| $b_8$ | 9.32920E-05 |
| $b_{10}$ | -2.48990E-04 |

Diffractive surface 3

| | |
|---|---|
| $b_2$ | -5.00000E-03 |
| $b_4$ | -8.23030E-05 |
| $b_6$ | 6.12980E-05 |
| $b_8$ | 7.98370E-05 |
| $b_{10}$ | -5.34800E-05 |

Diffractive surface 4

| | |
|---|---|
| $b_2$ | -5.00000E-03 |
| $b_4$ | -5.11460E-04 |
| $b_6$ | 6.47470E-05 |
| $b_8$ | 3.77610E-05 |
| $b_{10}$ | -1.42650E-05 |

Figure 20:
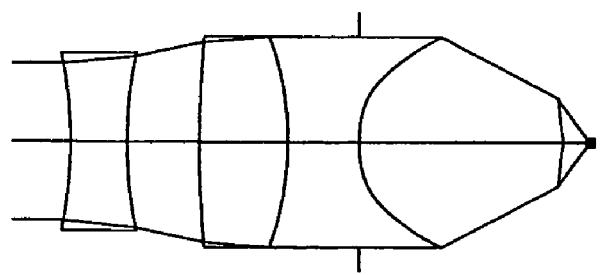
FIG. 20 is an optical system structural view of the negative lens 5, positive lens 4 and objective lens 3 according to the example 8.
Figure 21:
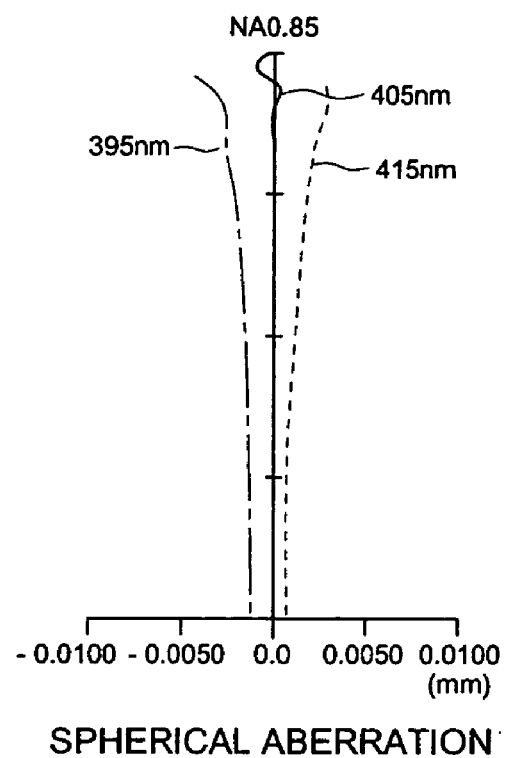
FIG. 21 is a spherical aberration view of the objective lens 3 according to the optical system of the example 8.

FIG. 20 is an optical system structural view of the negative lens 5, positive lens 4, and objective lens 3 according to the example 8. FIG. 21 is a spherical aberration view according to the objective lens 3. In the example 8, the information is recorded or reproduced by the combination of the first light source 11 of the wavelength 405 nm and the image side numerical aperture NA 0.85 of the objective lens 3. In the example 8, when the diffractive surfaces are added to the both surfaces of the negative lens 5 and the positive lens 4, and the diffractive structure have characteristics in which the back focus becomes short on the long wavelength side, the axial chromatic aberration generated in the objective lens 3 is corrected. Further, in the present example, fN=-5.54 (mm), fP=7.42 (mm), and f1=1.765 (mm).

Because the correction of the variation of the spherical aberration at the time of the wavelength variation of the light source or temperature change in the present example is the same as in the example 1, the explanation is neglected. As can clearly be seen from Table 16, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are intended.

TABLE 16

Example 8

| | | | |
|---|---|---|---|
| Image height characteristic WFE rms | | Y = 0 μm | 0.009λ (1.00 mm) |
| | | Y = 10 μm | 0.017λ |
| Wavelength characteristic | +10 nm | Y = 0 μm | 0.008λ (0.95 mm) |
| | | $\Delta f_B$ (μm) | +0.83 |
| WFE rms | -10 nm | Y = 0 μm | 0.013λ (1.06 mm) |
| | | $\Delta f_B$ (μm) | -1.21 |
| Temperature characteristic WFE rms | +30° C. | Y = 0 μm | 0.007λ (0.92 mm) |
| | -30° C. | | 0.022λ (1.08 mm) |

Note)
The figure in the parentheses in the Table expresses the interval between the negative lens and the positive lens of the spherical aberration correction means, and the divergent angle changing means.

EXAMPLE 9

The data relating to the optical system composed of the negative lens 5, positive lens 4 and objective lens 3 in the example 9 is shown in Table 17.

TABLE 17

Example 9
λ1 405 nm
NA 0.85

| | | r(mm) | d(mm) | $N_{\lambda 1}$ | νd |
|---|---|---|---|---|---|
| 1 (Aspheric surface 1) | Spherical aberration | -4.940 | 0.800 | 1.61949 | 30.0 |
| 2 (Aspheric surface 2) | correction means | 5.707 | 1.000 | | |
| 3 (Aspheric surface 3) | | 8.857 | 1.200 | 1.52524 | 56.5 |
| 4 (Aspheric surface 4, diffractive surface 1) | | -5.570 | 1.000 | | |
| 5 (Diaphragm) | | ∞ | 0.000 | | |
| 6 (Aspheric surface 5) | Objective lens | 1.225 | 2.845 | 1.52524 | 56.5 |
| 7 (Aspheric surface 6) | | -0.763 | 0.292 | | |
| 8 | Transparent | ∞ | 0.100 | 1.61949 | 30.0 |
| 9 | substrate | ∞ | 0.000 | | |

TABLE 17-continued

Example 9
λ1 405 nm
NA 0.85

Aspheric surface 1

| | |
|---|---|
| K | 7.47423E-01 |
| $A_4$ | -1.05216E-03 |
| $A_6$ | 1.83191E-03 |
| $A_8$ | -7.42838E-04 |
| $A_{10}$ | -1.82340E-03 |

Aspheric surface 2

| | |
|---|---|
| K | 2.05271E-01 |
| $A_4$ | 2.17539E-04 |
| $A_6$ | -1.28316E-03 |
| $A_8$ | -8.89776E-04 |
| $A_{10}$ | -4.69136E-04 |

Aspheric surface 3

| | |
|---|---|
| K | 1.16167E+00 |
| $A_4$ | 2.41421E-04 |
| $A_6$ | -1.36517E-05 |
| $A_8$ | 5.39496E-05 |
| $A_{10}$ | 3.14626E-05 |
| $A_{12}$ | -4.79376E-05 |

Aspheric surface 4

| | |
|---|---|
| K | 1.25410E-01 |
| $A_4$ | -1.41630E-04 |
| $A_6$ | 1.31960E-04 |
| $A_8$ | 7.62960E-05 |
| $A_{10}$ | -3.79170E-06 |
| $A_{12}$ | -2.37460E-05 |

Aspheric surface 5

| | |
|---|---|
| K | -6.99712E-01 |
| $A_4$ | 1.66009E-02 |
| $A_6$ | 2.09051E-03 |
| $A_8$ | 1.57932E-03 |
| $A_{10}$ | 2.12509E-04 |
| $A_{12}$ | -3.44184E-04 |
| $A_{14}$ | 1.19417E-05 |
| $A_{16}$ | 5.77745E-05 |
| $A_{18}$ | 4.09189E-05 |
| $A_{20}$ | -2.57292E-05 |

Aspheric surface 6

| | |
|---|---|
| K | -2.00337E+01 |
| $A_4$ | 3.31327E-01 |
| $A_6$ | -8.81378E-01 |
| $A_8$ | 9.65015E-01 |
| $A_{10}$ | -4.12771E-01 |
| $A_{12}$ | -2.52257E-04 |
| $A_{14}$ | -1.10756E-10 |
| $A_{16}$ | -1.68921E-11 |
| $A_{18}$ | -2.53030E-12 |
| $A_{20}$ | -3.70376E-13 |

Diffractive surface 1

| | |
|---|---|
| $b_2$ | -1.00000E-02 |
| $b_4$ | -5.64880E-05 |
| $b_6$ | 6.33930E-05 |
| $b_8$ | 6.62150E-05 |
| $b_{10}$ | -4.80270E-06 |

Figure 22:
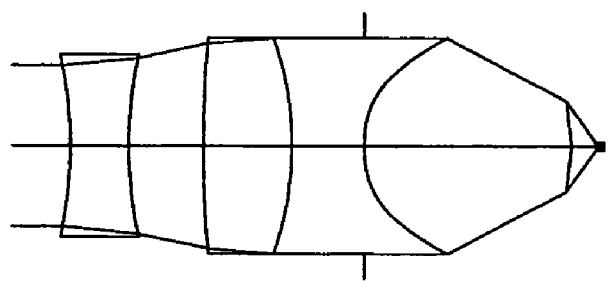
FIG. 22 is an optical system structural view of the negative lens 5, positive lens 4 and objective lens 3 according to the example 9.
Figure 23:
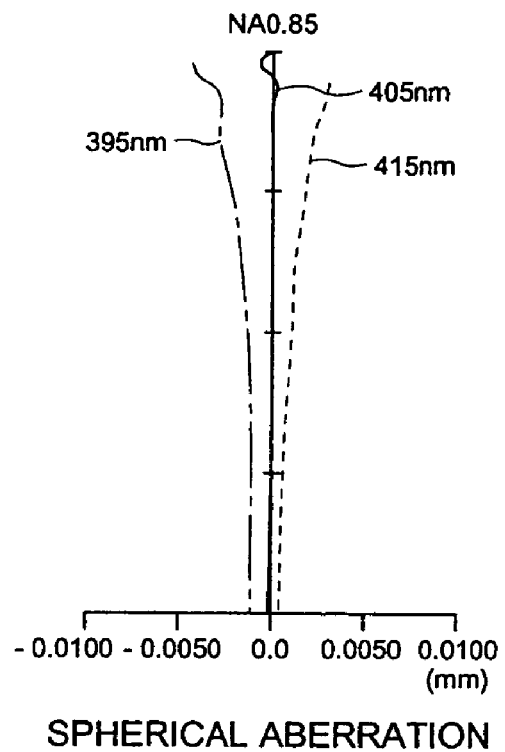
FIG. 23 is a spherical aberration view of the objective lens 3 according to the optical system of the example 9.

FIG. 22 is an optical system structural view of the negative lens 5, positive lens 4, and objective lens 3 according to the example 9. FIG. 23 is a spherical aberration view according to the objective lens 3. In the example 9, the information is recorded or reproduced by the combination of the first light source 11 of the wavelength 405 nm and the image side numerical aperture NA 0.85 of the objective lens 3. In the example 9, when the diffractive surface is added to the surface of the optical information recording medium side of the positive lens 4, and the diffractive structure has characteristics in which the back focus becomes short on the long wavelength side, the axial chromatic aberration generated in the objective lens 3 is corrected. Further, as the material of the negative lens 5 and the positive lens 4 of the spherical aberration correction means, by respectively selecting the materials of N=30.0 and P=56.5, the axial chromatic aberration in the objective lens 3 is more finely corrected. Further, in the present example, fN=-4.15 (mm), fP=5.91 (mm), and f1=1.765 (mm).

Because the correction of the variation of the spherical aberration at the time of the wavelength variation of the light source or temperature change in the present example is the same as in the example 1, the explanation is neglected. As can clearly be seen from Table 18, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are intended.

TABLE 18

Example 9

| | | | |
|---|---|---|---|
| Image height characteristic WFE rms | | Y = 0 μm | 0.006λ (1.00 mm) |
| | | Y = 10 μm | 0.016λ |
| Wavelength characteristic WFE rms | +10 nm | Y = 0 μm | 0.006λ (0.95 mm) |
| | | $\Delta f_B$ (μm) | +0.65 |
| | -10 nm | Y = 0 μm | 0.007λ (1.05 mm) |
| | | $\Delta f_B$ (μm) | -0.95 |
| Temperature characteristic WFE rms | +30° C. | Y = 0 μM | 0.005λ (0.95 mm) |
| | -30° C. | | 0.012λ (1.05 mm) |

Note)
The figure in the parentheses in the Table expresses the interval between the negative lens and the positive lens of the spherical aberration correction means, and the divergent angle changing means.

EXAMPLE 10

The data relating to the optical system composed of the negative lens 5, positive lens 4 and objective lens 3 in the example 10 is shown in Table 19.

TABLE 19

Example 10
λ1 405 nm
NA 0.85

| | | r(mm) | d(mm) | $N_{\lambda 1}$ | νd |
|---|---|---|---|---|---|
| 1 (Aspheric surface 1) | Spherical aberration correction means | -17.882 | 0.800 | 1.66845 | 24.3 |
| 2 (Aspheric surface 2) | | 7.461 | 1.500 | | |
| 3 (Diffractive surface 1) | | 7.218 | 1.200 | 1.52491 | 56.5 |
| 4 (Diffractive surface 2) | | ∞ | 2.500 | | |
| 5 (Diaphragm) | | ∞ | -1.000 | | |
| 6 (Aspheric surface 3) | Objective lens | 1.194 | 2.650 | 1.52491 | 56.5 |
| 7 (Aspheric surface 4) | | -0.975 | 0.355 | | |
| 8 | Transparent substrate | ∞ | 0.100 | 1.61949 | 30.0 |
| 9 | | ∞ | 0.000 | | |

Aspheric surface coefficient
Aspheric surface 1

| | |
|---|---|
| K | -180.985319 |
| $A_4$ | 0.213341E-02 |
| $A_6$ | -0.309153E-03 |

TABLE 19-continued

Example 10
λ1 405 nm
NA 0.85

| | |
|---|---|
| $A_8$ | −0.923446E−03 |
| $A_{10}$ | 0.434595E−03 |
| Aspheric surface 2 | |
| K | 6.460482 |
| $A_4$ | 0.303589E−02 |
| $A_6$ | −0.127523E−02 |
| $A_8$ | −0.661011E−03 |
| $A_{10}$ | 0.354629E−03 |
| Aspheric surface 3 | |
| K | −0.683354 |
| $A_4$ | 0.162029E−01 |
| $A_6$ | 0.154908E−02 |
| $A_8$ | 0.289288E−02 |
| $A_{10}$ | −0.367711E−03 |
| $A_{12}$ | −0.358222E−03 |
| $A_{14}$ | 0.148419E−03 |
| $A_{16}$ | 0.119603E−03 |
| $A_{18}$ | −0.302302E−04 |
| $A_{20}$ | −0.110520E−04 |
| Aspheric surface 4 | |
| K | −21.704418 |
| $A_4$ | 0.308021 |
| $A_6$ | −0.639499 |
| $A_8$ | 0.585364 |
| $A_{10}$ | −0.215623 |
| $A_{12}$ | −0.252265E−03 |
| Diffractive surface coefficient | |
| Diffractive surface 1 | |
| $b_2$ | −6.7880E−03 |
| $b_4$ | −1.2066E−04 |
| Diffractive surface 2 | |
| $b_2$ | −9.7794E−03 |
| $b_4$ | 5.1838E−04 |

Figure 24:
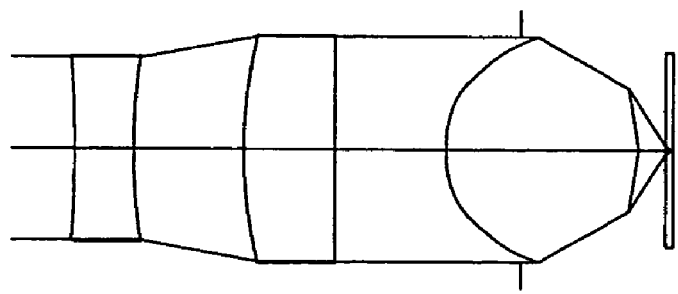
FIG. 24 is an optical system structural view of the negative lens 5, positive lens 4 and objective lens 3 according to the example 10.
Figure 25:
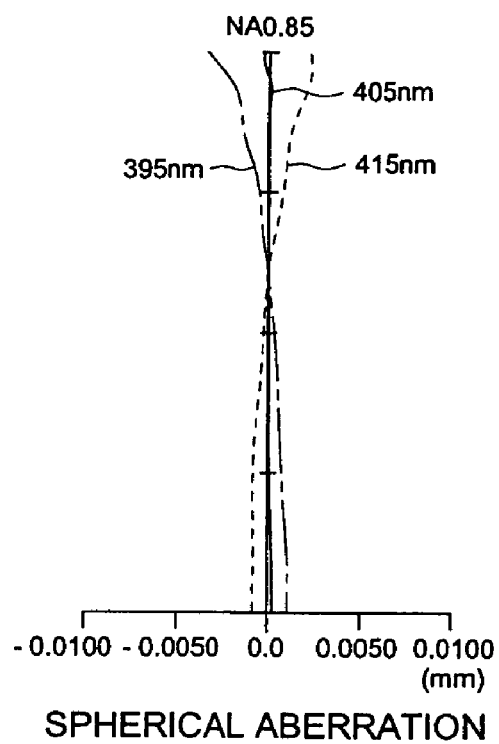
FIG. 25 is a spherical aberration view of the objective lens 3 according to the optical system of the example 10.

FIG. 24 is an optical system structural view of the negative lens 5, positive lens 4, and objective lens 3 according to the example 10. FIG. 25 is a spherical aberration view according to the objective lens 3. In the example 10, the information is recorded or reproduced by the combination of the first light source 11 of the wavelength 405 nm and the image side numerical aperture NA 0.85 of the objective lens 3. In the example 10, when the diffractive surfaces are added to the both surfaces of the positive lens 4, and the diffractive structure has characteristics in which the back focus becomes short on the long wavelength side, the axial chromatic aberration generated in the objective lens 3 is corrected. In this case, when the axial chromatic aberration of the composite system in which the objective lens 3, and the negative lens 5 and the positive lens 4 as the spherical aberration correction means are combined, is made in the overcorrected condition, as shown in FIG. 25, a spherical aberration curve of the oscillation wavelength (405 nm) of the first light source 11 and a spherical aberration curve on the long and short wavelength are made to cross each other. Thereby, when the mode hopping of the light source occurs, deterioration of the wave front aberration at the time of high frequency superimposition is very small, and for example, even when the oscillation wavelength of the light source is minutely varied, the shift of the position of the best image plane can be suppressed to small. Further, when the negative lens 5 which is the movable element as the spherical aberration correction means, is formed into the both side aspheric surface lens, the deterioration of the wave front aberration at the time of the decentering of the negative lens 5 or the tracking error is suppressed to small. Further, as the material of the negative lens 5 and the positive lens 4, by respectively selecting the materials of vdN=24.3 and vdP=56.5, the axial chromatic aberration in the objective lens 3 is corrected, and the burden of the diffractive structure added to the positive lens 4 is lightened. Further, in the present example, fN=−7.78 (mm), fP=9.95 (mm), and f1=1.765 (mm).

In the present example, because the diaphragm to regulate the light flux is arranged on the optical information recording medium side from the top of the surface of the light source side of the objective lens 3, when the divergent light flux is incident, the light ray passing height of the surface on the most light source side of the objective lens 3 can be suppressed to small. This is preferable also for the size reduction or aberration correction of the objective lens 3.

Because the correction of the variation of the spherical aberration at the time of the wavelength variation of the light source or temperature change in the present example is the same as in the example 1, the explanation is neglected. As can clearly be seen from Table 20, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are intended. Further, because the plastic material whose internal transmittance is high for the short wavelength light, is used, the large amount of lenses can be produced at low cost, and the optical system having the high efficiency of utilization of light is realized. In this connection, the movable mechanism is the transfer apparatus of the negative lens 5 and the focusing mechanism of the objective lens 3 in the example in the present specification.

TABLE 20

Example 10

| | | | |
|---|---|---|---|
| Image height characteristic WFE rms | | Y = 0 μm<br>Y = 10 μm | 0.004λ (1.50 mm)<br>0.011λ |
| Wavelength characteristic WFE rms | +10 nm | Y = 0 μm<br>$\Delta f_B$ (μm) | 0.004λ (1.29 mm)<br>−0.94 |
| | −10 nm | Y = 0 μm<br>$\Delta f_B$ (μm) | 0.010λ (1.72 mm)<br>+0.82 |
| Temperature characteristic WFE rms | +30° C.<br>−30° C. | Y = 0 μm | 0.013λ (1.26 mm)<br>0.023λ (1.76 mm) |

Note)
The figure in the parentheses in the Table expresses the interval between the negative lens and the positive lens of the spherical aberration correction means, and the divergent angle changing means.

In this connection, in the present example, although not shown in FIG. 25, as shown in the embodiment in FIG. 1, in the practical optical pick-up apparatus, a coupling lens such as a collimator is provided between the light source and the spherical aberration correction means. In this case, also the axial chromatic aberration generated in the coupling lens can be corrected by the structure of the present example, and the converging optical system having the fine chromatic aberration can be obtained.

Figure 26:
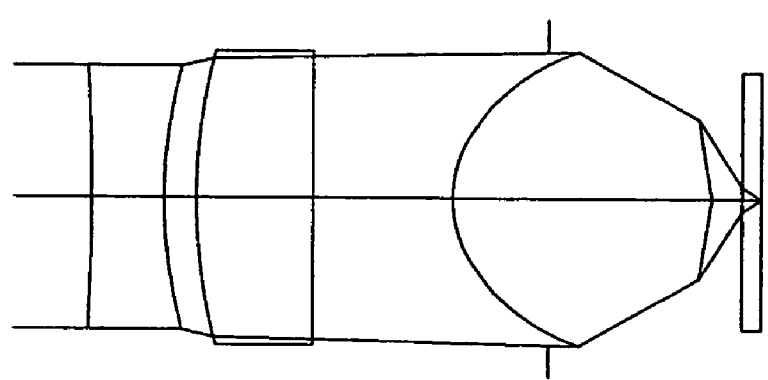
FIG. 26 is an optical system structural view of the negative lens 5, positive lens 4 and objective lens 3 according to the example 10.

Further, so-called 2 layer recording system optical information recording medium is well known in which, by providing two phase change layers for the first information recording layer and the second information recording layer on the one side of the optical information recording medium, and by recording the information on each of them, the storage capacity of the optical information recording medium is increased to about 2 times, however, the apparatus in the present example can also be applied for recording or reproducing of the information for such the 2 layer recording system optical information recording medium, and the spherical aberration generated by the difference in the thickness between the incident plane of the light flux and the information recording plane of each information recording layer can be corrected. For example, when, in the order from the incident plane of the light flux of the optical information recording medium, the first information recording layer and the second information recording layer are defined, as shown in FIG. 26, by reducing the interval between the negative lens 5 and the positive lens 4 as the spherical aberration correction means, the recording or reproducing of the information can conducted onto the information recording plane of the second information recording layer.

EXAMPLE 11

The data relating to the optical system composed of the negative lens 5, positive lens 4 and objective lens 3 in the example 11 is shown in Table 21.

TABLE 21

Example 11
λ1 405 nm
NA 0.85

| | | r(mm) | d(mm) | $N_{\lambda 1}$ | vd |
|---|---|---|---|---|---|
| 1 (Aspheric surface 1) | Spherical aberration | −11.505 | 0.800 | 1.52491 | 56.5 |
| 2 (Aspheric surface 2) | correction means | 7.202 | 3.000 | | |
| 3 | | ∞ | 1.200 | 1.52491 | 56.5 |
| 4 | | −6.458 | 3.000 | | |
| 5 (Diaphragm) | | | 0.000 | | |
| 6 (Aspheric surface 3, diffractive surface 1) | Objective lens | 1.258 | 2.620 | 1.52491 | 56.5 |
| 7 (Aspheric surface 4) | | −1.023 | 0.330 | | |
| 8 | Transparent | ∞ | 0.100 | 1.61950 | 30.0 |
| 9 | substrate | ∞ | | | |

Aspheric surface coefficient
Aspheric surface 1

K= −47.861166
$A_4=$ 0.401592 × 10$^{-2}$
$A_6=$ 0.290627 × 10$^{-2}$
$A_8=$ 0.694294 × 10$^{-3}$
$A_{10}=$ −0.493101 × 10$^{-2}$

Aspheric surface 2

K= 11.392515
$A_4=$ 0.273496 × 10$^{-2}$
$A_6=$ 0.238867 × 10$^{-2}$
$A_8=$ −0.86487 × 10$^{-3}$
$A_{10}=$ −0.324593 × 10$^{-2}$

Aspheric surface 3

K= −7.0631 × 10$^{-1}$
$A_4=$ 1.8891 × 10$^{-2}$
$A_6=$ −1.2594 × 10$^{-3}$
$A_8=$ 4.3129 × 10$^{-3}$
$A_{10}=$ −3.1523 × 10$^{-4}$
$A_{12}=$ −8.1023 × 10$^{-4}$
$A_{14}=$ 6.1785 × 10$^{-5}$
$A_{16}=$ 1.7038 × 10$^{-4}$
$A_{18}=$ −7.7915 × 10$^{-6}$
$A_{20}=$ −1.8397 × 10$^{-5}$

TABLE 21-continued

Example 11
λ1 405 nm
NA 0.85

Aspheric surface 4

K= −32.230932
$A_4=$ 0.202088
$A_6=$ −0.395843
$A_8=$ 0.286204
$A_{10}=$ −0.715179 × 10$^{-1}$
$A_{12}=$ −0.252269 × 10$^{-3}$

Diffractive surface coefficient
Diffractive surface 1

$b_2$ −1.7601 × 10$^{-2}$
$b_4$ −2.3203 × 10$^{-3}$
$b_6$ −2.1692 × 10$^{-4}$
$b_8$ −2.4765 × 10$^{-5}$
$b_{10}$ −9.4777 × 10$^{-5}$

Figure 27:
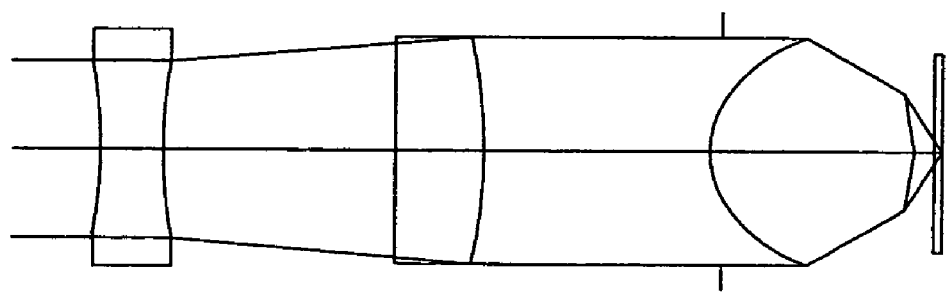
FIG. 27 is an optical system structural view of the negative lens 5, positive lens 4 and objective lens 3 according to the example 11.
Figure 28:
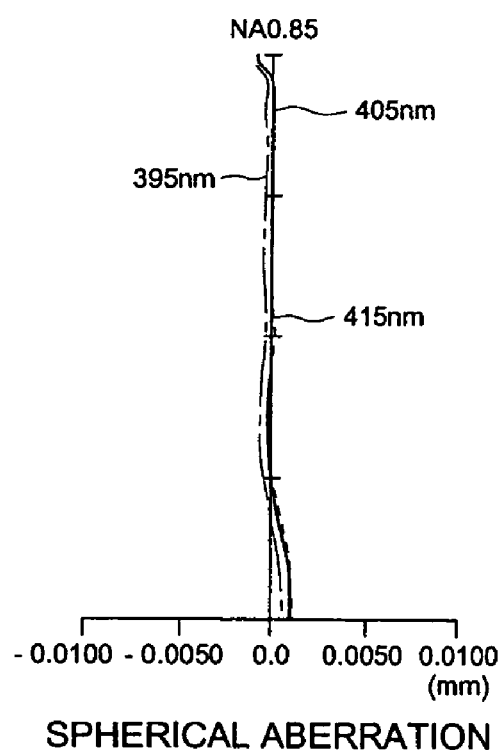
FIG. 28 is a spherical aberration view of the objective lens 3 according to the optical system of the example 11.

FIG. 27 is an optical system structural view of the negative lens 5, positive lens 4, and objective lens 3 according to the example 11. FIG. 28 is a spherical aberration view according to the objective lens 3. In the example 11, the information is recorded or reproduced by the combination of the first light source 11 of the wavelength 405 nm and the image side numerical aperture NA 0.85 of the objective lens 3. In the example 11, when the diffractive surface is added to the surface of the light source side of the objective lens 3, and the diffractive structure has characteristic in which the back focus becomes short on the long wavelength side, the axial chromatic aberration generated in the objective lens 3 is corrected. Further, when the negative lens 5 which is a movable element as the spherical aberration correction means, is the both side aspheric lens, the deterioration of the wave front aberration at the time of the decentering of the negative lens 5 or the tracking error is suppressed to small. Further, in the present example, fN=−8.32 (mm), fP=12.30 (mm), and f1=1.765 (mm), and fD=28.417 (mm).

Because the correction of the variation of the spherical aberration at the time of the wavelength variation of the light source or temperature change in the present example is the same as in the example 1, the explanation is neglected. As can clearly be seen from Table 22, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are attained. Further, because the plastic material whose internal transmittance is high for the short wavelength light, is used, the large amount of lenses can be produced at low cost, and the optical system having the high efficiency of utilization of light is attained.

TABLE 22

Example 11

| Image height characteristic WFE rms | | Y = 0 μm | 0.008λ (3.00 mm) |
|---|---|---|---|
| | | Y = 10 μm | 0.011λ |
| Wavelength characteristic WFE rms | +10 nm | Y = 0 μm | 0.007λ (3.01 mm) |
| | | $\Delta f_B$ (μm) | +0.12 |
| | −10 nm | Y = 0 μm | 0.009λ (2.99 mm) |
| | | $\Delta f_B$ (μm) | −0.36 |

TABLE 22-continued

Example 11

| | | | |
|---|---|---|---|
| Temperature characteristic WFE rms | +30° C. −30° C. | Y = 0 μm | 0.016λ (2.80 mm) 0.029λ (3.21 mm) |

Note)
The figure in the parentheses in the Table expresses the interval between the negative lens and the positive lens of the spherical aberration correction means, and the divergent angle changing means.

EXAMPLE 12

The data relating to the optical system composed of the negative lens 5, positive lens 4 and objective lens 3 in the example 12 is shown in Table 23.

TABLE 23

Example 12
$\lambda 1$ 405 nm NA1 0.85
$\lambda 2$ 655 nm NA2 0.65

| Surface No. | | r(mm) | d(mm) | $N_{\lambda 1}$ | vd |
|---|---|---|---|---|---|
| 1 (Aspheric surface 1) | Spherical aberration correction means | −14.461 | 1.000 | 1.52491 | 56.5 |
| 2 (Aspheric surface 2) | | 4.468 | (variable interval 1) | | |
| 3 (Aspheric surface 3) | | 5.516 | 1.500 | 1.52491 | 56.5 |
| 4 | | ∞ | 1.700 | | |
| 5 (Diaphragm) | | | −0.700 | | |
| 3 (Aspheric surface 4, diffractive surface 1) | Objective lens | 1.203 | 2.497 | 1.52491 | 56.5 |
| 4 (Aspheric surface 5) | | −1.207 | (variable interval 2) | | |
| 5 | Transparent substrate | ∞ | (variable interval 3) | 1.61950 | 30.0 |
| 6 | | ∞ | | | |

Aspheric surface coefficient
Aspheric surface 1

| | |
|---|---|
| K= | −303.128595 |
| $A_4$= | $0.708268 \times 10^{-2}$ |
| $A_6$= | $-0.189289 \times 10^{-1}$ |
| $A_8$= | $0.190213 \times 10^{-1}$ |
| $A_{10}$= | $-0.271581 \times 10^{-2}$ |

Aspheric surface 2

| | |
|---|---|
| K= | 3.803233 |
| $A_4$= | $0.588950 \times 10^{-2}$ |
| $A_6$= | $-0.167364 \times 10^{-1}$ |
| $A_8$= | $0.113657 \times 10^{-1}$ |
| $A_{10}$= | $0.615860 \times 10^{-3}$ |

Aspheric surface 3

| | |
|---|---|
| K= | 1.637827 |
| $A_4$= | $-0.395830 \times 10^{-2}$ |
| $A_6$= | $0.115426 \times 10^{-2}$ |
| $A_8$= | $-0.543755 \times 10^{-3}$ |
| $A_{10}$= | $0.885518 \times 10^{-4}$ |

Aspheric surface 4

| | |
|---|---|
| K= | $-6.8335 \times 10^{-1}$ |
| $A_4$= | $1.6203 \times 10^{-2}$ |
| $A_6$= | $1.5491 \times 10^{-3}$ |
| $A_8$= | $2.8929 \times 10^{-3}$ |
| $A_{10}$= | $-3.6771 \times 10^{-4}$ |
| $A_{12}$= | $-3.5822 \times 10^{-4}$ |

TABLE 23-continued

Example 12
$\lambda 1$ 405 nm NA1 0.85
$\lambda 2$ 655 nm NA2 0.65

| | |
|---|---|
| $A_{14}$= | $1.4842 \times 10^{-4}$ |
| $A_{16}$= | $1.1960 \times 10^{-4}$ |
| $A_{18}$= | $-3.0230 \times 10^{-5}$ |
| $A_{20}$= | $-1.1052 \times 10^{-5}$ |

Aspheric surface 5

| | |
|---|---|
| K= | −26.275787 |
| $A_4$= | 0.291992 |
| $A_6$= | −0.513328 |
| $A_8$= | 0.415634 |
| $A_{10}$= | −0.137436 |
| $A_{12}$= | $-0.252265 \times 10^{-3}$ |

Diffractive surface coefficient
Diffractive surface 1

| | |
|---|---|
| $b_2$ | $-1.1002 \times 10^{-2}$ |
| $b_4$ | $-1.9824 \times 10^{-3}$ |
| $b_6$ | $3.3680 \times 10^{-4}$ |
| $b_8$ | $-9.6881 \times 10^{-5}$ |
| $b_{10}$ | $-4.2391 \times 10^{-4}$ |
| $b_{12}$ | $2.2319 \times 10^{-4}$ |
| $b_{14}$ | $-2.3482 \times 10^{-5}$ |
| $b_{16}$ | $-9.2757 \times 10^{-6}$ |

| | $\lambda 1$ | $\lambda 2$ |
|---|---|---|
| (Variable interval 1) | 4.000 | 0.335 |
| (Variable interval 2) | 0.377 | 0.200 |
| (Variable interval 3) | 0.100 | 0.600 |

Figure 29:
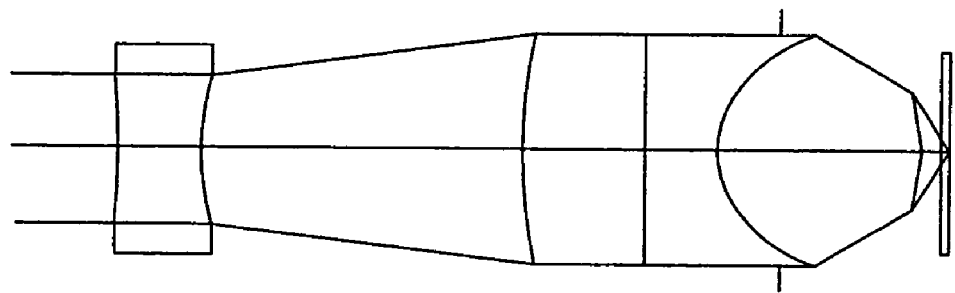
FIG. 29 is an optical system structural view of the negative lens 5, positive lens 4 and objective lens 3 according to the example 12.
Figure 30:
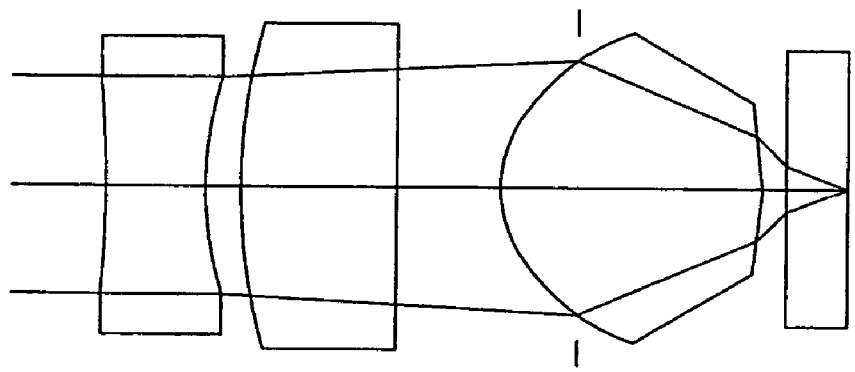
FIG. 30 is an optical system structural view of the negative lens 5, positive lens 4 and objective lens 3 according to the example 12.
Figure 31:
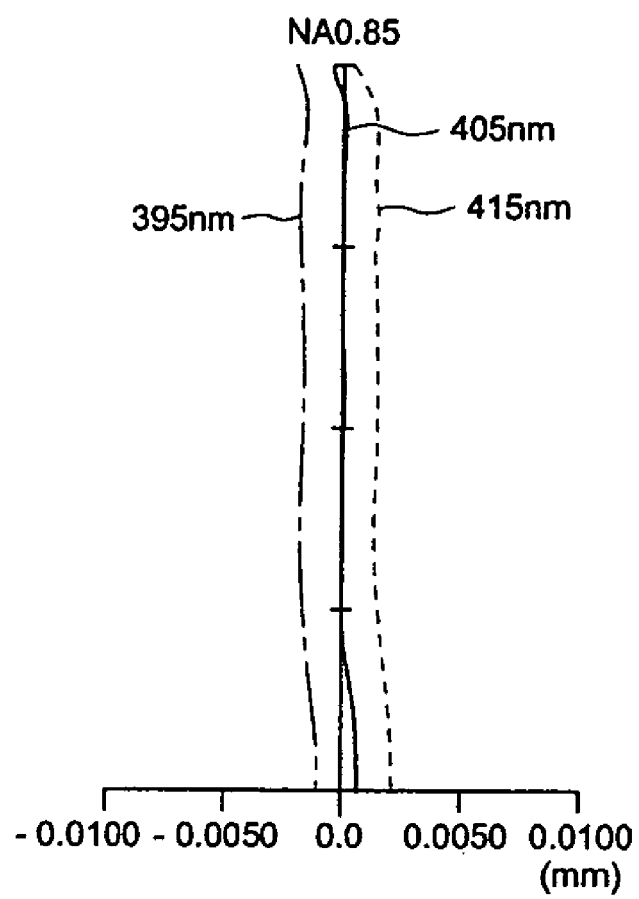
FIG. 31 is a spherical aberration view of the objective lens 3 according to the optical system of the example 12.
Figure 32:
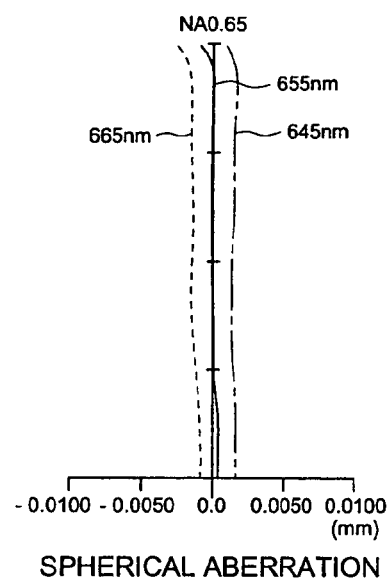
FIG. 32 is a spherical aberration view of the objective lens 3 according to the optical system of the example 12.

FIGS. 29 and 30 are optical system structural views of the negative lens 5, positive lens 4, and objective lens 3 according to the example 12. FIGS. 31 and 32 are spherical aberration views according to the objective lens 3 when the information is recorded or reproduced respectively for the different optical information recording media. The example 12 is an example of the optical pick-up apparatus by which the information is recorded or reproduced by the combination of the first light source 11 of the wavelength 405 nm and the optical information recording medium of the transparent substrate thickness 0.1 mm, or by the combination of the second light source 11 of the wavelength 655 nm and the optical information recording medium of the transparent substrate thickness 0.6 mm. In the example 12, when the diffractive surface is added to the surface of the light source side of the objective lens 3, the spherical aberration and the spherical aberration of the color, generated by the difference in the transparent substrate thickness, are corrected. Specifically, it is conducted, by moving the negative lens 5 as the spherical aberration correction means in the optical axis direction, when the slope angle of the marginal ray of the light flux incident to the objective lens 3 is changed corresponding to the transparent substrate thickness of the information recording medium. Further, in the present example, fN=−6.39 (mm), fP=10.51 (mm), and f1=1.765 (mm), and fD1=45.46 (mm). In this connection, the focal length of the objective lens at the oscillation wavelength $\lambda 2$=655 nm is f2=1.79.

Because the correction of the variation of the spherical aberration at the time of the wavelength variation of the light source or temperature change in the present example is the same as in the example 1, the explanation is neglected. As can clearly be seen from Table 24, the spherical aberration at the time of the wavelength variation or temperature change becomes fine. Further, when the plastic material is used for the objective lens 3, negative lens 5 and positive lens 4, the weight reduction of the optical system and the reduction of the burden onto the movable mechanism are attained. Further, because the plastic material whose internal transmittance is high for the short wavelength light, is used, a large amount of lenses can be produced at low cost, and the optical system having the high efficiency of utilization of light is attained.

TABLE 24

Example 12

|  |  | 405 nm<br>NA 0.85 | 655 nm<br>NA 0.65 |
|---|---|---|---|
| Image height characteristic WFE rms |  $Y = 0~\mu m$<br>$Y = 10~\mu m$ | $0.005\lambda$ (4.00 mm)<br>$0.033\lambda$ | $0.002\lambda$ (0.33 mm)<br>0.014 |
| Wavelength characteristic WFE rms | +10 nm  $Y = 0~\mu m$<br>$\Delta f_B$ ($\mu m$) | $0.011\lambda$ (4.01 mm)<br>+1.45 | $0.002\lambda$ (0.35 mm)<br>−1.28 |
|  | −10 nm  $Y = 0~\mu m$<br>$\Delta f_B$ ($\mu m$) | $0.007\lambda$ (3.99 mm)<br>−1.28 | $0.003\lambda$ (0.32 mm)<br>+1.28 |
| Temperature characteristic WFE rms | +30° C.  $Y = 0~\mu m$<br>−30° C. | $0.016\lambda$ (3.85 mm)<br>$0.026\lambda$ (4.17 mm) | $0.005~\lambda$ (0.33 mm)<br>$0.004~\lambda$ (0.34 mm) |

Note)
The figure in the parentheses in the Table expresses the interval between the negative lens and the positive lens of the spherical aberration correction means, and the divergent angle changing means.

In this connection, in the same manner as in the examples 4 and 5, when the light flux more than NA 0.65 to the optical information recording medium of the light source wavelength 655 nm and the transparent substrate thickness 0.6 mm, is made a flare component by using the effect of the diffractive surface provided on the objective lens 3, the spot diameter is not excessively squeezed on the information recording plane, and the detection of the unnecessary signal on the light receiving element of the optical pick-up apparatus can be prevented.

EXAMPLE 13

The data relating to the optical system composed of a coupling lens 21, or collimator corresponding to the coupling lenses 15 and 21, and negative lens 5, positive lens 4 and objective lens 3 in the example 13 is shown in Table 25.

TABLE 25

Example 13
$\lambda 1$ 405 nm
NA 0.85

| Surface No. |  | r(mm) | d(mm) | $N_{\lambda 1}$ | vd |
|---|---|---|---|---|---|
|  | Light source |  | 11.450 |  |  |
| 1 (Aspheric surface 1) | Coupling lens | 19.575 | 1.200 | 1.52491 | 56.5 |
| 2 (Aspheric surface 2) |  | −9.091 | d2 (variable) |  |  |
| 3 (Aspheric surface 3) | Spherical aberration correction means | −7.656 | 0.800 | 1.52491 | 56.5 |
| 4 (Aspheric surface 4) |  | 21.942 | d4 (variable) |  |  |
| 5 (Diffractive surface 1) |  | ∞ | 1.200 | 1.52491 | 56.5 |
| 6 (Diffractive surface 2) |  | −22.590 | 2.500 |  |  |
| 7 (Diaphragm) |  | ∞ | 0.000 |  |  |
| 8 (Aspheric surface 5) | Objective lens | 1.194 | 2.650 | 1.52491 | 56.5 |
| 9 (Aspheric surface 6) |  | −0.975 | 0.355 |  |  |
| 10 | Transparent substrate | ∞ | 0.100 | 1.61949 | 30.0 |
| 11 |  | ∞ | 0.000 |  |  |

Aspheric surface coefficient
Aspheric surface 1

| K | 117.804975 |
|---|---|
| $A_4$ | 0.329240E−02 |
| $A_6$ | −0.182464E−02 |
| $A_8$ | 0.140707E−02 |
| $A_{10}$ | −0.640870E−03 |

Aspheric surface 2

| K | −6.746762 |
|---|---|
| $A_4$ | 0.111141E−02 |
| $A_6$ | 0.282880E−02 |
| $A_8$ | −0.449522E−03 |
| $A_{10}$ | −0.118579E−03 |

Aspheric surface 3

| K | −19.770711 |
|---|---|
| $A_4$ | −0.749547E−03 |
| $A_6$ | 0.187767E−02 |
| $A_8$ | 0.123312E−03 |
| $A_{10}$ | 0.333580E−03 |

Aspheric surface 4

| K | 105.955239 |
|---|---|
| $A_4$ | 0.446828E−02 |
| $A_6$ | −0.226237E−02 |

TABLE 25-continued

Example 13
λ1 405 nm
NA 0.85

| | |
|---|---|
| $A_8$ | 0.112349E−02 |
| $A_{10}$ | 0.112686E−03 |
| Aspheric surface 5 | |
| K | −0.683354 |
| $A_4$ | 0.162029E−01 |
| $A_6$ | 0.154908E−02 |
| $A_8$ | 0.289288E−02 |
| $A_{10}$ | −0.367711E−03 |
| $A_{12}$ | −0.358222E−03 |
| $A_{14}$ | 0.148419E−03 |
| $A_{16}$ | 0.119603E−03 |
| $A_{18}$ | −0.302302E−04 |
| $A_{20}$ | −0.110520E−04 |
| Aspheric surface 6 | |
| K | −21.704418 |
| $A_4$ | 0.308021 |
| $A_6$ | −0.639499 |
| $A_8$ | 0.585364 |
| $A_{10}$ | −0.215623 |
| $A_{12}$ | −0.252265E−03 |
| Diffractive surface coefficient | |
| Diffractive surface 1 | |
| $b_2$ | −1.0609E−02 |
| $b_4$ | −6.4692E−04 |
| Diffractive surface 2 | |
| $b_2$ | −1.6184E−02 |
| $b_4$ | 5.9162E−04 |

Figure 33:
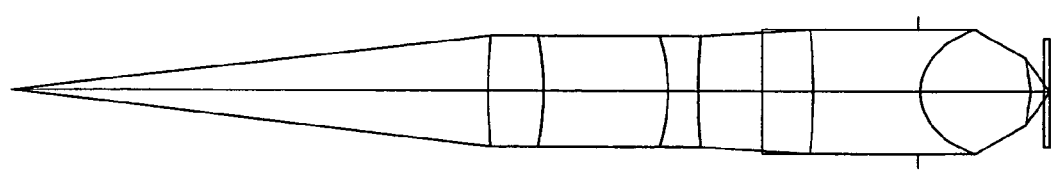
FIG. 33 is an optical system structural view of a collimator, negative lens 5, positive lens 4 and objective lens 3 according to the example 13.
Figure 34:
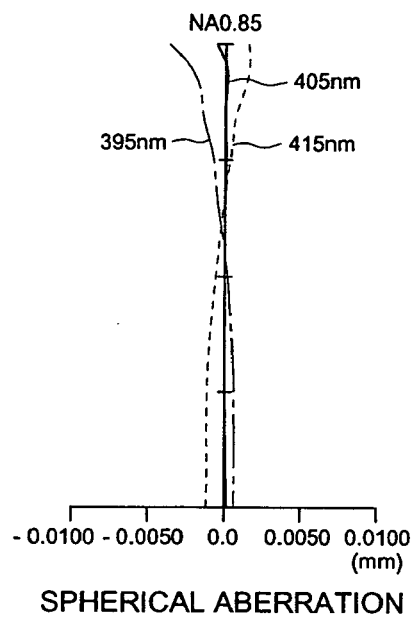
FIG. 34 is a spherical aberration view of the objective lens 3 according to the optical system of the example 13.

FIG. 33 is an optical system structural view of the collimator, negative lens 5, positive lens 4, and objective lens 3 according to the example 13. FIG. 34 is a spherical aberration view according to the objective lens 3. In the example 13, the information is recorded or reproduced by the combination of the first light source 11 of the wavelength 405 nm and the image side numerical aperture NA 0.85 of the objective lens 3. In the example 13, by moving the negative lens 5 in the spherical aberration correction means along the optical axis direction, the slope angle of the marginal ray of the light flux incident to the objective lens 3 is changed, and the variation of the spherical aberration generated on each optical surface of the converging optical system (collimator and the objective lens 3) is corrected. Further, in the present example, fN=−10.71 (mm), fP=13.18 (mm), and f1=1.765 (mm).

Further, diffractive surfaces are added to both surfaces of the positive lens 4, and the axial chromatic aberration having the inverse sign to that of the axial chromatic aberration generated by the optical surface of the converging optical system is generated in the spherical aberration correction means itself, thereby, the axial chromatic aberration generated by the optical surface of the converging optical system is corrected, and the axial chromatic aberration of the wave front when the focus is formed on the information recording plane is made fine. In the converging optical system in the present example, when the axial chromatic aberration generated by the collimator and the objective lens 3, are respectively ΔfB1, and ΔfB2, and ratio of them is approximately found, because the focal length of the collimator is 12 mm, the magnification of the spherical aberration correction means is 1.23 times, and the focal length of the objective lens is 1.765 mm, ΔfB1/ΔfB2=1/30. That is, when the absolute value of the axial chromatic aberration, generated by the spherical aberration correction means is made almost the same value as the absolute value of the axial chromatic aberration generated by the objective lens, the axial chromatic aberration of the wave front when the focus is formed on the information recording plane can be made fine. At the time, when the axial chromatic aberration of the composite system in which the converging optical system, and the negative lens 5 and the positive lens 4 as the spherical aberration correction means are combined, is corrected in the overcorrected condition, as shown in FIG. 34, the spherical aberration curve of the oscillation wavelength (405 nm) of the first light source 11 and the spherical aberration curve of the long·short wavelength side are crossed each other. Thereby, even when the mode hop phenomenon of the light source or the deterioration of the wave front aberration at the time of the high frequency superimposition is very small, for example, the oscillation wavelength of the light source is minutely varied, the shift of the position of the best image plane can be suppressed to small. Further, when the negative lens 5 which is a movable element in the spherical aberration correction means, is biaspherical surface lens, the decentering of the negative lens 5 or deterioration of the wave front aberration at the time of the tracking error is suppressed to small.

As can clearly be seen from Table 26, the variation of the spherical aberration generated on each optical surface of the converging optical system due to various factors, such as at the time of the wavelength variation or temperature change, can be corrected, and the spherical aberration becomes fine. Further, when the plastic material is used for all of the collimator and objective lens 3, and the negative lens 5 and positive lens 4, constituting the spherical aberration correction means, the weight reduction of the optical system and the reduction of the burden onto the movable mechanism are attained. Further, because the plastic material whose internal transmittance is high for the short wavelength light, is used, a large amount of lenses can be produced at low cost, and the optical system having the high efficiency of utilization of light is attained.

TABLE 26

Example 13

| Cause of variation of spherical aberration | | Wave front aberration after correction | d2 (variable) | d4 (variable) |
|---|---|---|---|---|
| Reference condition (λ = 405 nm, T = 25° C.) | Y = 0 μm | 0.005λ | 3.000 | 1.500 |
| | Y = 10 μm | 0.011λ | | |
| Wavelength characteristic WFE rms | +10 nm | Y = 0 μm | 0.005λ | 3.326 | 1.164 |
| | | $\Delta f_B$ (μm) | −0.90 | | |
| | −10 nm | Y = 0 μm | 0.009λ | 2.623 | 1.877 |
| | | $\Delta f_B$ (μm) | +0.66 | | |
| Temperature characteristic WFE rms | +30° C. | Y = 0 μm | 0.007λ | 3.363 | 1.137 |
| | −30° C. | | 0.019λ | 2.587 | 1.913 |

Note)
An amount of oscillation wavelength variation Δλ = +0.05 nm/° C. of the light source at the temperature change.

In this connection, in the present example, the negative lens 5 in the spherical aberration correction means is made transferable, however, the positive lens 4 may be made transferable, further, also when both lenses are made transferable, in the same manner, the variation of the spherical aberration of the converging optical system can be corrected. Further, in the present example, although the axial chromatic aberration of the converging optical system and the spherical aberration correction means is corrected by the diffractive structure provided on the positive lens 4 in the spherical aberration correction means, the diffractive structure may also be provided on the surface of the other lens, or the optical element having the surface provided with the diffractive structure may be separately added to the other portion.

EXAMPLE 14

The data relating to the optical system composed of a coupling lens 15, negative lens 5, positive lens 4 and objective lens 3 in the example 14 is shown in Table 27.

TABLE 27

Example 14
λ1 405 nm
NA 0.85

| Surface No. | | r(mm) | d(mm) | $N_{\lambda 1}$ | vd |
|---|---|---|---|---|---|
| | Light source | | 9.300 | | |
| 1 | Coupling lens | ∞ | 1.000 | 1.52491 | 56.5 |
| 2(Aspheric surface 1) | | −10.078 | d2 (variable) | | |
| 3(Aspheric surface 2) | Spherical aberration correction means | −7.701 | 0.800 | 1.52491 | 56.5 |
| 4 | | ∞ | d4 (variable) | | |
| 5(Diffractive surface 1) | | ∞ | 1.200 | 1.52491 | 56.5 |
| 6(Diffractive surface 2) | | −15.928 | 2.500 | | |
| 7(Diaphragm) | | ∞ | 0.000 | | |
| 8(Aspheric surface 3) | Objective lens | 1.194 | 2.650 | 1.52491 | 56.5 |
| 9(Aspheric surface 4) | | −0.975 | 0.355 | | |
| 10 | Transparent substrate | ∞ | 0.100 | 1.61949 | 30.0 |
| 11 | | ∞ | 0.000 | | |

Aspheric surface coefficient

Aspheric surface 1

| K | 18.245912 |
|---|---|
| $A_4$ | −0.281317E−02 |
| $A_6$ | 0.530301E−02 |
| $A_8$ | −0.297176E−02 |
| $A_{10}$ | 0.962649E−03 |

Aspheric surface 2

| K | −5.052328 |
|---|---|
| $A_4$ | −0.433879E−02 |
| $A_6$ | 0.267506E−02 |
| $A_8$ | 0.14128E−02 |
| $A_{10}$ | 0.388234E−03 |

Aspheric surface 3

| K | −0.683354 |
|---|---|
| $A_4$ | 0.162029E−01 |
| $A_6$ | 0.154908E−02 |
| $A_8$ | 0.289288E−02 |
| $A_{10}$ | −0.367711E−03 |
| $A_{12}$ | −0.358222E−03 |
| $A_{14}$ | 0.148419E−03 |
| $A_{16}$ | 0.119603E−03 |
| $A_{18}$ | −0.302302E−04 |
| $A_{20}$ | −0.110520E−04 |

Aspheric surface 4

| K | −21.704418 |
|---|---|
| $A_4$ | 0.308021 |
| $A_6$ | −0.639499 |
| $A_8$ | 0.585364 |
| $A_{10}$ | −0.215623 |
| $A_{12}$ | 0.252265E−03 |

TABLE 27-continued

Example 14
λ1 405 nm
NA 0.85

Diffractive surface coefficient

Diffractive surface 1

| $b_2$ | −1.1850E−02 |
|---|---|
| $b_4$ | −3.7111E−04 |

Diffractive surface 2

| $b_2$ | −1.5129E−02 |
|---|---|
| $b_4$ | 3.5690E−04 |

Figure 35:
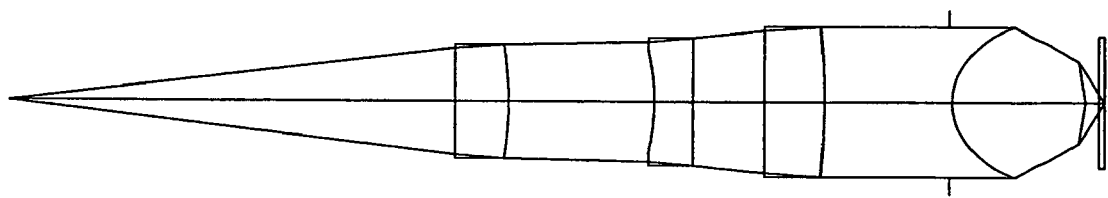
FIG. 35 is an optical system structural view of the collimator, negative lens 5, positive lens 4 and objective lens 3 according to the example 14.
Figure 36:
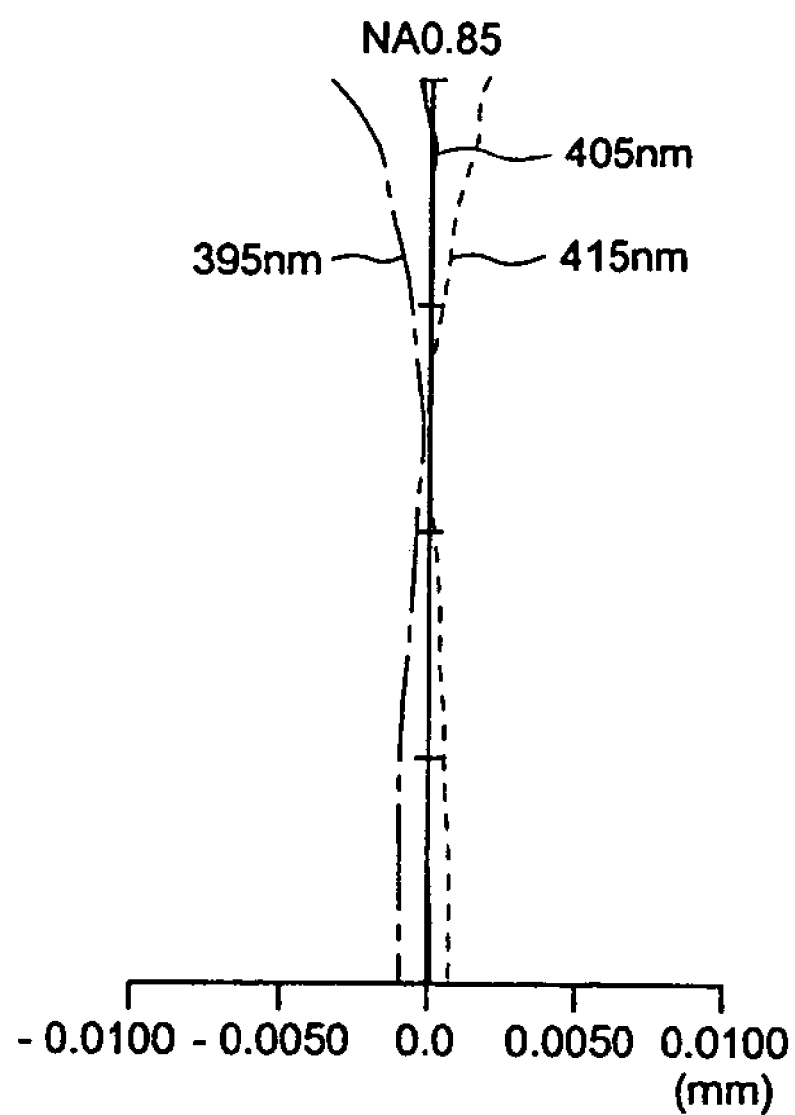
FIG. 36 is a spherical aberration view of the objective lens 3 according to the optical system of the example 14.

FIG. 35 is an optical system structural view of the coupling lens 15, negative lens 5, positive lens 4, and objective lens 3 according to the example 14. The coupling leans 15 has a function to convert the strong divergent light flux from the first light source 11 to the weak divergent light flux. FIG. 36 is a spherical aberration view according to the objective lens 3. In the example 14, the information is recorded or reproduced by the combination of the first light source 11 of the wavelength 405 nm and the image side numerical aperture NA 0.85 of the objective lens 3. In the example 14, by moving the negative lens 5 in the spherical aberration correction means along the optical axis direction, the slope angle of the marginal ray of the light flux incident to the objective lens 3 is changed, and the variation of the spherical aberration generated on each optical surface of the converging optical system (coupling lens 15 and the objective lens 3) is corrected. Further, in the present example, fN=−14.67 (mm), fP=11.66 (mm), and f1=1.765 (mm).

Further, diffractive surfaces are added to both surfaces of the positive lens 4, and the axial chromatic aberration having the inverse sign to that of the axial chromatic aberration generated by the optical surface of the converging optical system is generated by the spherical aberration correction means itself, thereby, the axial chromatic aberration generated by the optical surface of the converging optical system is corrected, and the axial chromatic aberration of the wave front when the focus is formed on the information recording plane is made fine. At the time, when the axial chromatic aberration of the composite system in which the converging optical system, and the negative lens 5 and the positive lens 4 as the spherical aberration correction means are combined, is corrected in the overcorrected condition, as shown in FIG. 36, the spherical aberration curve of the oscillation wavelength (405 nm) of the first light source 11 and the spherical aberration curve of the long·short wavelength side are crossed each other. Thereby, even when the mode hop phenomenon of the light source or the deterioration of the wave front aberration at the time of the high frequency superimposition is very small, for example, the oscillation wavelength of the light source is minutely varied, the shift of the position of the best image plane can be suppressed to small.

As can clearly be seen from Table 28, the variation of the spherical aberration generated on each optical surface of the converging optical system due to various factors, such as at the time of the wavelength variation or temperature change, can be corrected, and the spherical aberration becomes fine. Further, when the plastic material is used for all of the coupling lens 15 and objective lens 3, and the negative lens 5 and positive lens 4, constituting the spherical aberration correction means, the weight reduction of the optical system and the reduction of the burden onto the movable mechanism are attained. Further, because the plastic material whose permeability is high for the short wavelength light, is used, a large amount of lenses can be produced at low cost, and the optical system having the high efficiency of utilization is attained. Further, in the present example, because the incident light to the spherical aberration correction means is a weak divergent light flux, the power of the coupling lens 15 and the power of the negative lens 5 in the spherical aberration correction means may be small, and the deterioration of the wave front aberration due to the eccentricity of respective lenses can be suppressed to small.

TABLE 28

Example 14

| Cause of variation of spherical aberration | | Wave front aberration after correction | d2 (variable) | d4 (variable) |
|---|---|---|---|---|
| Reference condition ($\lambda$ = 405 nm, T = 25° C.) | Y = 0 μm Y = 10 μm | 0.004$\lambda$ 0.012$\lambda$ | 3.000 | 1.500 |
| Wavelength characteristic WFE rms | +10 nm −10 nm | Y = 0 μm $\Delta f_B$ (μm) Y = 0 μm $\Delta f_B$ (μm) | 0.003$\lambda$ −0.91 0.007$\lambda$ +0.75 | 3.308 2.658 | 1.192 1.842 |
| Temperature characteristic WFE rms | +30° C. −30° C. | Y = 0 μm | 0.008$\lambda$ 0.016$\lambda$ | 3.338 2.622 | 1.162 1.878 |

Note)
An amount of oscillation wavelength variation $\Delta\lambda$ = +0.05 nm/° C. of the light source at the temperature change.

In this connection, in the present example, the negative lens 5 in the spherical aberration correction means is made transferable, however, the positive lens 4 may be made transferable, further, also when both lenses are made transferable, in the same manner, the variation of the spherical aberration of the converging optical system can be corrected. Further, in the present example, although the axial chromatic aberration of the converging optical system and the spherical aberration correction means is corrected by the diffractive structure provided on the positive lens 4 in the spherical aberration correction means, the diffractive structure may also be provided on the surface of the other lens, or other than this, the optical element having the surface provided with the diffractive structure may be separately added to the system.

In each of examples described above, as the spherical aberration correction means, the beam expander is used, and as the beam expander, although an example in which it is structured by a transferable negative single lens and a positive single lens, is shown, of course, the expander is not limited to that, but it may be a structure composed of 2 lens group or more lens groups, composed of a plurality of lenses, and so long as it does not depart from the sprit of the present invention, various modifications are possible.

Figure 37:
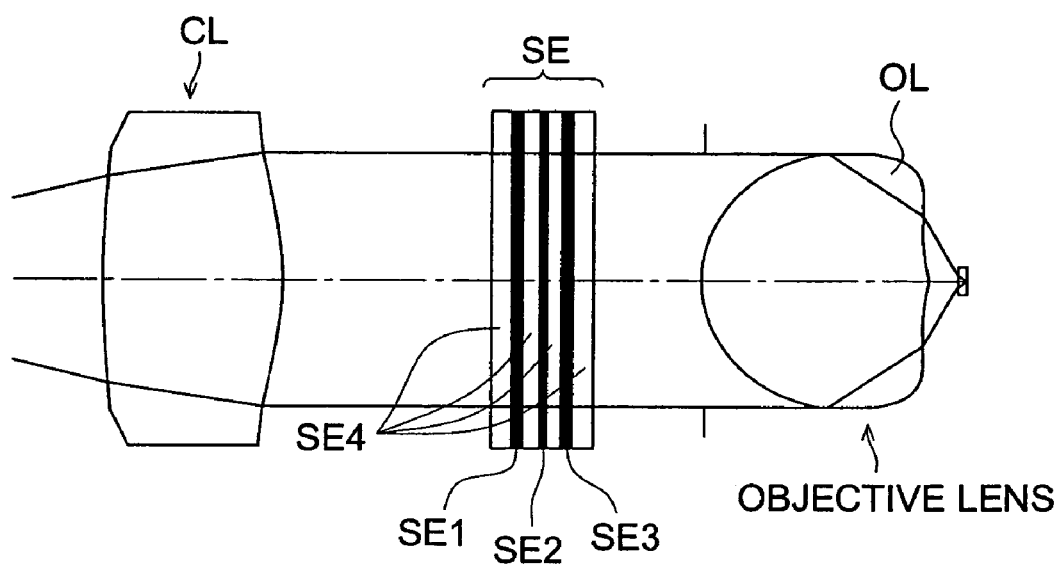
FIG. 37 is a view showing the optical system according to a different embodiment.

FIG. 37 is a view showing the optical system according to the different embodiment. An element SE for correcting the variation of the spherical aberration is inserted. Such the optical system can be used by replacing the negative lens 5, positive lens 4, and the objective lens 3 in FIG. 1.

The element SE is structured such that the X direction liquid crystal element SE1, ½ wavelength plate SE2, and Y direction liquid crystal element SE3 are respectively sandwiched among 4 glass plates SE4 from the coupling lens CL side. By electrically driving both liquid crystal elements SE1 and SE2, the variation of the spherical aberration can be corrected. Further, when the ring-shaped diffractive structure (not shown) is provided on the surface of the objective lens in the coupling lens CL, the chromatic aberration of the opposite phase to the axial chromatic aberration generated in the objective lens OL, that is, the axial chromatic aberration which is excessively corrected (over)on the short wavelength side, and the axial chromatic aberration which is insufficiently corrected (under) on the long wavelength side, can be generated. As the result, because the axial chromatic aberration is canceled, the wave front when the focus is formed on the optical information recording medium (not shown) through the element SE for correcting the variation of the spherical aberration and the objective lens OL, becomes the condition in which the axial chromatic aberration is suppressed to small.

Figure 38:
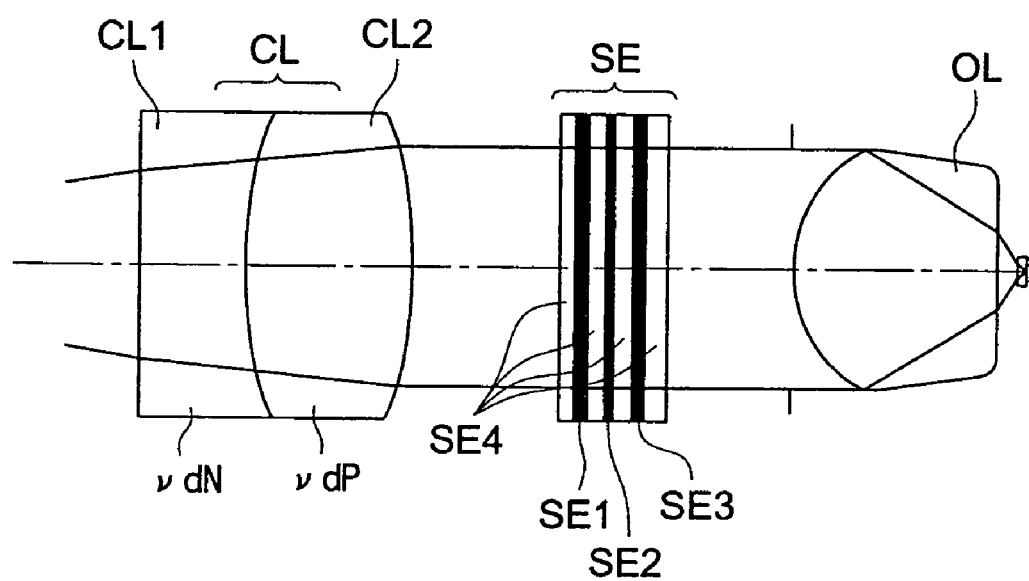
FIG. 38 a view showing the optical system according to a modified example of the present embodiment.

FIG. 38 is a view showing the optical system according to the modification of the present embodiment. In FIG. 38, because the objective lens OL and the element SE for correcting the variation of the spherical aberration are the same as in the embodiment shown in FIG. 37, the explanation is omitted. In FIG. 38, the coupling lens CL has the composition in which the negative lens CL1 and the positive lens CL2 are cemented together, and Abbe's number vdN of the negative lens CL1 and Abbe's number vdP of the positive lens CL2 have the relationship of vdN<vdP.

As described above, when Abbe's numbers of the negative lens CL1 and the positive lens CL2 are selected appropriately, the coupling lens CL generates the axial chromatic aberration having the opposite sign to that of the axial chromatic aberration generated by the objective lens OL, that is, the overcorrected axial chromatic aberration as the wavelength decreases, and the undercorrected axial chromatic aberration as the wavelength increases, can be generated.

As the result, because the axial chromatic aberration is canceled, the wave front when the focus is formed on the optical information recording medium (not shown) through the coupling lens CL1 the element SE for correcting the variation of the spherical aberration and the objective lens OL, becomes the condition in which the axial chromatic aberration is suppressed to small.

FIG. 39 is a sectional view (a) typically showing an objective lens 3' applicable for the optical pick-up apparatus of the present embodiment, and a front view (b) viewed from the light source side. (Dashed line shows the optical axis.)

This objective lens 3' can conduct the correction of the spherical aberration deviation due to the difference of the transparent substrate thickness of different optical information recording media. In FIG. 36, the refractive surface S1 on the light source side and the refractive surface S2 on the optical disk side are both convex lenses having the positive refracting power, which are aspherically shaped. Further, the refractive surface S1 on the light source side of the objective lens is structured by 4 divided surfaces b1 to b4, coaxially with the optical axis. The borders of the divided surfaces are provided with steps, and respective divided surfaces are formed. According to that, the spherical aberration and the wave front aberration of the objective lens generate steps at portions corresponding to the border portions.

In the ordinary objective lens, the generation of the spherical aberration due to the difference in the transparent substrate thickness of different information recording media can not be avoided. However, the objective lens 3' used in the present embodiment can not perfectly correct the spherical aberration, however, as will be described below, it is designed so that such the aberration is more softened.

Initially, when the information is reproduced and/or recorded for the first optical information recording medium, the refractive surface S1 and the refractive surface S2 are designed so that the spherical aberration component of the wave front aberration is within 0.05 λ1 rms at the best image surface position. The refractive surface S1 designed according to this is applied for the first divided surface b1 and the fourth divided surface b4. Then, the new refractive surface S1' is designed without using the refractive surface S2 as a variable, so that the spherical aberration component of the wave front aberration is within 0.05 λ2 rms at the best image surface position in the transparent substrate thickness t3 (t1≦t3≦t2).

This refractive surface S1' is made the second divided surface b2 and the third divided surface b3, and because the transparent substrate thickness is optimized by the transparent substrate thickness t3, at the time of the use of the first optical disk 10, the best image surface position is apparently formed at the position different from the best image surface position formed by the first divided surface b1 and the fourth divided surface b4. However, the wave front aberration is the aberration in which the inclination of the wave front aberration in the divided surface is changed and for example, in the first optical information recording medium (for example, the next generation optical disk with the higher density and capacity than the DVD), the wave front aberration is right-downward, and in the second optical information recording medium (for example, DVD), reversely, it is a little right-upward. When such the divided surfaces are partly provided more than 2 on the refractive surface S1, the compatibility of the wave front aberrations in the different optical information recording media becomes easy.

When the border position of each divided surface or the axial thickness of the divided surface is appropriately designed, the wave front aberration correction becomes possible respectively at the beam spot minimum blur-circle position in the next generation optical disk with the higher density and capacity than the DVD, and in the DVD, at the front focusing position. That is, in the next generation optical disk with the higher density and capacity than the DVD, the light is converged at the beam spot minimum blur-circle position by the objective lens, and the ray of light in the first to fourth light flux LB1 to LB4 has the spherical aberration of about several times of the wavelength λ1, that is, miλ1 (mi is integer and i=1, 2, . . . , k), at the beam spot minimum blur-circle position.

Further, because, in the DVD, the necessary numerical aperture NA2 is smaller than NA1, all of the first to fourth light fluxes LB1 to LB4 may not be effectively used, and in the optical pick-up apparatus of the present embodiment, the rays of light in the first to third light fluxes LB1 to LB3 have almost integer times of the wavelength λ2, niλ2 (ni is integer and i=1, 2, . . . , k). The fourth light flux LB4 is the unnecessary light in the case of the DVD, and is emitted as a flare at the position separated from the main spot light on the recording surface of the optical disk. Because this flare is vary small to the main spot light, when the diaphragm 8 is only remained as the equivalent to the necessary numerical aperture for the next generation optical disk with the higher density and capacity than the DVD, the reproduction of the DVD can be conducted without requiring the means for changing the numerical aperture of the diaphragm 8. Of course, at the time of the use of DVD, the diaphragm 8 having the function to shield the fourth light flux LB4 may be used.

Accordingly, although the optical pick-up apparatus of the present example is provided with 4 divided surfaces b1 to b4, different from the objective lens of the related art, because it does not have a plurality of focal positions on each disk, the loss of the spot light amount can be reduced. Then, at the time of the use of each optical disk, the wave front aberration of the ray of light in the necessary numerical aperture is made almost integer times of the wavelength, and because the light fluxes passing through the necessary numerical aperture interfere with each other and enhance each other, the central intensity of the spot light is enhanced, and as the result; the sufficient reflection light amount from the optical disk is obtained, and as the interchangeable optical pick-up apparatus, the stable operation becomes possible.

In this connection, in the present example, 4 divided surfaces are provided on the objective lens, however, an objective lens with the surface having 3 portions to divide the incident light flux into practically 3 light fluxes, so as to be basically 3 divided surfaces, can also be used for the objective lens of the present invention. For example, it is a well known objective lens structured such that it has, on at least one surface, at least the first portion, the second portion and the third portion which divide the light flux emitted from the light source into a plurality of light fluxes by the refractive action in the order from the optical axis side toward its outer periphery, wherein the first portion and the third portion can converge the light flux from the light source onto the information recording plane so that these can record or reproduce the information for the information recording plane of the first optical information recording medium of the transparent substrate thickness t1, and further, the first portion and the second portion can converge the light flux from the light source onto the information recording plane so that these can record or reproduce the information for the information recording plane of the second optical information recording medium of the transparent substrate thickness t2 (t1<t2).

According to the present embodiment, an optical pick-up apparatus and optical system which can effectively correct the axial chromatic aberration due to the mode hopping of the semiconductor laser, an optical pick-up apparatus and optical system which can effectively correct the variation of the spherical aberration of the converging optical system due to the temperature and humidity change, and an optical pick-up apparatus which is provided with the short wavelength laser and the high NA objective lens, and which can record or reproduce the information for the different kind of optical information recording media, can be provided. In this connection, of course, the present invention is not limited to the above embodiments or various examples.

A preferred embodiment of the invention will be explained as follows, referring to drawings. FIG. 40 is a schematic structure diagram of an optical pick-up apparatus pertaining to Embodiment 15.

The optical pick-up apparatus in FIG. 40 is equipped with semiconductor laser 3 representing a light source, coupling lens 2 (composed of two lens groups, namely of lens elements 2a and 2b wherein lens element 2a has positive refractive power, while lens element 2b has negative refractive power, and this applies also to the following embodiment) that changes a divergence angle of a divergent light emitted from light source 3, objective lens 1 that converges a light flux coming from coupling lens 2 on information recording plane 5 of an optical information recording medium, and detector 4 that receives reflected light from the information recording plane 5 of the optical information recording medium. The coupling lens 2 and the objective lens 1 constitute a converging optical system.

The optical pick-up apparatus in FIG. 40 is further equipped with beam splitter 6 that separates reflected light coming from information recording plane 5 toward detector 4, ¼ wavelength plate 7 provided between coupling lens 2 and objective lens 1, diaphragm 8 provided to be ahead of objective lens 8, cylindrical lens 9, and actuator for focus tracking (first driving device: this applies also to the following embodiment) 10.

Further, the objective lens 1 has on its outer circumference flange portion 1a having a plane extending in the direction perpendicular to an optical axis. This flange portion 1a makes it possible to mount the objective lens 1 accurately on the optical pick-up apparatus. Biaxial actuator 10 makes the objective lens 1 to be capable of moving in the direction of an optical axis for focusing, and of moving in the direction perpendicular to an optical axis for tracking.

Coupling lens 2 may also be a collimator lens that makes a divergent light flux which has entered to be a light flux that is almost in parallel with an optical axis. In the present embodiment, lens element 2a of the coupling lens 2 is made to be capable of moving in the direction of an optical axis by actuator (second driving device: this applies also to the following embodiment) 11, for the purpose of correcting deviation of spherical aberration caused on each optical surface of the optical pick-up apparatus by changes of oscillation wavelength of semiconductor laser 3, changes of temperature and humidity, and errors of a thickness of a transparent substrate of an optical information recording medium.

EXAMPLE

Next, Example 15 of a converging optical system which can be applied to the present embodiment will be explained as follows. In the Example 15 and other examples, light source wavelength of semiconductor laser 3 is made to be 405 nm, and a numerical aperture of objective lens 1 is made to be 0.85. With regard to an aspherical surface in Example 15, it is expressed by the following expression (numeral 1) under the condition that x axis represents the direction of an optical axis, h represents a height in the direction perpendicular to an optical axis and r represents a radius of curvature of a plane, in which K represents the constant of the cone and $A_{2i}$ represents the constant of the aspheric surface.

$$X = \frac{h^2/r}{1+\sqrt{1-(1+\kappa)h^2/r^2}} + \sum_{i=2} A_{2i} h^{2i}$$ (Numeral 1)

On the other hand, with respect to a diffractive surface, it is expressed with a generating aspheric surface showing a macroscopic shape where a diffraction relief is removed and with function of optical path difference $\Phi b$ of the following expression (Numeral 2). The function of optical path difference $\Phi b$ is to express an optical path difference added to a diffraction light of the standard wavelength by the diffractive surface, and every time a value of the function of optical path difference $\Phi b$ is changed by $m\lambda$ (m is a diffraction order), a diffraction zone is provided. In the expression, h represents a difference from an optical axis, and $b_{2i}$ represents a coefficient of the function of optical path difference.

$$\phi_b = \sum_{i=1} b_{2i} h^{2i}$$ (Numeral 2)

Figure 41:
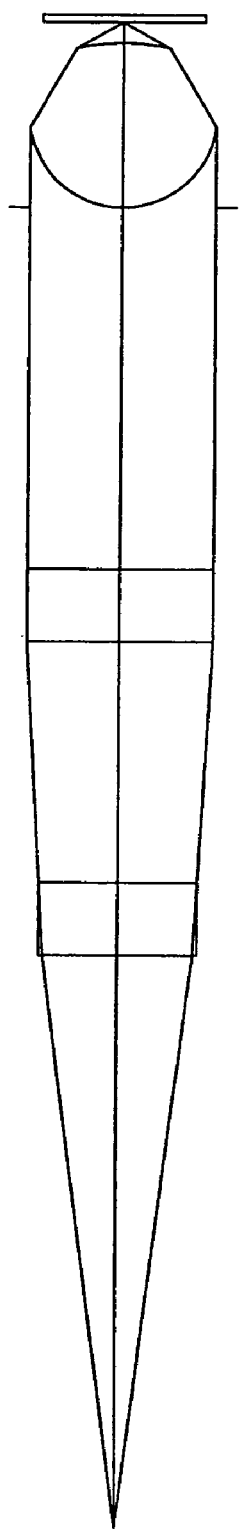
FIG. 41 is a sectional view of a converging optical system according to the example 15.
Figure 42:
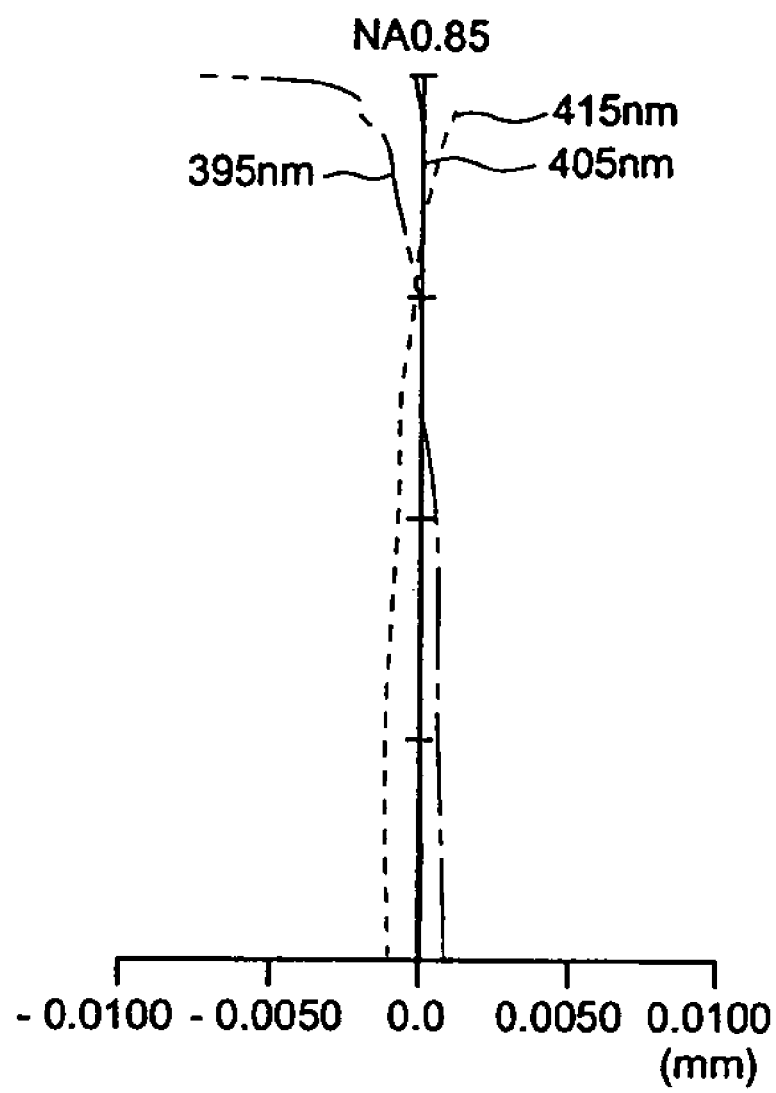
FIG. 42 is a spherical aberration view of the converging optical system according to the example 15.

Lens data of a converging optical system of Example 15 are shown in Table 29. Further, a schematic sectional view of a converging optical system of the present example is shown in FIG. 41, and a diagram of spherical aberration is shown in FIG. 42. In the present example, axial chromatic aberration caused on a converging optical system is corrected by operations of a diffractive structure provided on each of the first and third surfaces of coupling lens 2 having the structure of 2 elements in 2 groups. In addition, as shown in Table 30, spherical aberration caused on a converging optical system by wavelength deviation of laser light source 3, temperature changes and a thickness error of a transparent substrate can be corrected by changing a distance between lens elements 2a and 2b of coupling lens 2.

TABLE 29

Example 15
$\lambda 1$ 405 nm
NA 0.85

| Surface No. | | r(mm) | d(mm) | $N_{\lambda 1}$ | vd |
|---|---|---|---|---|---|
| 0 | Light source | | 9.524 | | |
| 1(Aspheric surface 1) | Coupling lens | ∞ | 1.200 | 1.52491 | 56.5 |
| 2(Diffractive surface 1) | | −41.291 | d2 (variable) | | |
| 3(Aspheric surface 2) | | ∞ | 1.200 | 1.52491 | 56.5 |
| 4(Diffractive surface 2) | | −40.155 | d4 (variable) | | |
| 5 | Diaphragm | | 0.000 | | |
| 6(Aspheric surface 3) | Objective lens | 1.194 | 2.650 | 1.52491 | 56.5 |
| 7(Aspheric surface 4) | | −0.975 | 0.355 | | |
| 8 | Transparent substrate | ∞ | 0.100 | 1.61949 | 30.0 |
| 9 | | ∞ | 0.000 | | |

Constant of the aspheric surface

Aspheric surface 1

| K | −6.0700E+02 |
|---|---|
| $A_4$ | 2.1101E−04 |
| $A_6$ | 6.3636E−04 |
| $A_8$ | −1.5044E−04 |

Aspheric surface 2

| K | −5.4018E+02 |
|---|---|
| $A_4$ | 7.6477E−04 |
| $A_6$ | −6.5149E−05 |
| $A_8$ | 4.6581E−05 |
| $A_{10}$ | −4.8124E−06 |

Aspheric surface 3

| K | −6.8335E−01 |
|---|---|
| $A_4$ | 1.6203E−02 |
| $A_6$ | 1.5491E−03 |
| $A_8$ | 2.8929E−03 |
| $A_{10}$ | −3.6771E−04 |
| $A_{12}$ | −3.5822E−04 |
| $A_{14}$ | 1.4842E−04 |
| $A_{16}$ | 1.1960E−04 |
| $A_{18}$ | −3.0230E−05 |
| $A_{20}$ | −1.1052E−05 |

Aspheric surface 4

| K | −2.1704E+01 |
|---|---|
| $A_4$ | 3.0802E−01 |
| $A_6$ | −6.3950E−01 |
| $A_8$ | 5.8536E−01 |
| $A_{10}$ | −2.1562E−01 |
| $A_{12}$ | −2.5227E−04 |

Constant of diffractive surface

Diffractive surface 1

| $b_2$ | −2.4126E−02 |
|---|---|
| $b_4$ | −8.7753E−04 |

TABLE 29-continued

| Diffractive surface 2 | |
|---|---|
| $b_2$ | −1.1228E−02 |
| $b_4$ | −8.6150E−04 |

TABLE 30

Example 15

| Causes of deviation of spherical aberration | | Wavefront aberration after correction | d2 (variable) | d4 (variable) |
|---|---|---|---|---|
| Standard state ($\lambda$ = 405 nm, T = 25° C., t = 0.100 mm) | | 0.004$\lambda$ | 4.000 | 6.000 |
| Wavelength deviation of light source | $\Delta\lambda$ = +10 nm | 0.005$\lambda$ | 2.545 | 7.455 |
| | $\Delta\lambda$ = −10 nm | 0.010$\lambda$ | 5.616 | 4.384 |
| Temperature change | $\Delta T$ = +30° C. | 0.010$\lambda$ | 2.279 | 7.721 |
| | $\Delta T$ = −30° C. | 0.018$\lambda$ | 6.064 | 3.906 |
| Error of thickness of transparent substrate | $\Delta t$ = +0.02 mm | 0.008$\lambda$ | 1.551 | 8.449 |
| | $\Delta t$ = −0.02 mm | 0.007$\lambda$ | 7.126 | 2.874 |

(Note)
Amount of change in oscillation wavelength of light source in temperature change $\Delta\lambda$ = +0.05 nm/° C.

Incidentally, in the present specifications (including lens data in Table), an exponent of 10 (for example, 2.5×10$^{-3}$) is expressed by the use of E (for example, 2.5×E-3).

Figure 43:
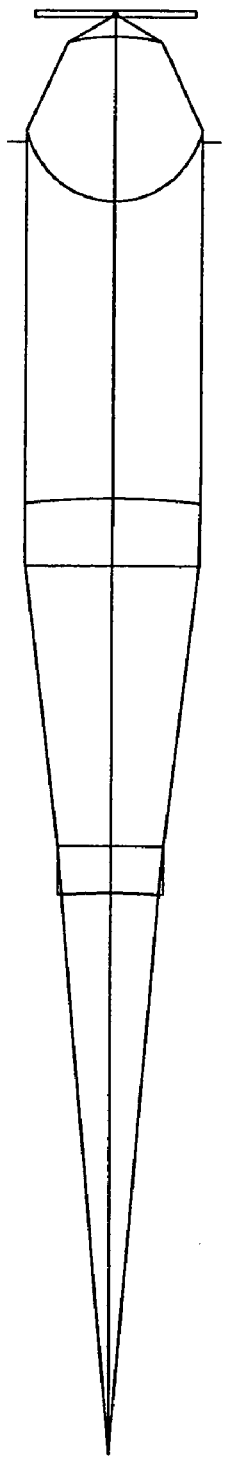
FIG. 43 is a sectional view of a converging optical system according to the example 16.
Figure 44:
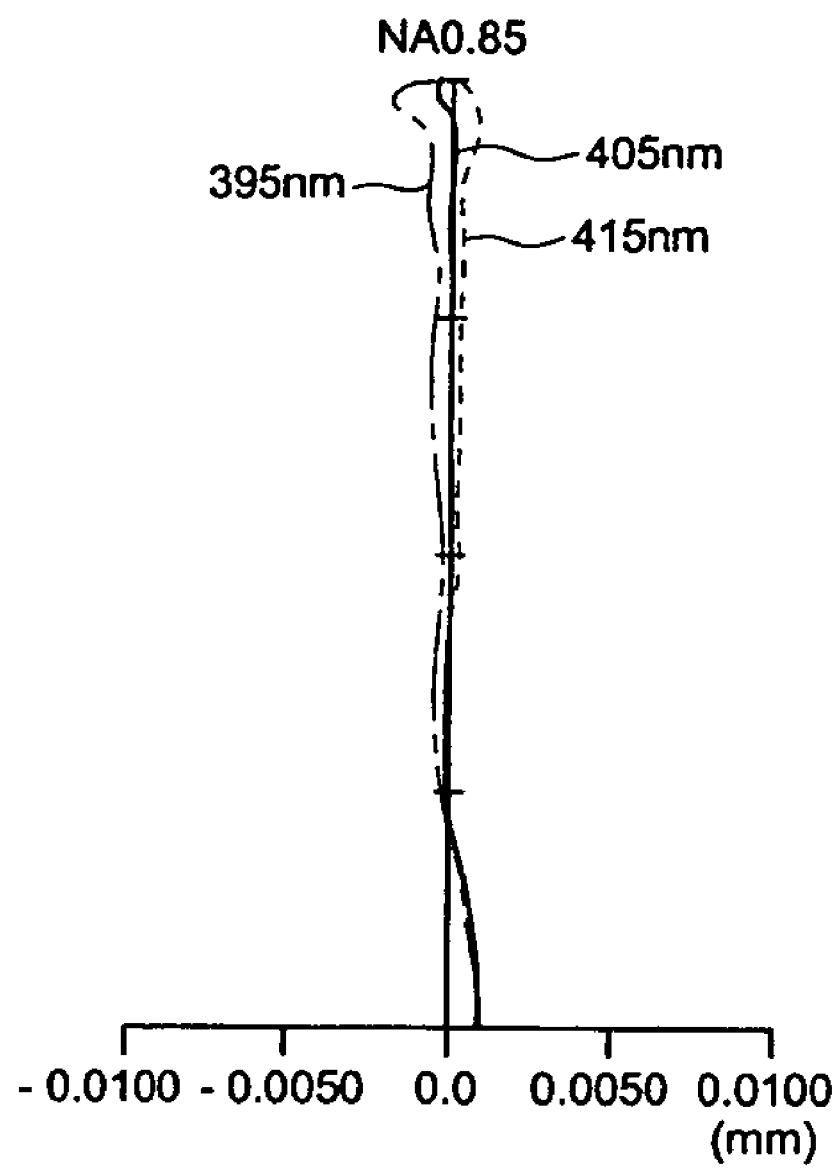
FIG. 44 is a spherical aberration view of the converging optical system according to the example 16.

Next, a converging optical system of Second Example which can be used for the optical pick-up apparatus in FIG. 40 will be explained. First, lens data of the converging optical system in the present example are shown in Table 31. Further, a schematic sectional view of the converging optical system in the present example is shown in FIG. 43 and a diagram of spherical aberration is shown in FIG. 44. In the present example, axial chromatic aberration caused on the converging optical system is corrected by operations of the diffractive structure provided on each of the third surface of coupling lens 2 of 2 elements in 2 groups and the first surface of objective lens 1 of 1 element in 1 group. Further, as shown in Table 32, spherical aberration caused on the converging optical system by wavelength deviation of laser light source 3, temperature changes and by an error of a thickness of a transparent substrate can be corrected by changing the distance between lens elements 2a and 2b of coupling lens 2. When a divergent light flux enters objective lens 1, a point on the surface of objective lens 1 on the light source side where a beam passes through is higher compared with an occasion wherein a collimated light flux passing through a diaphragm having the same diameter enters. For controlling occurrence of flare component by aspheric surface of a high order in that case, a diaphragm for regulating a light flux is arranged to be away from the top on the surface of objective lens 1 on the light source side toward an optical information recording medium, in the present example.

TABLE 31

Example 16

| Surface No. | | r(mm) | d(mm) | $N_{\lambda 1}$ | $\nu d$ |
|---|---|---|---|---|---|
| 0 | Light source | | d0 (variable) | | |
| 1(Aspheric surface 1) | Coupling lens | −18.828 | 0.800 | 1.52491 | 56.5 |
| 2(Diffractive surface 1) | | 16.312 | d2 (variable) | | |
| 3(Aspheric surface 2) | | 69.930 | 1.200 | 1.52491 | 56.5 |
| 4(Diffractive surface 2) | | −11.046 | 6.000 | | |
| 5 | Diaphragm | | −1.000 | | |
| 6(Aspheric surface 3) | Objective lens | 1.247 | 2.750 | 1.52491 | 56.5 |
| 7(Aspheric surface 4) | | −0.861 | 0.330 | | |
| 8 | Transparent substrate | ∞ | 0.100 | 1.61949 | 30.0 |
| 9 | | ∞ | 0.000 | | |

Constant of the aspheric surface

Aspheric surface 1

| K | 8.8068E+00 |
|---|---|
| $A_4$ | 1.3574E−03 |
| $A_6$ | −3.0031E−02 |
| $A_8$ | −4.1461E−04 |

Aspheric surface 2

| K | −6.6272E+02 |
|---|---|
| $A_4$ | −2.0667E−03 |
| $A_6$ | −7.2622E−03 |
| $A_8$ | −7.6379E−03 |

Aspheric surface 3

| K | −3.9217E+00 |
|---|---|
| $A_4$ | 3.7182E−04 |
| $A_6$ | 8.0750E−04 |
| $A_8$ | 1.1443E−04 |
| $A_{10}$ | 5.3543E−05 |

Aspheric surface 4

| K | −7.0271E−01 |
|---|---|
| $A_4$ | 2.0793E−02 |
| $A_6$ | −2.5985E−03 |
| $A_8$ | 4.9919E−03 |
| $A_{10}$ | −2.2786E−04 |
| $A_{12}$ | −9.5332E−04 |
| $A_{14}$ | 4.6404E−05 |
| $A_{16}$ | 1.7553E−04 |
| $A_{18}$ | 2.1430E−05 |
| $A_{20}$ | −2.9990E−05 |

Aspheric surface 5

| K | −2.7384E+01 |
|---|---|
| $A_4$ | 1.3778E−01 |
| $A_6$ | −3.2821E−01 |
| $A_8$ | 2.6291E−01 |
| $A_{10}$ | −7.8115E−02 |
| $A_{12}$ | −2.5227E−04 |

Constant of diffractive surface

Diffractive surface 1

| $b_2$ | −1.6978E−02 |
|---|---|
| $b_4$ | 7.8786E−04 |
| $b_6$ | −9.5788E−04 |
| $b_8$ | −6.4481E−05 |
| $b_{10}$ | 3.1466E−06 |

Diffractive surface 2

| $b_2$ | −4.9893E−03 |
|---|---|
| $b_4$ | −3.7597E−04 |

TABLE 32

Example 16

| Causes of deviation of spherical aberration | | Wavefront aberration after correction | d2 (variable) | d4 (variable) |
|---|---|---|---|---|
| Standard state ($\lambda$ = 405 nm, T = 25° C., t = 0.100 mm) | | 0.006$\lambda$ | 9.300 | 4.700 |
| Wavelength deviation of light source | $\Delta\lambda$ = +10 nm | 0.007$\lambda$ | 9.385 | 4.615 |
| | $\Delta\lambda$ = −10 nm | 0.008$\lambda$ | 9.187 | 4.813 |
| Temperature change | $\Delta T$ = +30° C. | 0.018$\lambda$ | 9.508 | 4.492 |
| | $\Delta T$ = −30° C. | 0.026$\lambda$ | 9.079 | 4.921 |
| Error of thickness of transparent substrate | $\Delta t$ = +0.02 mm | 0.016$\lambda$ | 9.818 | 4.182 |
| | $\Delta t$ = −0.02 mm | 0.019$\lambda$ | 8.673 | 5.327 |

(Note)
Amount of change in oscillation wavelength of light source in temperature change $\Delta\lambda$ = +0.05 nm/° C.

Figure 45:
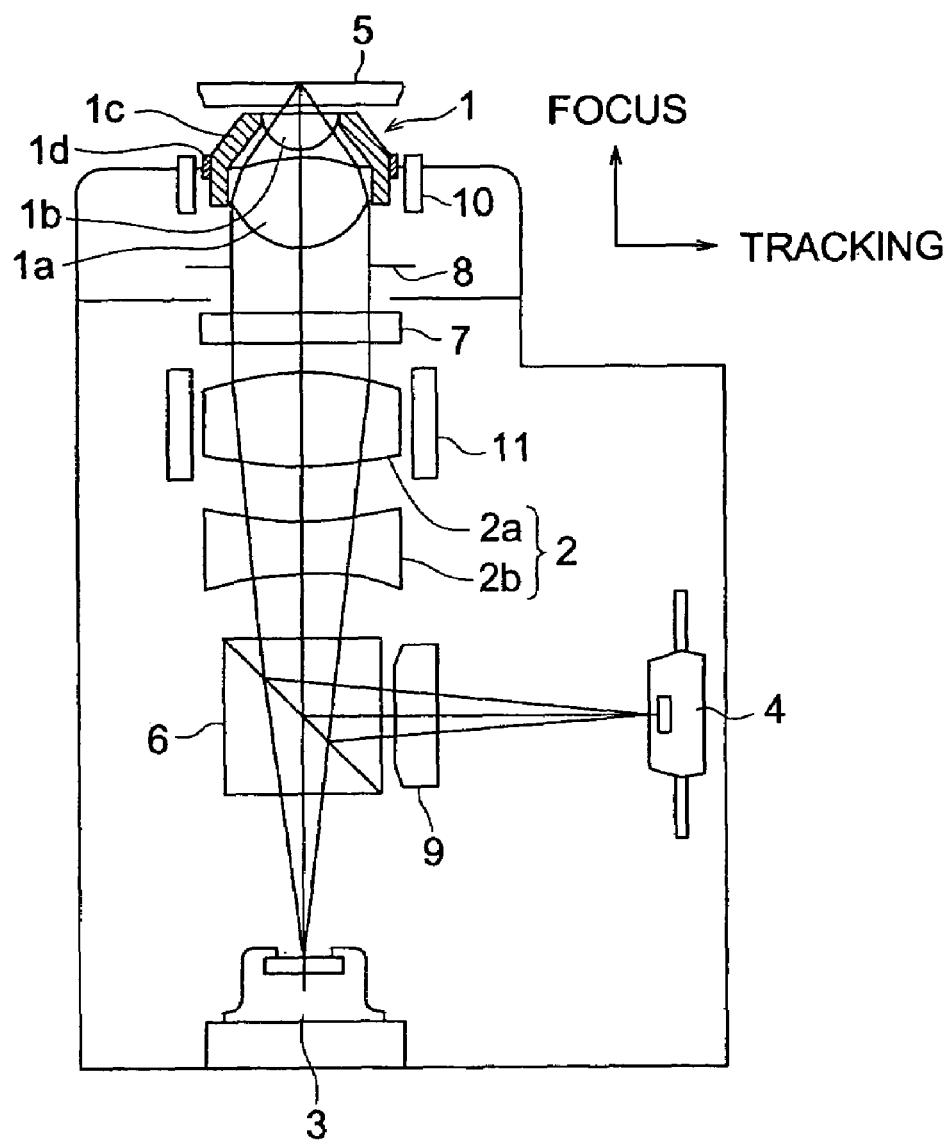
FIG. 45 is an outlined structural view of an optical pickup apparatus according to the example 16.
Figure 46:
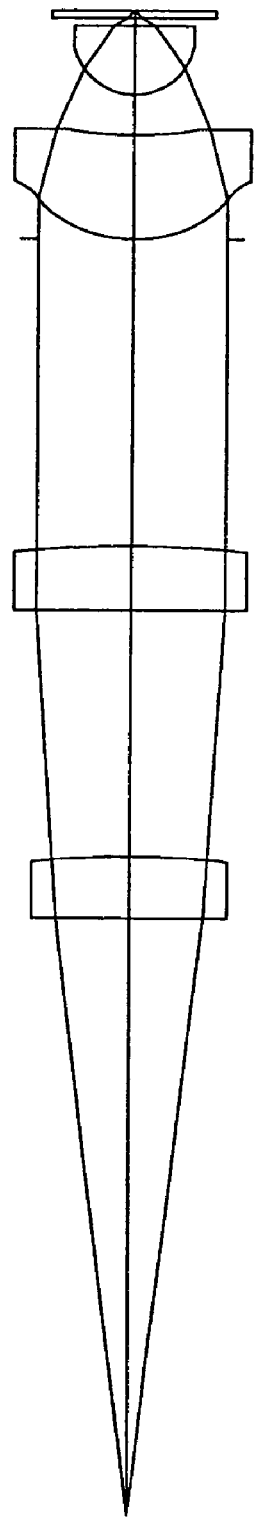
FIG. 46 is a sectional view of a converging optical system according to the example 17.
Figure 47:
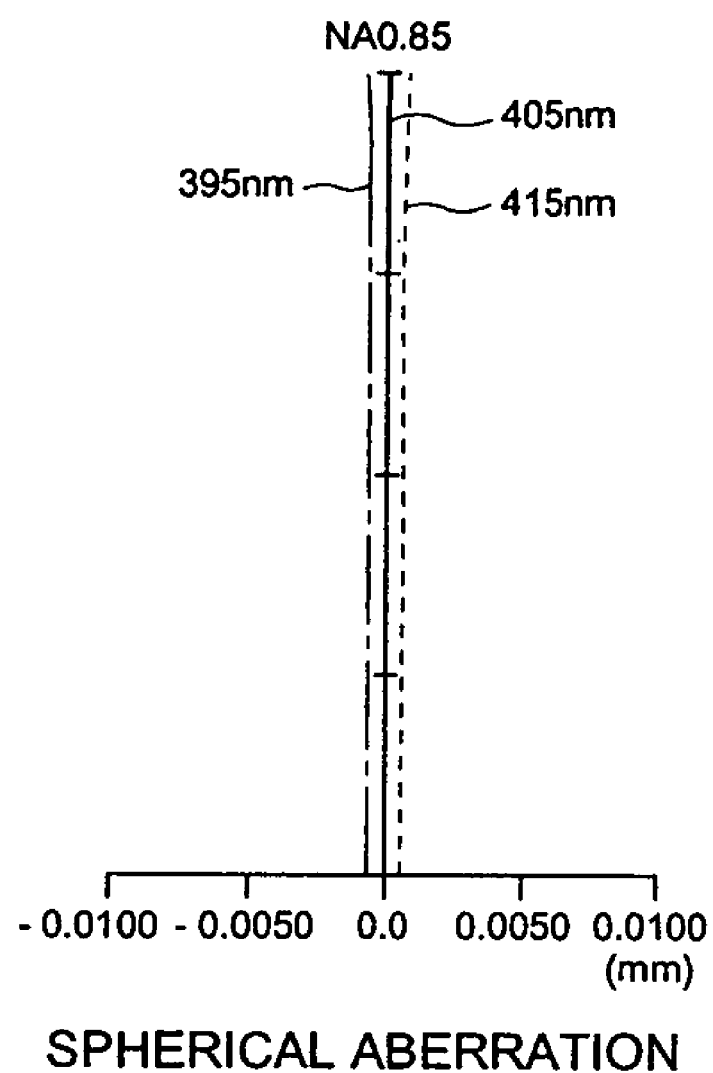
FIG. 47 is a spherical aberration view of the converging optical system according to the example 17.

Next, an optical pick-up apparatus relating to Embodiment 16 will be explained. An optical pick-up apparatus shown in FIG. 45 is provided with objective lens 1 of 2 elements in 2 groups wherein plastic lenses 1a and 1b are held solidly by holding member 1c, semiconductor laser 3 representing a light source, coupling lens 2 (composed of lens elements 2a and 2b) that changes a divergence angle of a divergent light emitted from the light source, and detector 4 which receives reflected light from information recording plane 5 of the optical information recording medium. The objective lens 1 converges a light flux coming from the coupling lens 2 on information recording plane 5 of the optical information recording medium.

The optical pick-up apparatus shown in FIG. 405 is provided with beam splitter 6 that separates reflected light coming from information recording plane 5 toward detector 4, ¼ wavelength plate 7 arranged between coupling lens 2 and objective lens 1, diaphragm 8 arranged to be ahead of objective lens 1, cylindrical lens 9 and biaxial actuator 10 for focus tracking.

Further, the objective lens 1 has, on the outer circumference of its holding member 1c, flange portion 1d having a plane extending in the direction perpendicular to an optical axis. This flange portion id makes it possible to mount the objective lens 1 accurately on the optical pick-up apparatus.

The coupling lens 2 may also be a collimator lens that makes an entering divergent light flux to be a light flux that is mostly in parallel with an optical axis. In this case, lens element 2a of the coupling lens 2 is made to be capable of moving in the direction of an optical axis, for the purpose of controlling deviation of spherical aberration caused on each optical surface of the optical pick-up apparatus by changes of oscillation wavelength of semiconductor laser 3, changes of temperature and humidity, and errors of a thickness of a transparent substrate of an optical information recording medium.

Next, Example 17 of a converging optical system which can be used for the present embodiment will be explained. First, lens data of the converging optical system in the present example are shown in Table 33. Further, a schematic sectional view of the converging optical system in the present example is shown in FIG. 8. In the present example, axial chromatic aberration caused on the converging optical system is corrected by operations of the diffractive structure provided on each of the first and third surfaces of coupling lens 2 of a 2 elements in 2 groups. Further, as shown in Table 34, spherical aberration caused on the converging optical system by wavelength deviation of laser light source 3, temperature changes and by an error of a thickness of the transparent substrate can be corrected by changing the distance between lens elements 2a and 2b of coupling lens 2.

TABLE 33

Example 17

| Surface No. | | r(mm) | d(mm) | $N_{\lambda 1}$ | $\nu d$ |
|---|---|---|---|---|---|
| 0 | Light source | | 9.557 | | |
| 1(Aspheric surface 1) | Coupling lens | ∞ | 1.000 | 1.52491 | 56.5 |
| 2(Diffractive surface 1) | | −17.290 | d2 (variable) | | |
| 3(Aspheric surface 2) | | ∞ | 1.000 | 1.52491 | 56.5 |
| 4(Diffractive surface 2) | | −23.158 | d4 (variable) | | |
| 5 | Diaphragm | | 0.000 | | |
| 6(Aspheric surface 3) | Objective lens | 1.870 | 1.700 | 1.52491 | 56.5 |
| 7(Aspheric surface 4) | | 21.104 | 0.600 | | |
| 8(Aspheric surface 5) | | 0.916 | 1.100 | | |
| 9 | | ∞ | 0.150 | | |
| 10 | Transparent substrate | ∞ | 0.100 | 1.61949 | 30.0 |
| 11 | | ∞ | 0.000 | | |

Constant of the aspheric surface

Aspheric surface 1

| K | −2.1849E+01 |
|---|---|
| $A_4$ | 5.6259E−04 |
| $A_6$ | 6.5164E−04 |
| $A_8$ | −9.6165E−05 |

Aspheric surface 2

| K | −2.6544E+01 |
|---|---|
| $A_4$ | 6.8751E−04 |
| $A_6$ | 2.4489E−04 |
| $A_8$ | 2.9894E−05 |

Aspheric surface 3

| K | −1.1034E−01 |
|---|---|
| $A_4$ | −6.0609E−03 |
| $A_6$ | −1.2828E−03 |
| $A_8$ | −5.4230E−04 |
| $A_{10}$ | −1.0053E−04 |
| $A_{12}$ | −3.1022E−06 |
| $A_{14}$ | 1.3974E−08 |
| $A_{16}$ | −8.2488E−06 |

Aspheric surface 4

| K | 1.0547E+02 |
|---|---|
| $A_4$ | 7.2959E−03 |
| $A_6$ | −1.8973E−03 |
| $A_8$ | 4.8022E−04 |
| $A_{10}$ | −2.1096E−03 |
| $A_{12}$ | 6.0792E−04 |

Aspheric surface 5

| K | −1.9362E−01 |
|---|---|
| $A_4$ | 1.8873E−02 |
| $A_6$ | −1.7301E−02 |
| $A_8$ | 1.1456E−01 |
| $A_{10}$ | −1.4290E−01 |

TABLE 33-continued

Constant of diffractive surface

Diffractive surface 1

| | |
|---|---|
| $b_2$ | −9.5885E−03 |
| $b_4$ | −8.0888E−04 |
| $b_6$ | −1.1868E−04 |

Diffractive surface 2

| | |
|---|---|
| $b_2$ | −9.5292E−03 |
| $b_4$ | −4.2952E−04 |
| $b_6$ | −2.2554E−04 |

TABLE 34

Example 17

| Causes of deviation of spherical aberration | | Wavefront aberration after correction | d2 (variable) | d4 (variable) |
|---|---|---|---|---|
| Standard state ($\lambda$ = 405 nm, T = 25° C., t = 0.100 mm) | | 0.001$\lambda$ | 4.000 | 5.000 |
| Wavelength deviation of light source | $\Delta\lambda$ = +10 nm | 0.004$\lambda$ | 4.130 | 4.870 |
| | $\Delta\lambda$ = −10 nm | 0.005$\lambda$ | 3.886 | 5.114 |
| Temperature change | $\Delta T$ = +30° C. | 0.006$\lambda$ | 4.785 | 4.215 |
| | $\Delta T$ = −30° C. | 0.008$\lambda$ | 3.249 | 5.751 |
| Error of thickness of transparent substrate | $\Delta t$ = +0.02 mm | 0.007$\lambda$ | 1.928 | 7.072 |
| | $\Delta t$ = −0.02 mm | 0.009$\lambda$ | 6.424 | 2.576 |

(Note)
Amount of change in oscillation wavelength of light source in temperature change $\Delta\lambda$ = +0.05 nm/° C.

Figure 48:
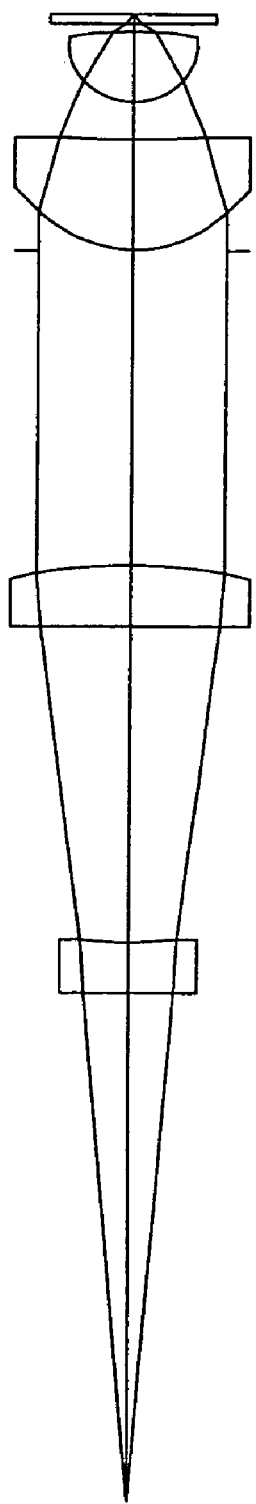
FIG. 48 is a sectional view of a converging optical system according to the example 18.
Figure 49:
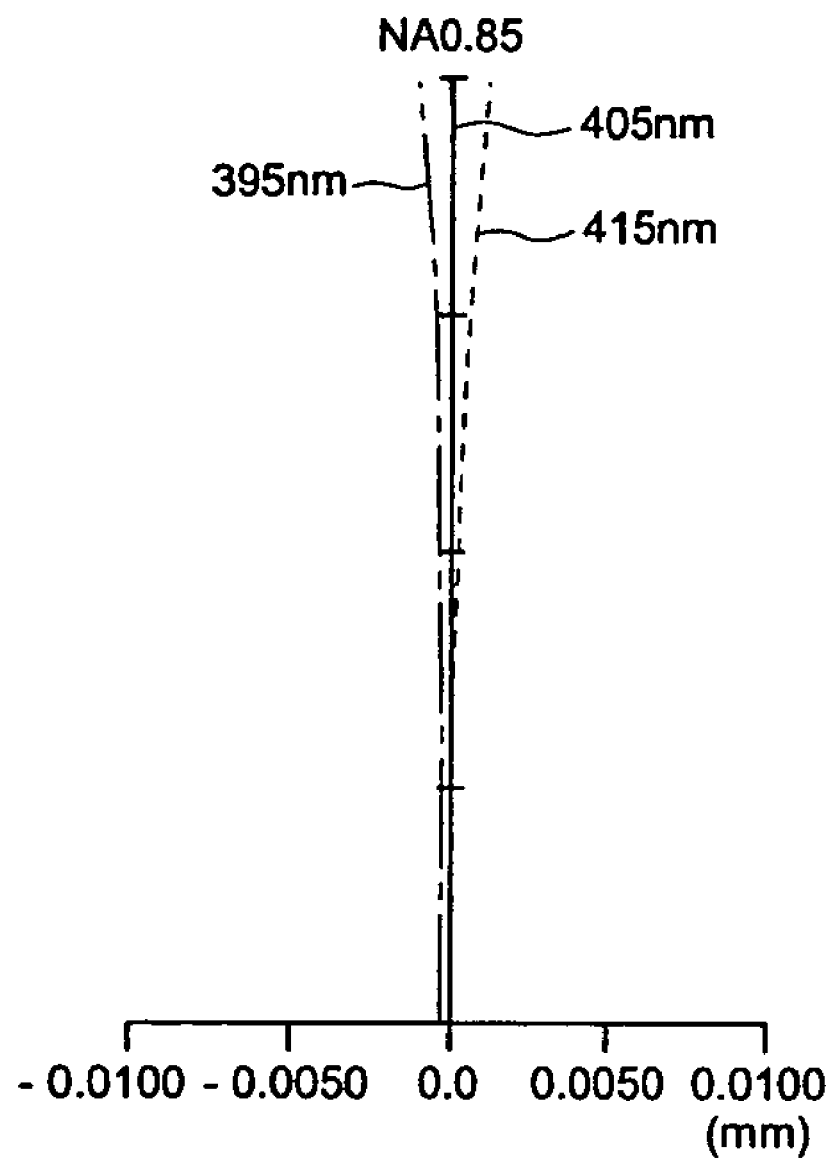
FIG. 49 is a spherical aberration view of the converging optical system according to the example 18.

Next, the converging optical system of Example 18 which can be used for the optical pick-up apparatus shown in FIG. 45 will be explained. First, lens data of the converging optical system in the present example are shown in Table 35. Further, a schematic sectional view of the converging optical system in the present example is shown in FIG. 48, and a diagram of spherical aberration is shown in FIG. 49. In the present example, axial chromatic aberration caused on the converging optical system is corrected by operations of the diffractive structure provided on each of the third surface of coupling lens 2 of a 2 elements in 2 groups and the first surface of the objective lens of 1 element in 1 group. Further, as shown in Table 36, spherical aberration caused on the converging optical system by wavelength deviation of laser light source 3, temperature changes and by an error of a thickness of the transparent substrate can be corrected by changing the distance between lens elements 2a and 2b of the coupling lens.

TABLE 35

Example 18

| Surface No. | | r(mm) | d(mm) | $N_{\lambda 1}$ | vd |
|---|---|---|---|---|---|
| 0 | Light source | | d0 (variable) | | |
| 1(Aspheric surface 1) | Coupling lens | −125.213 | 0.800 | 1.52491 | 56.5 |
| 2(Aspheric surface 2) | | 10.615 | d2 (variable) | | |
| 3(Diffractive surface 1) | | ∞ | 1.000 | 1.52491 | 56.5 |
| 4(Aspheric surface 3) | | −8.470 | 5.000 | | |
| 5 | Diaphragm | | 0.000 | | |
| 6(Aspheric surface 4, Diffractive surface 2) | Objective lens | 1.944 | 1.700 | 1.52491 | 56.5 |
| 7(Aspheric surface 5) | | 32.238 | 0.600 | | |
| 8(Aspheric surface 6) | | 0.959 | 1.100 | | |
| 9 | | ∞ | 0.150 | | |
| 10 | Transparent substrate | ∞ | 0.100 | 1.61949 | 30.0 |
| 11 | | ∞ | 0.000 | | |

Constant of the aspheric surface

Aspheric surface 1

| | |
|---|---|
| K | 1.8394E+03 |
| $A_4$ | −4.6322E−03 |
| $A_6$ | −2.1863E−03 |
| $A_8$ | −3.0571E−02 |

Aspheric surface 2

| | |
|---|---|
| K | −4.2244E+01 |
| $A_4$ | −2.1729E−04 |
| $A_6$ | −7.3557E−03 |
| $A_8$ | −1.4106E−02 |

Aspheric surface 3

| | |
|---|---|
| K | 3.7370E−01 |
| $A_4$ | −7.5808E−04 |
| $A_6$ | 6.2516E−05 |
| $A_8$ | −1.3333E−05 |
| $A_{10}$ | 5.5520E−06 |

Aspheric surface 4

| | |
|---|---|
| K | −1.0167E−01 |
| $A_4$ | −6.3824E−03 |
| $A_6$ | −1.0712E−03 |
| $A_8$ | −3.8459E−04 |
| $A_{10}$ | −8.7158E−05 |
| $A_{12}$ | 2.9718E−06 |
| $A_{14}$ | 8.3886E−06 |
| $A_{16}$ | −4.1865E−06 |

Aspheric surface 5

| | |
|---|---|
| K | −3.4728E+02 |
| $A_4$ | 3.1109E−03 |
| $A_6$ | 8.4223E−04 |
| $A_8$ | 2.7940E−03 |
| $A_{10}$ | −2.6177E−03 |
| $A_{12}$ | 1.0154E−03 |

Aspheric surface 6

| | |
|---|---|
| K | −2.9075E−01 |
| $A_4$ | 2.0673E−02 |
| $A_6$ | −2.2747E−02 |
| $A_8$ | 1.1245E−01 |
| $A_{10}$ | −9.7095E−02 |

Constant of diffractive surface

Diffractive surface 1

| | |
|---|---|
| $b_2$ | −1.3723E−02 |
| $b_4$ | 6.4381E−04 |

Diffractive surface 2

| | |
|---|---|
| $b_2$ | −6.3411E−03 |
| $b_4$ | −9.0875E−05 |

TABLE 36

Example 18

| Causes of deviation of spherical aberration | | Wavefront aberration after correction | d2 (variable) | d4 (variable) |
|---|---|---|---|---|
| Standard state ($\lambda$ = 405 nm, T = 25° C., t = 0.100 mm) | | 0.001$\lambda$ | 8.000 | 5.000 |
| Wavelength deviation of light source | $\Delta\lambda$ = +10 nm | 0.002$\lambda$ | 8.128 | 4.872 |
| | $\Delta\lambda$ = −10 nm | 0.001$\lambda$ | 7.873 | 5.127 |
| Temperature change | $\Delta T$ = +30° C. | 0.004$\lambda$ | 7.837 | 5.163 |
| | $\Delta T$ = −30° C. | 0.006$\lambda$ | 8.162 | 4.838 |
| Error of thickness of transparent substrate | $\Delta t$ = +0.02 mm | 0.003$\lambda$ | 8.579 | 4.421 |
| | $\Delta t$ = −0.02 mm | 0.006$\lambda$ | 7.357 | 5.643 |

(Note)
Amount of change in oscillation wavelength of light source in temperature change $\Delta\lambda$ = +0.05 nm/° C.

Figure 50:
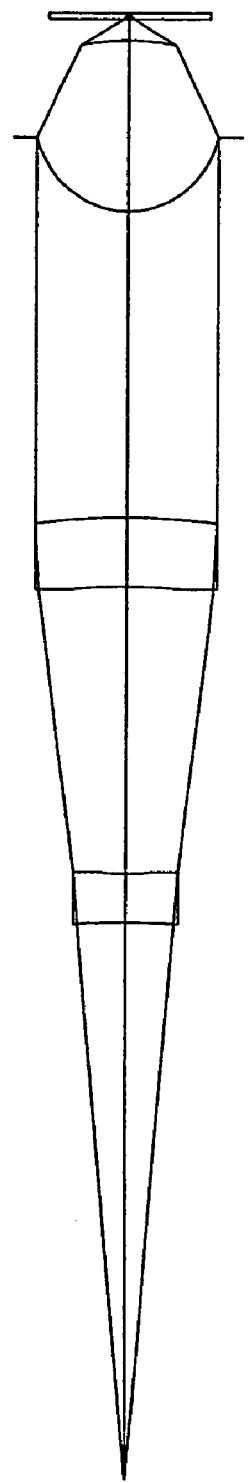
FIG. 50 is a sectional view of a converging optical system according to the example 19.
Figure 51:
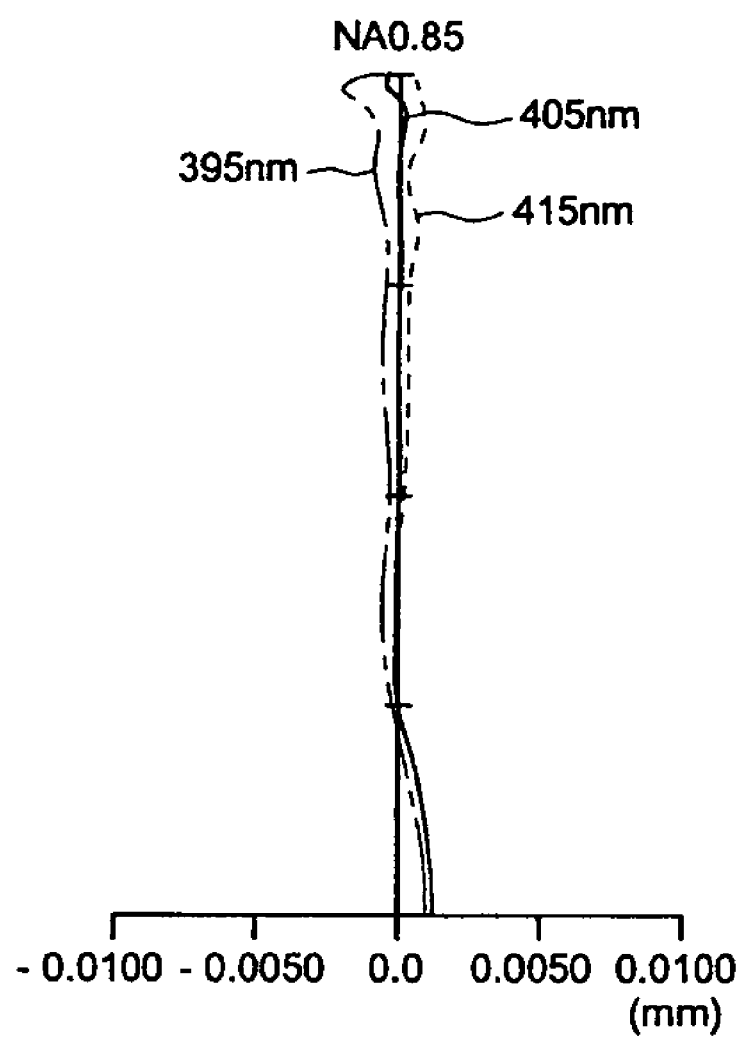
FIG. 51 is a spherical aberration view of the converging optical system according to the example 19.
Figure 52:
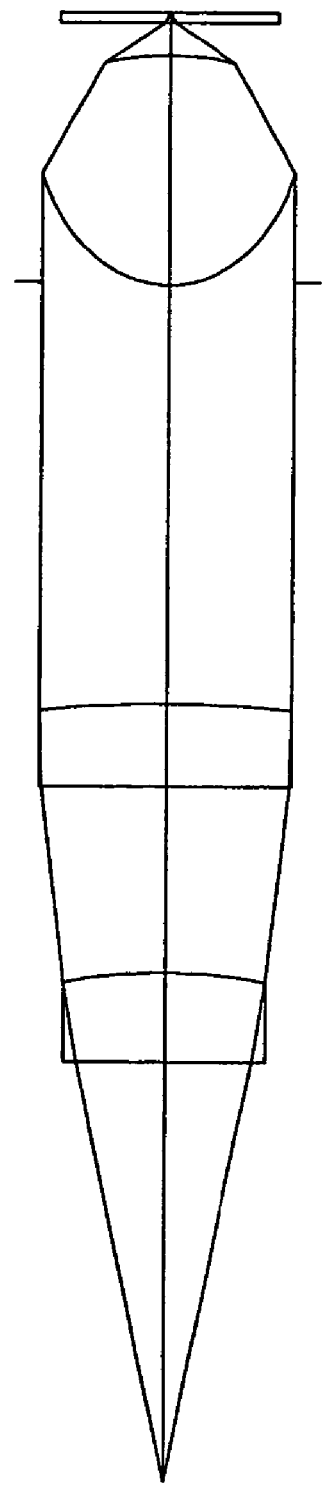
FIG. 52 is a sectional view of a converging optical system according to the example 20.
Figure 53:
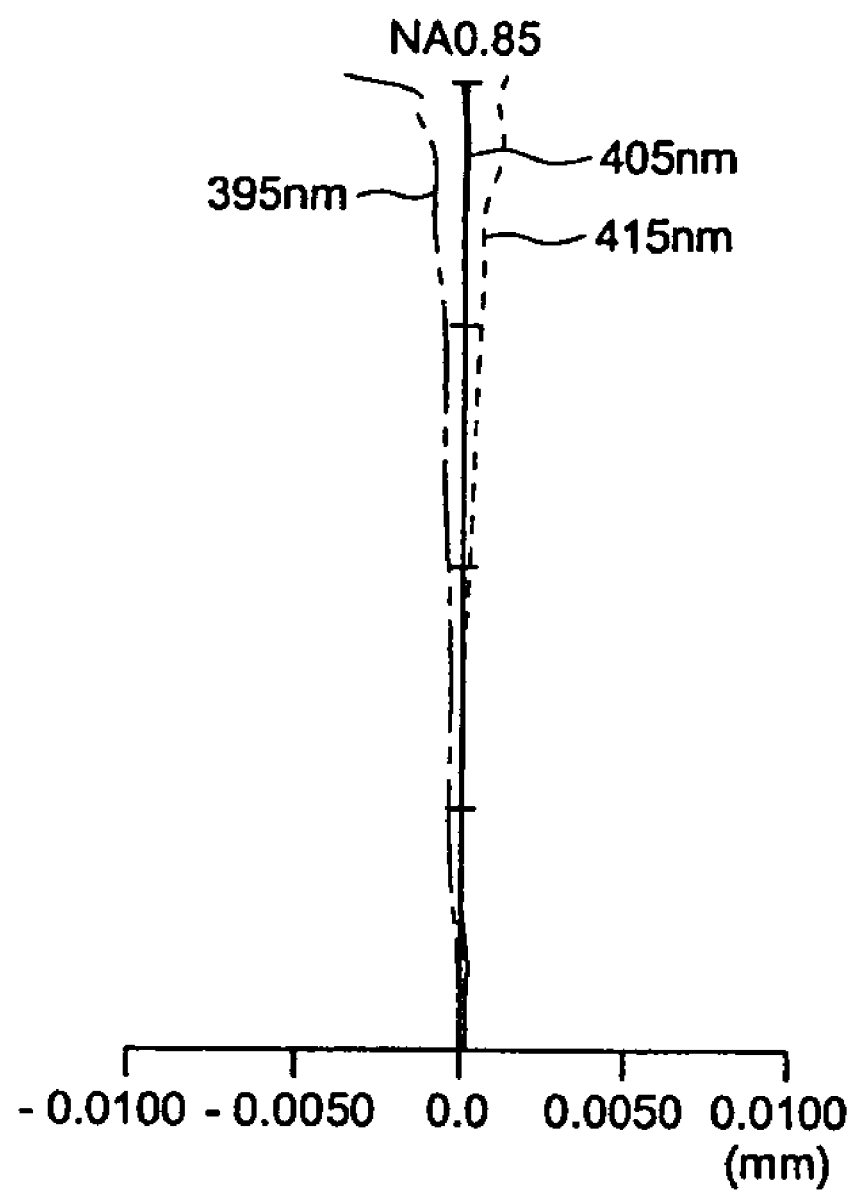
FIG. 53 is a spherical aberration view of the converging optical system according to the example 20.

Next, the converging optical system of Example 19 which can be used for the optical pick-up apparatus in FIG. 40 will be explained. First, lens data of the converging optical system in the present example are shown in Table 37. Further, a schematic sectional view of the converging optical system in the present example is shown in FIG. 50 and a diagram of spherical aberration is shown in FIG. 51. In the present example, axial chromatic aberration caused on the converging optical system is corrected by operations of the diffractive structure provided on each of the third surface of coupling lens 2 of 2 elements in 2 groups and the first surface of objective lens 1 of 1 element in 1 group. Further, as shown in Table 38, recording and/or reproduction of information for an optical information recording medium for the so-called 3-layer recording system wherein a transparent substrate and three information recording layers are laminated on one side is made possible, by changing the distance between lens elements 2a and 2b of coupling lens 2. Further, in the same way as in Examples 1–4, spherical aberration that is caused on a converging optical system by wavelength deviation of light source 3, temperature changes and a thickness error of a transparent substrate in the course of recording and/or reproduction of information for each information recording medium can be corrected.

TABLE 37

Example 19

| Surface No. | | r(mm) | d(mm) | $N_{\lambda 1}$ | vd |
|---|---|---|---|---|---|
| 0 | Light source | | d0 (variable) | | |
| 1(Aspheric surface 1) | Coupling lens | −15.158 | 0.800 | 1.52491 | 56.5 |
| 2(Aspheric surface 2) | | 15.692 | d2 (variable) | | |
| 3(Diffractive surface 1) | | −32.332 | 1.200 | 1.52491 | 56.5 |
| 4(Aspheric surface 3) | | −7.369 | 6.150 | | |
| 5 | Diaphragm | | −1.150 | | |
| 6(Aspheric surface 4, Diffractive surface 2) | Objective lens | 1.247 | 2.750 | 1.52491 | 56.5 |
| 7(Aspheric surface 5) | | −0.861 | d7 (variable) | | |

TABLE 37-continued

| 8 | Transparent substrate | ∞ | d8 (variable) | 1.61949 | 30.0 |
|---|---|---|---|---|---|
| 9 | | ∞ | 0.000 | | |

Constant of the aspheric surface

Aspheric surface 1

| K | 2.2997E+02 |
|---|---|
| $A_4$ | −1.2113E−03 |
| $A_6$ | −2.3094E−02 |
| $A_8$ | 5.7097E−04 |

Aspheric surface 2

| K | −7.1651E+02 |
|---|---|
| $A_4$ | −5.0140E−04 |
| $A_6$ | −1.5428E−02 |
| $A_8$ | −5.7871E−03 |

Aspheric surface 3

| K | −5.7990E−01 |
|---|---|
| $A_4$ | 5.3861E−05 |
| $A_6$ | 8.2843E−04 |
| $A_8$ | 1.2847E−04 |
| $A_{10}$ | 2.2449E−05 |

Aspheric surface 4

| K | −7.0271E−01 |
|---|---|
| $A_4$ | 2.0793E−02 |
| $A_6$ | −2.5985E−03 |
| $A_8$ | 4.9919E−03 |
| $A_{10}$ | −2.2786E−04 |
| $A_{12}$ | −9.5332E−04 |
| $A_{14}$ | 4.6404E−05 |
| $A_{16}$ | 1.7553E−04 |
| $A_{18}$ | 2.1430E−05 |
| $A_{20}$ | −2.9990E−05 |

Aspheric surface 5

| K | −2.7384E+01 |
|---|---|
| $A_4$ | 1.3778E−01 |
| $A_6$ | −3.2821E−01 |
| $A_8$ | 2.6291E−01 |
| $A_{10}$ | −7.8115E−02 |
| $A_{12}$ | −2.5227E−04 |

Constant of diffractive surface

Diffractive surface 1

| $b_2$ | −1.6939E−02 |
|---|---|
| $b_4$ | 6.4086E−04 |
| $b_6$ | −9.2105E−04 |
| $b_8$ | −4.4088E−05 |
| $b_{10}$ | 4.2021E−06 |

Diffractive surface 2

| $b_2$ | −4.9893E−03 |
|---|---|
| $b_4$ | −3.7597E−04 |

TABLE 38

Example 19

| | First information recording layer | Second information recording layer | Third information recording layer |
|---|---|---|---|
| d0 (variable) | 9.300 | 10.398 | 11.228 |
| d2 (variable) | 4.700 | 3.602 | 2.772 |
| d7 (variable) | 0.330 | 0.317 | 0.301 |
| d8 (variable) | 0.100 | 0.150 | 0.200 |
| Wavefront aberration | 0.007$\lambda$ | 0.010$\lambda$ | 0.008$\lambda$ |

Though the optical information recording medium is made to be that of a 3-layer recording system wherein a thickness of a transparent substrate interposed between information recording layers is 0.05 mm in the present example, the converging optical system in the present example can also work for recording and/or reproduction of information for the optical information recording medium of a multi-layer recording system other than the foregoing.

Next, the converging optical system of Example 20 which can be used for the optical pick-up apparatus in FIG. 40 will be explained. First, lens data of the converging optical system in the present example are shown in Tables 39 and 40. Further, a schematic sectional view of the converging optical system in the present example is shown in FIG. 42 and a diagram of spherical aberration is shown in FIG. 43. In the present example, axial chromatic aberration caused on the converging optical system is corrected by operations of the diffractive structure provided on each of the third and fourth surfaces of coupling lens 2 of 2 elements in 2 groups. Further, as shown in Table 41, spherical aberration that is caused on a converging optical system by wavelength deviation of light source 3, temperature changes and by a thickness error of a transparent substrate can be corrected by changing the distance between lens elements 2a and 2b of coupling lens 2.

TABLE 39

Example 20

| Surface No. | | r(mm) | d(mm) | Nλ | νd |
|---|---|---|---|---|---|
| 0 | Light source | | d0(variable) | | |
| 1 | Coupling | ∞ | 1.000 | 1.52491 | 56.5 |
| 2 | lens | −6.056 | d2(variable) | | |
| 3 | | ∞ | 1.000 | 1.52491 | 56.5 |
| 4 | | −19.860 | 5.000 | | |
| 5 | Diaphragm | ∞ | 0.000 | | |
| 6 | Objective | 1.194 | 2.650 | 1.52491 | 56.5 |
| 7 | lens | −0.975 | 0.355 | | |
| 8 | Transparent | ∞ | 0.100 | 1.61949 | 30.0 |
| 9 | substrate | ∞ | | | |

TABLE 40

Constant of the aspheric surface

| Second surface | k | 7.8224E−01 |
| | $A_4$ | −6.5522E−04 |
| | $A_6$ | 7.6018E−05 |
| | $A_8$ | 1.4178E−04 |
| Fourth surface | k | −7.6290E+01 |
| | $A_4$ | 1.1179E−03 |
| | $A_6$ | 5.9633E−04 |
| | $A_8$ | 1.5178E−04 |
| | $A_{10}$ | 5.6734E−05 |
| Sixth surface | k | −6.8335E−01 |
| | $A_4$ | 1.6203E−02 |
| | $A_6$ | 1.5491E−03 |
| | $A_8$ | 2.8929E−03 |
| | $A_{10}$ | −3.6771E−04 |
| | $A_{12}$ | −3.5822E−04 |
| | $A_{14}$ | 1.4842E−04 |
| | $A_{16}$ | 1.1960E−04 |
| | $A_{18}$ | −3.0230E−05 |
| | $A_{20}$ | −1.1052E−05 |
| Seventh surface | k | −2.1704E+01 |
| | $A_4$ | 3.0802E−01 |
| | $A_6$ | −6.3950E−01 |
| | $A_8$ | 5.8536E−01 |
| | $A_{10}$ | −2.1562E−01 |
| | $A_{12}$ | −2.5227E−04 |

TABLE 40-continued

Constant of diffractive surface

| Third surface | $b_2$ | −1.2117E−02 |
| | $b_4$ | −5.5463E−04 |
| | $b_6$ | −1.6754E−04 |
| | $b_8$ | −8.4468E−05 |
| | $b_{10}$ | −3.4341E−06 |
| Fourth surface | $b_2$ | −1.1967E−02 |
| | $b_4$ | −3.3959E−04 |
| | $b_6$ | −6.3935E−05 |
| | $b_8$ | −6.8699E−05 |
| | $b_{10}$ | −1.6431E−05 |

TABLE 41

Example 20

| Causes of deviation of spherical aberration | | Wavefront aberration | d0 (variable) | d2 (variable) |
|---|---|---|---|---|
| Standard state (λ = 405 nm, T = 25° C., t = 0.1 mm) | | 0.004 | 5.000 | 2.000 |
| Wavelength deviation of light source | Δλ = +10 nm | 0.004 | 4.956 | 2.044 |
| | Δλ = −10 nm | 0.006 | 5.049 | 1.951 |
| Temperature change | ΔT = +30° C. | 0.011 | 4.906 | 2.094 |
| | ΔT = −30° C. | 0.014 | 5.093 | 1.907 |
| Error of thickness of transparent substrate | Δt = +0.02 mm | 0.004 | 4.794 | 2.206 |
| | Δt = −0.02 mm | 0.005 | 5.205 | 1.795 |

(Note)
Amount of change in oscillation wavelength of light source in temperature change Δλ = +0.05 nm/° C.

Since the converging optical system in Examples 15–20 above is made of a material of plastic whose saturated water absorption rate is 0.01% or less and internal transmitance at thickness of 3 mm in wavelength area to be used is 90% or more, its image quality is affected less by water absorption, its efficiency of utilization of light is high, and it can be manufactured at low cost on a mass production basis. Further, by using plastic whose specific gravity is 2.0 or less, it is possible to make an overall converging optical system light, and thereby to lighten a load on a driving mechanism (actuator 10 or the like) for objective lens 1 and on a driving mechanism (actuator 11) for coupling lens 2, thus, high speed driving and downsizing of the driving mechanism are made possible.

Figure 54:
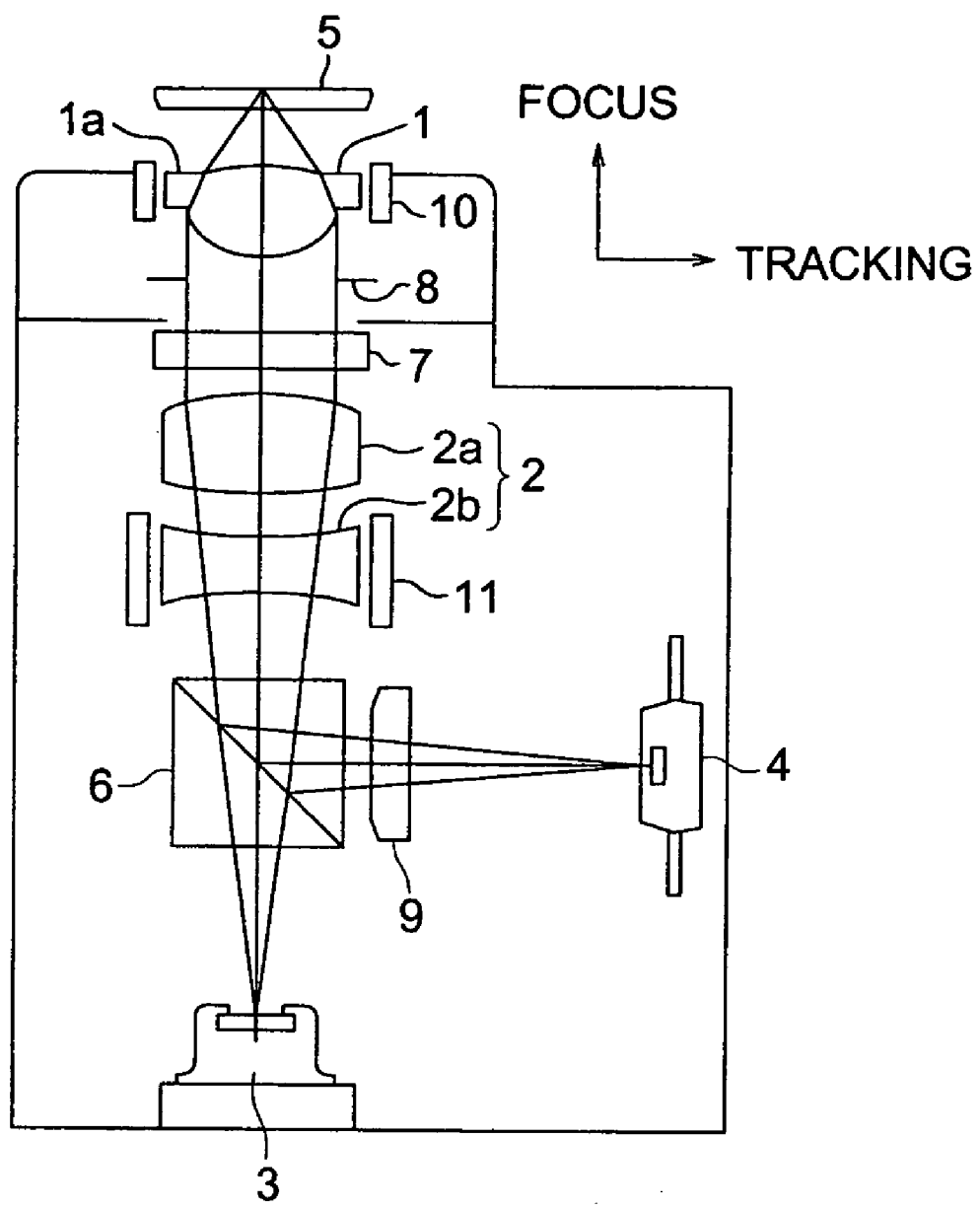
FIG. 54 is an outlined structural view of an optical pickup apparatus according to the example 17.

FIG. 54 is a schematic structure diagram of an optical pick-up apparatus related to Embodiment 17. The optical pick-up apparatus in FIG. 54 is only different from the optical pick-up apparatus in FIG. 40 on the point that actuator 11 moves lens element 2b instead of lens element 2a of coupling lens 2 in the direction of an optical axis, therefore, explanation for points other than the foregoing will be omitted here.

Figure 55:
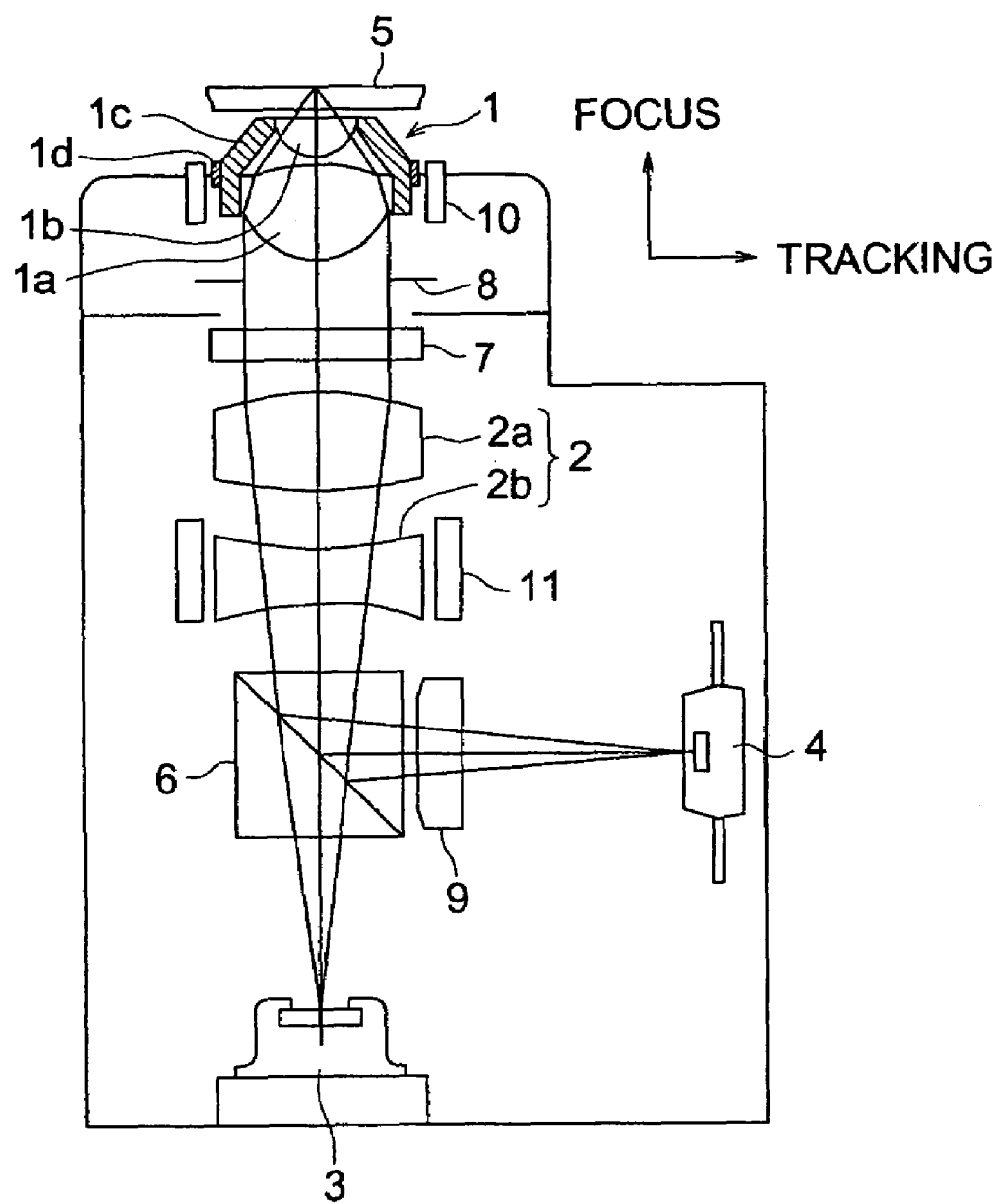
FIG. 55 is an outlined structural view of an optical pickup apparatus according to the example 18.

FIG. 55 is a schematic structure diagram of an optical pick-up apparatus related to Embodiment 18. The optical pick-up apparatus in FIG. 55 is only different from the optical pick-up apparatus in FIG. 45 on the point that actuator 11 moves lens element 2b instead of lens element 2a of coupling lens 2 in the direction of an optical axis, therefore, explanation for points other than the foregoing will be omitted here. Incidentally, any one of converging optical systems in Examples 15–20 can be applied to the optical pick-up apparatuses in FIGS. 54 and 55. Further, the distance between lens elements 2a and 2b of coupling lens 2 may also be changed by moving both of them as a variation of the optical pick-up apparatuses in FIGS. 54 and 55.

Another example will further be explained as follows.

FIG. 62 is a diagram showing an optical pick-up apparatus equipped with uniaxial actuator 11 for moving coupling lens 2 in the direction of an optical axis. It is possible to cancel deviation of spherical aberration caused on an optical system by changing the slope angle of the marginal ray of a light flux entering objective lens 1 by moving the coupling lens in the direction of an optical axis by an appropriate amount by the uniaxial actuator 11 representing a moving device. Further, when spherical aberration is caused on an optical system, when oscillation wavelength of semiconductor laser 3 representing a light source is varied, or when temperature or humidity is changed, or by an error of a protector layer thickness in an optical information recording medium, it is possible to cancel deviation of the spherical aberration caused on the optical system by moving coupling lens 2 in the direction of an optical axis by an appropriate amount by the uniaxial actuator 11 and thereby by changing the slope angle of the marginal ray of a light flux entering objective lens 1. Examples wherein a pick-up in FIG. 62 is used are shown below as Examples 21–25.

EXAMPLE 21

Figure 56:
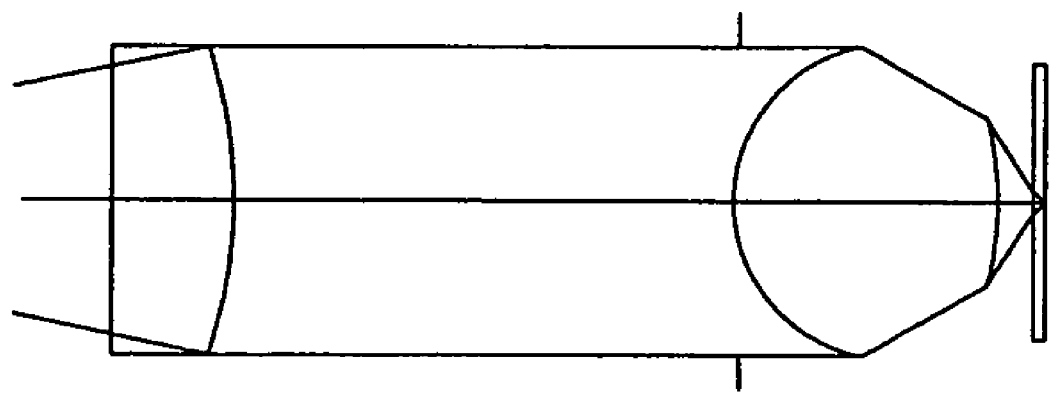
FIG. 56 is a sectional view of a coupling lens and an objective lens according to the example 21.
Figure 57:
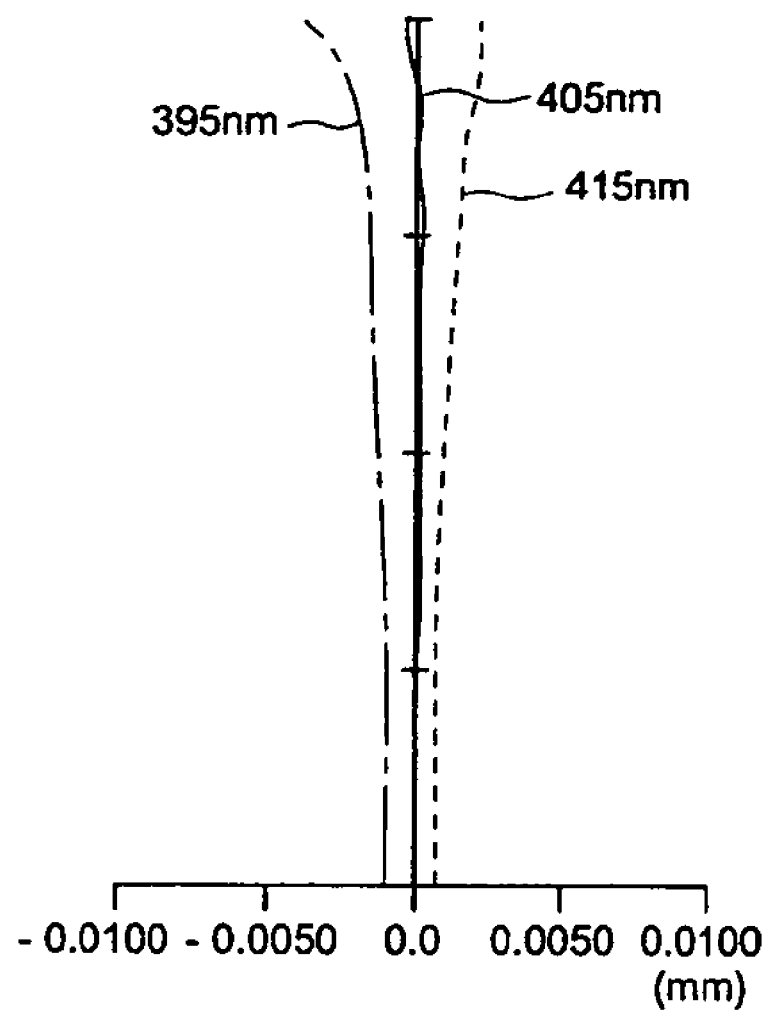
FIG. 57 is a spherical aberration view of a coupling lens and an objective lens according to the example 21.

Lens data and the constant of the aspheric surface are shown in Table 42. FIG. 56 shows sectional views of a coupling lens of 1 element in 1 group and an objective lens in Example 21, and FIG. 57 shows a diagram of spherical aberration.

TABLE 42

| Example 21 | | | | | |
|---|---|---|---|---|---|
| Surface No. | | r(mm) | d(mm) | Nλ | vd |
| Light source | | | d0 (variable) | | |
| 1 2(Aspheric surface 1, Diffractive surface 1) | Coupling lens | −62.022 −4.608 | 1.200 d2 (variable) | 1.52491 | 56.5 |
| Diaphragm | | ∞ | 0 | | |
| 3(Aspheric surface 2) | Objective lens | 1.194 | 2.650 | 1.52491 | 56.5 |
| 4(Aspheric surface 3) | | −0.975 | 0.355 | | |
| 5 | Transparent substrate | ∞ | 0.100 | 1.61950 | 30.0 |
| 6 | | ∞ | | | |

| Aspheric surface 1 | |
|---|---|
| K = | −2.4335E−01 |
| $A_4$ = | 2.7143E−03 |
| $A_6$ = | −5.6745E−05 |
| $A_8$ = | 7.0168E−05 |
| $A_{10}$ = | −1.5659E−05 |

| Aspheric surface 2 | |
|---|---|
| K = | −0.683354 |
| $A_4$ = | 0.162029E−01 |
| $A_6$ = | 0.154908E−02 |
| $A_8$ = | 0.289288E−02 |
| $A_{10}$ = | −0.367711E−03 |
| $A_{12}$ = | −0.358222E−03 |
| $A_{14}$ = | 0.148419E−03 |
| $A_{16}$ = | 0.119603E−03 |
| $A_{18}$ = | −0.302302E−04 |
| $A_{20}$ = | −0.110520E−04 |

TABLE 42-continued

| Aspheric surface 3 | |
|---|---|
| K = | −21.704418 |
| $A_4$ = | 0.308021E+00 |
| $A_6$ = | −0.639499E+00 |
| $A_8$ = | 0.585364E+00 |
| $A_{10}$ = | −0.215623E+00 |
| $A_{12}$ = | −0.252265E−03 |

| Diffractive surface 1 | |
|---|---|
| $b_2$ | −2.0000E−02 |
| $b_4$ | −1.3821E−03 |

In the present Example 21, it is intended to make an optical system to be light, and to lighten a burden for a focusing mechanism or a coupling lens moving device, by using a plastic material for an objective lens and a coupling lens. These lenses can be manufactured at low cost on a mass production basis. Further, an optical system corrected axial chromatic aberration satisfactorily by a simple structure is realized, by making a coupling lens to be represented by a diffractive lens in a form of a single lens. Table 43 shows results of correction made by moving a coupling lens for spherical aberrations generated by various causes. As is apparent from this Table 43, spherical aberration generated by wavelength deviation of a laser, temperature changes and by a thickness error of a transparent substrate can be corrected satisfactorily in the optical system of the present example.

TABLE 43

| Causes of deviation of spherical aberration | | WFE-rms after correction | d0 (mm) | d2 (mm) |
|---|---|---|---|---|
| Standard state (λc-405 nm, Tc = 25° C., tc = 0.1 mm) | | 0.007λ | 6.000 | 5.000 |
| Wavelength deviation of LD | Δλ = +10 nm | 0.008λ | 5.941 | 5.059 |
| | Δλ = −10 nm | 0.022λ | 6.054 | 4.946 |
| Temperature changes | ΔT = +30° C. | 0.011λ | 5.927 | 5.073 |
| | ΔT = −30° C. | 0.031λ | 6.071 | 4.929 |
| Transparent substrate thickness error | Δt = +0.02 mm | 0.004λ | 5.853 | 5.147 |
| | Δt = −0.02 mm | 0.015λ | 6.152 | 4.848 |

EXAMPLE 22

Figure 58:
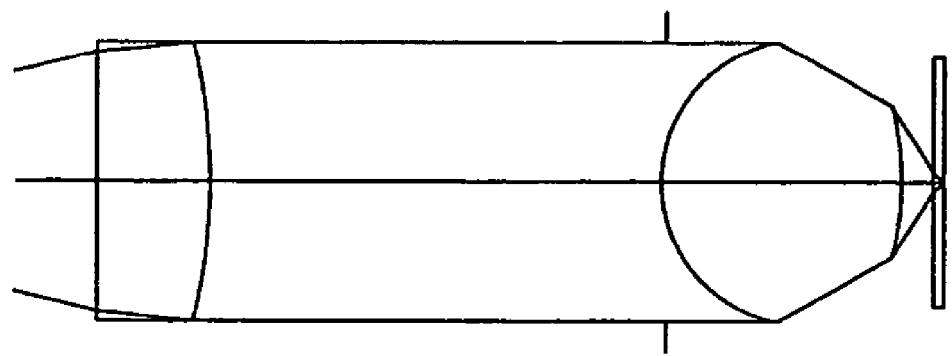
FIG. 58 is a sectional view of a coupling lens and an objective lens according to the example 22.
Figure 59:
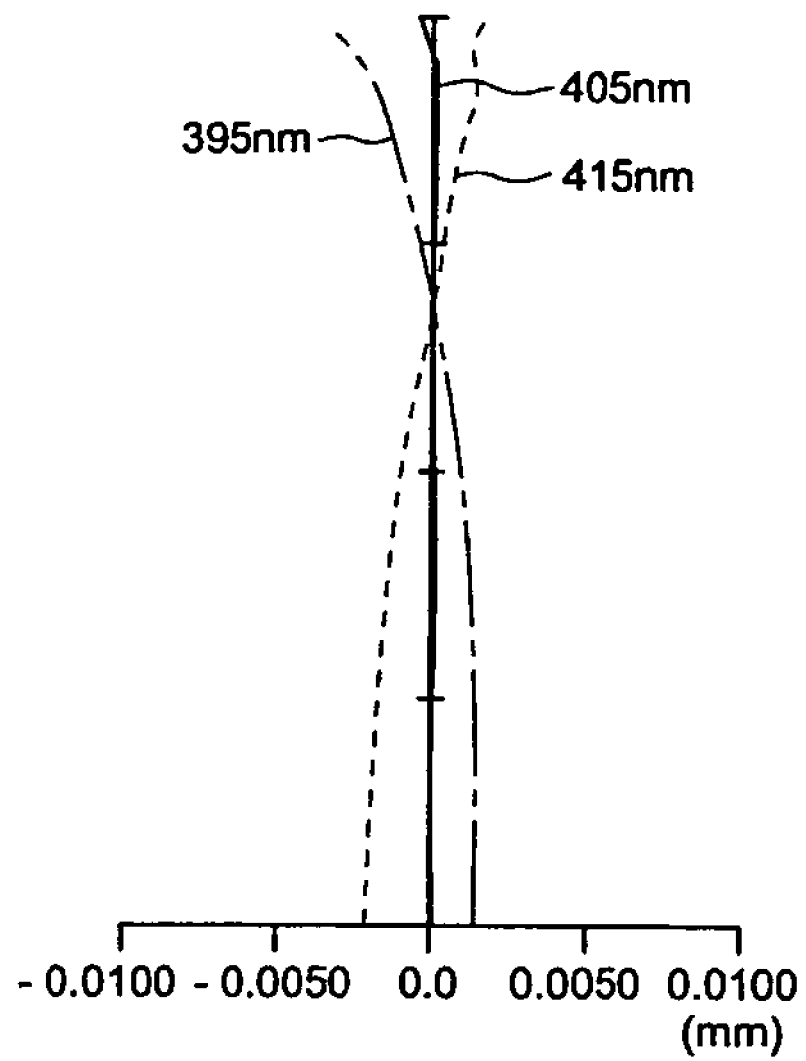
FIG. 59 is a spherical aberration view of a coupling lens and an objective lens according to the example 22.

Lens data and the constant of the aspheric surface are shown in Table 44. Schematic sectional views of the coupling lens of a 1-element structure of Example 22 and an objective lens are shown in FIG. 58 and a diagram of spherical aberration is shown in FIG. 59.

TABLE 44

| Example 22 | | | | | |
|---|---|---|---|---|---|
| Surface No. | | r(mm) | d(mm) | Nλ | vd |
| Light source | | | d0 (variable) | | |
| 1(Aspheric surface 1, Diffractive surface 1) | Coupling lens | −226.959 | 1.200 | 1.52491 | 56.5 |
| 2(Aspheric surface 2, | | −6.733 | d2 (variable) | | |

TABLE 44-continued

| | | | | | |
|---|---|---|---|---|---|
| Diffractive surface 2) | | | | | |
| Diaphragm | | ∞ | 0 | | |
| 3(Aspheric surface 3) | Objective lens | 1.194 | 2.650 | 1.52491 | 56.5 |
| 4(Aspheric surface 4) | | −0.975 | 0.355 | | |
| 5 | Transparent substrate | ∞ | 0.100 | 1.61950 | 30.0 |
| 6 | | ∞ | | | |

Aspheric surface 1

K = 0.0
$A_4$ = 1.0245E−02
$A_6$ = 9.6650E−04
$A_8$ = −5.9104E−04
$A_{10}$ = 8.9735E−05

Aspheric surface 2

K = −4.3181
$A_4$ = 1.5848E−03
$A_6$ = 8.6137E−04
$A_8$ = −2.0117E−04
$A_{10}$ = 1.3168E−05

Aspheric surface 3

K = −0.683354
$A_4$ = 0.162029E−01
$A_6$ = 0.154908E−02
$A_8$ = 0.289288E−02
$A_{10}$ = −0.367711E−03
$A_{12}$ = −0.358222E−03
$A_{14}$ = 0.148419E−03
$A_{16}$ = 0.119603E−03
$A_{18}$ = −0.302302E−04
$A_{20}$ = −0.110520E−04

Aspheric surface 4

K = −21.704418
$A_4$ = 0.308021E+00
$A_6$ = −0.639499E+00
$A_8$ = 0.585364E+00
$A_{10}$ = −0.215623E+00
$A_{12}$ = −0.252265E−00

Constant of diffractive surface

Diffractive surface 1

$b_2$ = −2.2967E−02
$b_4$ = 2.1037E−03

Diffractive surface 2

$b_2$ = −1.7113E−02
$b_4$ = 8.2815E−04

In the present Example 22, an optical system is lightened, and a burden for the focusing mechanism or for the coupling lens moving device is lightened, by using plastic materials for an objective lens and a coupling lens. It is further possible to manufacture them at low cost on a mass production basis by using plastic materials. When recording information on an optical information recording medium, deterioration in wavefront aberration caused by mode hopping is an unallowable problem. In the present optical system, a spherical aberration curve for the standard wavelength and spherical aberration curves for the short and long wavelengths are made to cross each other, by using bi-diffractive surface lens representing a single lens which is overcorrected in terms of axial chromatic aberration. As a result, the shift of the position of the best image plane caused by a wavelength shift is controlled to be small, resulting in prevention of deterioration of wavefront aberration in the case of mode hopping. Table 45 shows the results of correction made by moving a coupling lens, for the spherical aberration caused by various causes. As is apparent from Table 45, the optical system of the present example makes it possible to correct satisfactorily spherical aberration caused by deviation of laser wavelength, temperature changes and an error of transparent substrate thickness.

TABLE 45

| Causes of deviation of spherical aberration | | WFE-rms after correction | d0 (mm) | d2 (mm) |
|---|---|---|---|---|
| Standard state ($\lambda c$-405 nm, $Tc = 25°$ C., $tc = 0.1$ mm) | | 0.008λ | 6.000 | 5.000 |
| Wavelength deviation of LD | $\Delta\lambda$ = +10 nm | 0.009λ | 5.869 | 5.131 |
| | $\Delta\lambda$ = −10 nm | 0.010λ | 6.141 | 4.859 |
| Temperature changes | $\Delta T$ = +30° C. | 0.006λ | 5.905 | 5.095 |
| | $\Delta T$ = −30° C. | 0.025λ | 6.101 | 4.899 |
| Transparent substrate thickness error | $\Delta t$ = +0.02 mm | 0.003λ | 5.867 | 5.133 |
| | $\Delta t$ = −0.02 mm | 0.014λ | 6.139 | 4.861 |

EXAMPLE 23

Figure 60:
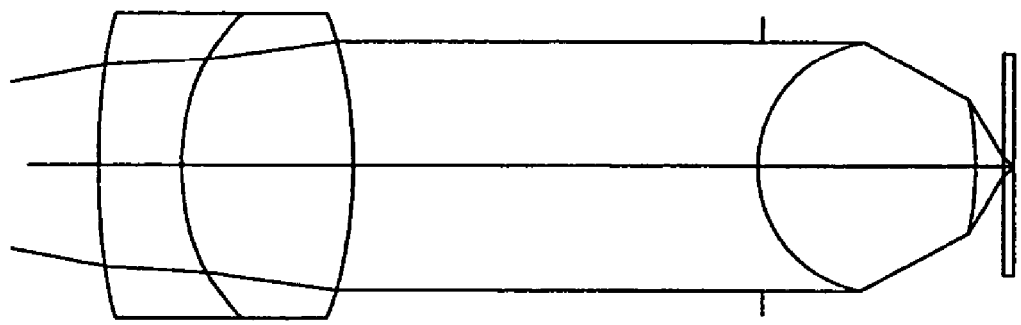
FIG. 60 is a sectional view of a coupling lens and an objective lens according to the example 23.
Figure 61:
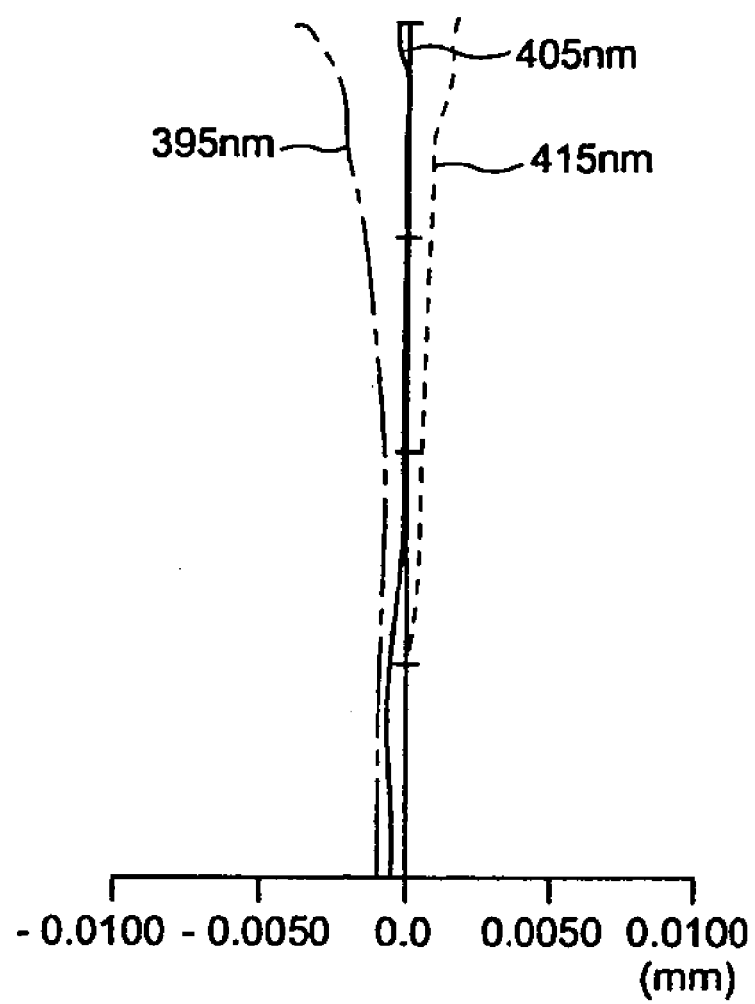
FIG. 61 is a spherical aberration view of a coupling lens and an objective lens according to the example 23.

Table 46 shows lens data and the constant of the aspheric surface. FIG. 60 shows sectional views for the coupling lens of 2 elements in 1 group in Example 23 and the objective lens, and FIG. 61 shows a diagram of spherical aberration.

TABLE 46

| | | | | | |
|---|---|---|---|---|---|
| Example 23 | | | | | |
| Surface No. | | r(mm) | d(mm) | Nλ | νd |
| Light source | | | d0 (variable) | | |
| 1 | Coupling lens | 13.531 | 1.000 | 1.91409 | 23.8 |
| 2 | | 2.551 | 2.100 | 1.71548 | 53.2 |
| 3(Aspheric surface 1) | | −5.765 | d3 (variable) | | |
| Diaphragm | | ∞ | 0 | | |
| 3(Aspheric surface 2) | Objective lens | 1.194 | 2.650 | 1.52491 | 56.5 |
| 4(Aspheric surface 3) | | −0.975 | 0.355 | | |
| 6 | Transparent substrate | ∞ | 0.100 | 1.61950 | 30.0 |
| 7 | | ∞ | | | |

Aspheric surface 1

K = 0.699858
$A_4$ = −0.53797E−3
$A_6$ = −0.352488E−3
$A_8$ = 0.595790E−4
$A_{10}$ = −0.152115E−4

Aspheric surface 2

K = −0.683354
$A_4$ = 0.162029E−01
$A_6$ = 0.154908E−02
$A_8$ = 0.289288E−02
$A_{10}$ = −0.367711E−03
$A_{12}$ = −0.358222E−03
$A_{14}$ = 0.148419E−03
$A_{16}$ = 0.119603E−03
$A_{18}$ = −0.302302E−04
$A_{20}$ = −0.110520E−04

Aspheric surface 3

K = −21.704418
$A_4$ = 0.308021E+00
$A_6$ = −0.639499E+00

TABLE 46-continued

| | |
|---|---|
| $A_8 =$ | 0.585364E+00 |
| $A_{10} =$ | -0.215623E+00 |
| $A_{12} =$ | -0.252265E-03 |

In the Example 23, an optical system is lightened and a burden for the focusing mechanism is lightened by using plastic materials for an objective lens. Further, a doublet lens of 2 elements in 1 group is used to correct satisfactorily axial chromatic aberration of the optical system. Further, by making the surface on the optical information recording medium side to be an aspheric surface, a numerical aperture of a coupling lens can be made large by an effect of correction for an aspheric surface, and thereby, a compact optical system whose total length is short is realized. Table 47 shows the results of correction made by moving a coupling lens, for the spherical aberration caused by various causes. As is apparent from Table 47, the optical system of the present example makes it possible to correct satisfactorily spherical aberration caused by deviation of laser wavelength, temperature changes and an error of transparent substrate thickness.

TABLE 47

| Causes of deviation of spherical aberration | | WFE-rms after correction | d0 (mm) | d2 (mm) |
|---|---|---|---|---|
| Standard state ($\lambda c$-405 nm, Tc = 25° C., tc = 0.1 mm) | | 0.008$\lambda$ | 7.230 | 5.000 |
| Wavelength deviation of LD | $\Delta\lambda = +10$ nm | 0.008$\lambda$ | 7.134 | 5.096 |
| | $\Delta\lambda = -10$ nm | 0.019$\lambda$ | 7.330 | 4.900 |
| Temperature changes | $\Delta T = +30°$ C. | 0.015$\lambda$ | 7.050 | 5.180 |
| | $\Delta T = -30°$ C. | 0.027$\lambda$ | 7.415 | 4.815 |
| Transparent substrate thickness error | $\Delta t = +0.02$ mm | 0.006$\lambda$ | 6.987 | 5.243 |
| | $\Delta t = -0.02$ mm | 0.015$\lambda$ | 7.486 | 4.744 |

EXAMPLE 24

This is an example wherein a diffractive surface is provided only on one side of a coupling lens which is a single lens.

TABLE 48

| Surface No. | | r(mm) | d(mm) | N$\lambda$ | vd |
|---|---|---|---|---|---|
| Light source | | | d0 (variable) | | |
| 1(Diffractive surface 1) | coupling lens | ∞ | 1.200 | 1.52491 | 56.5 |
| 2(Aspheric surface 1) | | -16.084 | d2 (variable) | | |
| Diaphragm | | ∞ | 0 | | |
| 3(Aspheric surface 2) | Objective lens | 1.194 | 2.650 | 1.52491 | 56.5 |
| 4(Aspheric surface 3) | | -0.975 | 0.355 | | |
| 5 | Transparent substrate | ∞ | 0.100 | 1.61950 | 30.0 |
| 6 | | ∞ | | | |
| Aspheric surface 1 | | | | | |
| K = | | 17.997115 | | | |
| $A_4 =$ | | 0.759036E-03 | | | |
| $A_6 =$ | | 0.311883E-03 | | | |
| $A_8 =$ | | -0.123894E-03 | | | |
| $A_{10} =$ | | 0.196179E-04 | | | |

TABLE 48-continued

| Aspheric surface 2 | |
|---|---|
| K = | -0.683354 |
| $A_4 =$ | 0.162029E-01 |
| $A_6 =$ | 0.154908E-02 |
| $A_8 =$ | 0.289288E-02 |
| $A_{10} =$ | -0.367711E-03 |
| $A_{12} =$ | -0.358222E-03 |
| $A_{14} =$ | 0.148419E-03 |
| $A_{16} =$ | 0.119603E-03 |
| $A_{18} =$ | -0.302302E-04 |
| $A_{20} =$ | -0.110520E-04 |
| Aspheric surface 3 | |
| K = | -21.704418 |
| $A_4 =$ | 0.308021E+00 |
| $A_6 =$ | -0.639499E+00 |
| $A_8 =$ | 0.585364E+00 |
| $A_{10} =$ | -0.215623E+00 |
| $A_{12} =$ | -0.252265E-03 |
| Diffractive surface 1 | |
| $b_2 =$ | -2.6023E-02 |
| $b_4 =$ | -2.1722E-04 |

In the Example 24, plastic materials are used for an objective lens and a coupling lens. Thus, the shift of the position of the best image plane caused by a wavelength shift is controlled to be small, and deterioration of wavefront aberration in the case of mode hopping is prevented. Further, deterioration of wavefront aberration in the case of surface-decentering of a coupling lens is prevented by providing an aspherical surface only on one side of the coupling lens. In addition, deterioration of wavefront aberration in the case of tracking error and of the decentering of the coupling lens are prevented, by providing a diffractive surface on the surface of the coupling lens on the light source side and by providing on the surface thereof on the objective lens side an aspheric surface whose refractive power is reduced as a position for the refracting power becomes more distant from an optical axis. Table 49 shows the results of correction made by moving a coupling lens, for the spherical aberration caused by various causes. As is apparent from Table 49, spherical aberration caused by deviation of laser wavelength, temperature changes and an error of transparent substrate thickness can be corrected satisfactorily and axial chromatic aberration can also be corrected satisfactorily.

TABLE 49

| Causes of deviation of spherical aberration | | WFE-rms after correction | d0 (mm) | d2 (mm) |
|---|---|---|---|---|
| Standard state ($\lambda c$-405 nm, Tc = 25° C., tc = 0.1 mm) | | 0.005$\lambda$ | 11.670 | 5.000 |
| Wavelength deviation of LD | $\Delta\lambda = +10$ nm | 0.008$\lambda$ | 11.404 | 5.266 |
| | $\Delta\lambda = -10$ nm | 0.009$\lambda$ | 11.960 | 4.710 |
| Temperature changes | $\Delta T = +30°$ C. | 0.014$\lambda$ | 11.373 | 5.297 |
| | $\Delta T = -30°$ C. | 0.018$\lambda$ | 11.995 | 4.676 |
| Transparent substrate thickness error | $\Delta t = +0.02$ mm | 0.009$\lambda$ | 11.246 | 5.424 |
| | $\Delta t = -0.02$ mm | 0.008$\lambda$ | 12.136 | 4.534 |

According to the present invention, in an optical pickup apparatus for conducting reproducing and/or recording information of the high density optical information recording medium, deviation of spherical aberration can be corrected efficiently.

The invention makes it possible to provide a converging optical system and an optical pick-up apparatus wherein deviation of spherical aberration caused on each optical surface of the optical pick-up apparatus by oscillation wavelength changes of a laser light source, changes in temperature and humidity and an error of a transparent substrate thickness of an optical information recording medium can be corrected effectively by a simple structure.

The invention further makes it possible to provide a converging optical system and an optical pick-up apparatus wherein axial chromatic aberration caused on an objective lens by mode hopping of a laser light source can be effectively corrected.

In addition, the invention makes it possible to provide a converging optical system and an optical pick-up apparatus wherein a short wavelength laser light source and an objective lens having a high numerical aperture are provided, and recording and/or reproduction of information for a plurality of information recording media each having a transparent substrate with a different thickness can be conducted.

With regard to an objective lens for the optical pick-up apparatus, the invention makes it possible to provide an aspherical objective lens that is a single lens having a large numerical aperture and excellent image height characteristics. In particular, there can be provided an objective lens having a numerical aperture that is as large as 0.75 or more and being suitable to be used for a high density recording/reproducing apparatus employing a laser wherein a wavelength of a light source is as short as about 400 nm. Further, sensitivity for decentering is made to be excellent, and aspherical aberration and coma can be corrected satisfactorily.

Its is further possible to provide an objective lens which is suitable for a recording/reproducing apparatus wherein a thickness of a protective layer of an optical information recording medium is thin as about 0.1 mm and a working distance can be small.

Disclosed embodiment can be varied by a skilled person without departing from the sprit and scope of the invention.

What is claimed is:

1. An optical pickup apparatus for conducting information recording and/or information reproducing of an optical information recording medium, comprising:
   a light source;
   a light converging optical system comprising:
      a first aberration compensating element; and
      an objective lens to converge a light flux emitted from the light source, the light flux passing through the first aberration compensating element onto an information recording plane of the optical information recording medium; and
   a photo-detector to receive a reflected light flux from the information recording plane,
   wherein the first aberration compensating element consists of a stationary element, and
   wherein a refractive index distribution of the stationary element along the direction perpendicular to the optical axis is changeable.

2. An optical pickup apparatus for conducting information recording and/or information reproducing an optical information recording medium, comprising:
   a light source;
   a light converging optical system comprising:
      a first aberration compensating element; and
      an objective lens to converge a light flux emitted from the light source, the light flux passing through the first aberration compensating element onto an information recording plane of the optical information recording medium; and
   the optical information recording medium; and
   a photo-detector to receive a reflected light flux from the information recording plane,
   wherein the light converging optical system comprises a diffractive surface including a ring-shaped diffractive structure on at least one optical surface in the light converging optical system, and
   wherein the first aberration compensating element comprises a movable element being movable in a direction of an optical axis of the light converging optical system, and the light converging optical system further comprises a moving device to move the movable element in the optical axis direction, and
   wherein the light converging optical system further comprises a second aberration compensating element, and
   wherein the second aberration compensating element comprises a stationary element which does not move in a direction of its optical axis, and
   wherein a refractive index distribution of the stationary element along the direction perpendicular to the optical axis is changeable.

3. The optical pickup apparatus of claim 2, wherein the first aberration compensating element comprises a movable element being movable in a direction of an optical axis of the light converging optical system, and the light converging optical system further comprises a moving device to move the movable element in the optical axis direction.

4. The optical pickup apparatus of claim 3, wherein the moving device is at least one device selected from a voice coil motor or a piezo actuator.

5. The optical pickup apparatus of claim 4, wherein the moving device is the piezo actuator.

6. The optical pickup apparatus of claim 2, wherein the first aberration compensating element consists of one optical element, and the optical element is the movable element.

7. The optical pickup apparatus of claim 6, wherein the first aberration compensating element has the diffractive surface on at least one-optical surface of the first aberration compensating element.

8. The optical pickup apparatus of claim 6, wherein the first aberration compensating element is capable of compensating a deviation of a spherical aberration of the light converging optical system.

9. The optical pickup apparatus of claim 6, wherein the first aberration compensating element is capable of compensating an axial chromatic aberration of the light converging optical system.

10. The optical pickup apparatus of claim 5, wherein the light converging optical system further comprises a second aberration compensating element, and the first aberration compensating element comprises the movable element.

11. The optical pickup apparatus of claim 10, wherein the second aberration compensating element comprises a stationary element which does not move in a direction of its optical axis.

12. The optical pickup apparatus of claim 11, wherein a refractive index distribution of the stationary element along the direction perpendicular to the optical axis is changeable.

13. The optical pickup apparatus of claim 12, wherein the stationary element is a liquid crystal optical element.

14. The optical pickup apparatus of claim 11, wherein the stationary element is capable of compensating a deviation of a spherical aberration of the light converging optical system.

15. The optical pickup apparatus of claim 10, wherein at least one element selected from the first aberration compensating element and the second aberration compensating element has the diffractive surface on at least one optical surface.

16. The optical pickup apparatus of claim 10, wherein the first aberration compensating element consists of one optical element.

17. The optical pickup apparatus of claim 10, wherein the first aberration compensating element comprises a positive lens group including at least one positive lens and a negative lens group including at least one negative lens.

18. The optical pickup apparatus of claim 3, wherein the light source includes a first light source emitting a first light flux having a wavelength of $\lambda 1$ and a second light source emitting a second light flux having a wavelength of $\lambda 2$, which is different from $\lambda 1$, and
wherein the optical pickup apparatus conducts the information recording and/or information reproducing of a first optical information recording medium having a first transparent substrate utilizing the first light flux, and conducts the information recording and/or reproducing of a second optical information recording medium having a second transparent substrate utilizing the second light flux.

19. The optical pickup apparatus of claim 18, wherein the first transparent substrate has a thickness of t1 and the second transparent substrate has a thickness of t2, and t1 is different from t2.

20. The optical pickup apparatus of claim 19, wherein the first aberration compensating element is capable of compensating a deviation of a spherical aberration due to the difference between the thickness t1 of the first transparent substrate and the thickness t2 of the second transparent substrate.

21. The optical pickup apparatus of claim 18, wherein the first aberration compensating element is capable of compensating a deviation of a spherical aberration due to the difference between the wavelength $\lambda 1$ of the first light flux and the wavelength $\lambda 2$ of the second light flux.

22. The optical pickup apparatus of claim 3, wherein the optical information recording medium has a plurality of information recording planes on one side of the optical information recording medium, and
wherein the optical pickup apparatus conducts the information recording and/or information reproducing of each of the plurality of information recording planes of the optical information recording medium utilizing the light flux emitted from the light source.

23. The optical pickup apparatus of claim 22, wherein the first aberration compensating element is capable of compensating a deviation of a spherical aberration due to the difference of the thickness between the light incident surface of the optical information recording medium and each of the plurality of information recording planes.

24. The optical pickup apparatus of claim 1, wherein the light converging optical system further comprises a second aberration compensating element.

25. The optical pickup apparatus of claim 24, wherein the second aberration compensating element comprises a movable element being movable in a direction of an optical axis of the light converging optical system.

26. The optical pickup apparatus of claim 24, wherein at least one element selected from the first aberration compensating element and the second aberration compensating element has the diffractive surface on at least one optical surface.

27. The optical pickup apparatus of claim 24, wherein at least one element selected from the first aberration compensating element and the second aberration compensating element is capable of compensating at least a deviation of spherical aberration generated in the light converging optical system.

28. The optical pickup apparatus of claim 24, wherein at least one element selected from the first aberration compensating element and the second aberration compensating element is capable of compensating at least an axial chromatic aberration generated in the light converging optical system.

29. The optical pickup apparatus of claim 1, wherein the stationary element is a liquid crystal optical element.

30. The optical pickup apparatus of claim 1, wherein the light source includes a first light source emitting a first light flux having a wavelength of $\lambda 1$ and a second light source emitting a second light flux having a wavelength of $\lambda 2$, which is different from $\lambda 1$, and
wherein the optical pickup apparatus conducts the information recording and/or information reproducing of a first optical information recording medium having a first transparent substrate utilizing the first light flux, and conducts the information recording and/or reproducing of a second optical information recording medium having a second transparent substrate utilizing the second light flux.

31. The optical pickup apparatus of claim 30, wherein the first transparent substrate has a thickness of t1 and the second transparent substrate has a thickness of t2, and t1 is different from t2.

32. The optical pickup apparatus of claim 31, wherein the first aberration compensating element is capable of compensating a deviation of a spherical aberration due to the difference between the thickness t1 of the first transparent substrate and the thickness t2 of the second transparent substrate.

33. The optical pickup apparatus of claim 30, wherein the first aberration compensating element is capable of compensating a deviation of a spherical aberration due to the difference between the wavelength $\lambda 1$ of the first light flux and the wavelength $\lambda 2$ of the second light flux.

34. The optical pickup apparatus of claim 1, wherein the optical information recording medium has a plurality of information recording planes on one side of the optical information recording medium, and
wherein the optical pickup apparatus conducts the information recording and/or information reproducing of each of the plurality of information recording planes of the optical information recording medium utilizing the light flux emitted from the light source.

35. The optical pickup apparatus of claim 34, wherein the first aberration compensating element is capable of compensating a deviation of a spherical aberration due to the difference of the thickness between the light incident surface of the optical information recording medium and each of the plurality of information recording planes.

36. A coupling lens optical system, for an optical pickup apparatus comprising a light source and an objective lens optical system for conducting information recording and/or information reproducing of an optical information recording medium, the coupling lens optical system being positioned between the light source and the objective lens optical system, the coupling lens optical system comprising:
an aberration compensating element including at least a movable element being movable in a direction of an optical axis of the coupling lens optical system; and a moving device to move the aberration compensating element in the optical axis direction, wherein the coupling lens optical system comprises a diffractive surface having a ring-shaped diffractive structure on at least one optical surface of the coupling lens optical system, and wherein the moving device is a piezo actuator.

37. The coupling lens optical systsm of claim 36, wherein the aberration compensating element comprises the movable element.

38. The coupling lens optical system of claim 36, wherein the light source includes a first light source emitting a first light flux having a wavelength of $\lambda 1$ and a second light source emitting a second light flux having a wavelength of $\lambda 2$ which is different from $\lambda 1$, and the optical pickup apparatus conducts the information recording and/or information reproducing of a first optical information recording medium having a first transparent substrate utilizing the first light flux, and conducts the information recording and/or reproducing of a second optical information recording medium having a second transparent substrate utilizing the second light flux.

39. The coupling lens optical system of claim 38, wherein the first transparent substrate has a thickness of t1 and the second transparent substrate has a thickness of t2, and t1 is different from t2.

40. The coupling lens optical system of claim 39, wherein the first aberration compensating element is capable of compensating a deviation of a spherical aberration due to the difference between the thickness t1 of the first transparent substrate and the thickness t2 of the second transparent substrate.

41. The coupling lens optical system of claim 38, wherein the first aberration compensating element is capable of compensating a deviation of a spherical aberration due to the difference between the wavelength $\lambda 1$ of the first light flux and the wavelength $\lambda 2$ of the second light flux.

42. The coupling lens optical system of claim 36, wherein the optical information recording medium has a plurality of information recording planes on one side of the optical information recording medium, and wherein the optical pickup apparatus conducts the information recording and/or information reproducing of each of the plurality of information recording planes of the optical information recording medium utilizing the light flux emitted from the light source.

43. The coupling lens optical system of claim 42, wherein the first aberration compensating element is capable of compensating a deviation of spherical aberration due to the difference of the thickness between the light incident surface of the optical information recording medium and each of the plurality of information recording planes.

44. The optical pickup apparatus of claim 3, wherein the light converging optical system comprises a diffractive surface including a ring-shaped diffractive structure on at least one optical surface in the light converging optical system.

45. An optical pickup apparatus for conducting information recording and/or information reproducing of an optical information recording medium, comprising:

a light source;

a light converging optical system comprising:
   a first aberration compensating element; and
   an objective lens to converge a light flux emitted from the light source, the light flux passing through the first aberration compensating element onto an information and recording plane of the optical information recording medium; and a photo-detector to receive a reflected light flux from the information recording plane, wherein the light converging optical system comprises a diffractive surface including a ring-shaped diffractive structure on at least one optical surface in the light converging optical system; and wherein the first aberration compensating element comprises a movable element being movable in a direction of an optical axis of the light converging optical system, and the light converging optical system further comprises a moving device to move the movable element in the optical axis direction, and wherein the moving device is piezo actuator.

* * * * *